United States Patent
Hasegawa et al.

(10) Patent No.: US 9,280,951 B2
(45) Date of Patent: Mar. 8, 2016

(54) STEREOSCOPIC IMAGE DISPLAY DEVICE, IMAGE PROCESSING DEVICE, AND STEREOSCOPIC IMAGE PROCESSING METHOD

(71) Applicant: NLT Technologies, Ltd., Kanagawa (JP)

(72) Inventors: Takefumi Hasegawa, Kanagawa (JP); Koji Shigemura, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 303 days.

(21) Appl. No.: 13/955,275

(22) Filed: Jul. 31, 2013

(65) Prior Publication Data

US 2014/0035907 A1 Feb. 6, 2014

(30) Foreign Application Priority Data

Jul. 31, 2012 (JP) .................................. 2012-170645
Apr. 22, 2013 (JP) .................................. 2013-089532

(51) Int. Cl.
*G09G 5/14* (2006.01)
*H04N 13/04* (2006.01)
*H04N 13/00* (2006.01)

(52) U.S. Cl.
CPC ............. *G09G 5/14* (2013.01); *H04N 13/0018* (2013.01); *H04N 13/0033* (2013.01); *H04N 13/0404* (2013.01); *H04N 13/0409* (2013.01); *H04N 13/0468* (2013.01); *H04N 2213/002* (2013.01)

(58) Field of Classification Search
CPC . G09G 5/14; H04N 13/0409; H04N 13/0018; H04N 13/0033; H04N 13/0468; H04N 13/0404; H04N 2213/002
See application file for complete search history.

(56) References Cited

U.S. PATENT DOCUMENTS

| 6,337,721 | B1 | 1/2002 | Hamagishi et al. |
| 2002/0109701 | A1 | 8/2002 | Deering |
| 2011/0032340 | A1* | 2/2011 | Redmann et al. ............ 348/51 |
| 2011/0181593 | A1* | 7/2011 | Hirai et al. .................. 345/427 |

(Continued)

FOREIGN PATENT DOCUMENTS

| EP | 2429202 A2 | 3/2012 |
| EP | 2693760 | 2/2014 |

(Continued)

OTHER PUBLICATIONS

European Search Report dated Jul. 9, 2014 in corresponding European Patent Application No. 13178737.6.

(Continued)

*Primary Examiner* — Maurice L McDowell, Jr.
(74) *Attorney, Agent, or Firm* — Young & Thompson

(57) ABSTRACT

A stereoscopic image display device, with which the influence of a CT-image by the 3D crosstalk is lightened so that a sense of discomfort is not felt by the observer even when the observing position of the observer is shifted, includes an image processing unit including: a relative position calculating unit which calculates a relative position of a stereoscopic display panel with respect to the observing position of the observer; an image filter value calculating unit which calculates an image filter value for adjusting an image blurring amount according to the relative position; and an image filtering processing unit which performs image filtering processing on image data according to the image filter value.

32 Claims, 106 Drawing Sheets

(56) References Cited

U.S. PATENT DOCUMENTS

2011/0316985 A1* 12/2011 Ishikawa et al. ............ 348/51
2012/0062551 A1* 3/2012 Lee et al. ............ 345/419

FOREIGN PATENT DOCUMENTS

| JP | 2001-298754 | 10/2001 |
|---|---|---|
| JP | 2002-095010 | 3/2002 |
| JP | 2005-252459 | 9/2005 |
| JP | 2008-089787 | 4/2008 |
| JP | 2011-040946 | 2/2011 |
| JP | 2011-082829 | 4/2011 |
| JP | 2011-166744 | 8/2011 |
| JP | 2011-244349 | 12/2011 |
| JP | 2012-039592 | 2/2012 |
| JP | 2012-044308 | 3/2012 |

OTHER PUBLICATIONS

Juyong Park, et al., Active Crosstalk Reduction on Multi-View Displays Using Eye Detection, SID2011, 61. 4, pp. 920-923.

Yuki Iwanaka, et al., "Image Processing-based Crosstalk Reduction for Stereoscopic Displays with Shutter Glasses", SID2011, 55. 4, pp. 816-819.

European Partial Search Report for Application 13178737.6-1902; dated Nov. 6, 2013.

* cited by examiner

FIG. 10

| 1/16 | 2/16 | 1/16 |
|------|------|------|
| 2/16 | 4/16 | 2/16 |
| 1/16 | 2/16 | 1/16 |

FIG. 11

| 1/256 | 4/256  | 6/256  | 4/256  | 1/256 |
|-------|--------|--------|--------|-------|
| 4/256 | 16/256 | 24/256 | 16/256 | 4/256 |
| 6/256 | 24/256 | 36/256 | 24/256 | 6/256 |
| 4/256 | 16/256 | 24/256 | 16/256 | 4/256 |
| 1/256 | 4/256  | 6/256  | 4/256  | 1/256 |

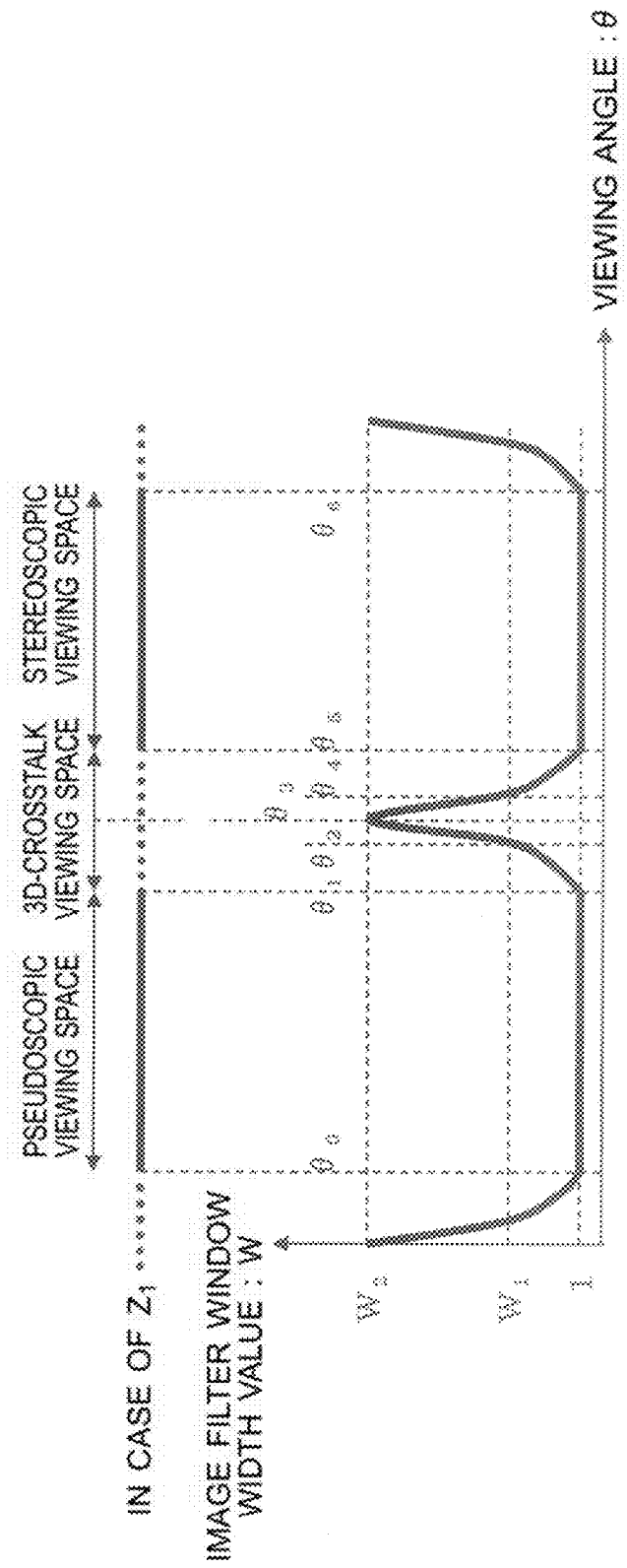

FIG. 13

| 3D CROSSTALK AMOUNT | CT-IMAGE | INFLUENCE FOR STEREOSCOPIC IMAGE | VIEWING ANGLE RANGE | VIEWING SPACE NAME | FILTER WINDOW WIDTH VALUE : W |
|---|---|---|---|---|---|
| $\beta_1$ OR LESS | NONE | HIGH-QUALITY STEREOSCOPIC IMAGE | $\theta_0 \sim \theta_1$ | PSEUDOSCOPIC VIEWING SPACE | 1 |
| $\beta_1 \sim \beta_2$ | SMALL | ACCEPTABLE QUALITY STEREOSCOPIC IMAGE | $\theta_1 \sim \theta_2$ | 3D-CROSSTALK VIEWING SPACE | $1 \sim W_1$ |
| $\beta_2$ OR MORE | LARGE | UNACCEPTABLE QUALITY STEREOSCOPIC IMAGE | $\theta_2 \sim \theta_3$ | 3D-CROSSTALK VIEWING SPACE | $W_1 \sim W_2$ |
| $\beta_2$ OR MORE | LARGE | UNACCEPTABLE QUALITY STEREOSCOPIC IMAGE | $\theta_3 \sim \theta_4$ | 3D-CROSSTALK VIEWING SPACE | $W_1 \sim W_2$ |
| $\beta_1 \sim \beta_2$ | SMALL | ACCEPTABLE QUALITY STEREOSCOPIC IMAGE | $\theta_4 \sim \theta_5$ | 3D-CROSSTALK VIEWING SPACE | $1 \sim W_1$ |
| $\beta_1$ OR LESS | NONE | HIGH-QUALITY STEREOSCOPIC IMAGE | $\theta_5 \sim \theta_6$ | STEREOSCOPIC VIEWING SPACE | 1 |

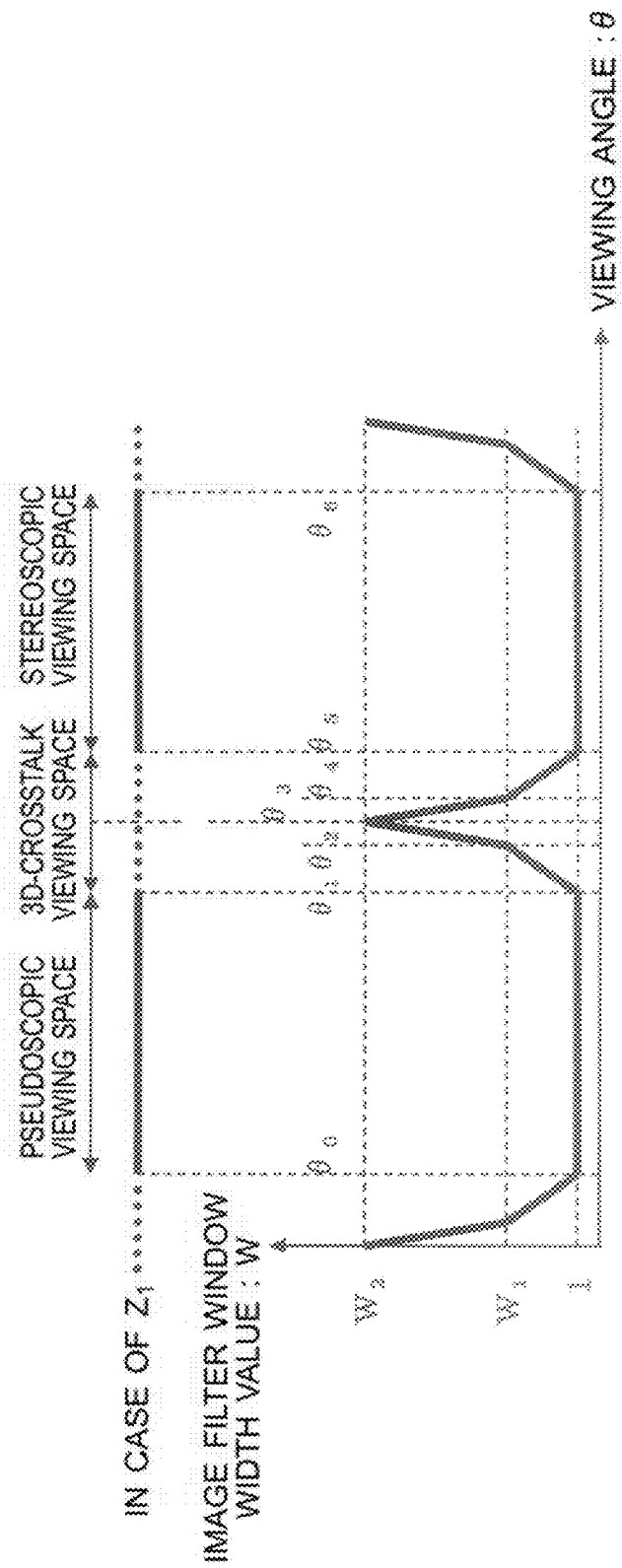

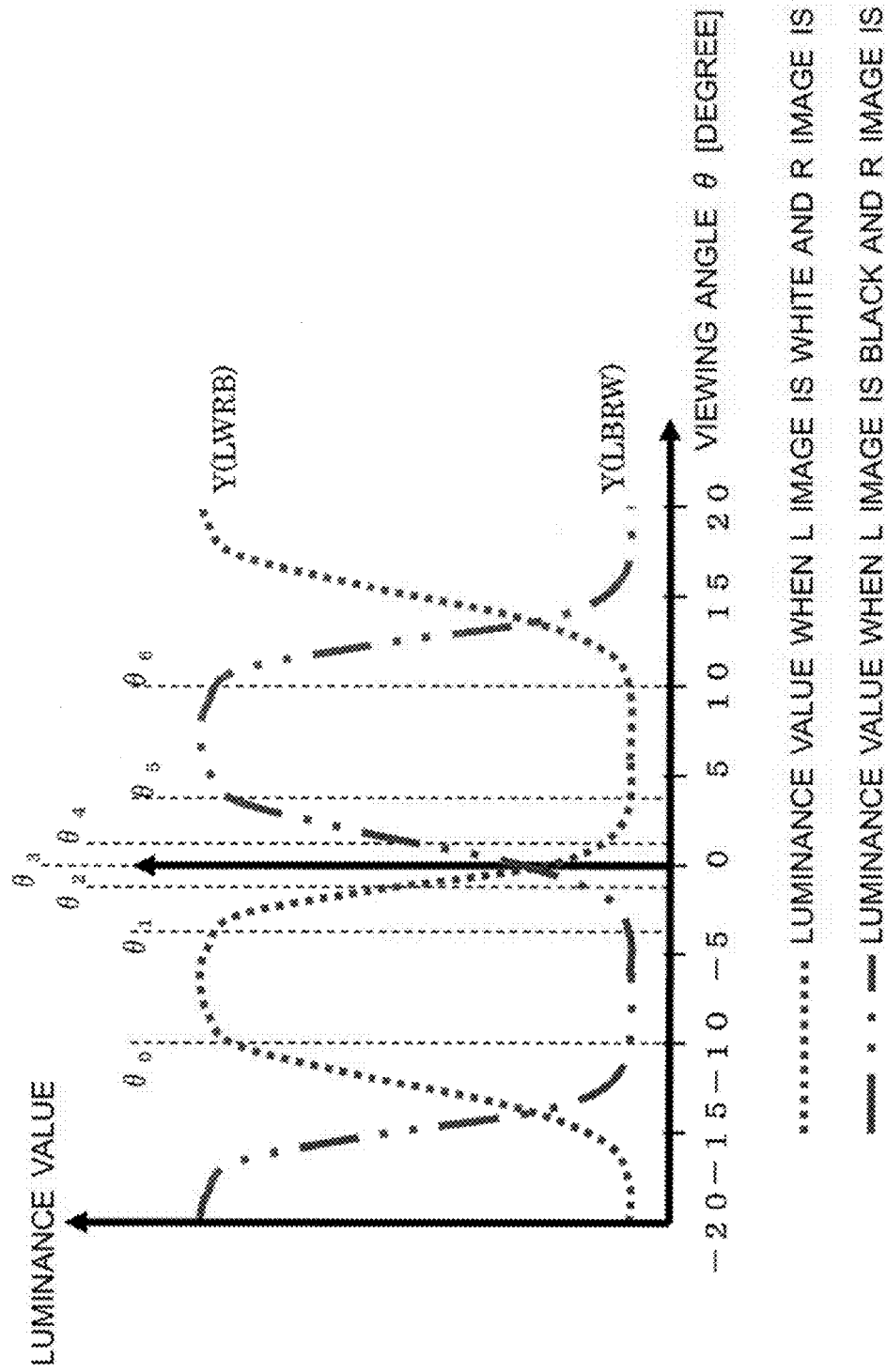

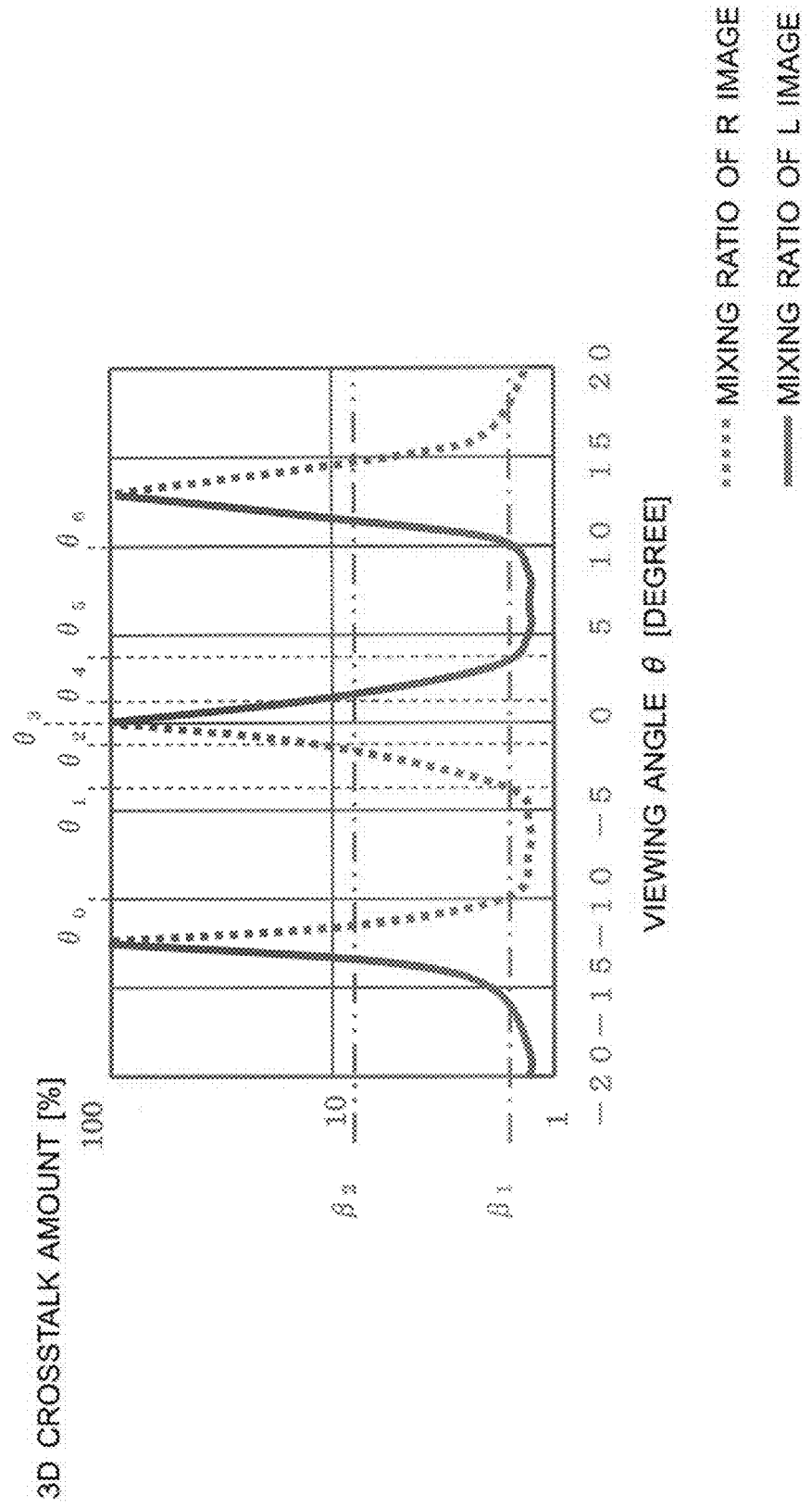

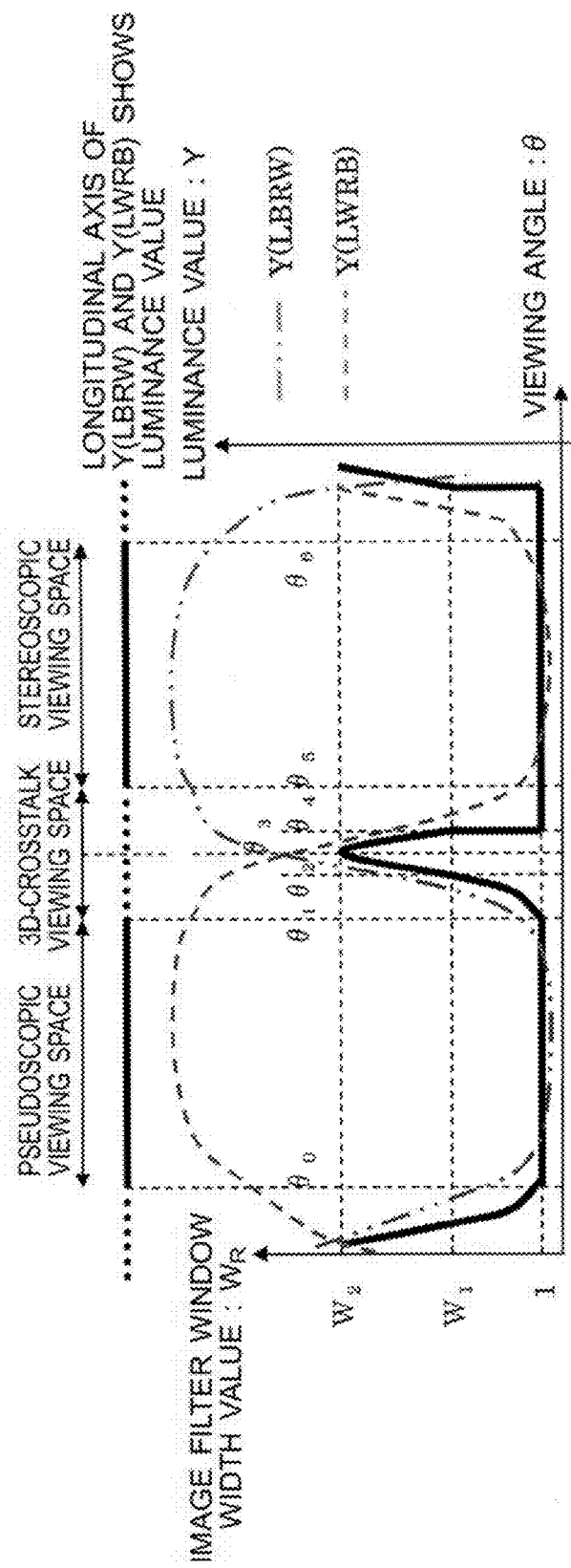

FIG. 29

| CROSSTALK AMOUNT | CT-IMAGE | INFLUENCE FOR STEREOSCOPIC IMAGE | VIEWING ANGLE RANGE | VIEWING SPACE NAME | R IMAGE WINDOW WIDTH VALUE : $W_R$ | L IMAGE WINDOW WIDTH VALUE : $W_L$ |
|---|---|---|---|---|---|---|
| $\beta_1$ OR LESS | NONE | HIGH-QUALITY STEREOSCOPIC IMAGE | $\theta_0 \sim \theta_1$ | PSEUDOSCOPIC VIEWING SPACE (NO CROSSTALK AREA) | 1 | 1 |
| $\beta_1 \sim \beta_2$ | SMALL | ACCEPTABLE QUALITY STEREOSCOPIC IMAGE | $\theta_1 \sim \theta_2$ | CROSSTALK AREA | $1 \sim W_1$ | 1 |
| $\beta_2$ OR MORE | LARGE | UNACCEPTABLE QUALITY STEREOSCOPIC IMAGE | $\theta_2 \sim \theta_3$ | CROSSTALK AREA | $W_1 \sim W_2$ | 1 |
| $\beta_2$ OR MORE | LARGE | UNACCEPTABLE QUALITY STEREOSCOPIC IMAGE | $\theta_3 \sim \theta_4$ | CROSSTALK AREA | 1 | $1 \sim W_1$ |
| $\beta_1 \sim \beta_2$ | SMALL | ACCEPTABLE QUALITY STEREOSCOPIC IMAGE | $\theta_4 \sim \theta_5$ | CROSSTALK AREA | 1 | $W_1 \sim W_2$ |
| $\beta_1$ OR LESS | NONE | HIGH-QUALITY STEREOSCOPIC IMAGE | $\theta_5 \sim \theta_6$ | STEREOSCOPIC VIEWING SPACE (NO CROSSTALK AREA) | 1 | 1 |

FIG. 32

| LEFT-EYE RELATIVE POSITION | RIGHT-EYE RELATIVE POSITION | L IMAGE WINDOW WIDTH VALUE : $W_L$ | R IMAGE WINDOW WIDTH VALUE : $W_R$ |
|---|---|---|---|
| 3D-CROSSTALK VIEWING SPACE | STEREOSCOPIC VIEWING SPACE (R IMAGE) | $1 \sim W_S$ | 1 |
| 3D-CROSSTALK VIEWING SPACE | PSEUDOSCOPIC VIEWING SPACE (L IMAGE) | 1 | $1 \sim W_S$ |
| STEREOSCOPIC VIEWING SPACE (L IMAGE) | 3D-CROSSTALK VIEWING SPACE | 1 | $1 \sim W_S$ |
| PSEUDOSCOPIC VIEWING SPACE (R IMAGE) | 3D-CROSSTALK VIEWING SPACE | $1 \sim W_S$ | 1 |
| 3D-CROSSTALK VIEWING SPACE | 3D-CROSSTALK VIEWING SPACE | $1 \sim W_S$ | $1 \sim W_S$ |

IMAGE DISPLAY STATE OF CT-IMAGE GENERATED
BY 3D CROSSTALK PROJECTED TO OBSERVER
LOCATED WITHIN 3D CROSSTALK VIEWING SPACE

IMAGE DISPLAY STATE FROM WHICH CT-IMAGE
GENERATED BY 3D CROSSTALK IS
LIGHTENED BY IMAGE FILTERING PROCESSING
OF FIRST EXEMPLARY EMBODIMENT

L IMAGE     R IMAGE(AFTER IMAGE FILTERING PROCESSING)

IMAGE DISPLAY STATE FROM WHICH CT-IMAGE
GENERATED BY 3D CROSSTALK IS
LIGHTENED BY IMAGE FILTERING PROCESSING
OF SECOND EXEMPLARY EMBODIMENT

FIG. 41

| RIGHT EYE | LEFT EYE | R IMAGE FILTERING PROCESSING | L IMAGE FILTERING PROCESSING |
|---|---|---|---|
| R IMAGE | L IMAGE | UNEXECUTED | UNEXECUTED |
| R IMAGE | CT IMAGE | UNEXECUTED | EXECUTED |
| R IMAGE | R IMAGE | UNEXECUTED | UNEXECUTED |
| L IMAGE | L IMAGE | UNEXECUTED | UNEXECUTED |
| L IMAGE | CT IMAGE | EXECUTED, IMAGE EXCHANGED | UNEXECUTED, IMAGE EXCHANGED |
| L IMAGE | R IMAGE | UNEXECUTED, IMAGE EXCHANGED | UNEXECUTED, IMAGE EXCHANGED |
| CT IMAGE | L IMAGE | EXECUTED | UNEXECUTED |
| CT IMAGE | CT IMAGE | EXECUTED | EXECUTED |
| CT IMAGE | R IMAGE | UNEXECUTED, IMAGE EXCHANGED | EXECUTED, IMAGE EXCHANGED |

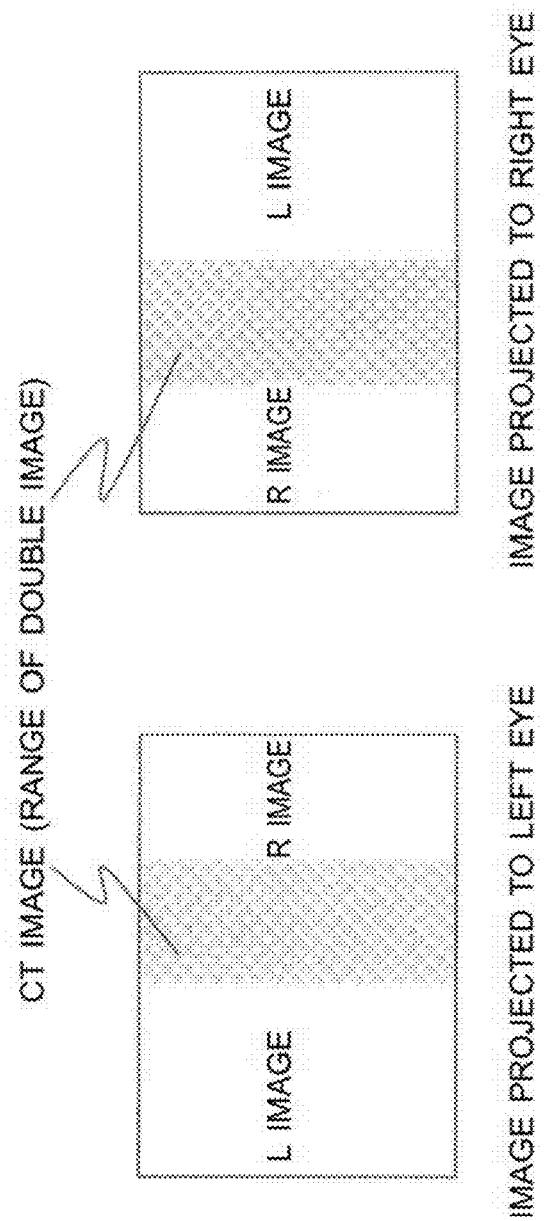

FIG. 43A
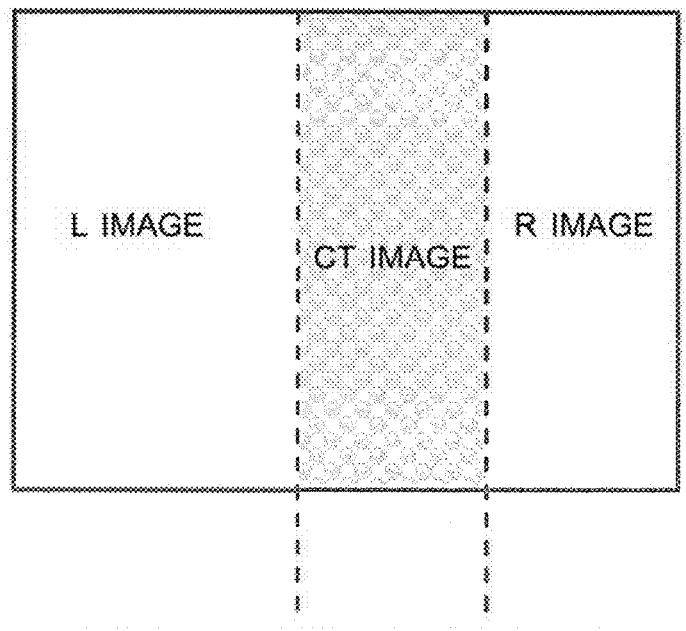
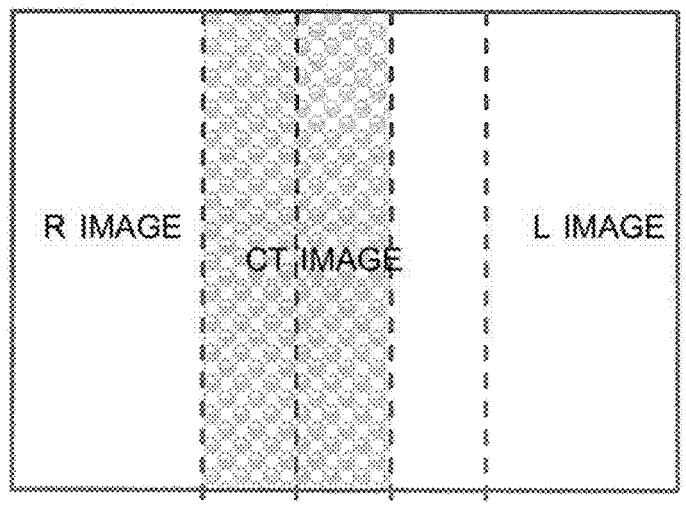

FIG. 44
CT IMAGE (RANGE OF DOUBLE IMAGE)
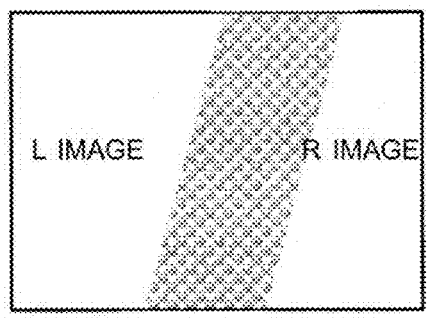
IMAGE PROJECTED TO LEFT EYE
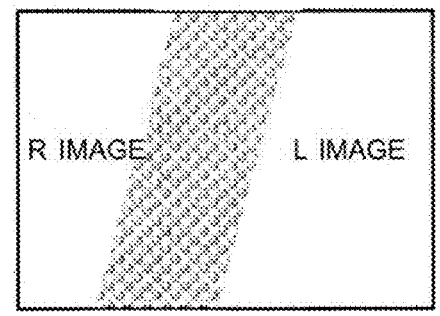
IMAGE PROJECTED TO RIGHT EYE

EXAMPLES OF PARALLAX VALUES SAVED
IN EACH PIXEL OF PARALLAX IMAGE

CALCULATE WEIGHT VALUES BY DEFINING MAXIM VALUE
OF PIXEL (PARALLAX MAXIMUM VALUE: 255) AS "1"

WEIGHT VALUE =
PARALLAX VALUE / PARALLAX MAXIMUM VALUE (255)

WEIGHT VALUES CALCULATED FROM
EXAMPLES OF PARALLAX VALUES

CT-IMAGE BY 3D CROSSTALK

| 0 | 0 | 0 | 0 | 0 |
|---|---|---|---|---|
| 0 | 0 | 0 | 0 | 0 |
| 10/256 | 30/256 | 70/256 | 30/256 | 10/256 |
| 5/256 | 15/256 | 35/256 | 15/256 | 5/256 |
| 1/256 | 5/256 | 10/256 | 5/256 | 1/256 |

CT-IMAGE BY 3D CROSSTALK

FIG. 70
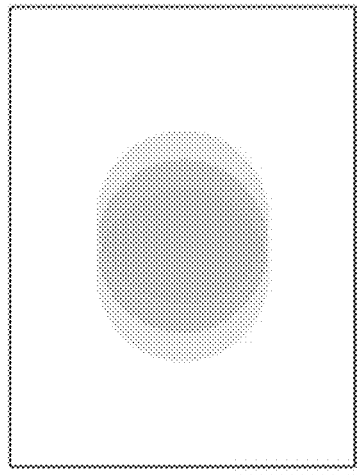
L IMAGE AFTER PROCESSING
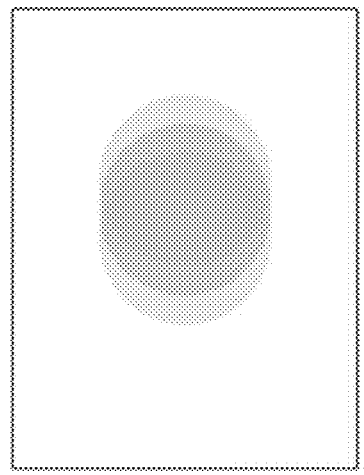
R IMAGE AFTER PROCESSING

FIG. 79

| 3D CROSSTALK AMOUNT | CT-IMAGE | INFLUENCE FOR STEREOSCOPIC IMAGE | VIEWING ANGLE RANGE | VIEWING SPACE NAME | PARALLAX ALLOWABLE VALUE $|u_h|$ |
|---|---|---|---|---|---|
| $\beta_1$ OR LESS | NONE | HIGH-QUALITY STEREOSCOPIC IMAGE | $\theta_0 \sim \theta_1$ | PSEUDOSCOPIC VIEWING SPACE | $\gamma_1$ |
| $\beta_1 \sim \beta_2$ | SMALL | ACCEPTABLE QUALITY STEREOSCOPIC IMAGE | $\theta_1 \sim \theta_2$ | 3D-CROSSTALK VIEWING SPACE | $\gamma_2 \sim \gamma_1$ |
| $\beta_2$ OR MORE | LARGE | UNACCEPTABLE QUALITY STEREOSCOPIC IMAGE | $\theta_2 \sim \theta_3$ | 3D-CROSSTALK VIEWING SPACE | $0 \sim \gamma_2$ |
| $\beta_2$ OR MORE | LARGE | UNACCEPTABLE QUALITY STEREOSCOPIC IMAGE | $\theta_3 \sim \theta_4$ | 3D-CROSSTALK VIEWING SPACE | $0 \sim \gamma_2$ |
| $\beta_1 \sim \beta_2$ | SMALL | ACCEPTABLE QUALITY STEREOSCOPIC IMAGE | $\theta_4 \sim \theta_5$ | 3D-CROSSTALK VIEWING SPACE | $\gamma_2 \sim \gamma_1$ |
| $\beta_1$ OR LESS | NONE | HIGH-QUALITY STEREOSCOPIC IMAGE | $\theta_5 \sim \theta_6$ | STEREOSCOPIC VIEWING SPACE | $\gamma_1$ |

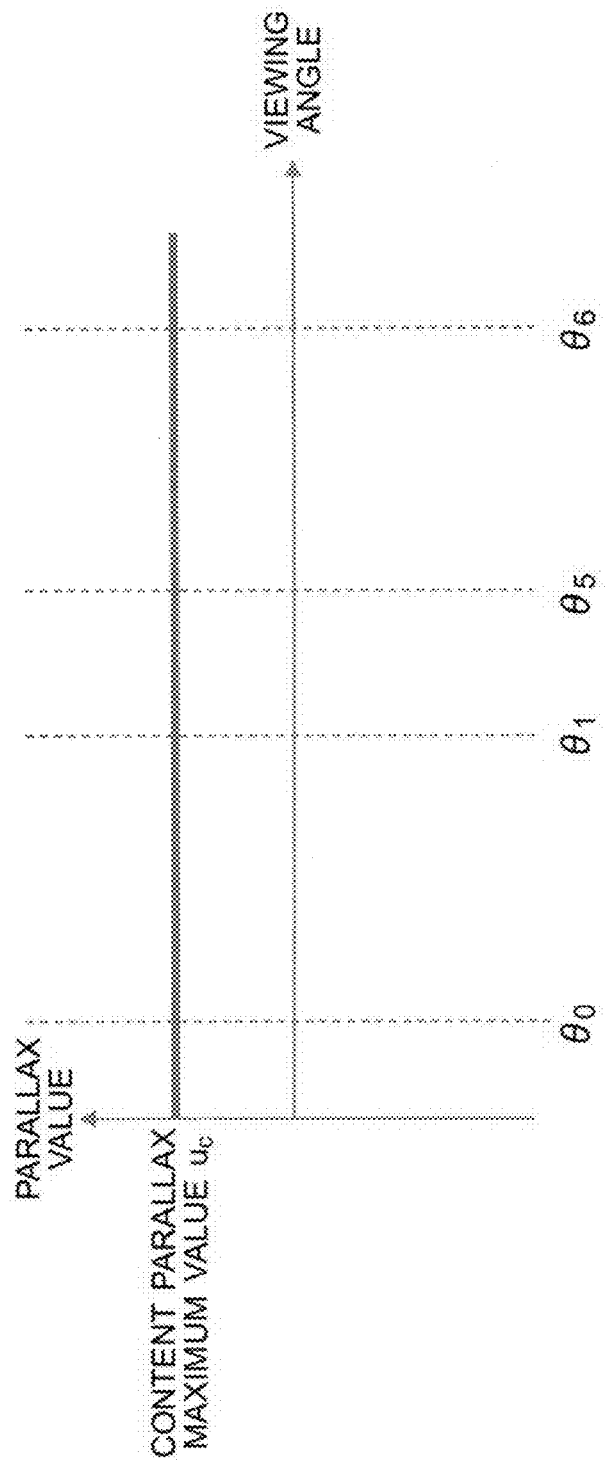

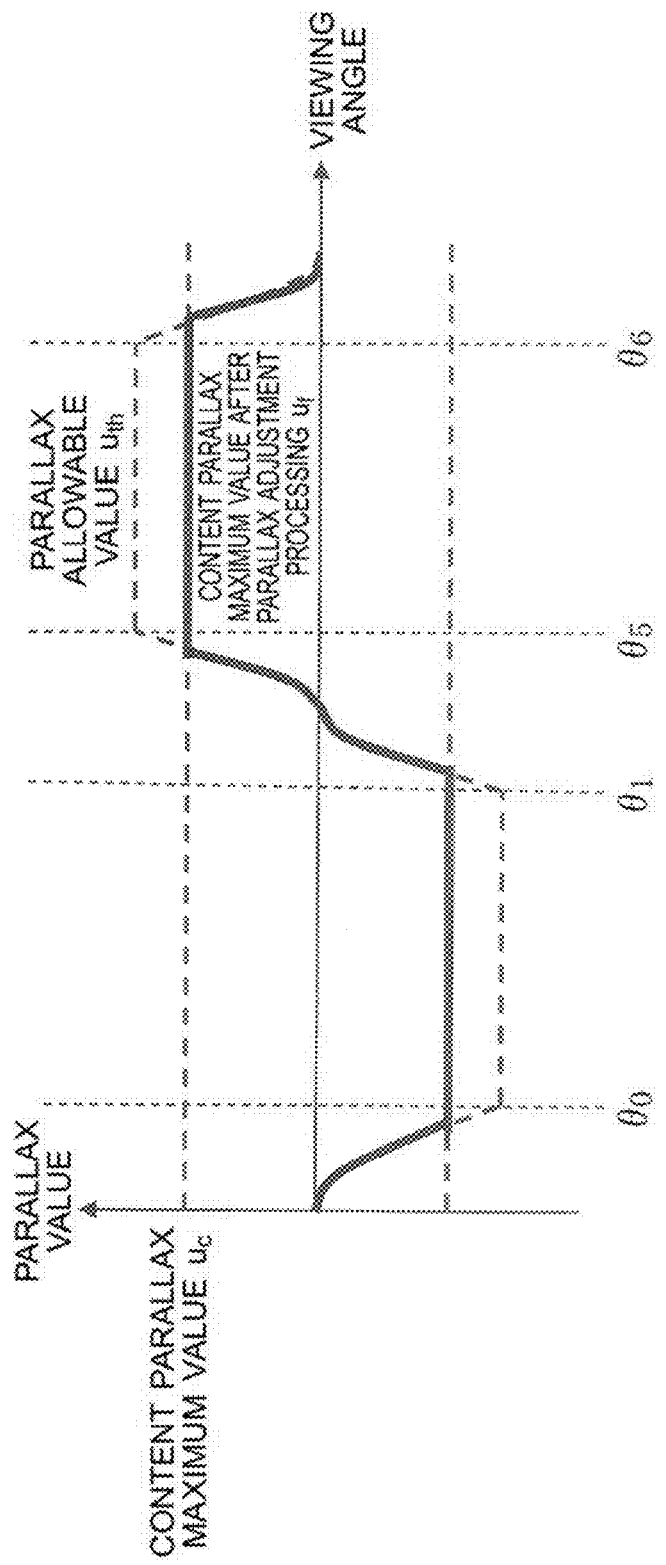

STEREOSCOPIC IMAGE DISPLAY DEVICE, IMAGE PROCESSING DEVICE, AND STEREOSCOPIC IMAGE PROCESSING METHOD

CROSS-REFERENCE TO RELATED APPLICATION

This application is based upon and claims the benefit of priority from Japanese patent application No. 2012-170645, filed on Jul. 31, 2013 and No. 2013-089532, filed on Apr. 22, 2013, the disclosure of which is incorporated herein in its entirety by reference.

BACKGROUND OF THE INVENTION

1. Field of the Invention

The present invention relates to a stereoscopic image display technique. More specifically, the present invention relates to a stereoscopic image display device and the like for converting an image to a stereoscopic image with which an observer does not feel a sense of discomfort even when the observer changes one's position.

2. Description of the Related Art

Recently, television sets capable of viewing stereoscopic images are on the general market. Accordingly, the amount of the stereoscopic image contents is increased, and the environments for viewing the stereoscopic images are coming to be in good condition. In general, the observer wears eyeglasses for stereoscopic image display to project images of different parallaxes on left and right eyes so that the observer can view the stereoscopic image on the stereoscopic image television set. However, there are many observers who feel a sense of displeasure to wear the eyeglasses for stereoscopic image display, and a stereoscopic image display device that requires no such eyeglasses is desired. Further, when the eyeglass-type stereoscopic image display device is utilized as a mobile device, it is inconvenient since the stereoscopic image display device and the eyeglasses for stereoscopic image display are required to be carried to the outside. Thus, such stereoscopic image display device that requires no eyeglasses is more strongly desired for mobile use.

As the stereoscopic image display that requires no eyeglasses for stereoscopic image display, generally used is a type which divides spatial areas for projecting a stereoscopic image, and projects images of different parallaxes to each of the divided spatial areas so as to project images of different parallaxes to the left and right eyes of the observer. Through providing a lenticular lens and a parallax barrier on a stereoscopic display panel of the stereoscopic display device, the images of different parallaxes are provided for each of the divided spatial areas.

With such-type of stereoscopic image display device, it is not necessary to wear the eyeglasses for stereoscopic image display. Thus, it is excellent in terms of avoiding such trouble of wearing eyeglasses and is expected to be utilized in mobile use in particular. However, images of different parallaxes are projected by being spatially isolated with such type, so that the spatial area where the observer can visually recognize the stereoscopic images properly becomes limited. The spatial area where the observer can visually recognize the stereoscopic images properly is limited to a case where the position of the left eye of the observer is within the spatial area where the left-eye image is projected and the position of the right eye of the observer is within the spatial area where the right-eye image is projected. When the positions of the left and right eyes of the observer are shifted from those spatial areas, the left-eye image and the right-eye images overlap on one another. This results in projecting a video of 3D-crosstalk images (CT-images) to the observer.

Now, the spatial areas divided by the stereoscopic display panel will be described by referring to the accompanying drawings. First, described is the spatial area in a case where a parallax barrier is used for the stereoscopic display panel. FIG. 84 shows an example of an optical model in which images of different parallaxes are projected to the left and right eyes of an observer with the parallax-barrier type stereoscopic image display device. FIG. 84 is a sectional view observed from the above the head of the observer, in which the both eyes (right eye 55R and left eye 55L) of the observer are located on an observing plane 30 at a distance of an optimum observing distance OD from the display plane of the display device, and the center of the both eyes of the observer and the center of the display panel match with each other.

The image display panel (not shown) is constituted with a group of optical modulators that are pixels arranged in matrix (e.g., a liquid crystal panel). In FIG. 84, among the right-eye pixels 4R and the left-eye pixels 4L arranged alternately, only each of the pixels at both ends of the image display panel and in the center are illustrated. A parallax barrier 6 that functions as a means for dividing a spatial area and projecting images is disposed on the far side of the display panel from the observer. The parallax barrier 6 is a barrier (a light shielding plate) on which a great number of thin vertical striped slits 6a are formed, and it is disposed in such a manner that the longitudinal direction of the barrier itself becomes orthogonal to the direction along which the left-eye pixels 4L and the right-eye pixels 4R of the image display panel are arranged. In a still far side of the parallax barrier, a light source (not shown: so-called backlight) is placed. Light emitted from the light source transmits through the slits 6a and is projected towards the observer while the intensity thereof is being modulated in the pixels within the image display panel. The projecting directions of the right-eye pixel 4R and the left-eye pixel 4L are limited by the existence of the slits 6a.

When a locus of the light passing through the closest pixel among the light emitted from each of the slits 6a is illustrated as a light ray 20, a right-eye area 70R (a spatial area where the right-eye image is projected) where the projection images of all the right-eye pixels 4R are superimposed and a left-eye area 70L (a spatial area where the left-eye image is projected) where the projection images of all the left-eye pixels 4L are superimposed can be acquired. Only the projection images from the right-eye pixels 4R can be observed in the right-eye area 70R, and only the projection images from the left-eye pixels 4L can be observed in the left-eye area 70L. Therefore, when the parallax images are projected to the left and right eyes while the right eye 55R of the observer is located within the right-eye area 70R and the left eye 55L is located within the left-eye area 70L, the observer visually recognizes those as a stereoscopic image. In other words, the observer can observe a desired stereoscopic image when the right eye 55R is located within the right-eye area 70R and the left eye 55L is located within the left-eye area 70L. The display device shown in FIG. 84 is so designed that the projection images (width P') at the optimum observing distance OD of each of the right-eye pixel 4R and the left-eye pixel 4L (width P) all superimposed with each other so that the width of the right-eye area 70R and the left-eye area 70L becomes the maximum on an observing plane 30. The width P' of the projection image is mainly determined based on the distance h between the slit 6a and the pixel, the pixel pitch P, and the optimum observing distance OD. When the width P' is widened, the width of the right-eye pixel 70L and the left-eye pixel 70L is widened. However, it is impossible to locate each of the both eyes of the observer at arbitrary positions, so that the stereoscopic area where the stereoscopic images can be sighted cannot necessarily be expanded. Provided that the distance between both eyes is e, it is preferable to design the width P' to be equivalent to the space e between the both eyes. In a case where the width P' is smaller than the space e between the both eyes, the area of stereopsis is limited to the width P'. In the meantime, in a case where the width P' is larger than the space e between the both eyes, the area where the both eyes are located in the right-eye area 70R or the left-eye area 70L is simply increased. Note that a far observing distance FD, a near observing distance ND, and a slit width S are written in FIG. 84.

Further, FIG. 85 shows an optical model of a case where the parallax barrier 6 is disposed on the front side of the display panel when viewed from the observer. As in the case where the barrier is disposed on the far side of the display panel when viewed from the observer, the observer is at the optimum observing distance OD, and the projection images (width P') of each of the left-eye and right-eye pixels (width P) are designed to superimpose with each other on the observing plane 30. When a locus of the light passing through the closest slit 6a among the light emitted from each of the pixels is illustrated as the light ray 20, the right-eye area 70R where the projection images of all the right-eye pixels 4R are superimposed and the left-eye area 70L where the projection images of all the left-eye pixels 4L are superimposed can be acquired.

Next, FIG. 86 shows spatial areas divided when a lenticular lens is used instead of the parallax barrier. In FIG. 86, only the parallax barrier 6 of FIG. 85 is changed to the lenticular lens 3. Note that a cylindrical lens width L is written in FIG. 86.

Next, a case where the observer is located in a 3D-crosstalk viewing space away from an area (stereoscopic viewing space) where the observer can visually recognize a stereoscopic image properly will be studied by using the lenticular-lens type optical model. FIG. 87 is a sectional view when observed from above the head of the observer when the observer moves to the right side so that the right eye 55R comes to be located at the boundary between the right-eye area 70R and the left-eye area 72L and the left eye 55L comes to be located at the boundary between the right-eye area 70R and the left-eye area 70L.

In this case, the light ray 20 passing through the principal point (vertex) of the closest cylindrical lens 3a among the light emitted from the right-eye pixels 4R and a light ray 21 passing through the principal point (vertex) of the second closest cylindrical lens 3b among the light emitted from the left-eye pixels 4L are both projected to the position of the right eye 55R of the observer. That is, in FIG. 87, the observer observes the projection images from both the right-eye pixels 4R and the left-eye pixels 4L with the right eye 55R. Thus, when a stereoscopic image is observed, the right-eye pixels 4R and the left-eye pixels 4L are superimposed to produce a double image (so-called 3D-crosstalk image (CT-image)). Therefore, a desired stereoscopic image cannot be sighted. Note here that the area of the boundary between the right-eye area 70R and the left-eye area 72L and the area of the boundary between the right-eye area 70R and the left-eye area 70L are the 3D-crosstalk viewing spaces.

As described above, with the stereoscopic image display device that requires no eyeglasses for stereoscopic image display, an issue of having a CT-image caused by 3D crosstalk occurs depending on the observing position of the observer. Therefore, the observer feels a sense of discomfort, which is a reason for preventing the stereoscopic image display devices from being spread.

In order to overcome the above-described issue, there is proposed a method which lightens the influence of 3D crosstalk by adding black-side correction data or white-side correction data to the image area where the luminance value within the left-eye image (L image) and the right-eye image (R image) of a stereoscopic image content are changed by 3D crosstalk generated by retardation of the liquid crystal of a time-division type stereoscopic image display device. Further, there is also proposed a method which lightens the influence of CT-images caused by 3D crosstalk through adding smooth correction data by applying image blurring processing such as lowpass filter and the like on the black-side correction data and the white-side correction data so that the CT-image becomes hard to be recognized by human eyes (Japanese Unexamined Patent Publication 2011-166744 (Patent Document 1)).

Further, also proposed are methods which lighten the influence of CT-images caused by 3D crosstalk through generating image data from which image components mixed by 3D crosstalk is subtracted and displaying the acquired data (Japanese Unexamined Patent Publication 2001-298754 (Patent Document 2), Japanese Unexamined Patent Publication 2002-095010 (Patent Document 3)). When α % of image components of the R image are mixed into the L image by 3D crosstalk, correction processing of the image data is performed by using a following formula (1).

$$L_f(x,y) = L_c(x,y) - \alpha \times R_c(x,y) \quad \text{Formula (1)}$$

Note here that $L_f(x, y)$ shows the luminance value of the L image after performing the correction processing, while $L_c(x, y)$ shows the luminance value of the L image of the stereoscopic image content as the original data. Further, α shows the 3D crosstalk amount (proportion of the image components to be mixed), and $R_c(x, y)$ shows the luminance value of the R image of the stereoscopic image content as the original data, respectively.

Further, also proposed is a method which lightens the influence of CT-images caused by 3D crosstalk through converting one of two-viewpoint image data into a black image and projecting only the other image data at the observing position where a CT-image generated by 3D crosstalk is projected (Japanese Unexamined Patent Publication 2008-089787 (Patent Document 4)).

Furthermore, also proposed is a stereoscopic image display device which lightens the influence of CT-images caused by 3D crosstalk through measuring the observing position of the observer and performing luminance adjustment processing within sub-pixels which generate multiple-viewpoint parallax images depending on the observing positions (Juyong Park, et al, "Active Crosstalk Reduction on Multi-View Displays Using Eye Detection" SID2011, 61. 4, pp. 920-923 (Non-Patent Document 1)).

Moreover, also proposed is a method which lightens the influence of CT-images caused by 3D crosstalk generated by delay at the time of switching the shutter of the eyeglasses through applying image blurring processing such as lowpass filter and the like on the left-eye image (L image) and the right-eye image (R image) of the stereoscopic image based on the parallax amount with a liquid crystal shutter eyeglass type stereoscopic image display device (Japanese Unexamined Patent Publication 2011-040946 (Patent Document 5)).

Further, also proposed is a method which shortens the time for displaying a CT-image caused by 3D crosstalk through expanding the dynamic range of the luminance value of the image data for lightening the influence of the CT-image by 3D crosstalk generated due to shift (change in the speed) in the timing of the eyeglass shutter, the timing of the liquid crystal panel, and the timing of the backlight with a liquid crystal shutter eyeglass type stereoscopic image display device (Yuki Iwanaka, et al, "Image Processing-based Crosstalk Reduction for Stereoscopic Displays with Shutter Glasses" SID2011, 55. 4, pp. 816-819 (Non-Patent Document 2)).

Furthermore, also disclosed is a method which lightens the influence of the CT-image caused by 3D crosstalk even in a case where stereoscopic image display devices of various display types are used through switching the image to the image data that lightens the influence of the CT-image caused by 3D crosstalk in accordance with the display types (liquid crystal shutter eyeglass type, polarization eyeglass type) of the stereoscopic image display device (Japanese Unexamined Patent Publication 2012-039592 (Patent Document 6)).

Further, even when stereoscopic image contents of same parallax are displayed, the parallax of the stereoscopic image contents observed by the observer changes depending on the distance between the stereoscopic image display device and the observing position of the observer. There is also proposed a method which displays a stereoscopic image by adjusting the parallax of the stereoscopic image content according to the distance between the stereoscopic image display device and the observing position of the observer in order to overcome such an issue that the stereoscopic image cannot be sighted when the distance between the stereoscopic image display device and the observing position of the observer becomes too small so that the parallax of the stereoscopic image contents becomes too large (Japanese Unexamined Patent Publication 2012-044308 (Patent Document 7)).

Furthermore, the stereoscopic image display device gives a sense of discomfort called an image frame distortion to the observer when the popup-displayed stereoscopic image content is hidden in the image frame and displayed partially. In a case of a flat image display, the image content is in a rear position with respect to the image frame, so that the observer visually recognizes that the whole scene of the content is not shown. However, in a case of a stereoscopic image display, the observer feels a sense of discomfort since the stereoscopic image content is displayed with a part thereof being hidden by the image frame even when the stereoscopic image is displayed on the front side with respect to the image frame. Thus, there is proposed a method which makes the stereoscopic image content displayed on the outside of the stereoscopic display area that is the cause for the image frame distortion transparent so that it is not displayed, in order to overcome the issue of the image frame distortion in the multi-viewpoint type stereoscopic image display device (Japanese Unexamined Patent Publication 2005-252459 (Patent Document 8)).

Further, also proposed is a method which performs blurring processing on the image data to be the stereoscopic image in order to lighten fatigue caused by viewing the stereoscopic image (Japanese Unexamined Patent Publication 2011-082829 (Patent Document 9)).

Furthermore, an object at a far distance is viewed in an out-of-focus state with human eyes due to the focus function of the human eyes. However, in a case of displaying a stereoscopic image on the stereoscopic image display device, the out-of-focus state caused due to the focus function of the human eyes does not occur since the stereoscopic image is projected from the panel on the same plane. In order to lighten such state, there is proposed a method which measures the observing position of the observer and performs blurring processing of the image data to be the stereoscopic image (Japanese Unexamined Patent Publication 2011-244349 (Patent Document 10)).

With the naked-eye stereoscopic image display device that requires no eyeglasses for stereoscopic image display, there is a large influence of a CT-image caused by 3D crosstalk depending on the observing position of the observer. This gives not only a sense of discomfort to the observer but also is one of the factors for causing physiological instability such as feeling video sickness and eye fatigue in a case of a stereoscopic image display device with a low picture quality, which is a reason for preventing the naked-eye stereoscopic image display device from being spread.

As a method for overcoming such issue, Patent Document 1 is proposed. However, the method of Patent Document 1 does not adjust the blurring amount of the image data by taking the observing position of the observer in to consideration. Therefore, it is not possible to perform the image blurring processing for lightening the influence of the CT-image caused by 3D crosstalk when the observing position of the observer is shifted.

Further, the methods of Patent Documents 2 and 3 lighten the influence of the CT-image caused by 3D crosstalk by subtracting the image components mixed by 3D crosstalk from the image data. However, the image processing method executed by subtraction can only be applied when the 3D crosstalk amount is small and the amount of the image component to be mixed is small. When the 3D crosstalk amount is large, the image component to be mixed cannot be subtracted from the original image data. Thus, there appears an image area from which the mixed image component cannot be removed completely. Therefore, when the observing position of the observer is shifted and the 3D crosstalk amount is increased, the influence of the CT-image caused by 3D crosstalk cannot be lightened.

Further, with the method of Patent Document 4, it is possible to remove the influence of the CT-image caused by 3D crosstalk through converting one of the image data to a black image. However, only the other image data is projected towards the observer, so that the luminance value of the image data projected towards the observer is deteriorated. Furthermore, while increasing the output of the backlight as a countermeasure for the deterioration of the luminance value is depicted in Patent Document 4, it causes increase of the power consumption, shortening of the life of the backlight, and the like. Moreover, with the stereoscopic image display device which projects the two-viewpoint image data (right-eye image and left-eye image) towards the observer, there is a possibility of projecting only the black image to one of the eyes of the observer when one of the image data is converted into the black image. Therefore, the image processing method of Patent Document 4 cannot be applied.

With Non-Patent Document 1, it is possible to lighten the influence of CT-images caused by 3D crosstalk through measuring the observing position of the observer and performing luminance adjustment processing on the sub-pixels which generate multiple-viewpoint parallax images depending on the observing positions. However, the luminance adjustment processing on the order of sub-pixel is required, so that the processing becomes complicated. Further, as in the case of Patent Document 4, with the stereoscopic image display device which projects the two-viewpoint image data (right-eye image and left-eye image) towards the observer, there is a possibility of projecting only the sub-pixels whose luminance value is deteriorated to one of the eyes of the observer when the luminance value is deteriorated by the luminance adjustment processing performed on the sub-pixels. Therefore, the image processing method of Non-Patent Document 1 cannot be applied.

Further, with Patent Document 5 and Non-Patent Document 2, it is possible to lighten the influence of CT-images caused by 3D crosstalk in the liquid crystal shutter eyeglass type stereoscopic image display device. However, there is no consideration regarding a countermeasure for 3D crosstalk generated in the naked-eye type stereoscopic image display device, and the blurring amount of the image data is not adjusted by considering the observing position of the observer. Thus, when the observing position of the observer is shifted, the image blurring processing for lightening the influence of the CT-image caused by 3D crosstalk cannot be performed.

Further, Patent Document 6 discloses the method which displays the image by switching it to the image data that lightens the influence of 3D crosstalk in accordance with the display type of the stereoscopic image display device. However, it does not consider the display type of the naked-eye type stereoscopic image display device, so that it is not possible to lighten the influence of 3D crosstalk with the naked-eye type stereoscopic image display device.

Furthermore, Patent Document 7 discloses the method which performs parallax adjustment processing on the stereoscopic image content in accordance with the distance between the stereoscopic image display device and the observing position of the observer. However, it does not consider any image filtering processing method (parallax adjusting amount calculation method) for lightening the influence of the CT-image caused by 3D crosstalk appearing in the naked-eye type stereoscopic image display device which projects the image by spatially separating it into the right-eye image and the left-eye image by using a lenticular lens or a parallax barrier, so that the influence of the CT-image caused by 3D crosstalk cannot be lightened.

Further, Patent Document 8 proposes the method which makes the stereoscopic image contents displayed on the outside of the stereoscopic display area that is the cause for the image frame distortion transparent so that it is not displayed. However, it does not consider any image filtering processing method (method which makes the image transparent so as not be displayed) for lightening the influence of the CT-image caused by 3D crosstalk appearing in the naked-eye type stereoscopic image display device which projects the image by spatially separating it into the right-eye image and the left-eye image by using a lenticular lens or a parallax barrier. Thus, the influence of the CT-image caused by 3D crosstalk cannot be lightened.

Further, Patent Document 9 proposes the method which performs blurring processing on the image data to be the stereoscopic image. However, it does not consider any image filtering processing method (image blurring) for lightening the influence of the CT-image caused by 3D crosstalk appearing in the naked-eye type stereoscopic image display device which projects the image by spatially separating it into the right-eye image and the left-eye image by using a lenticular lens or a parallax barrier, so that the influence of the CT-image caused by 3D crosstalk cannot be lightened.

Further, Patent Document 10 proposes the method which measures the observing position of the observer and performs blurring processing of the image data to be the stereoscopic image. However, it does not consider any image filtering processing method (image blurring) for lightening the influence of the CT-image caused by 3D crosstalk appearing in the naked-eye type stereoscopic image display device which projects the image by spatially separating it into the right-eye image and the left-eye image by using a lenticular lens or a parallax barrier, so that the influence of the CT-image caused by 3D crosstalk cannot be lightened.

It is therefore an exemplary object of the present invention to overcome the above-described issues and to provide a stereoscopic image display device and the like with which the influence of the CT-image caused by 3D crosstalk is lightened so that the observer does not feel a sense of discomfort even when the observing position of the observer is shifted even with the naked-eye type stereoscopic image display device.

SUMMARY OF THE INVENTION

The stereoscopic image display device according to an exemplary aspect of the invention is characterized to include:
a stereoscopic display panel which includes: a light separating module which distributes a light ray at least into two different viewpoint directions; assuming that the direction of distributing the light ray as a first direction, a stereoscopic viewing space where a stereoscopic image is displayed by projecting a right-eye image to the right-eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a 3D-crosstalk viewing space where the right-eye image and the left-eye image are projected to one of or both of the right eye and the left eye, which is between the stereoscopic viewing space and the pseudoscopic viewing space in the first direction;
an observer position measuring unit which measures an observing position of the observer;
a relative position calculating unit which calculates a relative position of the stereoscopic display panel with respect to the measured observing position;
an image filter value calculating unit which calculates an image filter value for adjusting an image blurring amount according to the relative position; and
an image filtering processing unit which performs image filtering processing on image data according to the image filter value.

The image processing device according to another exemplary aspect of the invention is characterized as an image processing device which outputs an image data to a stereoscopic display panel which includes: a light separating module which distributes a light ray at least into two different viewpoint directions; assuming that the direction of distributing the light ray as a first direction, a stereoscopic viewing space where a stereoscopic image is displayed by projecting a right-eye image to the right-eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a crosstalk area where the right-eye image and the left-eye image are projected to one of or both of the right eye and the left eye, which is between the stereoscopic viewing space and the pseudoscopic viewing space in the first direction, and the image processing device includes:
a relative position calculating unit which calculates a relative position of the stereoscopic display panel with respect to an observing position of the observer;
an image filter value calculating unit which calculates an image filter value for adjusting an image blurring amount according to the relative position; and
an image filtering processing unit which performs image filtering processing on image data according to the image filter value.

The stereoscopic image processing method according to still another exemplary aspect of the invention is characterized as a stereoscopic image processing method using a stereoscopic display panel which includes: a light separating module which distributes a light ray at least into two different viewpoint directions; assuming that the direction of distributing the light ray as a first direction, a stereoscopic viewing space where a stereoscopic image is displayed by projecting a right-eye image to the right-eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a crosstalk area where the right-eye image and the left-eye image are projected to one of or both of the right eye and the left eye, which is between the stereoscopic viewing space and the pseudoscopic viewing space in the first direction, and the method includes:

measuring an observing position of the observer;
calculating a relative position of the stereoscopic display panel with respect to the observing position;
calculating an image filter value for adjusting an image blurring amount according to the relative position;
performing image filtering processing on image data according to the image filter value; and
outputting the image data on which the image filtering processing is performed to the stereoscopic display panel.

BRIEF DESCRIPTION OF THE DRAWINGS

FIG. 10 is a chart showing an image filter (Gaussian filter);
FIG. 11 is a chart showing an image filter (Gaussian filter);
FIG. 12 is a chart showing window width values of the image filter with respect to viewing angles;
FIG. 13 is a chart showing a relational table regarding each kind of values with respect to 3D crosstalk amount;
FIG. 14 is a chart showing window width values of the image filter with respect to viewing angles;
FIG. 26A is a chart showing luminance characteristic data of the stereoscopic image display device among 3D device characteristic data;
FIG. 26B is chart showing 3D crosstalk characteristic data of the stereoscopic image display device among 3D device characteristic data;
FIG. 27 is a chart showing window width values of the image filter with respect to viewing angles of an R image;
FIG. 29 is a chart showing a relational table regarding each kind of values with respect to 3D crosstalk amount;
FIG. 32 is a chart showing an image filter value calculation condition table which corresponds to relative positions of both eyes of the observer;
FIG. 41 is a chart showing an image filtering processing execution judgment table;
FIG. 42 shows illustrations of image displayed states projected to the right eye and left eye of an observer;
FIG. 43A shows image displayed states of stereoscopic image contents projected to the left eye and the right eye, respectively;
FIG. 44 shows image displayed states projected to the right eye and left eye of an observer;

FIG. 66 is a chart showing image filter values applied to the R image;

FIG. 67 is a chart showing image filter values applied to the L image;

FIG. 70 shows illustrations of an L image and an R image to which laterally symmetric image filtering processing is applied;

FIG. 73 is a layout chart of virtual cameras by toe-in;

FIG. 79 is a chart showing a relational table regarding each kind of values with respect to 3D crosstalk amount;

FIG. 80B is a chart showing content parallax maximum values with respect to the viewing angles;

FIG. 80C is a chart showing parallax maximum values with respect to the viewing angles after performing parallax adjustment processing;

DETAILED DESCRIPTIONS OF THE PREFERRED EMBODIMENTS

Modes (referred to as "exemplary embodiments" hereinafter) for embodying the present invention will be described hereinafter by referring to the accompanying drawings.

First Exemplary Embodiment

Figure 1:
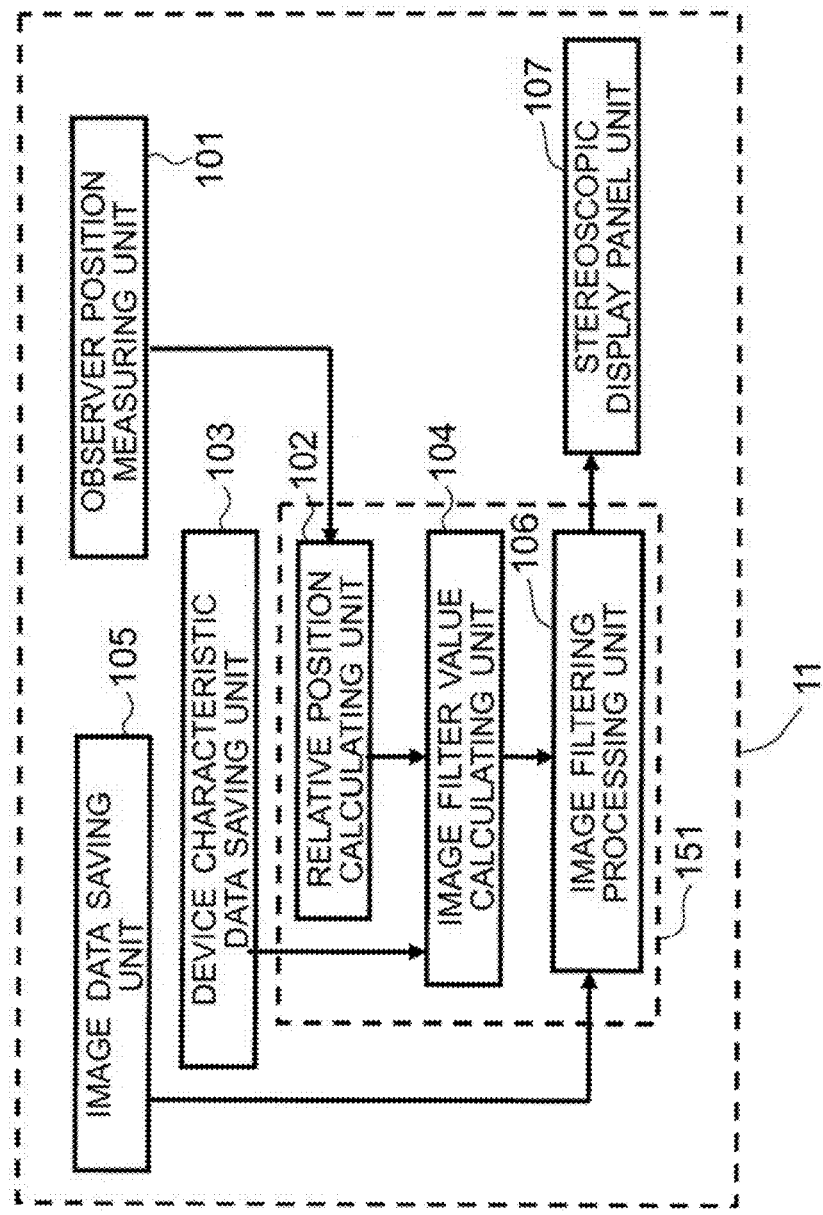
FIG. 1 is a block diagram showing a stereoscopic image display device according to a first exemplary embodiment.

The structure of a stereoscopic image display device according to a first exemplary embodiment will be described below. FIG. 1 is a block diagram of a stereoscopic image display device 11. The stereoscopic image display device 11 includes: an observer position measuring unit 101; a relative position calculating unit 102; a device characteristic data saving unit 103; an image filter value calculating unit 104; an image data saving unit 105; an image filtering processing unit 106; and a stereoscopic display panel unit 107. Further, a processing unit that is an integration of the relative position calculating unit 102, the image filter value calculating unit 104, and the image filtering processing unit 106 is referred to as an image processing unit 151.

Figure 2:
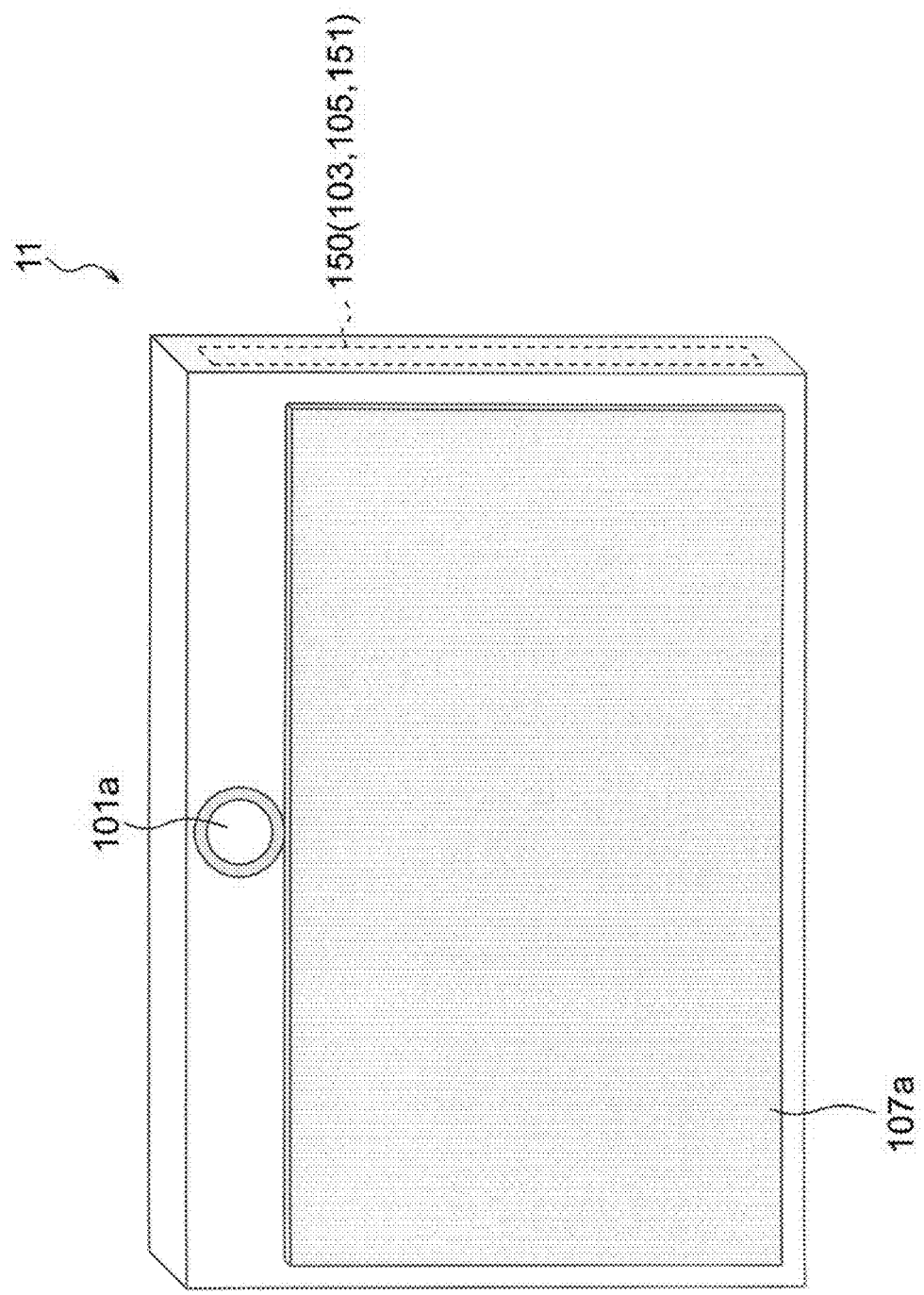
FIG. 2 is an external appearance of the stereoscopic image display device.
Figure 3:
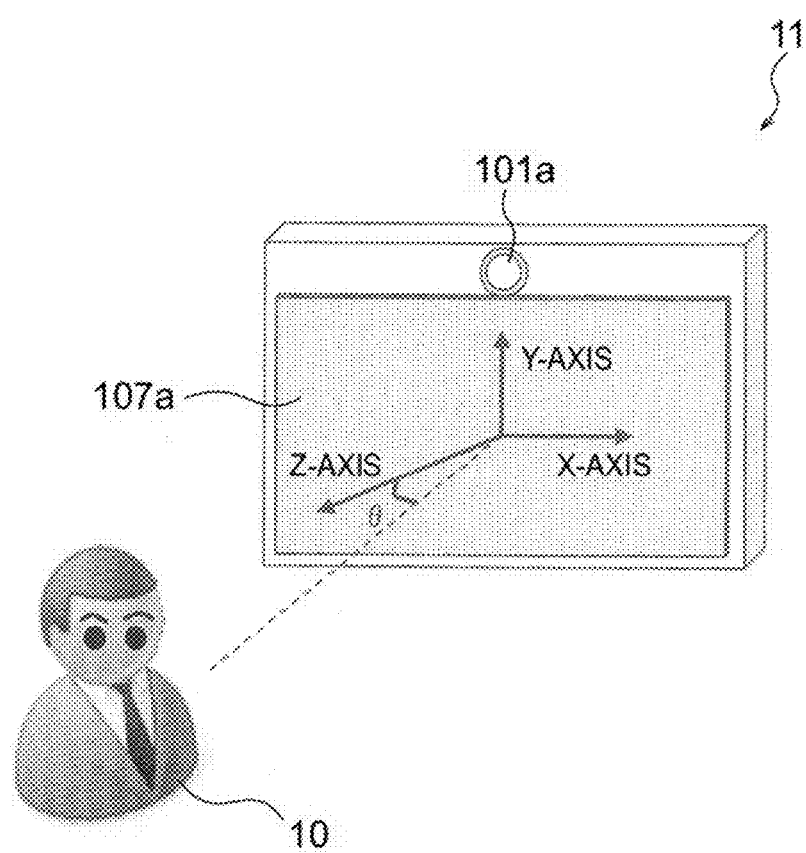
FIG. 3 is a chart showing a coordinate system of the relative positions regarding the observing position of an observer and the stereoscopic display panel.

FIG. 2 shows an external appearance of the stereoscopic image display device 11. FIG. 3 shows a coordinate system of the relative positions regarding the observing position of an observer 10 and a stereoscopic display panel 107a. The stereoscopic display panel 107a is a part of the stereoscopic display panel 107, and a camera 101a is a part of the observer position measuring unit 101. In the stereoscopic image display device 11, the camera 101a is placed on the upper side of the stereoscopic display panel 107a, and the observing position of the observer 10 is measured through capturing the observer 10 by the camera 101a. Further, the set positions of the camera 101a and the stereoscopic display panel 107a are fixed, so that the relative positions between the observing position of the observer 10 and the stereoscopic display panel 107a can be calculated through capturing the observer 10 by using the camera 101a.

The stereoscopic display panel 107a is constituted with: a display panel as an electro-optical module in which a plurality of pixels including at least sub-pixels for displaying images for a first viewpoint and sub-pixels for displaying images for a second viewpoint are arranged in matrix; and a light separating module which is capable of separating each of the images to prescribed different dictions. Examples of the display panel that can be used as the electro-optic module are a liquid crystal type, an organic EL type, a plasma type, and the like. Examples of the light separating modules that can be used are a lenticular lens, a parallax barrier, a liquid crystal lens, and the like. This exemplary embodiment will be described by using a combination of a display panel 2 and a lenticular lens 3 (see FIG. 5). Note here that an example of "a first direction" depicted in the exemplary embodiments of the invention is the X-axis direction shown in FIG. 3, and an example of "an optical module" also depicted in the exemplary embodiments is the above-described light separating module.

Further, a calculator 150 which implements functions of the image processing unit 151, the device characteristic data saving unit 103, and the image data saving unit 105 is placed in a rear part of the stereoscopic display panel 107a.

Hereinafter, functions of each unit included in the stereoscopic image display device 11 will be described.

The observer position measuring unit 101 has a function which measures the position of the observer who is observing a stereoscopic image content displayed on the stereoscopic display panel 107a. For measuring the observer position, the positions of the right and the left eye of the observer 10 are measured by capturing the observer with the camera 101a placed at the upper side of the stereoscopic display panel 107a. Not only the position in the horizontal direction (X axis, Y axis) of the capturing plane of the camera 101a but also the position in the depth direction (Z axis) with respect to the camera 101a is measured for measuring the observing position of the observer 10. Many methods are proposed for measuring the distance in the depth direction with respect to the camera 101a.

One of those is an optical pattern projection method with which an optical pattern of an infrared ray or the like is projected towards the observer from a viewpoint different from the camera and the depth distance is measured from the displacement amount based on the triangulation theory. Measurement equipment employing the optical pattern projection method has recently been put into products as home-use game machines and computer peripheral equipment.

The second method is a TOF (Time of Flight) method with which a near infrared sine wave light is irradiated to the observer from the camera, and the depth distance is measured from the time lag of the light flight until the sine wave light reflected from the observer reaches the camera. Recently, the improvement in the performance of the TOF sensor is remarkable, thereby making it almost possible to measure the inner-side distance with a small and cheap camera.

The third method is a multi-viewpoint camera method with which two or more cameras are placed at different viewpoints. For measuring the depth distance, the feature point of the observer is detected from images of arbitrary viewpoints, and the points corresponding to the feature point are searched from the images of different viewpoints to calculate the depth distance based on the triangulation theory.

The fourth method uses lens focus information, with which the depth distance of the observer is measured from a group of multi-focus-points images captured at various focal points by using optical-system lenses of different depths of fields.

The four methods for measuring the depth distance are described above. The first exemplary embodiment can employ any of those methods. Further, any other measuring methods can be employed. For example, the depth distance may be measured by saving the size of the face of the observer in advance and comparing it with the face image size of the observer captured by a camera.

With the processing for detecting the face of the observer from a captured image, template data is generated in advance from the feature amount (eyes, nose, mouth, chin, and the like) of the face image, and the face of the observer is detected by matching the captured image with the template data. The template data is generated by using mechanical learning methods such as a support vector machine (SVM) and a vector quantization from the face image of the observer. As the face detecting functions, it is also possible to use multi-purpose software. Further, it is possible with the face detecting function software to achieve face detecting processing by considering the direction towards which the observer is facing through the use of depth information. Thus, the detection precision is improved further.

With the above-described processing, the positions of the right eye and the left eye are measured by detecting the face of the observer 10. As another example, it is also possible to use an acceleration sensor and a gyro sensor without using a camera. Various kinds of sensors are placed in the stereoscopic image display device 11 in advance, and positional information acquired from the sensors is referred to measure the observing position of the observer 10.

The relative position calculating unit 102 has a function which calculates the relative positions from the stereoscopic display panel 107a to the observing position of the observer 10. As shown in FIG. 3, the relative position to the observing position of the observer with respect to the center of the stereoscopic display panel 107a as the origin is calculated while assuming that the lateral direction with respect to the plane of the stereoscopic display panel 107a is the X-axis, the longitudinal direction with respect to the plane of the stereoscopic display panel 107a is the Y-axis, and the perpendicular direction with respect to the plane of the stereoscopic display panel 107a is the Z-axis. The relative position is calculated by subtracting the distance from the set position of the camera 101a to the set position of the stereoscopic display panel 107a from the positions of the right eye and the left eye of the observer measured by the observer position measuring unit 101. Further, the viewing angle θ is calculated from the relative position (coordinate value of X-axis, Y-axis, Z-axis). A relational expression between the viewing angle θ and the coordinate value of the X-axis, the Y-axis, and the Z-axis is as in formula (2), so that the viewing angle θ can be calculated from formula (3).

$$\tan \theta = X/Z \quad \text{Formula (2)}$$

$$\theta = \tan^{-1}(X/Z) \quad \text{Formula (3)}$$

Figure 4:
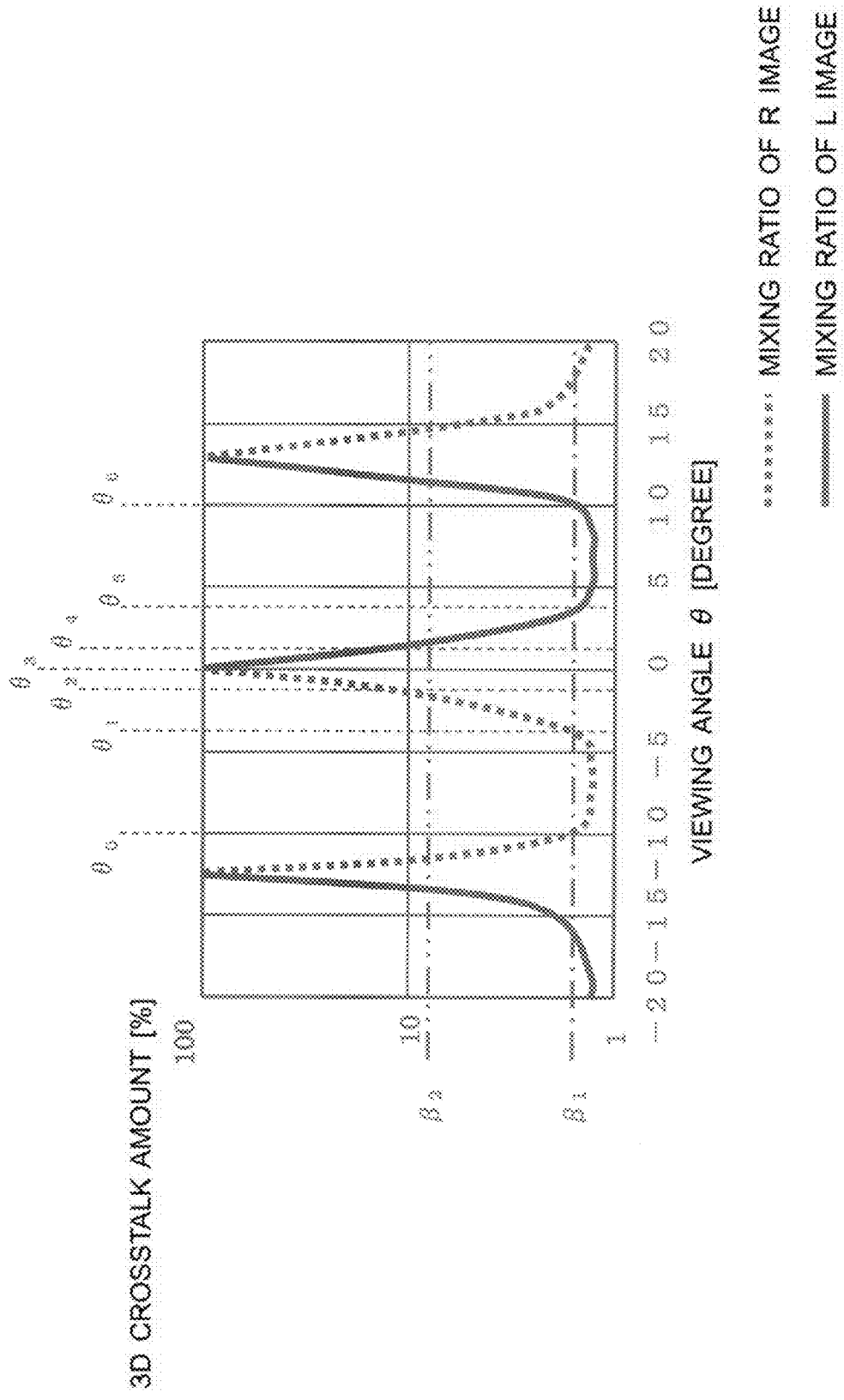
FIG. 4 is a chart showing 3D crosstalk characteristic data of the stereoscopic image display device.
Figure 5:
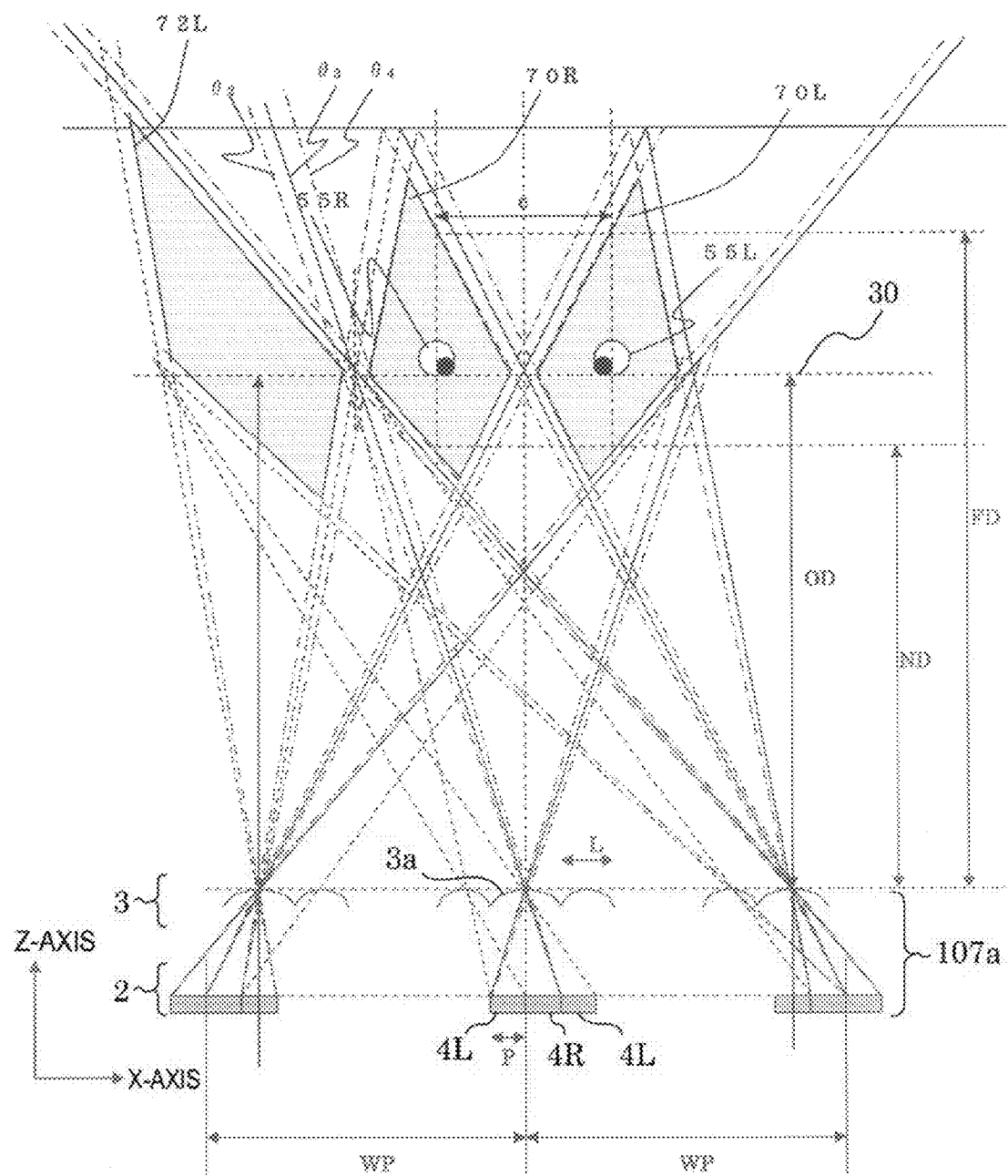
FIG. 5 is a relational chart showing the 3D crosstalk characteristic data and an optical model.
Figure 86:
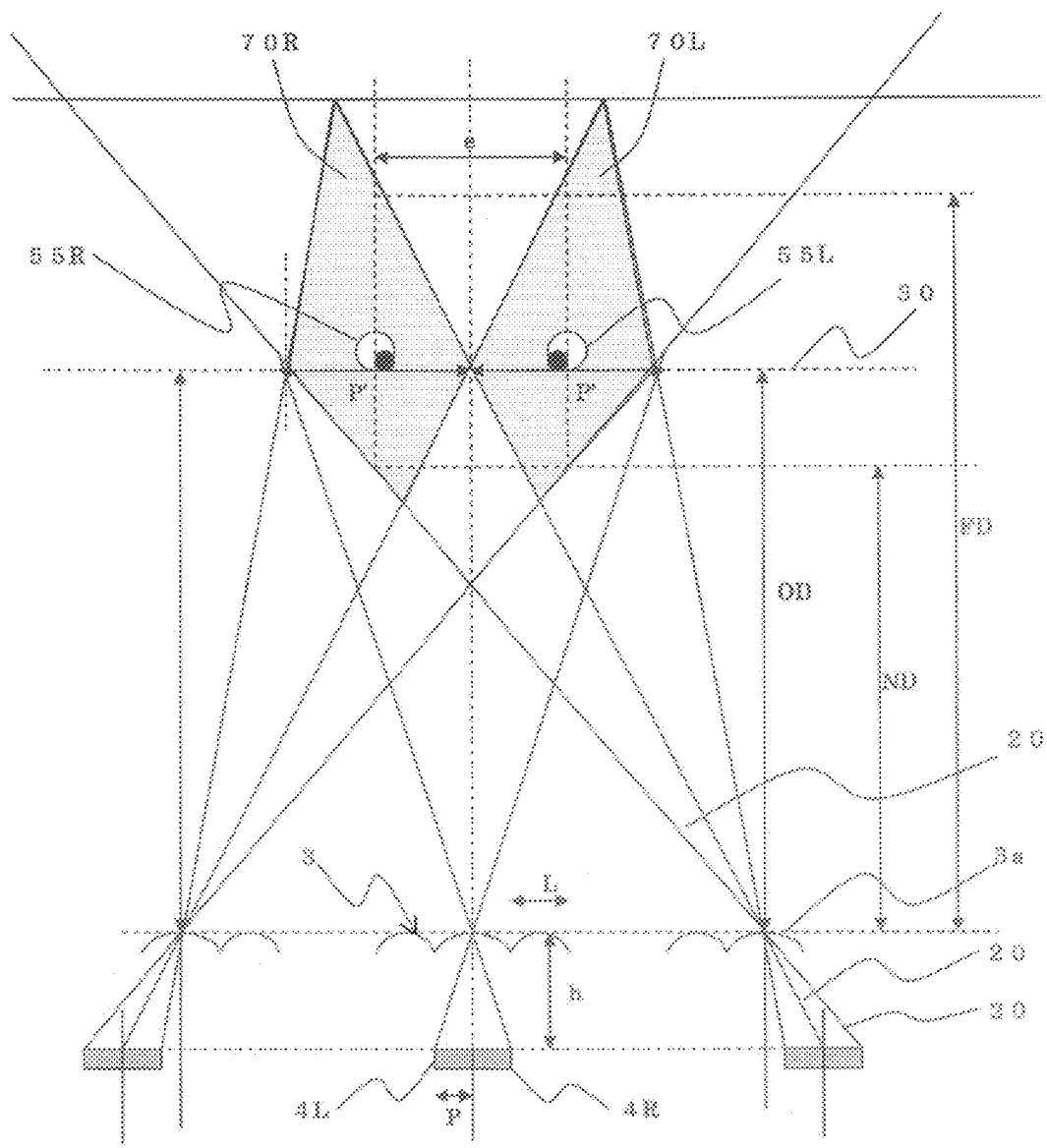
FIG. 86 is an optical model chart of a lenticular lens.
Figure 87:
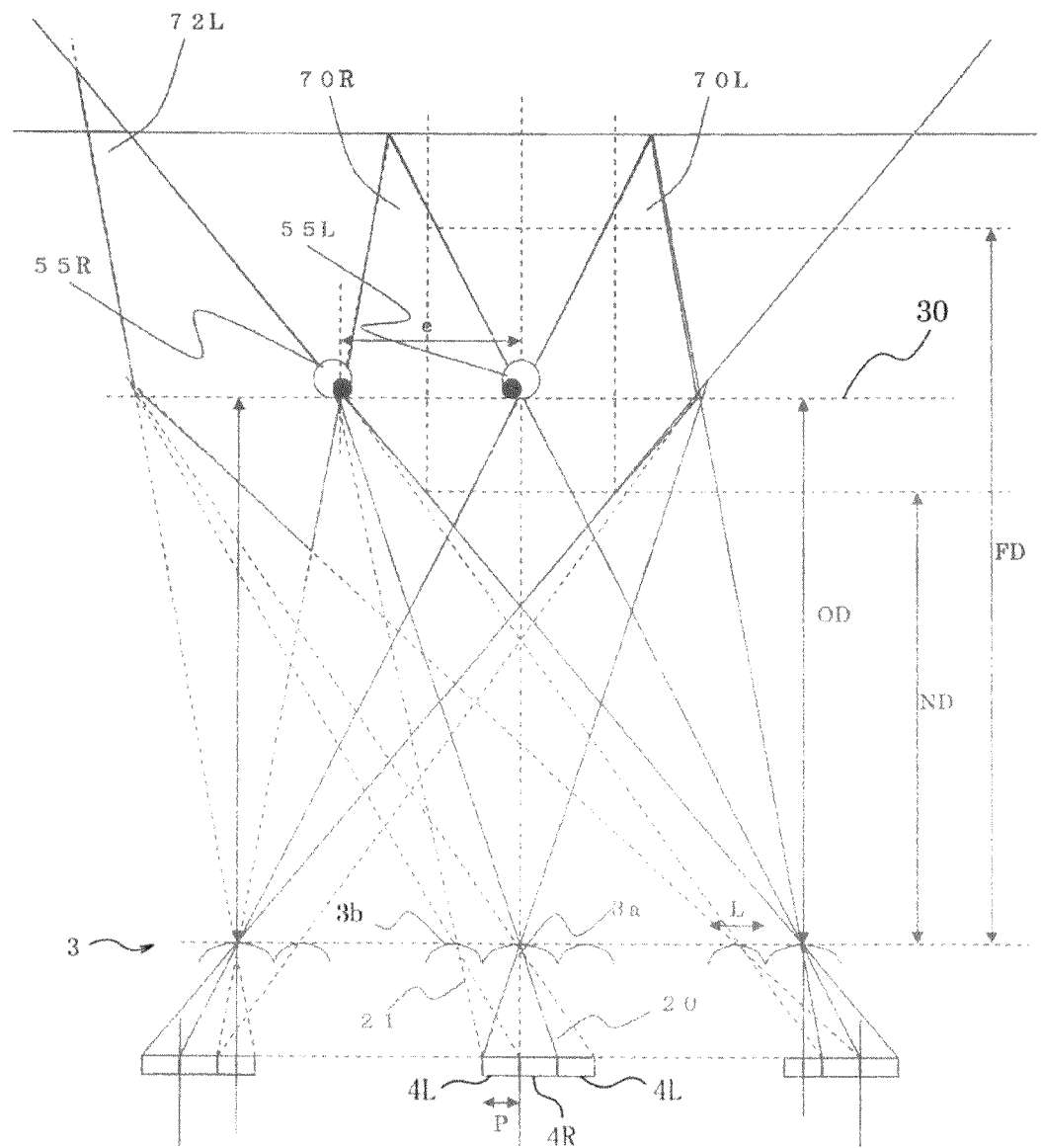
FIG. 87 is an optical model chart for describing a 3D-crosstalk viewing space.

The device characteristic data saving unit 103 has a function which saves 3D crosstalk data for the viewing angles of the stereoscopic display panel 107a. FIG. 4 shows an example of 3D crosstalk characteristic data. The lateral axis of the 3D crosstalk characteristic data shows the viewing angle θ, and the longitudinal axis shows the 3D crosstalk amount. The 3D crosstalk amount shows a proportion of mixing the left-eye image (L image) into the right-eye image (R image) (also shows the case of inverted mixture: a proportion of mixing the R image to the L image). The 3D crosstalk characteristic data takes different values depending on the device characteristic of the stereoscopic display panel 107a, and it can be calculated based on the design condition and manufacture condition of the stereoscopic display panel 107a. Further, it is also possible to acquire the 3D crosstalk characteristic data by measuring the stereoscopic display panel 107a with an evaluation device for 3D crosstalk. In this case, it is desirable to calculate or measure not only at the X-axis origin as the center of the stereoscopic display panel 107a (see the coordinate system of FIG. 3) but also at prescribed ±X points (distance WP of FIG. 5 to be described later) on the outside of the panel. Hereinafter, explanations will be provided in this Specification by using the charts of the 3D crosstalk characteristic data. Note that the explanations will be provided based on the charts of the X-axis origin for convenience' sake. With the stereoscopic image display device 11, the right-eye area, the left-eye area, and the 3D-crosstalk viewing space are determined depending on the 3D crosstalk characteristic data. Defining as a way of example that the threshold value of the 3D crosstalk amount with which the observer 10 can normally recognize the stereoscopic image is $\beta_2$ or smaller, the area of the viewing angles $\theta_0$ to $\theta_1$ is the right-eye area, the area of the viewing angles $\theta_2$ to $\theta_4$ is the 3D-crosstalk viewing space, and the area of the viewing angles $\theta_5$ to $\theta_6$ is the left-eye area. FIG. 5 shows an optical model which projects the right-eye image and the left-eye image to both the right and left eyes of the observer 10 in the stereoscopic image display device 11 of this case. In FIG. 5, the section of the viewing angles $\theta_2$ to $\theta_4$ is the 3D-crosstalk viewing space, so that the right-eye area 70R and the left-eye area 70L are narrowed compared to those of FIG. 86. For the right-eye 55R, the right-eye area 70R is the stereoscopic viewing space, the left-eye areas 70L and 72L are pseudoscopic viewing spaces, and other areas are the 3D-crosstalk viewing spaces. In FIG. 5, the optimum observing distance OD, the far observing distance FD, the near observing distance ND, the cylindrical lens width L, the pixel width P, the width WP between the position of the center pixel of the stereoscopic display panel and the position of the pixels at both ends, and the like are written.

Figure 6:
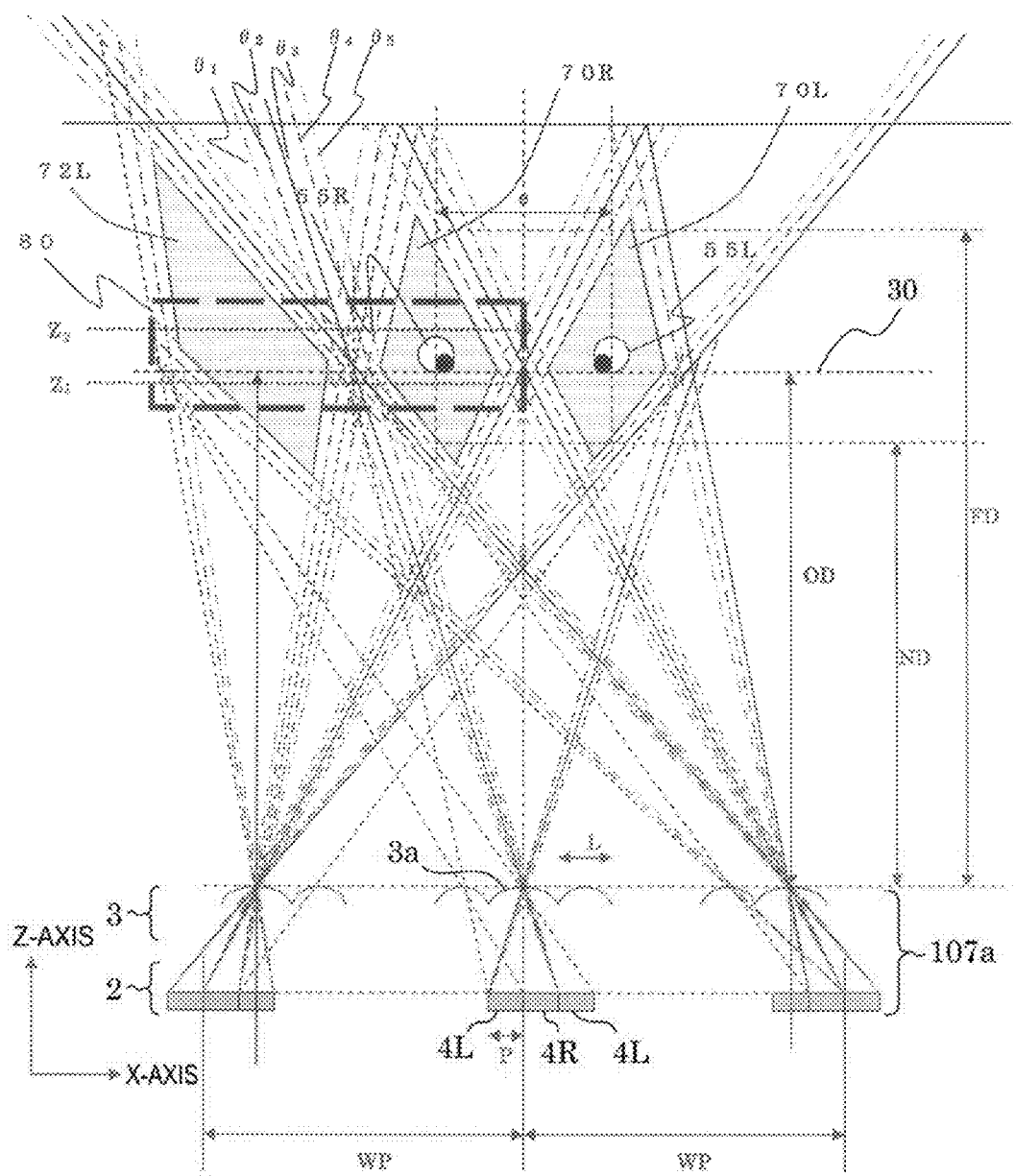
FIG. 6 is a relational chart showing the 3D crosstalk characteristic data and an optical model.

As another example, when it is assumed that the threshold value of the 3D crosstalk amount is $\beta_1$ or smaller, the area of the viewing angles $\theta_1$ to $\theta_5$ is the 3D-crosstalk viewing space and other areas are the right-eye area and the left-eye area based on FIG. 4. FIG. 6 shows an optical model of the stereoscopic image display device 11 of this case. In FIG. 6, the section of the viewing angles $\theta_1$ to $\theta_5$ is the 3D-crosstalk viewing space, so that the right-eye area 70R and the left-eye area 70L are narrowed further compared to those of FIG. 5. For the right-eye 55R, the right-eye area 70R is the stereoscopic viewing space, the left-eye areas 70L and 72L are pseudoscopic viewing spaces, and other areas are the 3D-crosstalk viewing spaces as in the case of FIG. 5. As described above, it is shown that the stereoscopic viewing space, the pseudoscopic viewing space, and the 3D-crosstalk viewing space are determined depending on the 3D crosstalk characteristic data.

The threshold value of the 3D crosstalk amount can be determined by the optical measurement of the stereoscopic image display device 11 and the subjective evaluation. As the devices that can optically measure the 3D crosstalk, there are various kinds such as a conoscope type, a goniometer type, and a Fourier type. It is possible to measure the luminance distribution with respect to the viewing angles by using the measuring device employing those types and to calculate the 3D crosstalk amount (3DCT(θ)) by following Formula (4).

$$3DCT(\theta) = (Y(LBRW) - Y(LBRB))/(Y(LWRB) - Y(LBRB)) \quad \text{Formula (4)}$$

Note here that Y(LBRW) is the luminance provided that the left-eye image is black and the right-eye image is white, Y(LBRB) is the luminance provided that the left-eye image is black and the right-eye image is black, and Y(LWRB) is the luminance provided that the left-eye image is white and the right-eye image is black.

There is no extensive difference in the qualitative results when measured by any of those measuring devices. However, the quantitative numerical values acquired thereby vary depending on the types of the measurement and the device specifications. Collating the typical measurement result with the subjective stereoscopic area evaluation result, it can be found that stereopsis can be achieved when the 3D crosstalk amount is roughly 10% or less. This value can be used as the threshold value of the 3D crosstalk amount described above.

Figure 7:
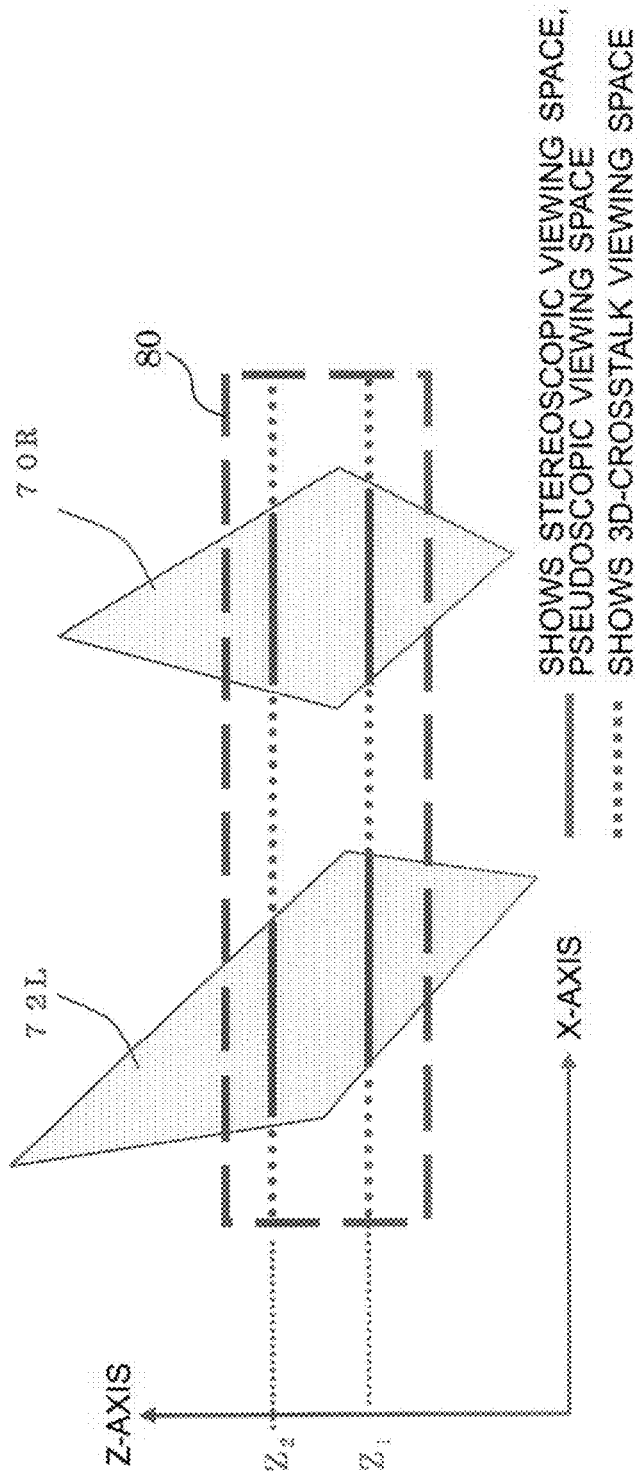
FIG. 7 is an enlarged diagram of the optical model.

FIG. 7 shows an enlarged view of an area 80 shown in FIG. 6. The area widths of the right-eye area 70R, the left-eye area 72L, and the 3D-crosstalk viewing space at arbitrary values $Z_1$ and $Z_2$ on the Z-axis are different. The area widths of the stereoscopic viewing space, the pseudoscopic viewing space, and the 3D-crosstalk viewing space change depending on the positions on the Z-axis.

Figure 8:
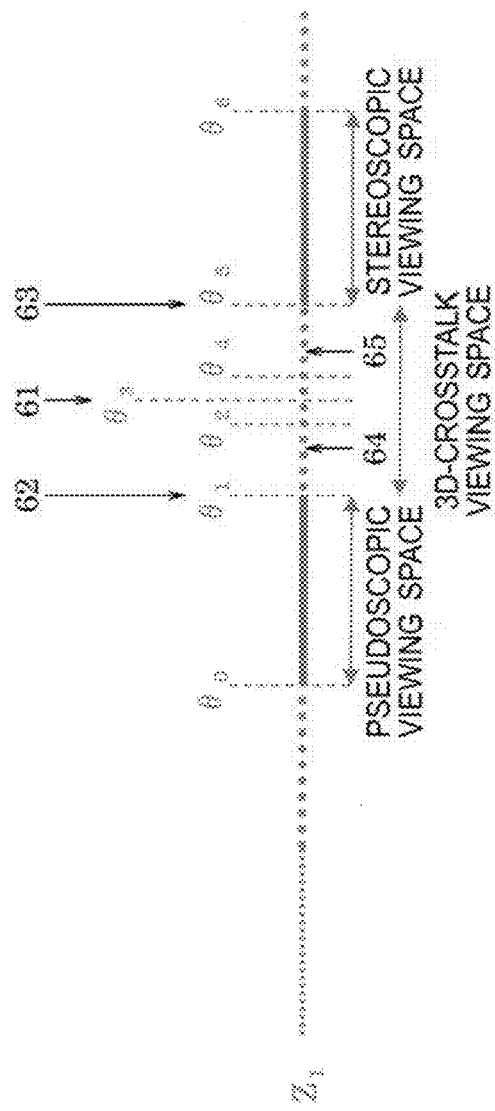
FIG. 8 is a relational chart of widths of a stereoscopic viewing space, a pseudoscopic viewing space, a 3D-crosstalk viewing space, and viewing angles.

Further, FIG. 8 shows the relational chart between the area widths of the stereoscopic viewing space, the pseudoscopic viewing space, and the 3D-crosstalk viewing space and the viewing angles at the arbitrary point $Z_1$ on the Z-axis. With respect to the right eye 55R as the reference, the area of the viewing angles $\theta_0$ to $\theta_1$ is the pseudoscopic viewing space, the area of the viewing angles $\theta_1$ to $\theta_5$ is the 3D-crosstalk viewing space, and the area of the viewing angles $\theta_5$ to $\theta_6$ is the stereoscopic viewing space. Further, the 3D crosstalk amount becomes the greatest at the position of viewing angle $\theta_3$, and the area of viewing angles $\theta_2$ to $\theta_4$ is the area where the 3D crosstalk amount is $\beta_2$ or more based on FIG. 4.

Figure 9:
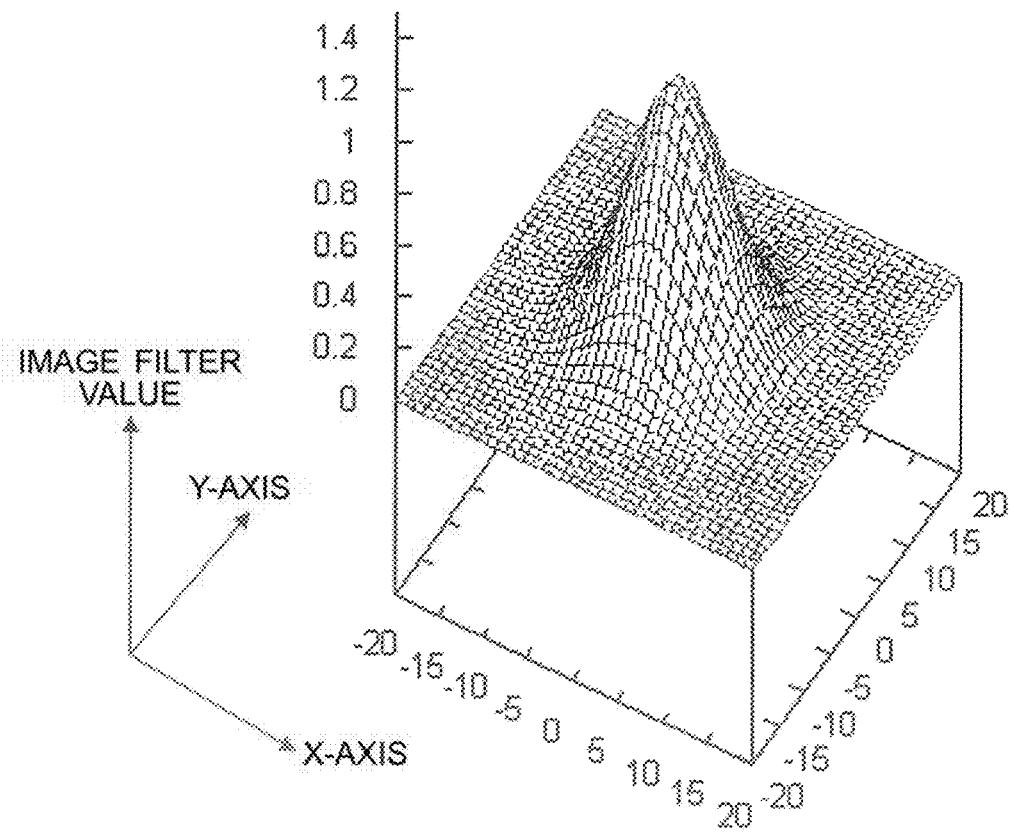
FIG. 9 is a chart showing the shape of a Gaussian filter.

The image filter value calculating unit 104 has a function which calculates the image filter value suited for stereoscopic image display with respect to the viewing angle based on the device characteristic data. For the image filter value, the filter shape for performing blurring processing (also referred to as smoothing processing, lowpass filtering processing, or the like) of the image data of the stereoscopic image content is employed. The typical filter shapes for performing the image blurring processing may be averaging filter, median filter, Gaussian filter, and the like. In an example provided below, a case of using a Gaussian filter will be described. FIG. 9 shows the Gaussian filter shape applied to the image data of the stereoscopic image content. FIG. 9 shows a two-dimensional Gaussian filter shape, in which the X-axis corresponds to the lateral axis direction of the image data and the Y-axis corresponds to the longitudinal axis of the image data. The Gaussian filter is calculated from Formula 4 of the Gaussian distribution function. Note here that variance $\sigma^2$ is an arbitrary value. When the value of $\sigma$ is large, the Gaussian shape becomes gradual and the effect of the image blurring processing is increased.

$$f(x, y) = \frac{1}{2\pi\sigma^2} \exp\left(-\frac{x^2 + y^2}{2\sigma^2}\right) \quad \text{Formula (5)}$$

The image filter values are the dispersed values of the Gaussian filter. The image filter values are calculated by substituting the value f(x, y) calculated by Formula (5) to the position (x, y) of each of the pixels that form the image filter values.

Figure 10:
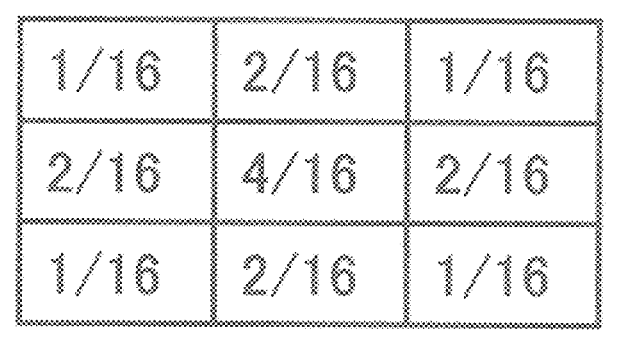

FIG. 10 and FIG. 11 show examples of the image filter values calculated from the Gaussian filter. Provided that the value of window width of the image filter in the X-axis direction is Wx and the value of the window width in the Y-axis direction is Wy, FIG. 10 is a case where the window width of the image filter is set as 3×3 pixels (Wx=3, Wy=3), and FIG. 11 is a case where the window width of the image filter is set as 5×5 pixels (Wx=5, Wy=5). In the explanations below, it is defined as W (W=Wx=Wy) for convenience' sake. When the window width W of the image filter is large, the effect of the image blurring processing is increased as well.

As described above, when the Gaussian filter is used for the image blurring processing, the image filter value is specified by the value of the variance $\sigma$ of the Gaussian distribution function and the window width value W of the image filter. Therefore, the image filter value calculating unit 104 simply needs to calculate the value of the variance $\sigma$ and the window width value W of the image filter. Note here that the value of the variance $\sigma$ may be set as a constant (set as $\sigma$=1, for example) and only the window width value W of the image filter may be calculated. A case of setting the value of the variance $\sigma$ of the Gaussian distribution function as "1" and calculating only the window width value W of the image filter will be described hereinafter as an example of calculating the image filter value with respect to the viewing angle based on the device characteristic data.

FIG. 12 shows the result of calculating the window width value W($\theta$) of the image filter for the viewing angle $\theta$ in a case where the observing position of the observer is on $Z_1$ based on the device characteristic data of the stereoscopic image display device 11 (see FIG. 4). In FIG. 12, it is shown that the window width value W($\theta$) of the image filter of the case described in FIG. 4 where the threshold value of the 3D crosstalk amount is set as $\beta_1$ takes different values for the pseudoscopic viewing space $\theta_0$ to $\theta_1$, the stereoscopic viewing space $\theta_5$ to $\theta_6$, and the 3D-crosstalk viewing space $\theta_1$ to $\theta_5$.

FIG. 13 is a table which shows the relation regarding generation of a CT-image with respect to the 3D crosstalk amount, the influence for the stereoscopic image caused by 3D crosstalk, the viewing angle ranges, the viewing space names (pseudoscopic viewing space, 3D-crosstalk viewing space, stereoscopic viewing space), and the window width value W($\theta$) of the image filter. Hereinafter, the window width value W($\theta$) of the image filter for each of the areas of the pseudoscopic viewing space $\theta_0$ to $\theta_1$, the stereoscopic viewing space $\theta_5$ to $\theta_6$, and the 3D-crosstalk viewing space $\theta_1$ to $\theta_5$ will be described by referring to FIG. 12 and FIG. 13.

"1" is substituted to the window width value W($\theta$) of the image filter in the stereoscopic viewing space $\theta_5$ to $\theta_6$. When the observer is in the stereoscopic viewing space, the influence of the CT-image by 3D crosstalk does not appear. Thus, the stereoscopic image content can be sighted properly, so that it is not necessary to perform blurring processing by using the image filter. When the window width value W($\theta$) of the image filter is "1", the image data of the stereoscopic image content does not change even when the image filtering processing by using the Gaussian filter is performed. Naturally, a command value for stopping execution of the image filtering processing may be substituted instead of substituting "1" to the window width value W($\theta$) of the image filter in order to reduce the calculation amount of the image filtering processing.

"1" is substituted also into the window width value W($\theta$) of the image filter in the pseudoscopic viewing space $\theta_0$ to $\theta_1$. In the pseudoscopic viewing space, there is the influence of the reverse vision where the parallax value of the stereoscopic image content is inverted and displayed. Thus, in the pseudoscopic viewing space, the influence of the reverse vision may be overcome by switching the L image and the R image to be displayed. Through switching the L image and the R image, the stereoscopic image content can be sighted properly also in the pseudoscopic viewing space $\theta_0$ to $\theta_1$ as in the case of the stereoscopic viewing space $\theta_5$ to $\theta_6$.

In the 3D-crosstalk viewing space $\theta_1$ to $\theta_5$, the window width value W($\theta$) of the image filter is fractionated according to the 3D crosstalk amount. In the range where the 3D crosstalk amount is $\beta_1$ to $\beta_2$ (the viewing angle range of $\theta_1$ to $\theta_2$), a slight CT-image is generated. Thus, the stereoscopic image can be sighted even though the observer feels a sense of discomfort. In the meantime, in the range where the 3D crosstalk amount is $\beta_2$ or more (the viewing angle range of $\theta_2$ to $\theta_3$), the influence of the CT-image is increased. Thus, it becomes almost impossible for the observer to sight the stereoscopic image. Therefore, it is desirable to set the window width value W($\theta$) of the image filter in accordance with the extent of the influence of the CT-image. Specifically, the 3D crosstalk amount is referred from the device characteristic data of FIG. 4, and the window width value W($\theta$) of the image filter suited for that amount is set. The window width value W($\theta$) of the image filter shown in FIG. 12 and FIG. 13 is defined as equal to or less than the window width value $W_1$ when the window width values W($\theta$) of the image filter are calculated under the condition where the window width value W($\theta$) of the image filter is the window width value $W_1$ defined arbitrarily or less when the 3D crosstalk amount is $\beta_1$ or more and under the condition where the window width value W($\theta$) of the image filter is the window width value $W_2$ defined arbitrarily or less when the 3D crosstalk amount is $\beta_2$ or more.

It is common to specify the window width values $W_1$ and $W_2$ as the calculation condition of the window width value W($\theta$) of the image filter by the subjective evaluation done for many observers. However, it is also possible to set the values according to the preference of the observer. For example, the stereoscopic image display device such as a mobile apparatus with which the observer is specified may be designed to be able to set the window width values $W_1$ and $W_2$ according to the preference of the observer when the observer uses the mobile apparatus for the first time. When the window width value W($\theta$) of the image filter is large, the effect of the image blurring processing is increased. Thus, the influence of the CT-image by 3D crosstalk is lightened but the image quality of the stereoscopic image content is decreased. In the meantime, when the window width value $W(\theta)$ of the image filter is small, the effect of the image blurring processing is decreased. Thus, the image quality of the stereoscopic image content can be maintained but the influence of the CT-image by 3D crosstalk is not lightened. Therefore, with the subjective evaluation experiment for specifying the window width values $W_1$ and $W_2$, it is desirable to present various kinds of stereoscopic image contents (stereoscopic image contents of different parallax values, contrast, brightness, and spatial frequencies of hue) to the evaluator and to totalize the results acquired by the subjective evaluation. Further, in order to increase the security of the stereoscopic image display, the window width value $W_2$ may be set to a value slightly larger than the totalized value of the subjective evaluation. The results of the experiments of the subjective evaluation for the observer are shown in various literatures, so that the window width values $W_1$ and $W_2$ may be specified from those literatures.

Regarding the window width value $W(\theta)$ of the image filter in the 3D-crosstalk viewing space, the point where the window width value is 1 at the viewing angle $\theta_1$, the point of the window width value $W_1$ at the viewing angle $\theta_2$, the point of the window width value $W_2$ at the viewing angle $\theta_3$ as the center position of the 3D-crosstalk viewing space, the point of the window width value $W_1$ at the viewing angle $\theta_4$, and the point where the window width value is 1 at the viewing angle $\theta_5$ are connected with each other by interpolation via a line to calculate the window width values $W(\theta)$ of the image filter for each of the viewing angles $\theta$. As the line for interpolating the group of points with each other, secondary interpolation (polynomial interpolation) as in FIG. 12 or linear interpolation as in FIG. 14 may be used. Further, since the window width value $W(\theta)$ of the image filter is desirable to be an integer, so that the decimal value may be rounded off to be approximated to an integer value.

While FIG. 12, FIG. 13, and FIG. 14 show the case where the threshold values $\beta_1$, $\beta_2$ of the 3D crosstalk amount are set as the calculation condition of the window width value $W(\theta)$ of the image filter, the threshold values of the 3D crosstalk amount are not limited only to the two kinds. It is also possible to set a greater number of threshold values.

Figure 15:
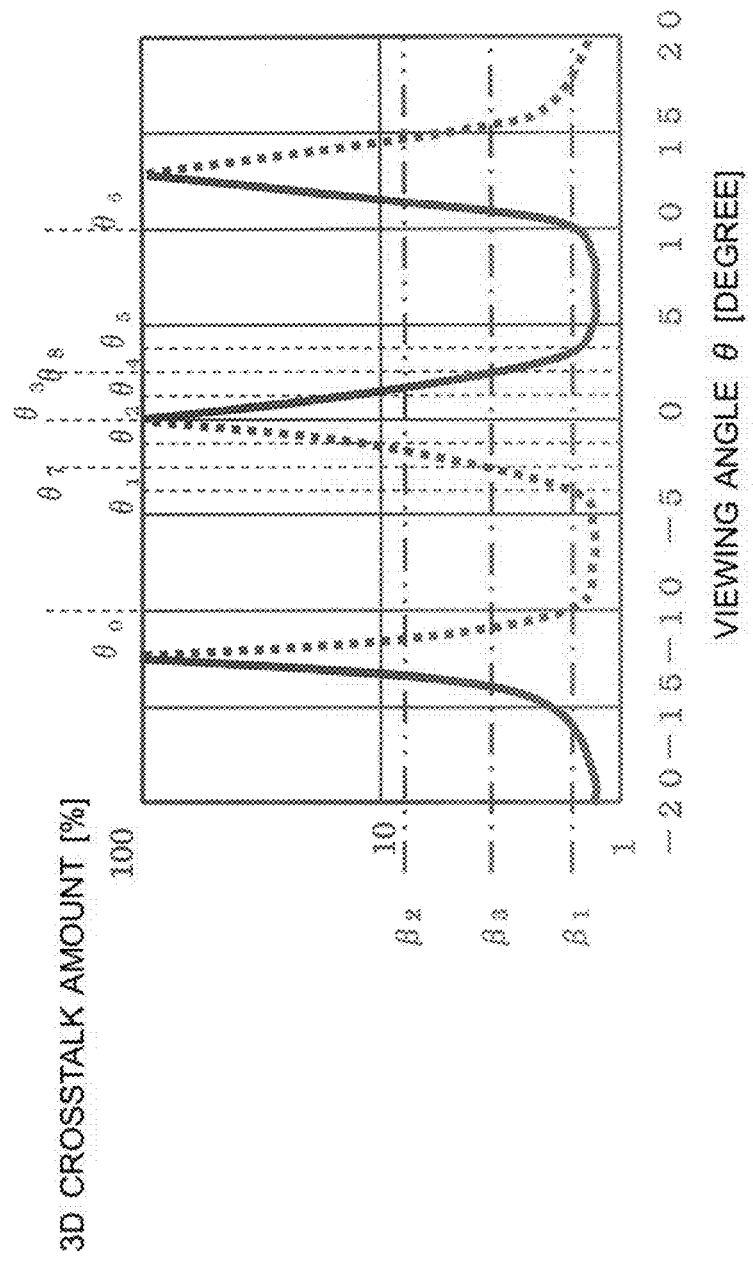
FIG. 15 is a chart showing 3D crosstalk characteristic data of the stereoscopic image display device.
Figure 16:
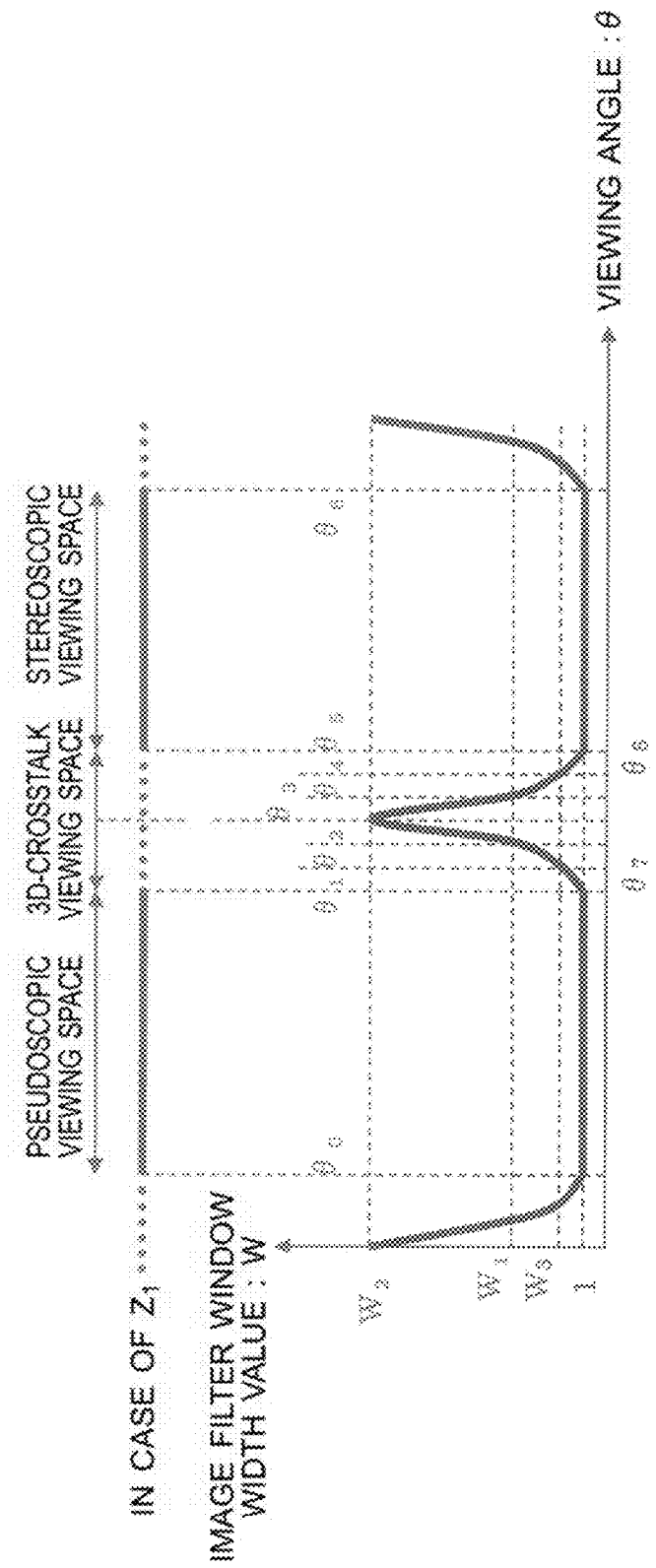
FIG. 16 is a chart showing window width values of the image filter with respect to viewing angles.

FIG. 15 and FIG. 16 show a case where a new threshold value $\beta_3$ is added to the threshold values $\beta_1$ and $\beta_2$ of the 3D crosstalk amount. FIG. 15 shows 3D crosstalk characteristic data, in which the threshold value $\beta$ is added to the threshold values $\beta_1$ and $\beta_2$. Note here that the viewing angles of the 3D crosstalk characteristic data corresponding to the threshold value $\beta$ are $\theta_7$ and $\theta_8$. FIG. 16 shows the window width values $W(\theta)$ of the image filter for the viewing angles $\theta$, in which the window width value $W_3$ at the viewing angles $\theta_7$ and $\theta_8$ is added to the calculation condition of the window width value $W(\theta)$ of the image filter. Regarding the window width values $W(\theta)$ of the image filter shown in FIG. 16, the group of points including the newly added window width value $W_3$ are connected with each other by interpolation via a line to calculate the window width values $W(\theta)$ of the image filter for each of the viewing angles $\theta$.

Figure 17:
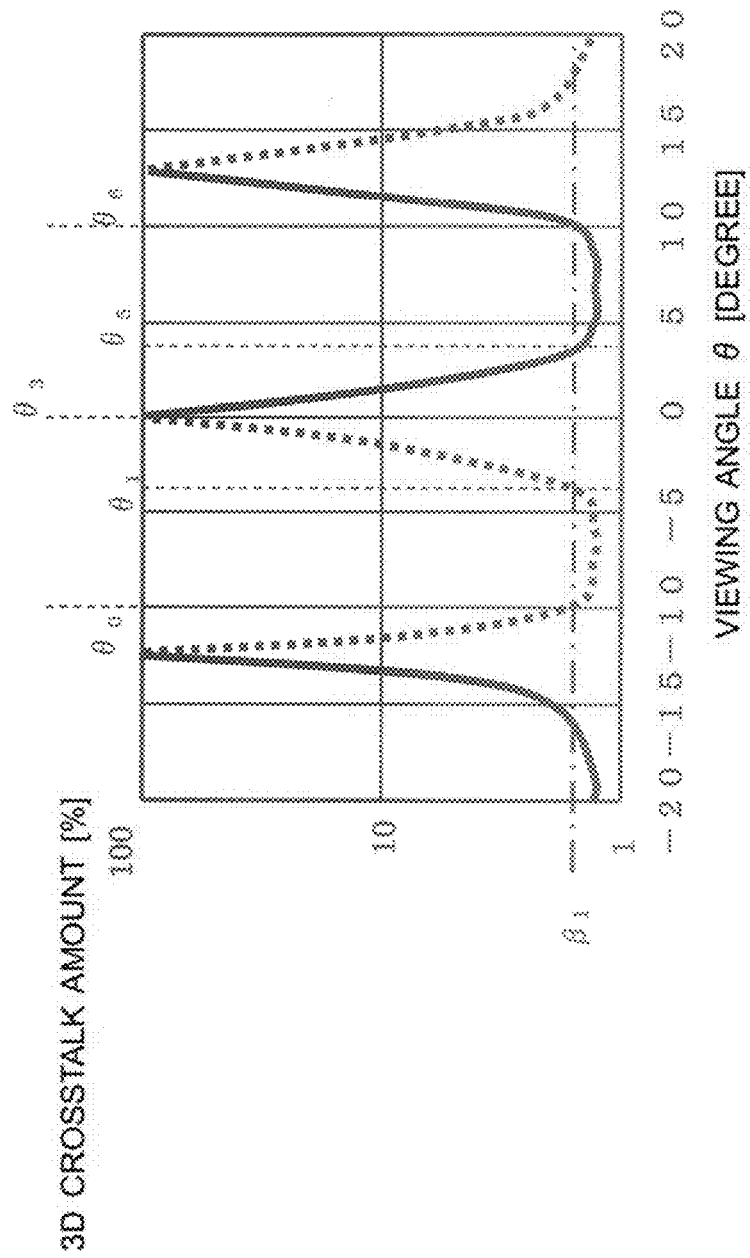
FIG. 17 is a chart showing 3D crosstalk characteristic data of the stereoscopic image display device.
Figure 18:
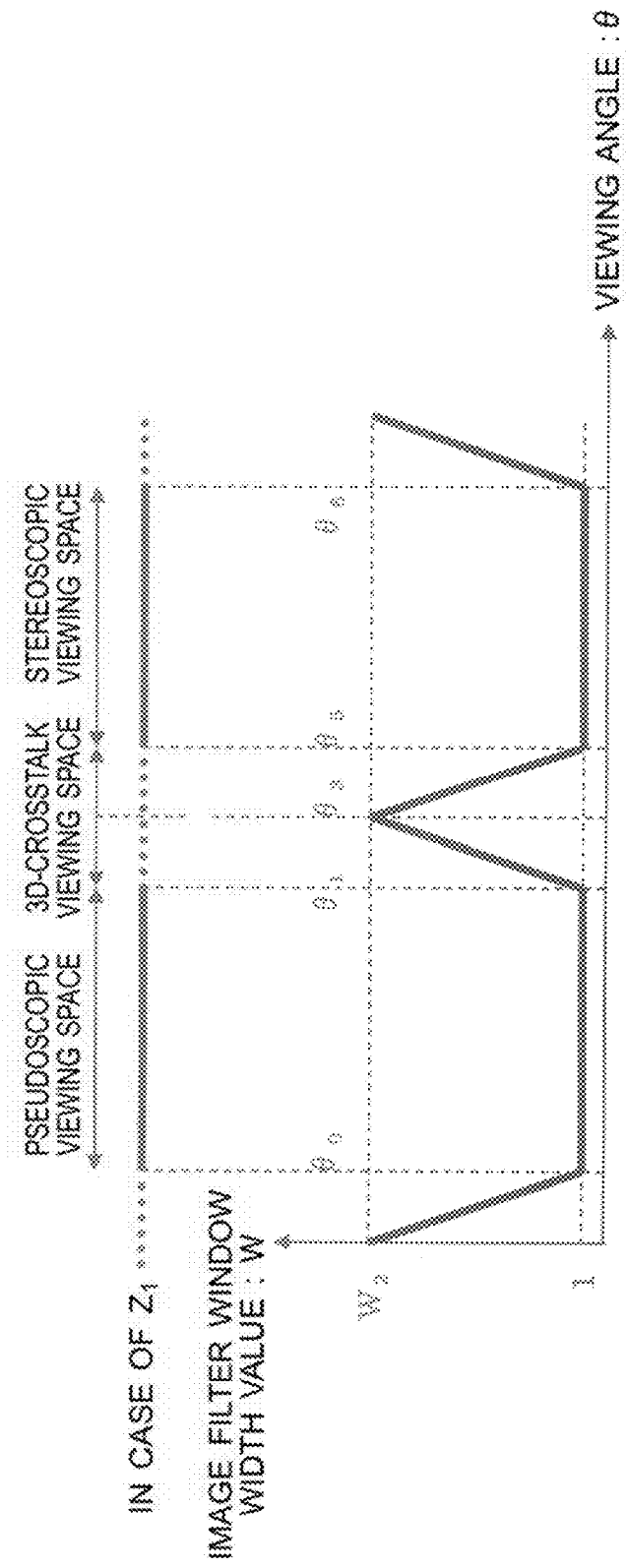
FIG. 18 is a chart showing window width values of the image filter with respect to viewing angles.

As another example, FIG. 17 and FIG. 18 show a case where the threshold value of the 3D crosstalk amount shown in FIG. 4 is changed only to the threshold value $\beta_1$. FIG. 17 shows 3D crosstalk characteristic data, in which the viewing angles of the 3D crosstalk characteristic data corresponding to the threshold value $\beta_1$ are $\theta_1$ and $\theta_5$. FIG. 18 shows the window width values $W(\theta)$ of the image filter for the viewing angles $\theta$, in which the calculation condition of the window width value $W(\theta)$ of the image filter at the viewing angle $\theta_3$ is only the window width value $W_2$. Thereby, the window width values $W(\theta)$ of the image filter form a straight line as in FIG. 18 when the point where the window width value is 1 at the viewing angle $\theta_1$, the point of the window width value $W_2$ at the viewing angle $\theta_3$, and the point where the window width value is 1 at the viewing angle $\theta_5$ are connected with each other by interpolation via a line. Further, while the method for calculating the window width value $W(\theta)$ of the image filter in the case where the observing position of the observer is at the position on $Z_1$ is described in the above-described cases, the calculation method described above is not limited only to the case where the observing position of the observer is at the position on $Z_1$. The same calculation method can be used also when the observer is at other positions (e.g., position on $Z_2$). In the manner described above, the image filter value calculating unit 104 calculates the image filter value suited for the stereoscopic image display device 11 through calculating the window width value $W(\theta)$ of the image filter with respect to the viewing angle from the calculation condition of the threshold value based on the device characteristic data.

Further, while the case of using a square-shaped image filter by defining it as W=Wx=Wy is described in the above, Wy does not necessarily take the same value as the value of Wx. The influence of the CT-image by 3D crosstalk eminently appears in the X-axis direction, so that a rectangular-shaped image filter of Wx>Wy may be used as well. It is also possible to change the value of Wy according to the image data of the stereoscopic image content.

Further, the method for specifying the image filter value through calculating the window width values $W(\theta)$ of the image filter by defining the variance of the Gaussian filter as $\sigma=1$ is described above. However, inversely, it is also possible to specify the image filter value by calculating the variance $\sigma$ of the Gaussian filter through defining the window width value $W(\theta)$ of the image filter as a constant (e.g., 20 pixels×20 pixels). As the method for calculating $\sigma$, as in the case of the window width value $W(\theta)$ of the image filter, $\sigma_1$, $\sigma_2$ corresponding to the threshold values $\beta_1$, $\beta_2$ of the 3D crosstalk amount are specified, and the variance $\sigma(\theta)$ for the viewing angle $\theta$ will is calculated from $\sigma_1$, $\sigma_2$ by the subjective evaluation experiment of the observer. Thereby, the variance $\sigma$ is increased as the 3D crosstalk amount becomes larger so as to increase the image blurring effect. Naturally, it is also possible to define both the variance $\sigma$ of the Gaussian filter and the window width value W of the image filter as variables and to specify the image filter value by calculating the both values. As one of the calculation methods, the value of the variance $\sigma(\theta)$ is fixed first, the window width value $W(\theta)$ of the image filter is calculated, and then the variance $\sigma(\theta)$ suited for the calculated window width value $W(\theta)$ of the image filter is calculated by the same method described above.

Figure 19:
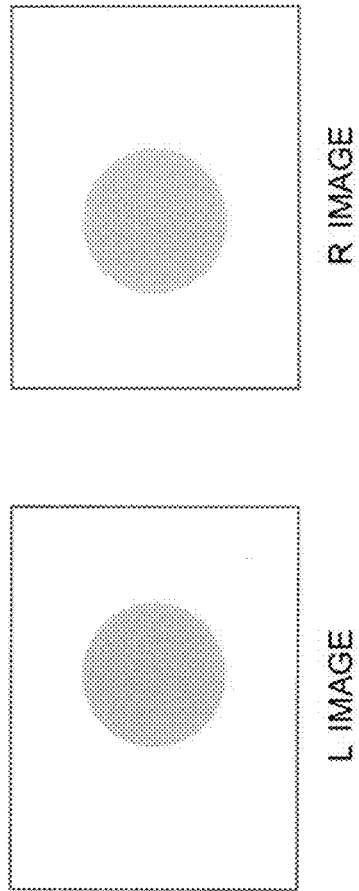
FIG. 19 is an illustration showing image data that is saved within an image data saving unit.

The image data saving unit 105 has a function which saves or receives the image data. FIG. 19 shows an example of the image data saved in the image data saving unit 105. In FIG. 19, an L image and an R image are saved as the image data of the stereoscopic image content. The L image is a left-eye image projected to the left-eye area, and the R image is a right-eye image projected to the right-eye area. Each of the pixel values of the LR image (L image and R image) holds luminance values (RGB values), and the LR image is displayed on the stereoscopic display panel 107a.

Further, an image data group of the LR images on which image processing is performed in advance with various image filter values may be saved in the image data saving unit 105. The image filtering processing time at the time of the stereoscopic image display processing is shortened through acquiring the image-filtering processed image data from the image data saving unit 105 at the time of the stereoscopic image display processing.

The image filtering processing unit 106 has a function which performs the image filtering processing on the image data saved in the image data saving unit 105 according to the image filter value calculated by the image filter value calculating unit 104. In the image filtering processing, convolution of the image filter value is executed on each of the pixels of the image data. Thereby, an $L_f$ image and an $R_f$ image as the image data of the stereoscopic image content on which the image filtering processing is performed are generated from the L image and the R image as the image data of the stereoscopic image content.

The stereoscopic display panel unit 107 has a function which projects the image data on which the image filtering processing is performed to the right eye and the left eye according to the relative positions. The stereoscopic display panel unit 107 acquires the $L_f$ image and the $R_f$ image on which the image filtering processing is performed, and projects the $L_f$ image and the $R_f$ image by the stereoscopic display panel 107a to display the stereoscopic image content.

Figure 20:
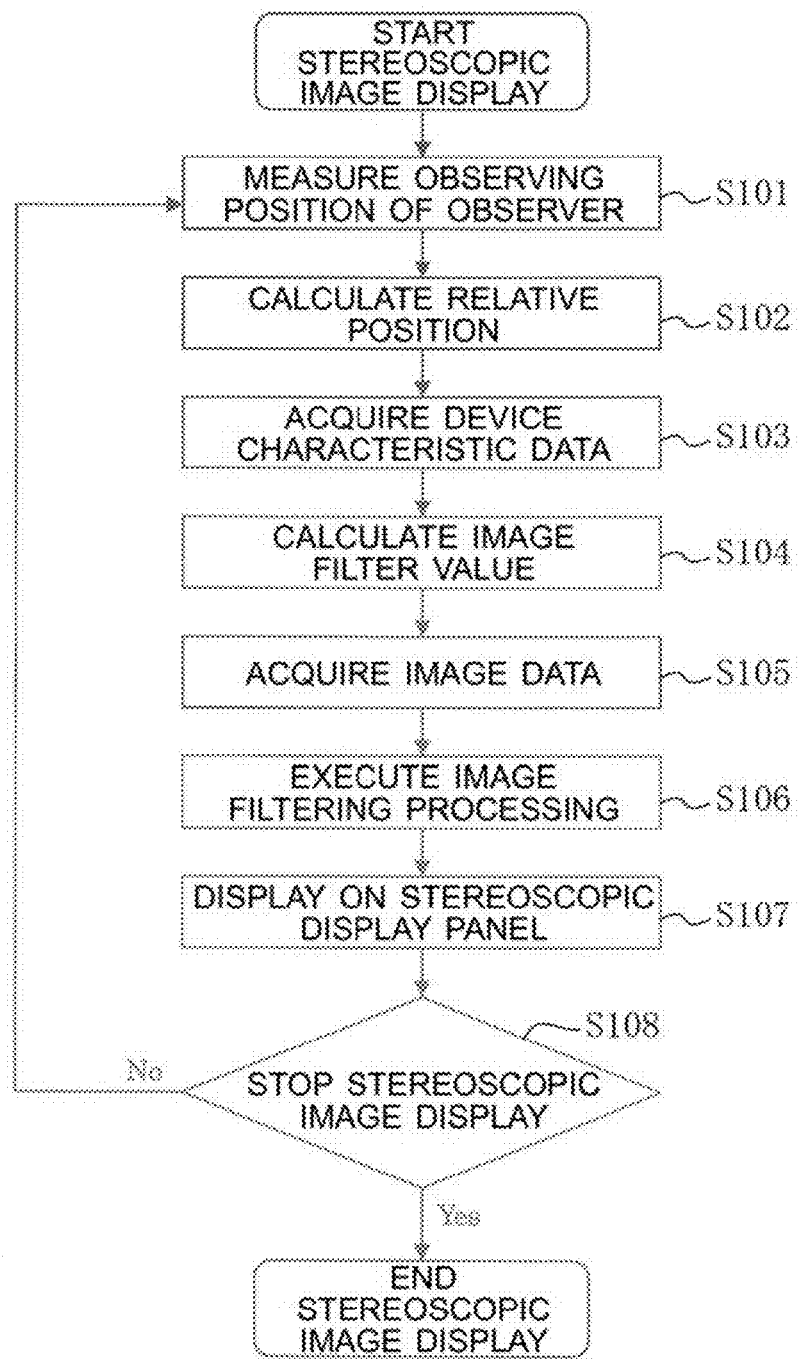
FIG. 20 is a flowchart of a stereoscopic image processing method.

The flowchart of the stereoscopic image processing method used in the stereoscopic image display device 11 according to the first exemplary embodiment will be described by referring to FIG. 20.

In step S101, the observing position of the observer is measured by using the observer position measuring unit 101.

In step S102, the relative position of the observing position of the observer 10 and the stereoscopic display panel 107a are calculated by using the relative position calculating unit 102. In step S102, the observing position (distance Zp in the Z-axis direction and the viewing angle θp) of the observer 10 by having the center position of the stereoscopic display panel 107a as the origin is calculated as the relative position.

In step S103, the 3D crosstalk characteristic data corresponding to the distance Zp and the viewing angle θp calculated in step S102 and the threshold values $β_1$, $β_2$ of the 3D crosstalk characteristic data are acquired from the device data saving unit 103 (see FIG. 4 as an example). Further, the image filter window width maximum value $W_1$ corresponding to the threshold value $β_1$ of the 3D crosstalk characteristic data and the image filter window width maximum value $W_2$ corresponding to the threshold value $β_2$ are acquired (see FIG. 13 as an example).

In step S104, the image filter window width value Wp for the viewing angle θp as the relative position calculated in step S102 is calculated by using the image filter value calculating unit 104 from the 3D crosstalk characteristic data acquired in step S103.

As an example, the calculation method will be described by referring to FIG. 12. First, the viewing angle range $θ_5$ to $θ_6$ of the stereoscopic viewing space, the viewing angle range $θ_0$ to $θ_1$ of the pseudoscopic viewing space, and the viewing angle range $θ_1$ to $θ_5$ of the 3D-crosstalk viewing space are specified from the threshold values $β_1$ and $β_2$ of the 3D crosstalk characteristic data acquired in step S103. Then, the window width value W(θ) of the image filter in the viewing angle range $θ_5$ to $θ_6$ of the stereoscopic viewing space and the viewing angle range $θ_0$ to $θ_1$ of the pseudoscopic viewing space is defined as "1". Then, the window width value W(θ) of the image filter in the viewing angle range $θ_1$ to $θ_5$ of the 3D-crosstalk viewing space is determined. Specifically, the window width value W(θ) of the image filter in the viewing angle range $θ_1$ to $θ_5$ of the 3D-crosstalk viewing space is determined through connecting the point where the window width value of the image filter is 1 at the viewing angle $θ_1$ and the viewing angle $θ_5$, the point where the window width value of the image filter is $W_1$ at the viewing angle $θ_2$ and the viewing angle $θ_4$, and the point where the window width value of the image filter is $W_2$ at the viewing angle $θ_3$ by interpolation via a line. As described above, the window width value Wp of the image filter for the viewing angle θp as the relative position calculated in step S102 is calculated by finding the window width value Wp of the image filter in the viewing angle range $θ_0$ to $θ_6$ in advance. Then, the image filter value is calculated from the calculated image filter window width value Wp by applying an arbitrary image filter shape (Gaussian filter or the like) for performing the image blurring processing.

In step S105, the image data as the stereoscopic image content is acquired from the image data saving unit 105 (see FIG. 19 as an example).

In step S106, the image filtering processing is performed on the image data acquired in step S105 by using the image filtering processing unit 106 according to the image filter value calculated in step S104. In the image filtering processing of step S106, convolution of the image filter value is executed on each pixel of the image data to generate the image data on which the image filtering processing is performed.

In step S107, the image data on which the image filtering processing is performed in step S106 is displayed on the stereoscopic display panel 107a by using the stereoscopic display panel unit 107.

In step S108, whether to stop or to continuously execute the stereoscopic image display processing is set. When the power of the stereoscopic image display device 11 is turned off or interruption of the stereoscopic image display is designated by the observer 10, the stereoscopic image display processing is stopped. When there is no event for stopping the stereoscopic image display processing, the stereoscopic image display processing is continuously executed. When the stereoscopic image display processing is stopped in step S108, the stereoscopic image display processing is ended. When the stereoscopic image display processing is executed continuously in step S108, the procedure is returned to the processing of step S101 to repeatedly execute the processing from step S101 to step S108.

As described above, it is possible to provide the stereoscopic image display device and the stereoscopic image display method with which the influence of the CT-image by the 3D crosstalk is lightened so that a sense of discomfort is not felt by the observer 10 even when the observing position of the observer 10 is shifted, through performing the image filtering processing on the image data according to the image filter value calculated based on the observing position of the observer 10 and the device characteristic data.

In the flowchart, described is the case of calculating the relative position between the observing position of the observer 10 and the stereoscopic display panel 107a, i.e., the observing position (distance Zp in the Z-axis direction and the viewing angle θp) of the observer 10 by having the center position of the stereoscopic display panel 107a as the origin, and calculating the image filter window width value Wp for the viewing angle θp to perform the image filtering processing on the image data at the time of performing the stereoscopic image display. However, it is possible to shorten the calculation time when executing the stereoscopic image display processing through preparing in advance a group of image data on which the image filtering processing is performed with the window width value Wp of the image filter. It is also possible to prepare in advance a group of image data on which the image filtering processing is performed by using the window width values W(θ) of a plurality of image filters.

In such case, the processing of step S103 to step S106 is performed in advance prior to the stereoscopic image display processing, and the image data group in the viewing angle range $\theta_0$ to $\theta_6$ on which the image filtering processing is performed is saved in the image data saving unit 105 in advance. At the time of the stereoscopic image display processing, after calculating the viewing angle $\theta p$ as the relative position in step S102, the image data related to the relative position viewing angle $\theta p$ is acquired from the image data group in the viewing angle range $\theta_0$ to $\theta_6$ saved in the image data saving unit 105. Then, the acquired image data is displayed as a stereoscopic image on the stereoscopic display panel 107*a* as in step S107. This makes it possible to greatly shorten the calculation time used for the image filter value calculation processing and the image filtering processing performed on the image data, which is preferable for the case where the observing position of the observer 10 changes frequently.

However in order to achieve the stereoscopic image display processing method, it is the necessary condition that the image data can be acquired before execution of the stereoscopic image display processing and the recording capacity of the image data saving unit 105 is large. Thus, the stereoscopic image display processing method may be selected depending on the use state of the stereoscopic image display device 11.

In the external appearance of the first exemplary embodiment (FIG. 2), the case where the image processing unit 151, the observer position measuring unit 101, the image data saving unit 105, and the stereoscopic display panel unit 107 exist within a single stereoscopic image display device 11 is illustrated. However, the functions of the stereoscopic image display device 11 may be achieved by separating those units according to the application thereof and integrating each of the separated devices.

Figure 21:
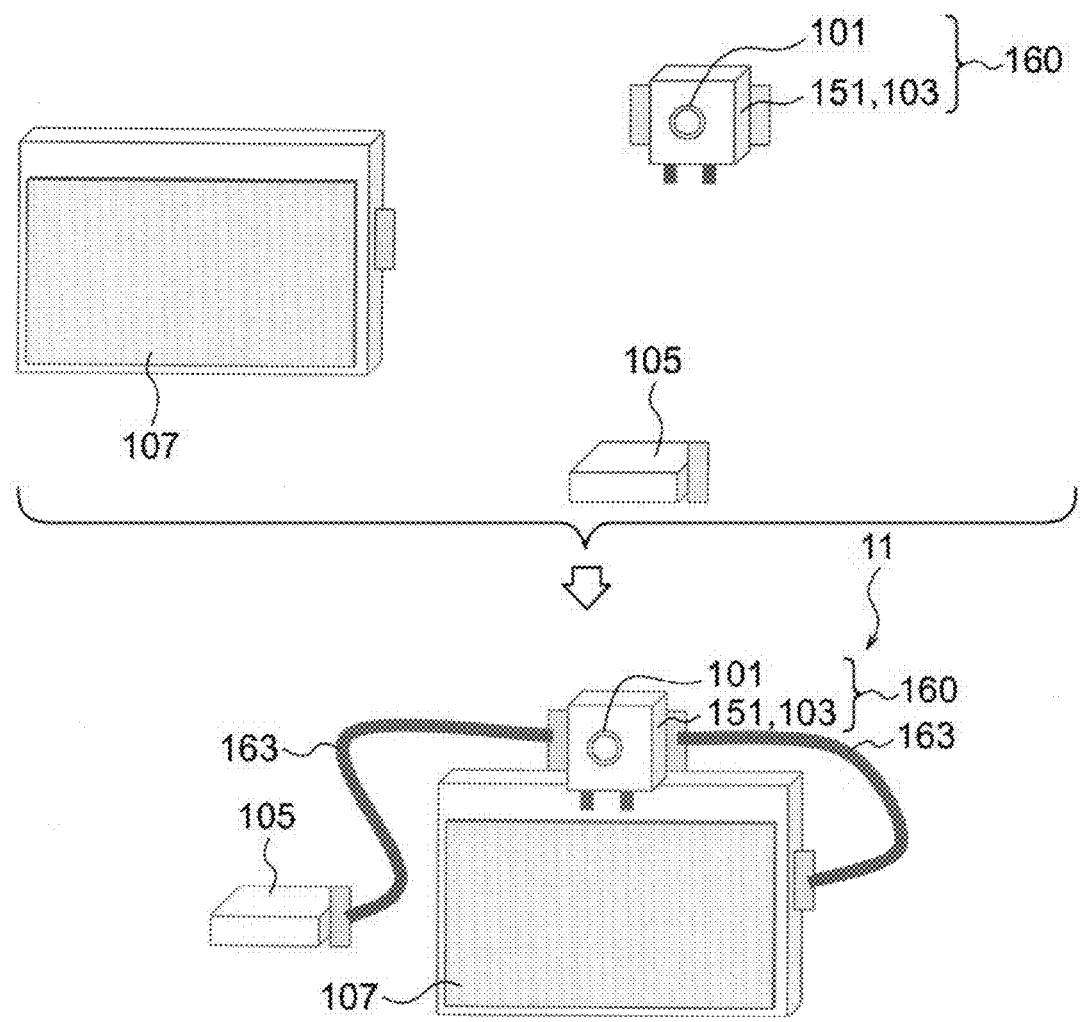
FIG. 21 is an external appearance of the stereoscopic image display device.

FIG. 21 shows a case where the stereoscopic image display device 11 is separated into three devices. The first one is the stereoscopic display panel unit 107, the second one is an image processing device 160 acquired by integrating the observer position measuring unit 101, the image processing unit 151, and the device characteristic data saving unit 103, and the third one is the device of the image data saving unit 105. The functions of the stereoscopic image display device 11 can be achieved through connecting the three devices via an image input/output cable 163 such as HDMI (registered trademark) or DVI, a data communication cable such as USB or LAN, or via radio communication such as W-LAN and receiving various kinds of data.

Figure 22:
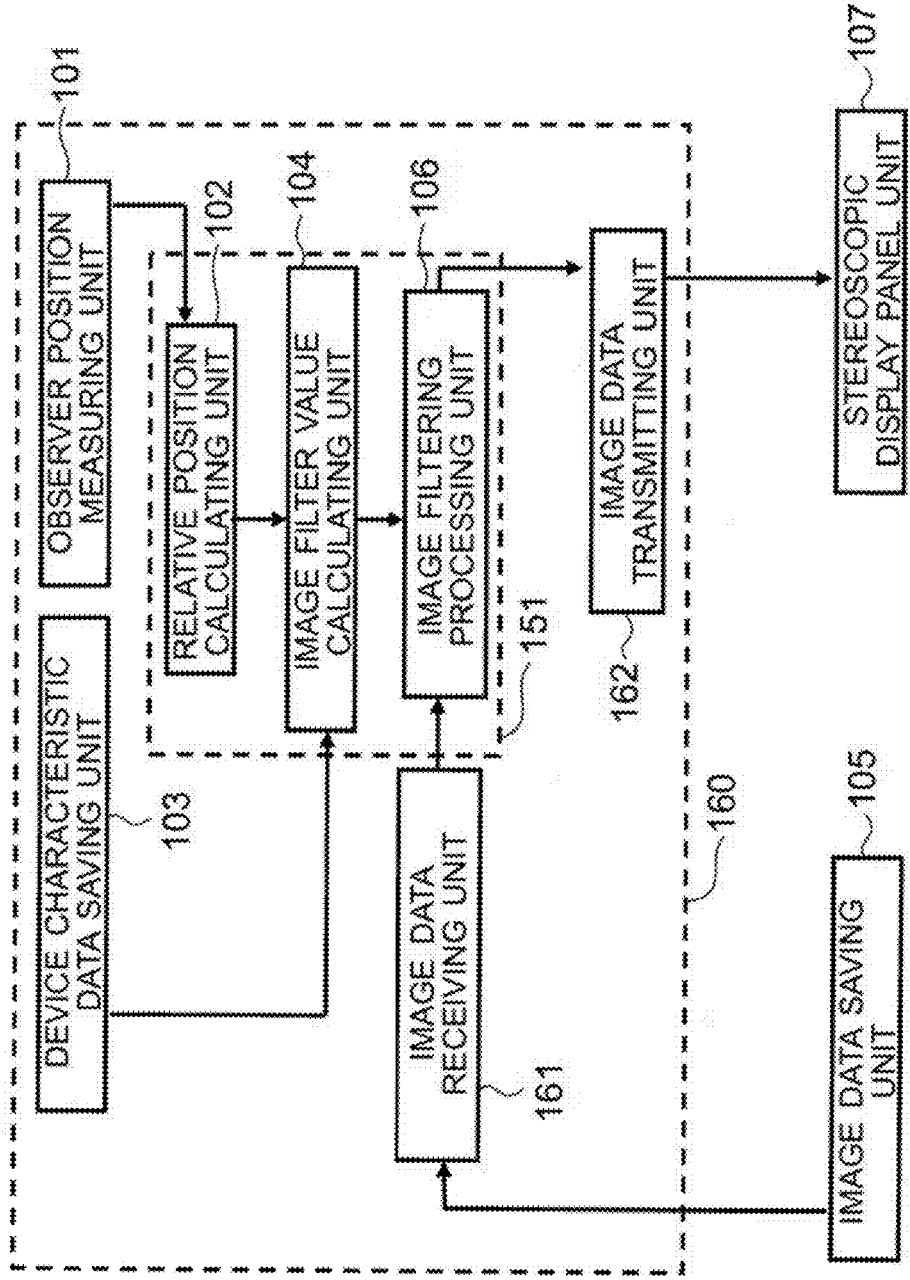
FIG. 22 is a block diagram of an image processing device.

FIG. 22 shows a block diagram of the image processing device 160. The image processing device 160 includes: the observer position measuring unit 101, the relative position calculating unit 102, the device characteristic data saving unit 103, the image filter value calculating unit 104, the image filter processing unit 106, an image data receiving unit 161, and an image data transmitting unit 162. Note here that the observer position measuring unit 101, the relative position calculating unit 102, the device characteristic data saving unit 103, the image filter value calculating unit 104, and the image filter processing unit 106 have the same functions as each of the structural elements of the stereoscopic image processing device 11 described above.

The image data receiving unit 161 has a function which receives the image data transmitted from the image data saving unit 105 provided outside the image processing device 160 and transmits it to the image filtering processing unit 106. Further, the image data transmitting unit 162 has a function which transmits the image data transmitted from the image filtering processing unit 106 to the stereoscopic display panel unit 107. Examples of the image data receiving unit 161 and the image data transmitting unit 162 are a connection terminal and a data transfer device used for transmitting/receiving the image data to/from the image processing device 160 via HDMI, a DVI cable, or the like.

While the case of separating the image display device into the three devices is described in the above, the form of separation is not limited only to that case. The feature of the first exemplary embodiment is the image processing unit 151 which lightens the influence of the CT-image generated by the 3D crosstalk. Thus, it is possible to combine the image processing unit 151 and the observer position measuring unit 101 and provide it as the single image processing device 160 described above.

The optical model chart of the stereoscopic image display device 11 according to the first exemplary embodiment (FIG. 5) shows a case of projecting images of two different viewpoints (L image, R image) from the stereoscopic display panel 107*a*. However, the number of viewpoints is not limited to two. Images of multi-viewpoints may be projected from the stereoscopic display panel. In a case of projecting the images of multi-viewpoints, the image filtering processing may be performed on all the images of the neighboring viewpoints observed by the observer with both eyes or the image filtering processing may be performed by selecting only the images between which reverse visions are generated. For selecting the image filtering processing from those kinds, it is possible to select the type according to the number of viewpoints of the stereoscopic image display device or the extent of the parallax amount between the images of the neighboring viewpoints.

Figure 23:
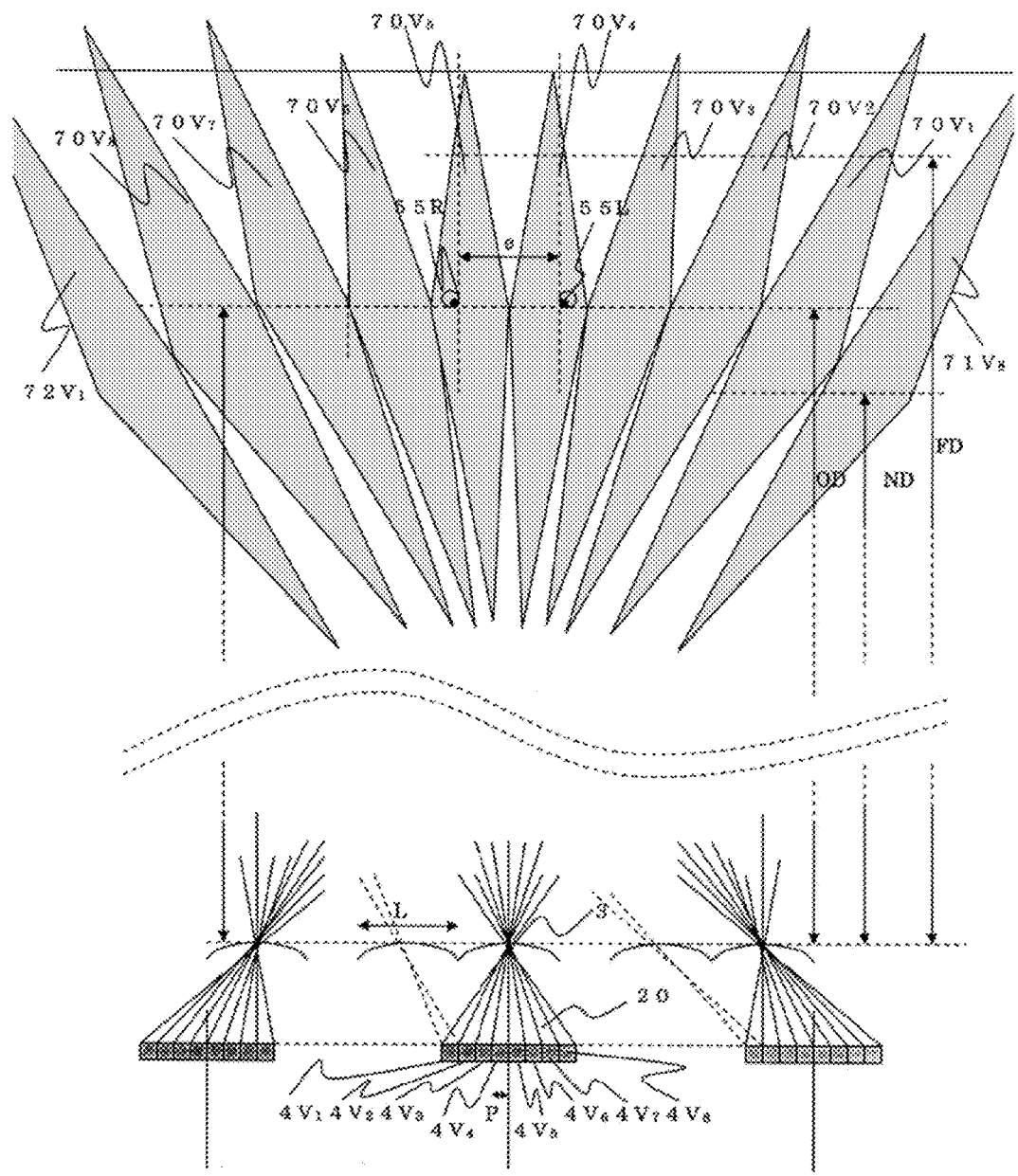
FIG. 23 is an illustration showing an optical model with eight viewpoints.

FIG. 23 shows an eight-viewpoint stereoscopic image display device as an example of multi-viewpoints. The 3D crosstalk is generated in seven sets of images between $70V_1$ image and $70V_2$ image, between $70V_2$ image and $70V_3$ image, between $70V_3$ image and $70V_4$ image, - - -, between $70V_7$ image and $70V_8$ image within a stereoscopic viewing space and two sets of images $72V_1$ image and $70V_8$ image and between $71V_8$ image and $70V_1$ image as the pseudoscopic viewing space. In general, images used in eight viewpoints are a group of images with some extent of motion parallax taken into consideration, so that many of the contents are of small parallax amount between the images of neighboring viewpoints. When the parallax amount is small, the influence of the CT-image by the 3D crosstalk is weakened. Therefore, in such case, it is desirable to perform the image filtering processing only when the left eye or the right eye of the observer is within the pseudoscopic viewing space and not to perform the image filtering processing on the seven sets within the stereoscopic viewing space.

However, even with eight viewpoints, it is desirable to perform the image filtering processing between the images of the neighboring viewpoints depending on the observing position of the observer even in a case of observing the content having the parallax amount between the images of the neighboring viewpoints within the stereoscopic viewing space is large or a case where the parallax amount between the images of the neighboring viewpoints is not so large. Particularly, depending on the observing distance of the observer, following circumstances occur: the observer observes not the images of the first neighboring viewpoints such as the $70V_4$ image by the left eye and the $70V_5$ image by the right eye, but observes the images of the second neighboring viewpoints such as the $70V_4$ image by the left eye and the $70V_6$ image by the right eye, the images of the third neighboring viewpoints or the images of the fourth neighboring viewpoints. In such state, as the order becomes larger as the second neighboring viewpoints, the third neighboring viewpoints, and the fourth neighboring viewpoints, the parallax amount of the images inputted to the both eyes becomes larger. Therefore, the influence for the 3D crosstalk is increased. As described, it is possible to detect which viewpoint image is located at the left eye position or the right eye position of the observer through measuring the observing position of the observer. Thus, the image filtering processing may be performed only on the images of the viewpoints of the target order.

Figure 24:
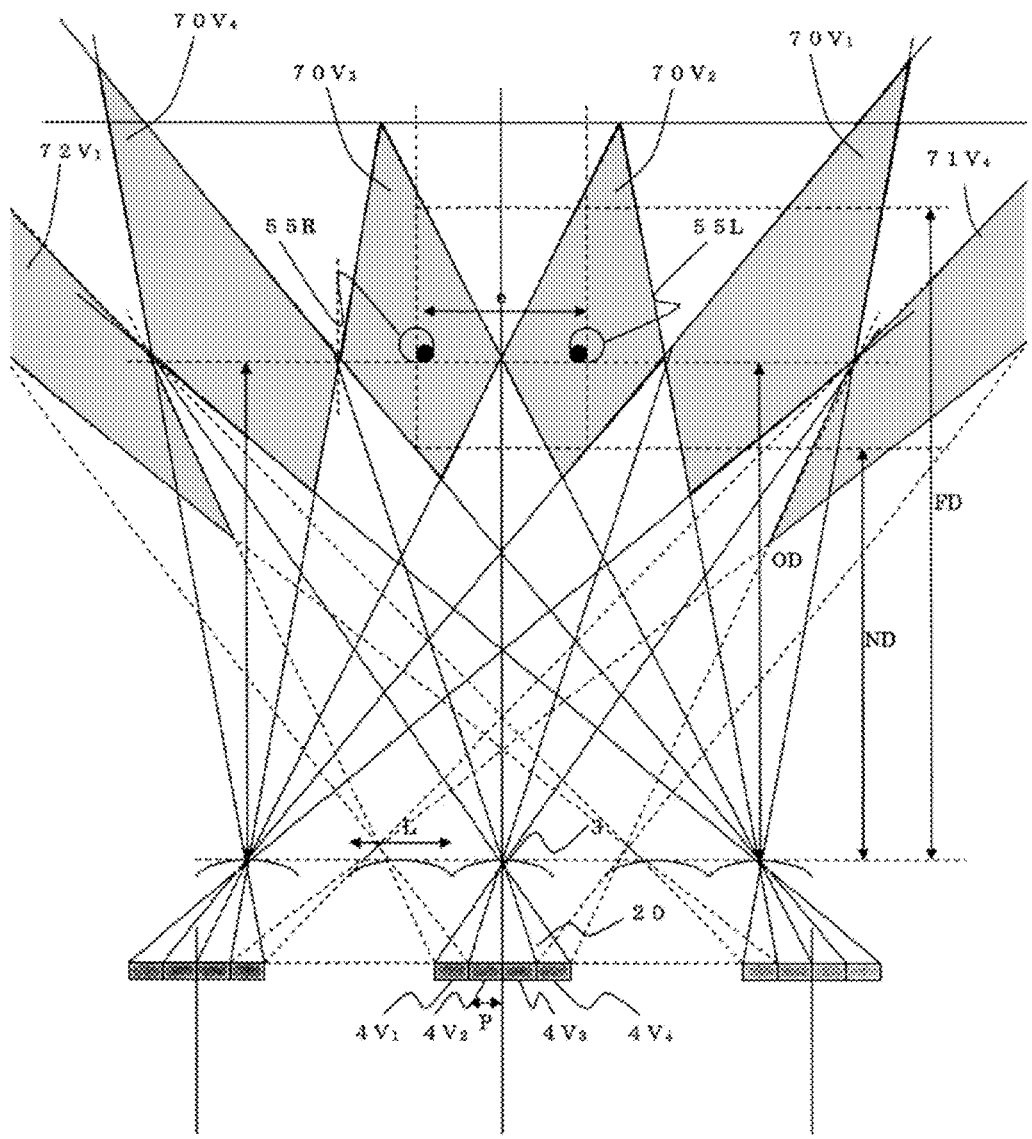
FIG. 24 is an illustration showing an optical model with four viewpoints.

FIG. 24 shows a four-viewpoint stereoscopic image display device as another example of multi-viewpoints. The 3D crosstalk is generated in three sets of images between $70V_1$ image and $70V_2$ image, between $70V_2$ image and $70V_3$ image, between $70V_3$ image and $70V_4$ image within a stereoscopic viewing space and two sets of images between $72V_1$ image and $70V_4$ image and between $71V_4$ image and $70V_1$ image as the pseudoscopic viewing space. In general, there are many contents of large parallax amount between the viewpoints regarding the images of four viewpoints, and the so-called flipping effect occurs at the time of shift between the viewpoints. Thus, in such case, it is desirable to perform the image filtering processing on the image data projected to the left eye when the left eye of the observer is within the 3D-crosstalk viewing space and to perform the image filtering processing on the image data projected to the right eye when the right eye of the observer is within the 3D-crosstalk viewing space partly for the sake of the flipping suppressing effect. However, this does not apply even in a case of four viewpoints when the contents thereof are of small parallax amount. It is needless to say that the image filtering processing may be performed only on the pseudoscopic viewing space in that case.

As another example, in a case where the left eye of the observer is in the 3D-crosstalk viewing space between the $70V_1$ image and the $70V_2$ image and the right eye is in the stereoscopic viewing space of the $70V_3$ image, the image filtering processing is performed only on the $70V_1$ image and the $70V_2$ image to blur the images so as to lighten the influence of the CT-image by the 3D crosstalk. When this image filtering processing is performed, the image-filtering processed $70V_1$ image and $70V_2$ image projected to the left eye of the observer are blurred by the image filtering processing but the $70V_3$ image projected to the right eye of the observer is not blurred. Therefore, even when the influence of the CT-image by the 3D crosstalk is lightened by the image filtering processing, the image blurring is not generated in one of the eyes of the observer. Thus, the stereoscopic image content can be viewed while keeping the image quality. Note that the area $70V_1$ of the viewpoint 1, the area $70V_2$ of the viewpoint 2, the area $70V_3$ of the viewpoint 3, the area $70V_4$ of the viewpoint 4, the area $70V_5$ of the viewpoint 5, the area $70V_6$ of the viewpoint 6, the area $70V_7$ of the viewpoint 7, the area $70V_8$ of the viewpoint 8, the area $72V_1$ of the viewpoint 1, the area $71V_8$ of the viewpoint 8, the area $71V_4$ of the viewpoint 4, the pixel $4V_1$ for the viewpoint 1, the pixel $4V_2$ for the viewpoint 2, the pixel $4V_3$ for the viewpoint 3, the pixel $4V_4$ for the viewpoint 4, the pixel $4V_5$ for the viewpoint 5, the pixel $4V_6$ for the viewpoint 6, the pixel $4V_7$ for the viewpoint 7, and the pixel $4V_8$ for the viewpoint 8 are illustrated in both or one of the drawings FIG. 23 and FIG. 24.

Further, it is needless to mention that the above-described image filtering processing can be applied not only to the multi-viewpoint type but also to various naked-eye stereoscopic types such as the integral type and the super multi-viewpoint type. Note here that there is no pseudoscopic viewing space with an ideal integral type. However, even in that case, it is effective to perform the image filtering processing between the images of neighboring viewpoints within the stereoscopic viewing space when the parallax amount between the neighboring viewpoints is larger than a prescribed value.

In other words, the stereoscopic image display device according to the first exemplary embodiment includes: the observer position measuring unit which measures the observing position of the observer; the relative position calculating unit which calculates the relative position between the observing position of the observer and the position of the stereoscopic display panel; the device characteristic data saving unit which saves the device characteristic data for the viewing angles of the stereoscopic display panel; the image filter value calculating unit which calculates the image filter value suited for stereoscopic image display for the viewing angle based on the device characteristic data; the image data saving unit which saves or receives the image data; the image filtering processing unit which performs the image filtering processing on the image data according to the image filter value; and the stereoscopic display panel unit which projects the image data on which the image filtering processing is performed to the right eye and the left eye according to the relative position.

The first exemplary embodiment can overcome the issues by providing the stereoscopic image display device and the stereoscopic image processing method with which the influence of the CT-image by the 3D crosstalk is lightened so that a sense of discomfort is not felt by the observer even when the observing position of the observer is shifted, through performing the image filtering processing on the image data according to the image filter value calculated based on the observing position of the observer and the device characteristic data.

As an exemplary advantage according to the invention, the present invention exhibits the effect of providing the stereoscopic image display device and the stereoscopic image processing method with which the influence of the CT-image caused by 3D crosstalk can be lightened so that the observer does not feels a sense of discomfort even when the observing position of the observer is shifted.

Second Exemplary Embodiment

It is an exemplary object of a second exemplary embodiment to provide a stereoscopic image display device and a stereoscopic image processing method with which the influence of the CT-image by the 3D crosstalk is lightened so that a sense of discomfort is not felt by the observer, through performing image filtering processing for suppressing deterioration of the image quality of the stereoscopic image content viewed by the observer even when the image data of the stereoscopic image content is blurred by the image filtering processing through calculating the different image filter values for each of the image data of the stereoscopic image content.

Figure 25:
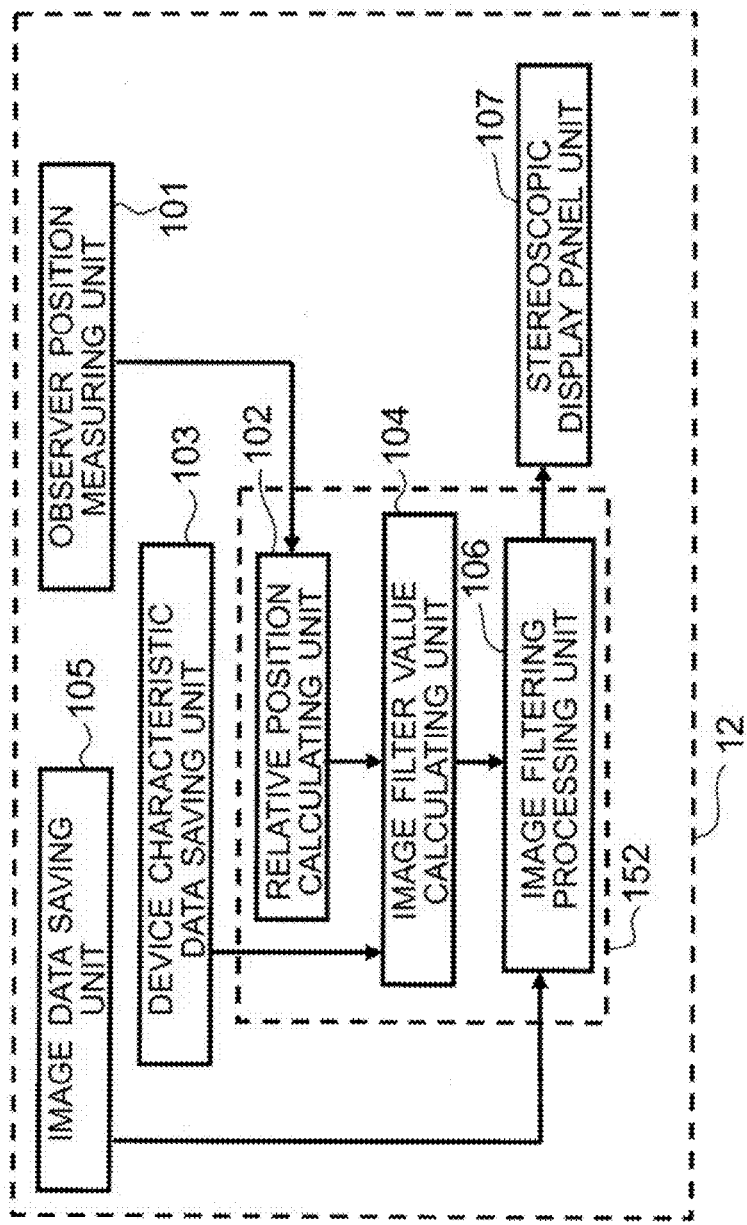
FIG. 25 is a block diagram of a stereoscopic image display device according to a second exemplary embodiment.

FIG. 25 shows a block diagram of a stereoscopic image display device 12. The stereoscopic image display device 12 includes: an observer position measuring unit 101; a relative position calculating unit 102; a device characteristic data saving unit 103; an image filter value calculating unit 104; an image data saving unit 105; an image filtering processing unit 106; and a stereoscopic display panel unit 107. Further, a processing unit that is an integration of the relative position calculating unit 102, the image filter value calculating unit 104, and the image filtering processing unit 106 is referred to as an image processing unit 152.

Hereinafter, functions of each unit included in the stereoscopic image display device 12 will be described. The functions of the observer position measuring unit 101, the relative position calculating unit 102, the device characteristic data saving unit 103, the image data saving unit 105, and the stereoscopic display panel unit 107 are the same as those of the first exemplary embodiment.

The image filter value calculating unit 104 has a function which calculates the image filter value suited for stereoscopic image display with respect to the viewing angle based on the device characteristic data. In the first exemplary embodiment, the same image filter value is calculated for the L image and the R image as the image data of the stereoscopic image content. However, in the second exemplary embodiment, image filter values different for each of the image data of the stereoscopic image content are calculated.

Hereinafter, depicted is a case where the variance σ of the Gaussian filter is defined as a constant and the window width value W of the image filter is calculated by the image filter value calculating unit 104. FIG. 26 shows the 3D device characteristic data saved in the device characteristic data saving unit 103. FIG. 26A shows the luminance characteristic data of the left-eye image and the right-eye image with respect to the viewing angles θ. FIG. 26B shows the 3D crosstalk characteristic data with respect to the viewing angles θ, which is calculated by using Formula (4) from the luminance characteristic data. Note that device characteristic data may carry only the 3D crosstalk characteristic data.

Figure 28:
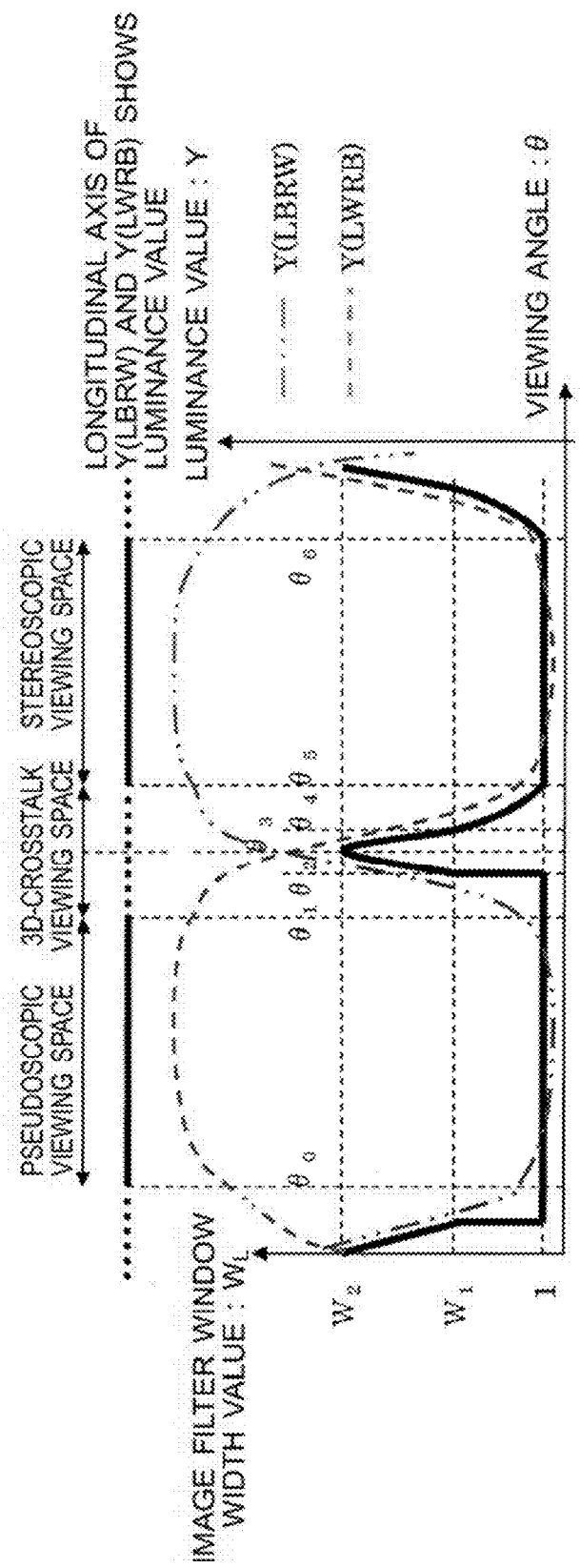
FIG. 28 is a chart showing window width values of the image filter with respect to viewing angles of an L image.

FIG. 27 shows the calculated result of the image filter window width $W_R(\theta)$ with respect to the viewing angles θ in the R image of the stereoscopic image content based on the 3D crosstalk characteristic data (FIG. 26B). Further, FIG. 28 shows the calculated result of the image filter window width $W_L(\theta)$ with respect to the viewing angles θ in the L image of the stereoscopic image content based on the 3D crosstalk characteristic data (FIG. 26B). In FIG. 27 and FIG. 28, the luminance characteristic data of FIG. 26A is also shown in order to show that the image filter window width values correspond to the luminance characteristic data (or the 3D crosstalk characteristic data).

FIG. 29 is a table which shows the relation regarding the generation of a CT-image for the 3D crosstalk amount, the influence for the stereoscopic image caused by 3D crosstalk, the viewing angle ranges, the viewing space names (pseudoscopic viewing space, 3D-crosstalk viewing space, stereoscopic viewing space), and the image filter window width value $W_L(\theta)$ in the L image, the image filter window width value $W_R(\theta)$ in the R image.

Hereinafter, the image filter window width values $W_L(\theta)$ and $W_R(\theta)$ in the L image and the R image for each of the areas of the stereoscopic viewing space $\theta_5$ to $\theta_6$, the pseudoscopic viewing space $\theta_0$ to $\theta_1$, and the 3D-crosstalk viewing space $\theta_1$ to $\theta_5$ will be described by referring to FIG. 27, FIG. 28, and FIG. 29. The stereoscopic viewing space $\theta_5$ to $\theta_6$ and the pseudoscopic viewing space $\theta_0$ to $\theta_1$ shown in FIG. 29 are the viewing space names of a case where the right eye is considered as the reference. When the left eye is considered as the reference, the stereoscopic viewing space becomes the area $\theta_0$ to $\theta_1$, and the pseudoscopic viewing space becomes the area $\theta_5$ to $\theta_6$. Therefore, the stereoscopic viewing space and the pseudoscopic viewing space may be defined as no-3D-crosstalk areas for convenience' sake.

"1" is substituted to the window width values $W_L(\theta)$ and $W_R(\theta)$ of the image filter in the stereoscopic viewing space $\theta_5$ to $\theta_6$ and the pseudoscopic viewing space $\theta_0$ to $\theta_1$ as in the case of the first exemplary embodiment. Naturally, a command value for stopping execution of the image filtering processing may be substituted instead of substituting "1" to the window width value of the image filter in order to reduce the calculation amount of the image filtering processing.

In the 3D-crosstalk viewing space $\theta_1$ to $\theta_5$, the window width values $W_L(\theta)$ and $W_R(\theta)$ of the image filter are fractionated according to the 3D crosstalk amount. In the range where the 3D crosstalk amount is $\beta_1$ to $\beta_2$ (viewing angle ranges of $\theta_1$ to $\theta_2$, $\theta_4$ to $\theta_5$), a slight CT-image is generated. Thus, the stereoscopic image can be sighted even though the observer feels a sense of discomfort. In the meantime, in the range where the 3D crosstalk amount is $\beta_2$ or more (the viewing angle ranges of $\theta_2$ to $\theta_3$, $\theta_3$ to $\theta_4$), the influence of the CT-image is increased. Thus, it becomes almost impossible for the observer to sight the stereoscopic image. Therefore, it is desirable to set the window width values $W_L(\theta)$ and $W_R(\theta)$ of the image filter in accordance with the extent of the influence of the CT-image.

Specifically, the 3D crosstalk amount is referred from the 3D device characteristic data of FIG. 26B, and the window width values $W_L(\theta)$ and $W_R(\theta)$ of the image filter suited for that amount are set. From the 3D device characteristic data of FIG. 26B, the core of the image data projected to the observer in the viewing angle range $\theta_1$ to $\theta_2$ is the L image, and the component of the R image is slightly mixed therein. Thus, the image filtering processing is performed only on the R image to slightly blur the R image, and the L image is saved in that state without performing the image filtering processing in order to keep the image quality. Thus, the values from "1" to the window width value $W_1$ are substituted to the window width value $W_R(\theta)$ of the image filter in the R image of FIG. 27 to correspond to the curve of Y(LWRB), and the value "1" is substituted to the window width value $W_L(\theta)$ of the image filter in the L image of FIG. 28.

The core of the image data projected to the observer in the viewing angle range $\theta_2$ to $\theta_3$ is the L image, and many components of the R image are mixed therein so that the image components of the L image and the R image become almost equivalent. Thus, the image filtering processing is performed on the L image and the R image to blur the images to be saved. Thus, the values of the window width values $W_1$ and $W_2$ are substituted to the window width value $W_R(\theta)$ of the image filter in the R image of FIG. 27 and the window width value $W_L(\theta)$ of the image filter in the L image of FIG. 28.

The core of the image data projected to the observer in the viewing angle range $\theta_3$ to $\theta_4$ is the R image, and many components of the L image are mixed therein so that the image components of the L image and the R image become almost equivalent. Thus, the image filtering processing is performed on the L image and the R image to blur the images to be saved. Thus, the values of the window width values $W_1$ and $W_2$ are substituted to the window width value $W_R(\theta)$ of the image filter in the R image of FIG. 27 and the window width value $W_L(\theta)$ of the image filter in the L image of FIG. 28.

The core of the image data projected to the observer in the viewing angle range $\theta_4$ to $\theta_5$ is the R image, and the component of the L image is slightly mixed therein. Thus, the image filtering processing is performed only on the L image to slightly blur the L image, and the R image is saved in that state without performing the image filtering processing in order to keep the image quality. Thus, the window width value "1" is substituted to the window width value $W_R(\theta)$ of the image filter in the R image of FIG. 27, and the values from "1" to $W_1$ are substituted to the window width value $W_L(\theta)$ the image filter in the L image of FIG. 28 to correspond to the curve of Y(LBRW). Note that the window width values $W_1$ and $W_2$ as the calculation condition of the window width values $W_L(\theta)$ and $W_R(\theta)$ of the image filter are specified based on the result of the subjective evaluation done on the observer as in the case of the first exemplary embodiment.

Regarding the window width value $W_R(\theta)$ of the image filter in the 3D-crosstalk viewing space of the R image, the point where the window width value is 1 at the viewing angle $\theta_1$, the point of the window width value $W_1$ at the viewing angle $\theta_2$, the point of the window width value $W_2$ at the viewing angle $\theta_3$ as the center position of the 3D-crosstalk viewing space, the point of the window width value $W_1$ at the viewing angle $\theta_4$, and the point where the window width value is 1 at the viewing angle $\theta_4$, and the point where the window width value is 1 at the viewing angle $\theta_5$ are connected with each other by interpolation via a line so as to calculate the window width values $W_R(\theta)$ of the image filter for each of the viewing angles $\theta$. The window width values $W_L(\theta)$ of the image filter for the viewing angles $\theta$ are calculated also for the image L by using the same method.

Figure 30:
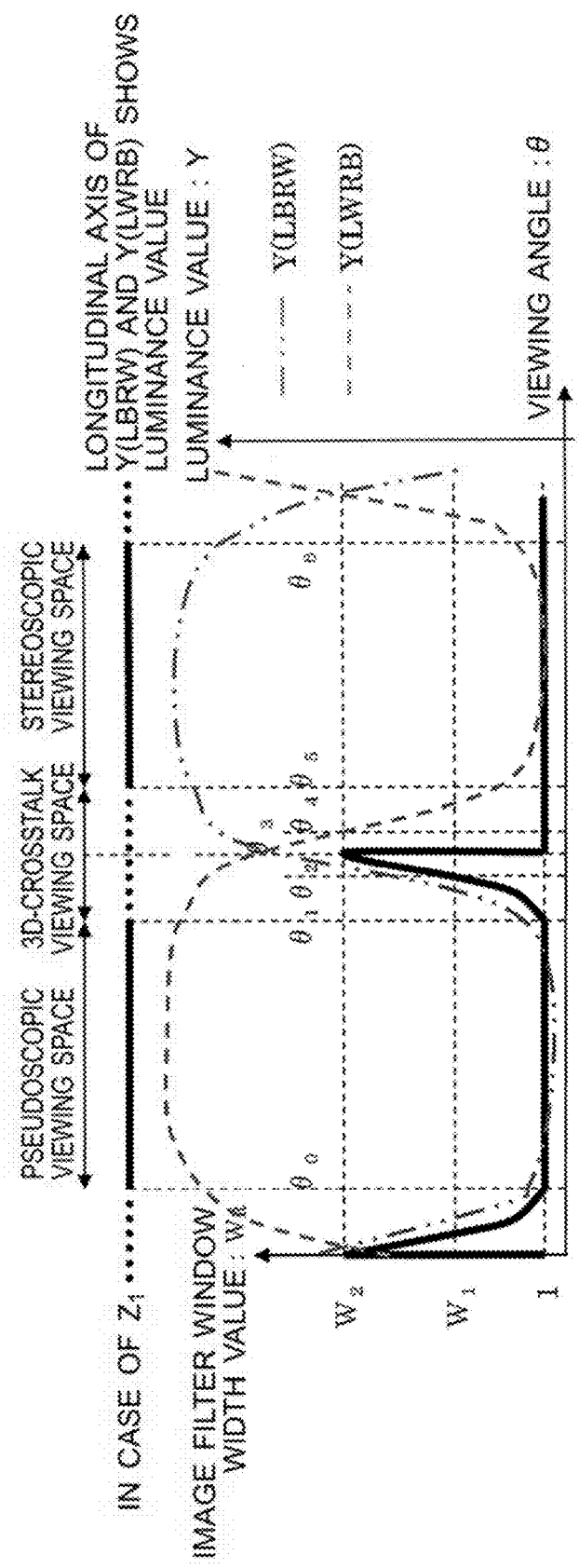
FIG. 30 is a chart showing window width values of the image filter with respect to viewing angles of an R image.
Figure 31:
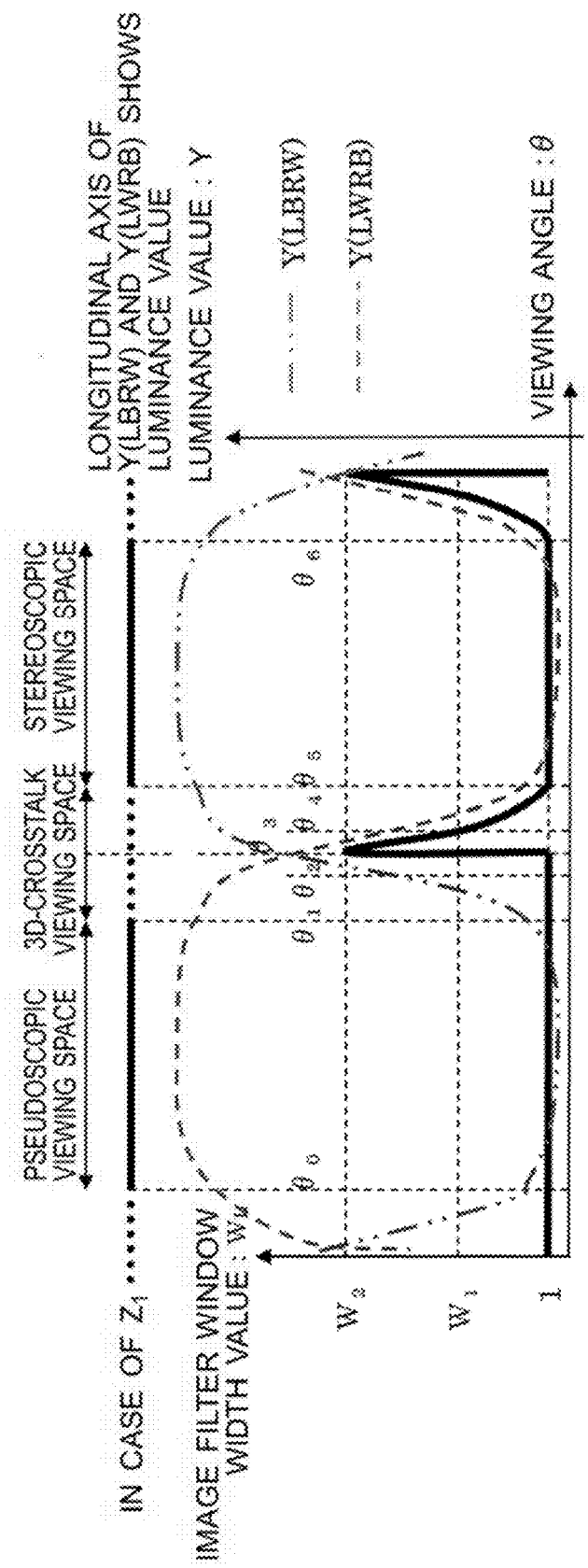
FIG. 31 is a chart showing window width values of the image filter with respect to viewing angles of an L image.

In the above case, the window width values $W_1$ to $W_2$ are substituted to the window width values $W_L(\theta)$ of the image filter in the L image in the viewing angle range $\theta_2$ to $\theta_3$. However, in order to keep the image quality of the image data, it is also possible to substitute the value of "1" to the window width values $W_L(\theta)$ of the image filter and save the image without performing the image filtering processing on the L image. This makes it possible to display the stereoscopic image content while keeping the image quality also in the viewing angle range $\theta_2$ to $\theta_3$ even though the effect for lightening the influence of the 3D crosstalk is weakened. FIG. 30 shows the window width values $W_R(\theta)$ of the image filter for the viewing angles of the R image in such case, and FIG. 31 shows the window width values $W_L(\theta)$ of the image filter for the viewing angles of the L image.

Further, while the case of calculating the window width values $W_L(\theta)$ and $W_R(\theta)$ of the image filter by referring to the luminance characteristic data or the 3D crosstalk characteristic data is described above, the window width values $W_L(\theta)$ and $W_R(\theta)$ of the image filter may be calculated by taking the relative position of the right eye and the left eye of the observer, respectively, into consideration in addition to the characteristic data. When only the 3D crosstalk characteristic data is referred without taking the relative position of the right eye and the left eye of the observer, respectively, into consideration, the processing for lightening the influence of the CT-image by the 3D crosstalk is performed preferentially. Thus, the window width values of the image filter calculated from the observing positions of the right eye and the left eye, respectively, are compared, and the larger window width value is applied as the image filter value.

FIG. 32 shows an example of calculating the window width values $W_L(\theta)$ and $W_R(\theta)$ of the image filter in such case. In a case where the left eye of the observer is in the viewing angle range $\theta_1$ to $\theta_2$ (3D-crosstalk viewing space) and the right eye is in the viewing angle range $\theta_5$ to $\theta_6$ (stereoscopic viewing space), image blurring is performed on the R image in order to lighten the influence of the CT-image by the 3D crosstalk. The influence of the CT-image by the 3D crosstalk is lightened in the right eye of the observer, and the image data having the L image as the core is projected to the observer. However, the R image whose image is blurred and the image quality thereof is deteriorated is projected to the left eye of the observer. In order to overcome such issue, the image filter value is calculated by considering not only the 3D crosstalk characteristic data but also the relative position of both eyes of the observer.

For example, in the case where the left eye of the observer is in the viewing angle range $\theta_1$ to $\theta_2$ (3D-crosstalk viewing space) and the right eye is in the viewing angle range $\theta_5$ to $\theta_6$ (stereoscopic viewing space), the influence of the CT-image by the 3D crosstalk is lightened through not performing the image filtering processing on the R image by considering the relative position of the right eye but performing the image filtering processing on the L image instead so as to blur only the L image.

FIG. 32 shows a table showing conditions for calculating the image filter value by taking the relative position of both eyes of the observer into consideration.

When the left eye of the observer is in the 3D-crosstalk viewing space and the right eye is in the stereoscopic viewing space, the window width value $W_R(\theta)$ of the R image is set as "1" and the image filter value is calculated in such a manner that the window width value $W_L(\theta)$ of the L image takes the values of 1 to $W_5$ in order to blur only the L image.

Note here that $W_5$ is set to be a larger value than that of $W_2$ shown in FIG. 27 and FIG. 28. This is for lightening the influence of the CT-image by the 3D crosstalk through blurring only the L image that has a high luminance value even when the image becomes the 3D crosstalk image in which the luminance value of the L image is higher than the R image for considering the relative position of the both eyes.

When the left eye of the observer is in the 3D-crosstalk viewing space and the right eye is in the pseudoscopic viewing space, the window width value $W_L(\theta)$ of the L image is set as "1" and the image filter value is calculated in such a manner that the window width value $W_R(\theta)$ of the R image takes the values of 1 to $W_5$ in order to blur only the R image.

When the left eye of the observer is in the stereoscopic viewing space and the right eye is in the 3D-crosstalk viewing space, the window width value $W_L(\theta)$ of the L image is set as "1" and the image filter value is calculated sin such a manner that the window width value $W_R(\theta)$ of the R image takes the values of 1 to $W_5$ in order to blur only the R image.

When the left eye of the observer is in the pseudoscopic viewing space and the right eye is in the 3D-crosstalk viewing space, the window width value $W_R(\theta)$ of the R image is set as "1" and the image filter value is calculated in such a manner that the window width value $W_L(\theta)$ of the L image takes the values of 1 to $W_5$ in order to blur only the L image.

When the left eye and the right eye of the observer are in the 3D-crosstalk viewing space, either one of the L image and the R image is selected to perform image blurring. Thus, the image filter value is calculated in such a manner that one of the window width values out of the window width value $W_R(\theta)$ of the R image and the window width value $W_L(\theta)$ of the L image takes the values of 1 to $W_s$ to perform image blurring processing.

Figure 33:
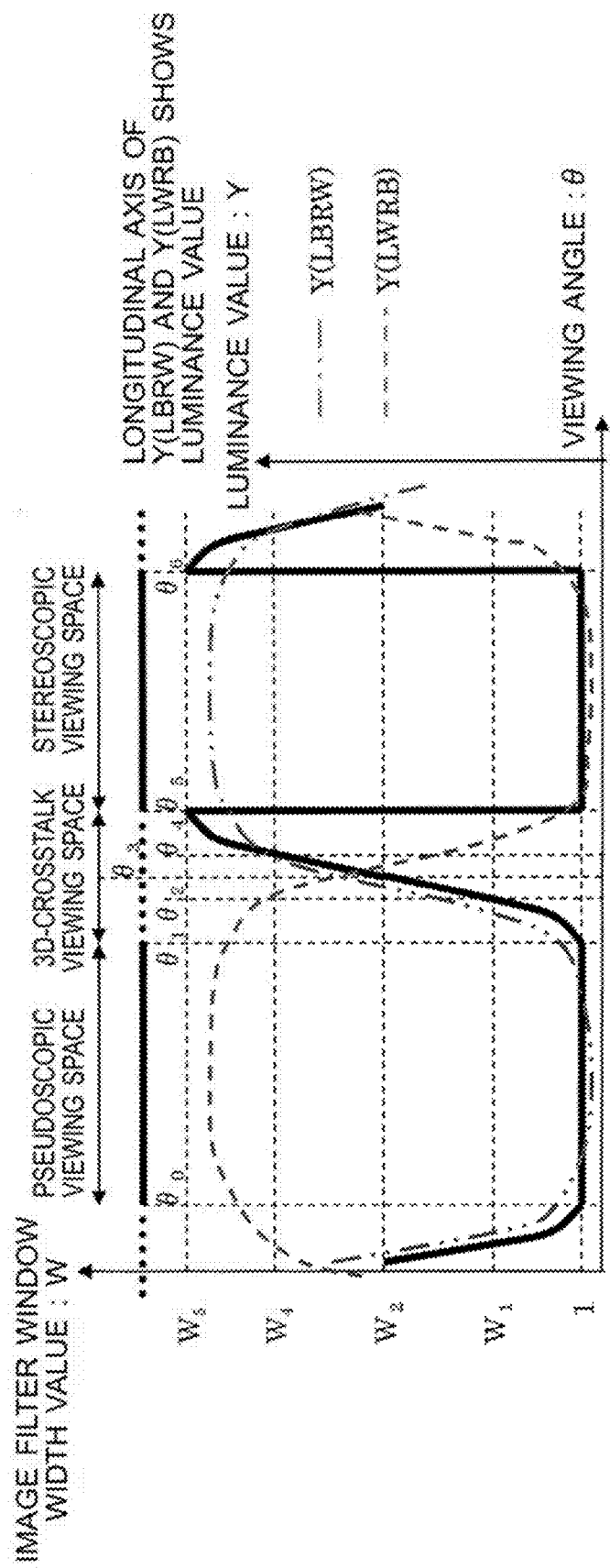
FIG. 33 is a chart showing window width values of the image filter with respect to viewing angles of an R image.
Figure 34:
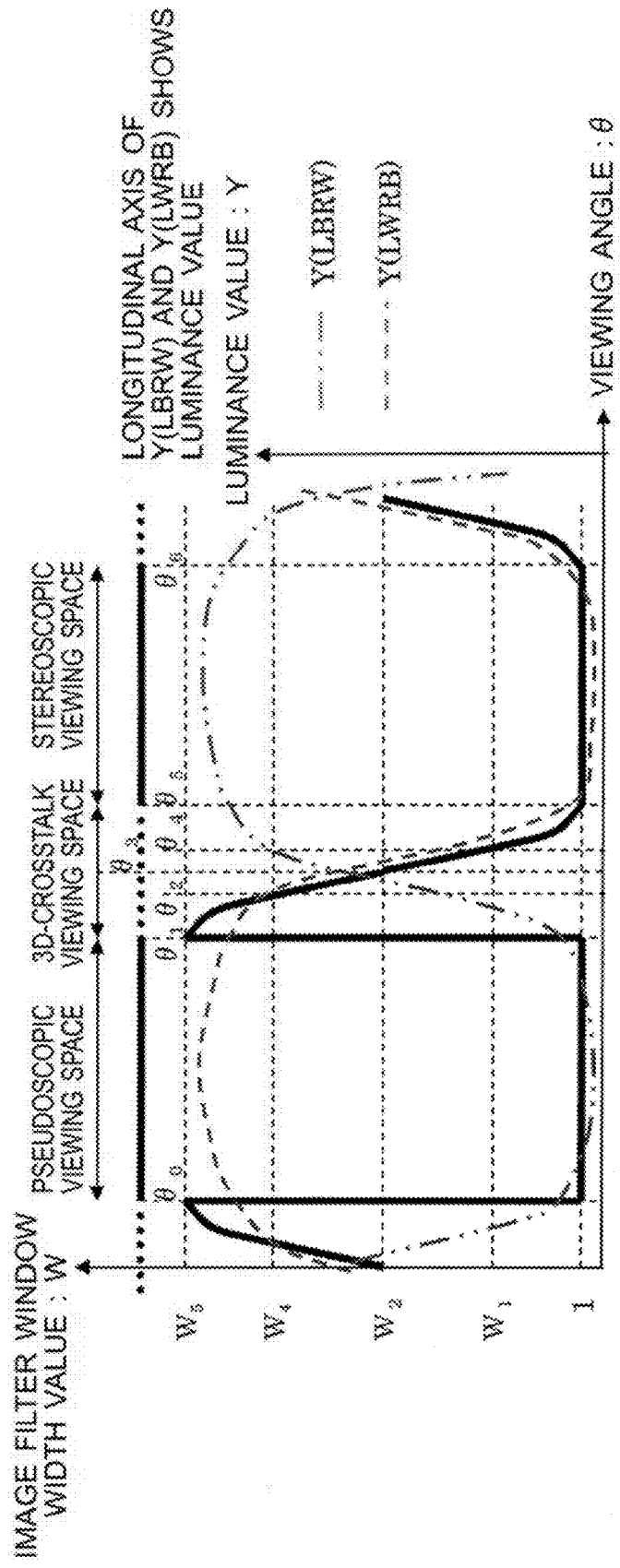
FIG. 34 is a chart showing window width values of the image filter with respect to viewing angles of an L image.

FIG. 33 shows the window width value $W_R(\theta)$ of the image filter for the viewing angle $\theta$ of the R image in the condition table of FIG. 32, and FIG. 34 shows the window width value $W_L(\theta)$ of the image filter for the viewing angle $\theta$ of the L image.

In a case where the right eye is in the stereoscopic viewing space and the R image is projected thereto even when the left eye of the observer is in the viewing angle range $\theta_1$ to $\theta_3$, the R image is saved in that state and image blurring is performed only on the L image. In the viewing angle range $\theta_1$ to $\theta_3$, the image having the L image as the core is projected. Thus, the influence of the CT-image by the 3D crosstalk is lightened through increasing the image blurring effect by widening the image filter window width value $W_L(\theta)$ of the L image.

Note here that it is common to specify the window width value $W_4$ of the image filter at the viewing angle $\theta_4$ in FIG. 33 and at the viewing angle $\theta_2$ in FIG. 34 as well as the window width values $W_5$ of the image filter at the viewing angle $\theta_5$ in FIG. 33 and at the viewing angle $\theta_1$ in FIG. 34 by the subjective evaluation done for the observer as in the case of the first exemplary embodiment. As the specifying method other than the subjective evaluation, the window width values $W_4$, $W_5$ of the image filter may be calculated from Formula (8) and Formula (9) by referring to the window width values $W_1$, $W_2$ of the image filter.

$$W_4 = W_2 + W_2 - W_1 \quad \text{Formula (8)}$$

$$W_5 = W_2 + W_2 - 1 \quad \text{Formula (9)}$$

Figure 35:
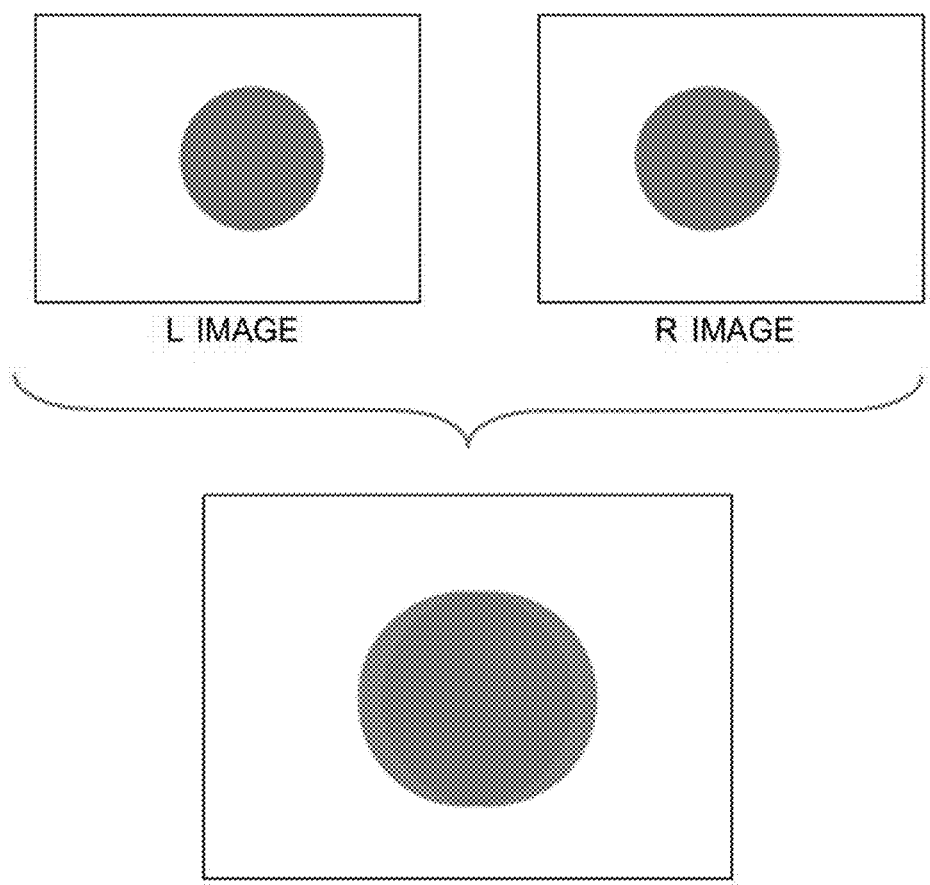
FIG. 35 is an illustration showing an image display state of a CT-image generated by 3D crosstalk.
Figure 36:
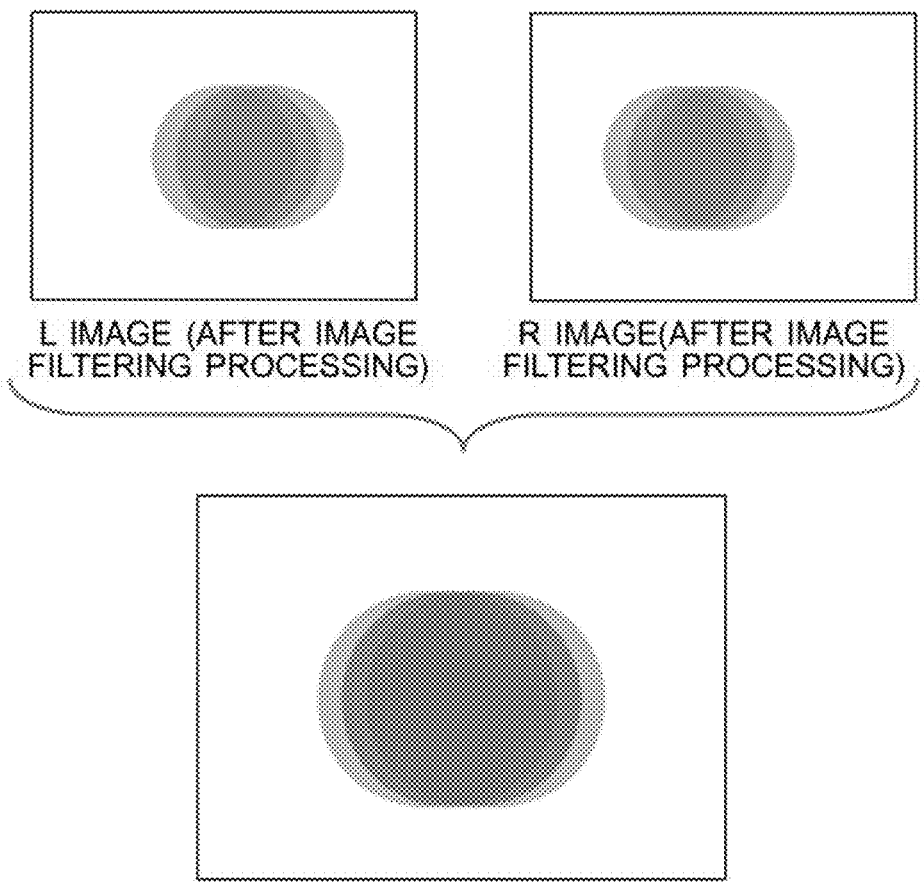
FIG. 36 is an illustration showing an image display state from which the CT-image is lightened by performing image filtering processing according to the first exemplary embodiment.
Figure 37:
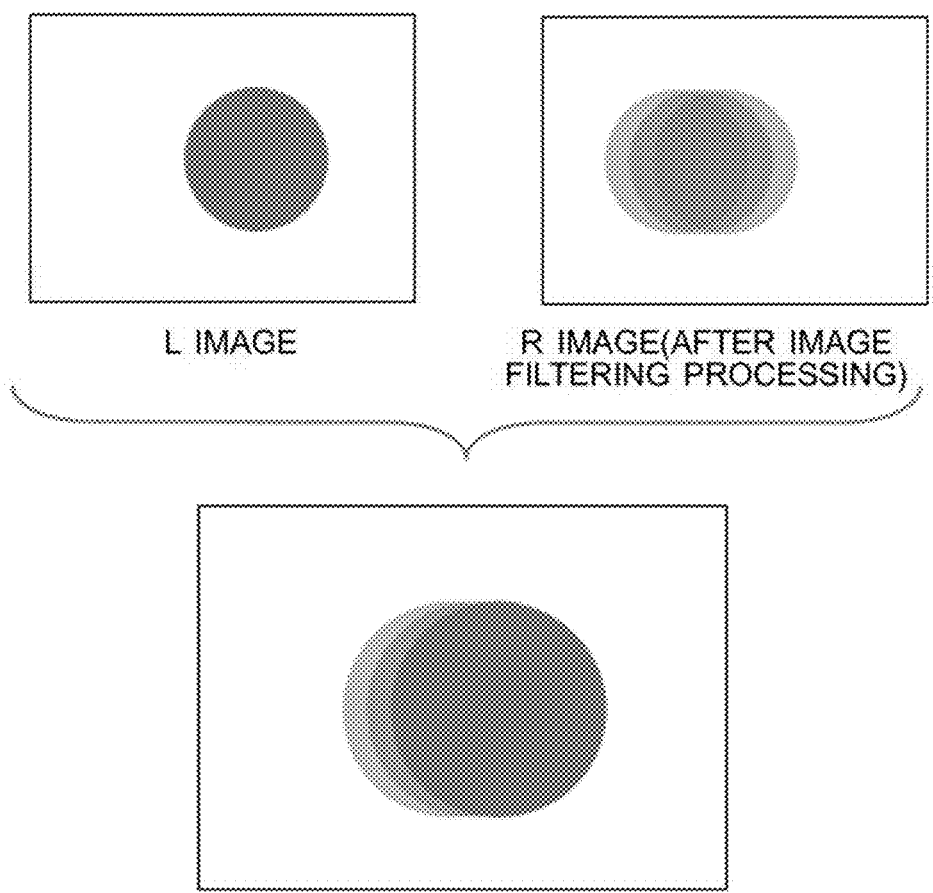
FIG. 37 is an illustration showing an image display state from which the CT-image is lightened by performing image filtering processing according to the second exemplary embodiment.

The image filtering processing unit 106 has a function which performs image filtering processing on the image data saved in the image data saving unit 105 according to the image filter value calculated by the image filter value calculating unit 104. FIG. 35 shows an image display state of a CT-image in which the L image and the R image are mixed by the 3D crosstalk. FIG. 36 shows an image display state in which the influence of the CT-image by the 3D crosstalk is lightened by performing the image filtering processing on both the L image and the R image by employing the image filtering processing of the first exemplary embodiment. FIG. 37 shows an image display state in which the influence of the CT-image by the 3D crosstalk is lightened by performing the image filtering processing only on the R image by employing the image filtering processing of the second exemplary embodiment.

In the case where the image filtering processing of the first exemplary embodiment is performed, the influence of the CT-image by the 3D crosstalk can be lightened as the blurring effect of the image filtering processing becomes greater. However, the image quality of the stereoscopic image content is deteriorated. In the case where the image filtering processing of the second exemplary embodiment is applied, however, the deterioration of the image quality of the stereoscopic image content is small even when the blurring effect by the image filtering processing becomes large. Therefore, it is possible to project the image data in which the influence of the CT-image by the 3D crosstalk is lightened to the observer.

As described above, it is possible to provide the stereoscopic image display device with which the influence of the CT-image by the 3D crosstalk is lightened while keeping the image quality of one of the image data of the stereoscopic image content so that a sense of discomfort is not felt by the observer even when the observing position of the observer is shifted, through calculating the image filter values for each of the image data of the stereoscopic image content and applying different image filter values.

As in the case of the first exemplary embodiment, the second exemplary embodiment can be applied to various kinds of naked-eye type stereoscopic image display devices such as the multi-viewpoint type and the integral type. Naturally, it is possible to provide the image processing unit 152 of the second exemplary embodiment as an individual image processing unit, and to achieve the function of the stereoscopic image display device in combination with the stereoscopic display panel unit 107 and the like.

Figure 38:
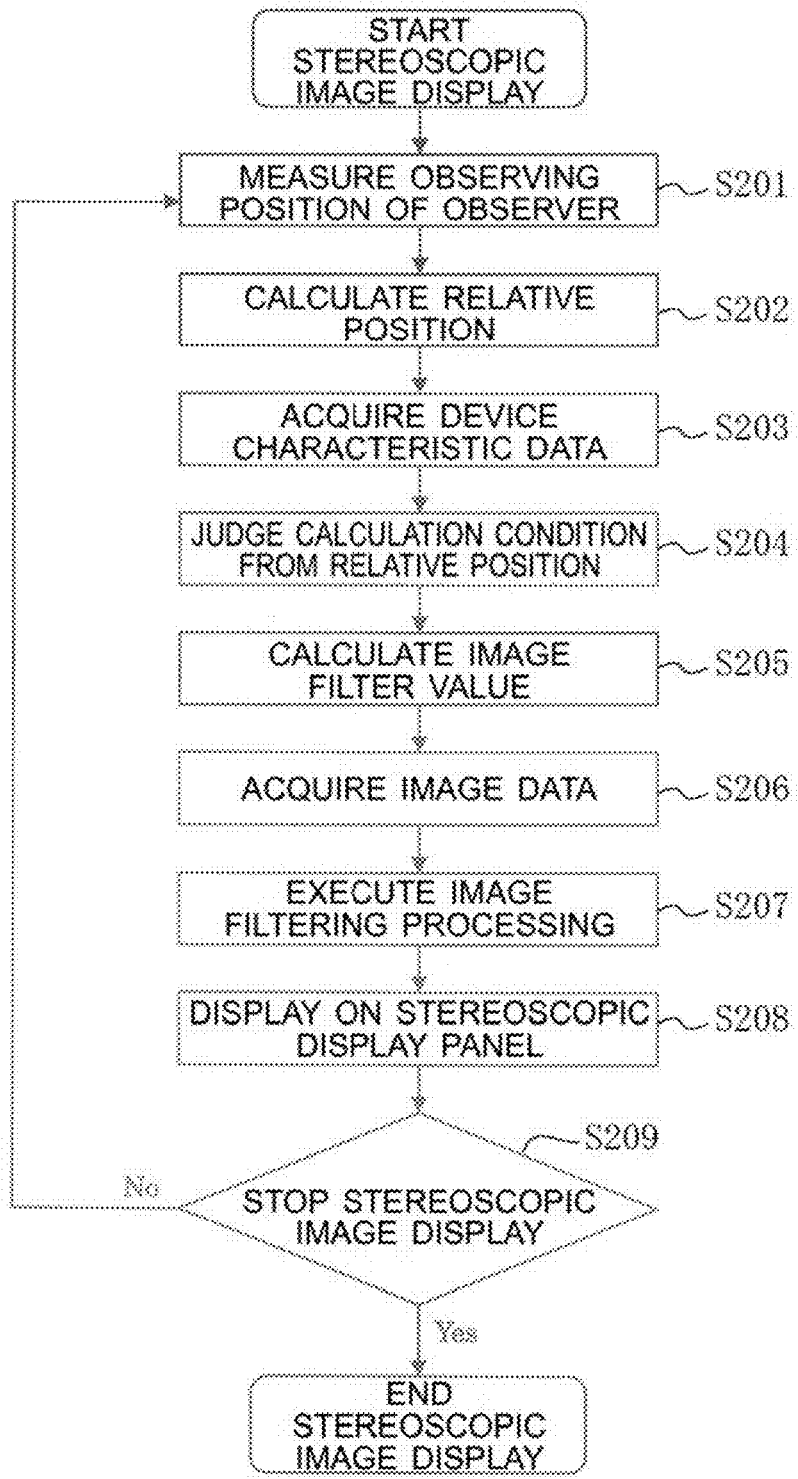
FIG. 38 is a flowchart of a stereoscopic image processing method.

A flowchart of the stereoscopic image processing method used in the stereoscopic image display device 12 according to the second exemplary embodiment will be described by referring to FIG. 38.

Step S201 to step S203 are the same as those of the first exemplary embodiment.

In step S204, the condition for calculating the image filter value is judged by using the image filter value calculating unit 104 from the positional relation between the both eyes of the observer acquired in step S202. The calculation condition table of FIG. 32 is referred for the calculation condition to judge whether it is the L image or the R image on which the image filtering processing is to be performed.

In step S205, the image filter window width values $W_R$, $W_L$ for the viewing angle θp as the relative position calculated in step S202 are calculated by using the image filter value calculating unit 104 from the 3D crosstalk characteristic data acquired in step S203 by referring to the judgment result of step S204.

An example of the calculation method will be described by referring to FIG. 33. First, the viewing angle range $\theta_5$ to $\theta_6$ of the stereoscopic viewing space, the viewing angle range $\theta_0$ to $\theta_1$ of the pseudoscopic viewing space, and the viewing angle range $\theta_1$ to $\theta_5$ of the 3D-crosstalk viewing space are specified from the threshold values $\beta_1$ and $\beta_2$ of the 3D crosstalk characteristic data acquired in step S203. Then, the window width value W of the image filter in the viewing angle range $\theta_5$ to $\theta_6$ of the stereoscopic viewing space and the viewing angle range $\theta_0$ to $\theta_1$ of the pseudoscopic viewing space is defined as "1". Then, the window width value W(θ) of the image filter in the viewing angle range $\theta_1$ to $\theta_5$ of the 3D-crosstalk viewing space is determined. Specifically, the window width value $W_R(\theta)$ of the image filter for the R image in the viewing angle range $\theta_1$ to $\theta_5$ is determined through connecting the point where the window width value of the image filter is 1 at the viewing angle $\theta_1$, the point where the window width value of the image filter at the viewing angle $\theta_2$ is $W_1$, the point where the window width value of the image filter at the viewing angle $\theta_3$ is $W_2$, the point where the window width value of the image filter at the viewing angle $\theta_4$ is $W_4$, and the point where the window width value of the image filter at the viewing angle $\theta_5$ is $W_5$ by interpolation via a line. The window width value $W_L(\theta)$ of the image filter for the L image in the viewing angle range $\theta_1$ to $\theta_5$ is determined in the same manner. As described above, the window width values $W_R(\theta)$, $W_L(\theta)$ of the image filter in the viewing angle range $\theta_0$ to $\theta_6$ are found in advance, and then the window width values $W_R$, $W_L$ of the image filter for the viewing angle θp as the relative position calculated in step S202 are calculated. Thereafter, one of the window width values out of the window width values $W_R$, $W_L$ of the image filter is changed to "1" by referring to the judgment result of step S204.

In step S205 to S209, the same processing of step S104 to S108 of the first exemplary embodiment is performed.

Thereby, it is possible to provide the stereoscopic image display device and the stereoscopic image display method with which the influence of the CT-image by the 3D crosstalk is lightened so that a sense of discomfort is not felt by the observer through achieving the image filtering processing for reducing the deterioration of the image quality of the stereoscopic image content sighted by the observer even when the image data of the stereoscopic image content is blurred by the image filtering processing, through calculating the image filter value for each of the image data of the stereoscopic image content in the manner described above.

In other words, the stereoscopic image display device according to the second exemplary embodiment includes: the observer position measuring unit which measures the observing position of the observer; the relative position calculating unit which calculates the relative positions between the observing position of the observer and the position of the stereoscopic display panel; the device characteristic data saving unit which saves the device characteristic data for the viewing angles of the stereoscopic display panel; the image filter value calculating unit which calculates, for each of the image data, the image filter value suited for stereoscopic image display for the viewing angle based on the device characteristic data; the image data saving unit which saves or receives the image data; the image filtering processing unit which performs the image filtering processing on the image data according to the image filter value; and the stereoscopic display panel unit which projects the image data on which the image filtering processing is performed to the right eye and the left eye according to the relative position.

It is possible with the second exemplary embodiment to overcome the issues by providing the stereoscopic image display device with which the influence of the CT-image by the 3D crosstalk is lightened while keeping the image quality of one of the image data of the stereoscopic image content so that a sense of discomfort is not felt by the observer even when the observing position of the observer is shifted, through calculating the image filter values for each of the image data of the stereoscopic content and applying different image filter values. That is, the image filtering processing is performed only on one of the image data so as to keep the image quality of the other image data.

Third Exemplary Embodiment

It is an exemplary object of a third exemplary embodiment to provide a stereoscopic image display device and a stereoscopic image processing method with which the influence of the CT-image by the 3D crosstalk is lightened so that a sense of discomfort is not felt by the observer, through performing image filtering processing only on the image area where the influence of the CT-image by the 3D crosstalk appears so that there is no image blurring by the image filtering processing generated in the other image area.

Figure 39:
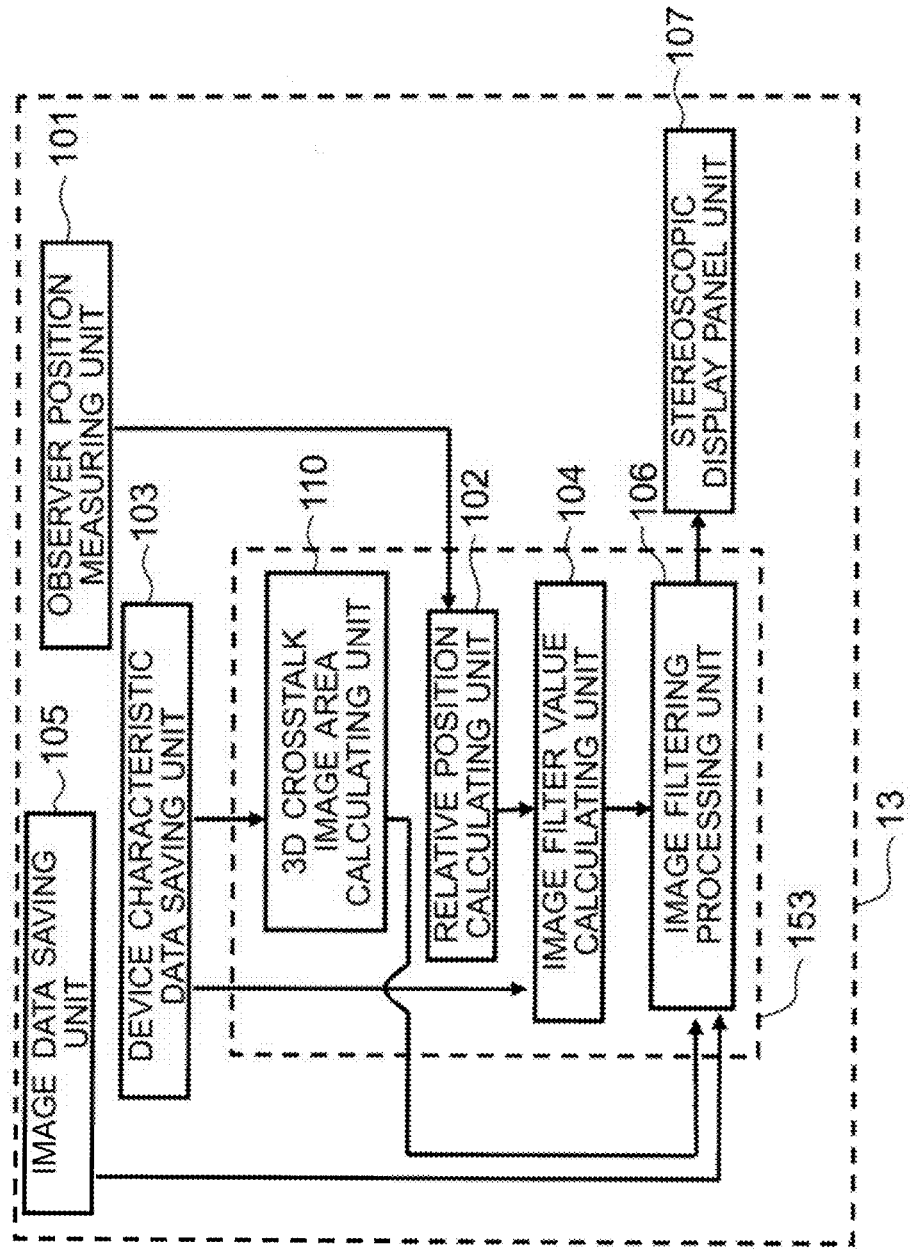
FIG. 39 is a block diagram of a stereoscopic image display device according to a third exemplary embodiment.

FIG. 39 shows a block diagram of a stereoscopic image display device 13. The stereoscopic image display device 13 includes: an observer position measuring unit 101; a relative position calculating unit 102; a device characteristic data saving unit 103; an image filter value calculating unit 104; an image data saving unit 105; an image filtering processing unit 106; a stereoscopic display panel unit 107; and a 3D crosstalk image area calculating unit 110. Further, a processing unit that is an integration of the relative position calculating unit 102, the image filter value calculating unit 104, the image filtering processing unit 106, and the 3D crosstalk image area calculating unit 110 is referred to as an image processing unit 153.

Hereinafter, functions of each unit included in the stereoscopic image display device 13 will be described. The functions of the observer position measuring unit 101, the relative position calculating unit 102, the device characteristic data saving unit 103, the image filtering value calculating unit 104, the image data saving unit 105, and the stereoscopic display panel unit 107 are the same as those of the first exemplary embodiment.

The 3D crosstalk image area calculating unit 110 has a function which calculates the image area where the CT-image by the 3D crosstalk appears. The image area where the CT-image by the 3D crosstalk appears changes depending on the relative position between the observing position of the observer and the stereoscopic display panel. The image area where the CT-image appears at an arbitrary relative position is determined based on the 3D crosstalk characteristic data that is saved in the device characteristic data saving unit 103 and an optical model.

Figure 40:
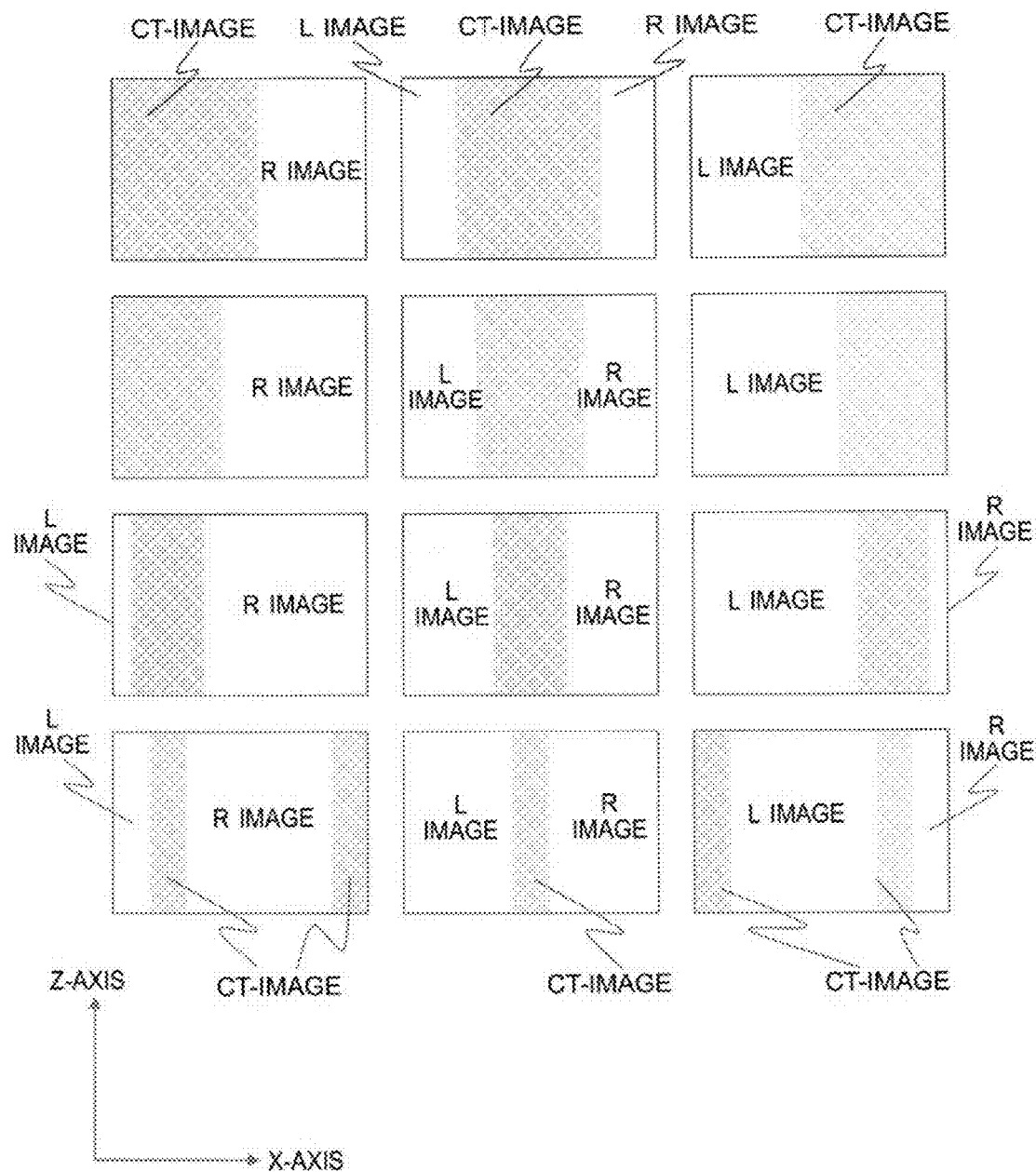
FIG. 40 shows illustrations of image areas where a CT-image appears at relative positions.

FIG. 40 shows examples of the image area where the CT-image appears at an arbitrary relative position. FIG. 40 shows display states of the image projected to the relative position when the relative position is shifted in the X-axis direction (see FIG. 3) and in the Z-axis direction within the 3D-crosstalk viewing space. When the relative position is shifted to the X-axis direction, the image area where the CT-image appears is also shifted to the X-axis direction accordingly. Further, when the relative position is shifted to the Z-axis direction, the image area where the CT-image appears is expanded accordingly.

The image filtering processing unit 106 performs image filtering processing according to the image area calculated by the 3D crosstalk image area calculating unit 110. It is judged whether the R image, the L image, or a CT-image by the 3D crosstalk (depicted as CT image hereinafter) is projected to an arbitrary image area of the image data projected to the right eye and the left eye of the observer based on the positional information of the right eye and the left eye of the observer acquired from the relative position calculating unit 102 and the image area information calculated by the 3D crosstalk image area calculating unit 110.

FIG. 41 shows an execution judgment table regarding the image filtering processing corresponding to the types of the images (L image, R image, CT image) projected to the right eye and the left eye of the observer. The image area where the L image is projected to the left eye and the R image is projected to the right eye is kept as it is without applying the image filtering processing. In the image area where the R image is projected to the right eye and the CT image is projected to the left eye, the image filtering processing is applied only to the L image. The image area where the R image is projected to the right eye and the left eye as well as the image area where the L image is projected to the right eye and the left eye is kept as it is without applying the image filtering processing. In the image area where the CT image is projected to the right eye and the L image is projected to the left eye, the image filtering processing is applied only to the R image. In the image area where the L image is projected to the right eye and the R image is projected to the left eye, the R image and the L image are exchanged without applying the image filtering processing. In the case where the L image is projected to the right eye and the CT image is projected to the left eye, the image filtering processing is applied only the R image, and the R image and the L image are exchanged. In the case where the CT image is projected to the right eye and the R image is projected to the left eye, the image filtering processing is applied only to the L image, and the R image and the L image are exchanged. In the image area where the CT image is projected to the right eye and the left eye, the image filtering processing is applied to the L image and the R image. Further, in the image area where the CT image is projected to the right eye and the left eye, the image filtering processing may be applied only to the image (R image or L image) whose image component amount mixed into the CT image is smaller.

FIG. 42 shows examples of the image display state projected to the right eye and the left eye of the observer. In FIG. 42, projected to the left eye of the observer is the image data in which the L image is in the left-side range of the image, the CT image is in the middle range, and the R image is in the right-side range. Meanwhile, projected to the right eye of the observer is the image data in which the R image is in the right-side range of the image, the CT image is in the middle range, and the L image is in the left-side range.

Figure 43B:
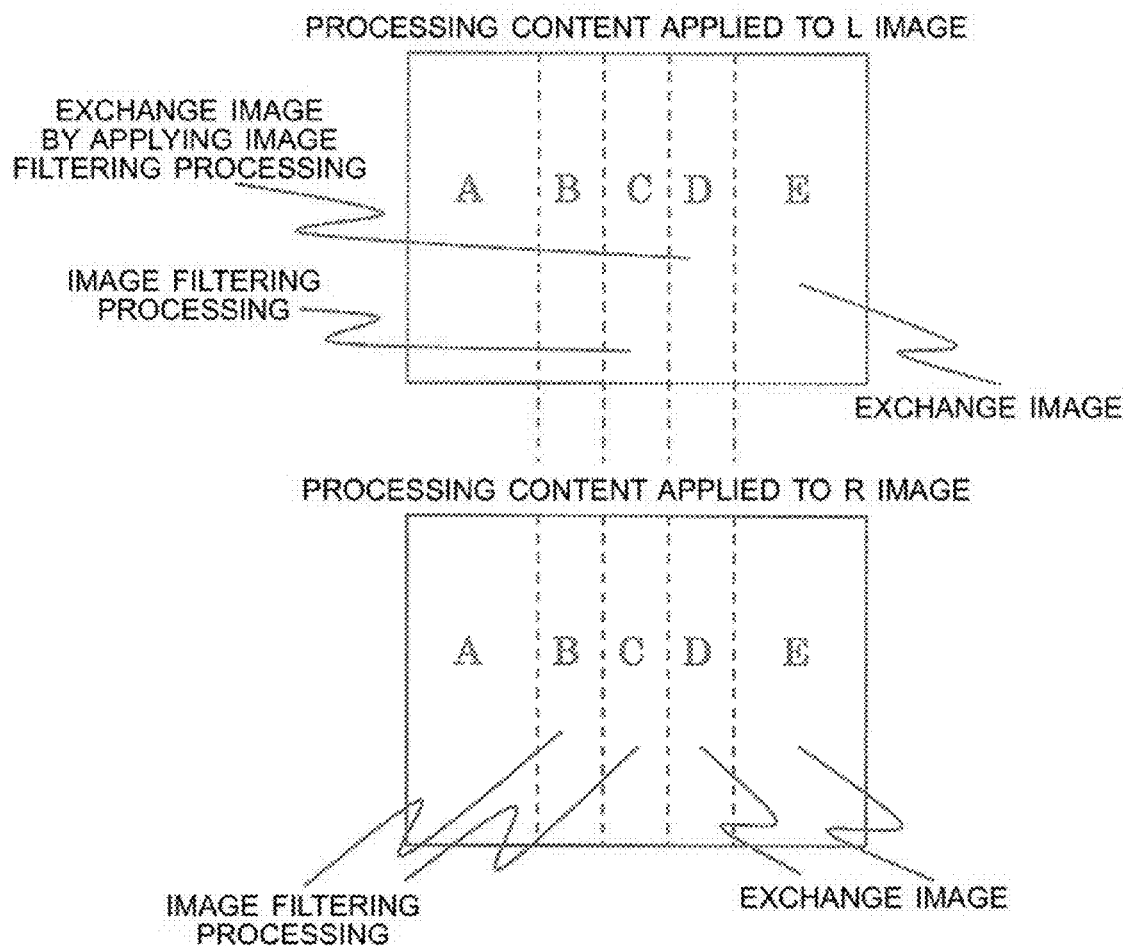
FIG. 43B shows image displayed states of stereoscopic image contents, which shows a filtering processing content applied to an L image and an R image.
Figure 43C:
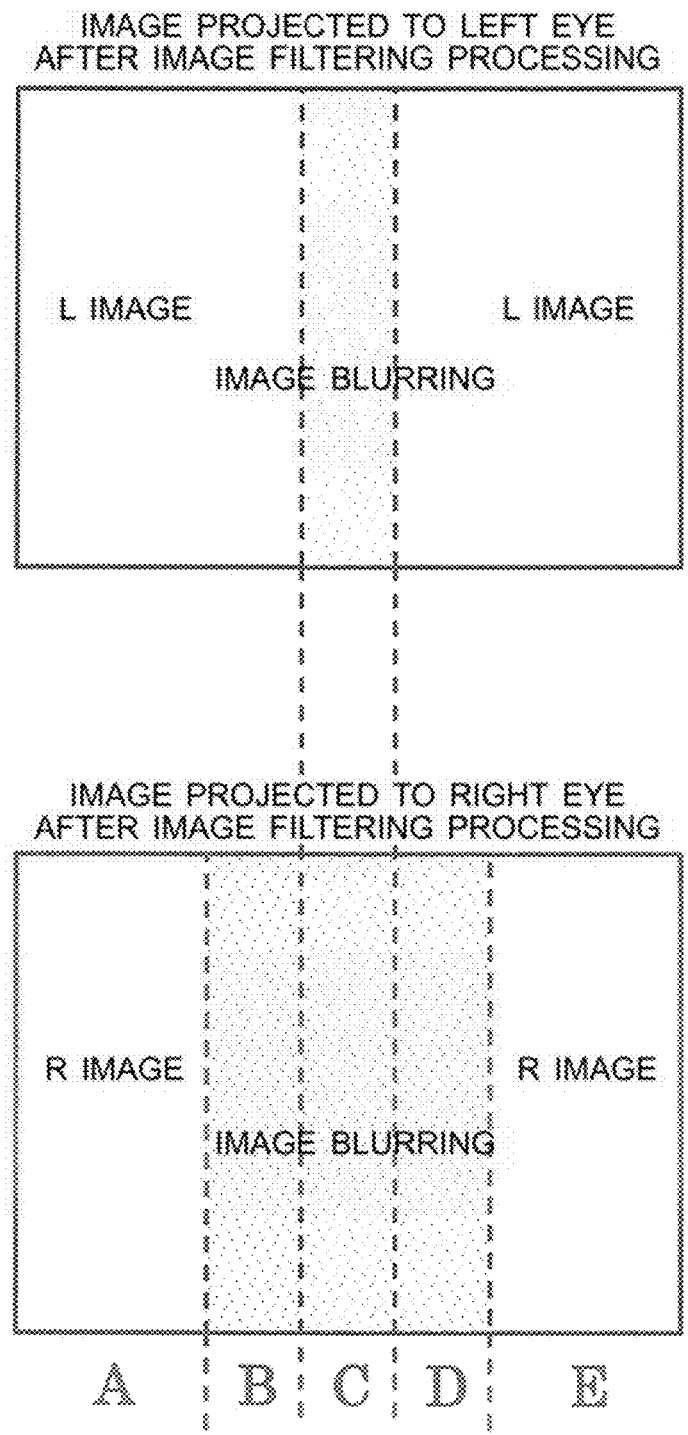
FIG. 43C shows image displayed state of a stereoscopic image content, which shows filtering-processed image display states projected to the left eye and the right eye, respectively.

FIG. 43A shows image display states as in those of FIG. 42. FIG. 43B shows the content of the image filtering processing applied to the image data of FIG. 42, and FIG. 43C shows image display states projected to the observer after performing the image filtering processing.

In the left-side range (A area of FIG. 43B) of the image, the L image is projected to the left eye of the observer and the R image is projected to the right eye. Thus, the image filtering processing is not performed. In the left-side center area (B area of FIG. 43B) of the image, the L image is projected to the left eye of the observer and the CT image is projected to the right eye. Thus, the image filtering processing is performed on the R image. In the center range (C area of FIG. 43B) of the image, the CT image is projected to the right eye and the left eye of the observer. Thus, the image filtering processing is performed on the L image and the R image. In the right-side center area (D area of FIG. 43B) of the image, the CT image is projected to the left eye of the observer and the L image is projected to the right eye. Thus, the image filtering processing is performed on the R image, and the L image and the R image are exchanged thereafter. In the right-side range (E area of FIG. 43B) of the image, the R image is projected to the left eye and the L image is projected to the right eye. Thus, the L image and the R image are exchanged.

When the image filtering processing described above is performed, the image data in which the center range (C area of FIG. 43C) of the L image is blurred is projected to the left eye of the observer and the image data in which the left-side center range, the center range, and the right-side center range of the R image (B, C, and D areas of FIG. 43C) are blurred is projected to the right eye of the observer. Therefore, through applying the image filtering processing only in the image area where the influence of the CT-image by the 3D crosstalk appears, it is possible to display the stereoscopic image having no image blurring generated by the image filter processing in the other image area and to lighten the influence of the CT-image by the 3D crosstalk.

Further, in the actual stereoscopic display panel 107*a*, position shift within a prescribed precision is generated in the positional relation between a display panel 2 as the electro-optic module and a lenticular lens 3 as a light separating module (see FIG. 5, for example). In such case, a 3D crosstalk image area that is an oblique component as shown in FIG. 44 appears.

Figure 45A:
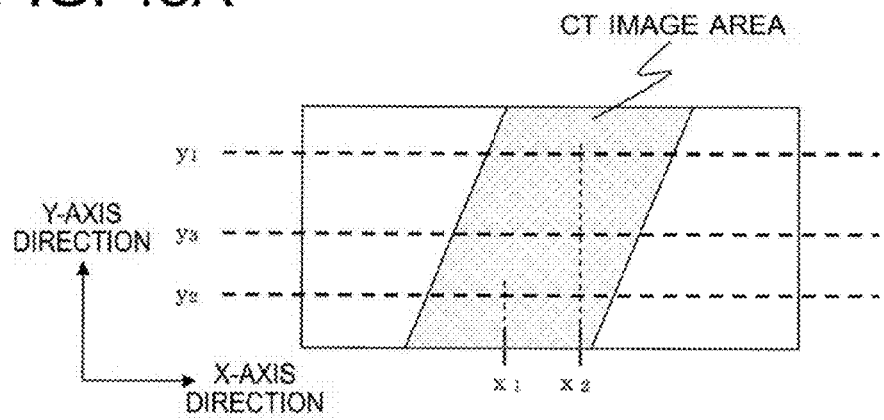
FIG. 45 shows relational charts regarding the image display state and the 3D crosstalk characteristic data, with FIG. 45A illustrating CT image area, FIG. 45B and FIG. 45C illustrating crosstalk amount for position $X_1$ and $X_2$.
Figure 45B:
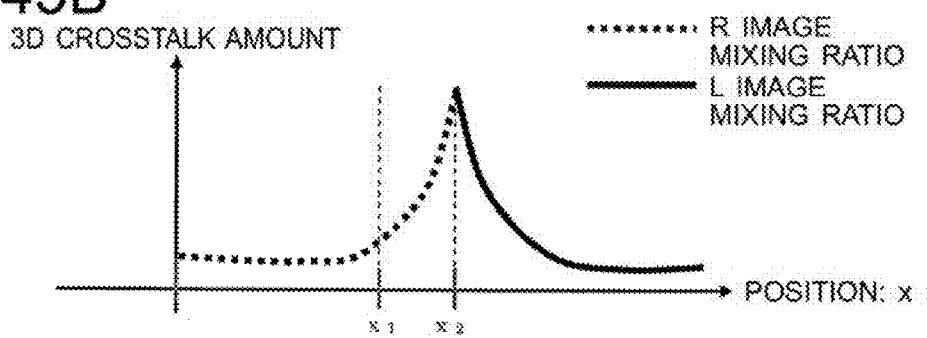
Figure 45C:
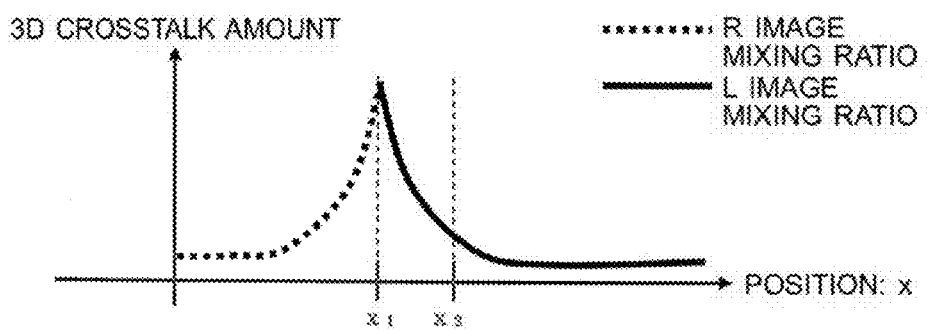

FIG. 45 shows relational charts between the image display state and the 3D crosstalk characteristic data of a case where rotary shift is generated between the electro-optic module and the light separating module. FIG. 45A shows the image display state where the 3D crosstalk image area of the oblique component appeared. FIG. 45B shows the 3D crosstalk characteristic data for the positions in the X-axis direction at the positions on $y_1$ line of FIG. 45A. FIG. 45C shows the 3D crosstalk characteristic data for the positions in the X-axis direction at the positions on $y_2$ line of FIG. 45A. From FIG. 45B and FIG. 45C, it can be seen that the 3D crosstalk characteristic data changes depending also on the positions in the Y-axis direction.

For calculating the image filter value, the following first to third processing is executed. As the first processing, the positions in the X-axis direction at which the 3D crosstalk amount becomes the maximum on the three lines of the upper end (on the $y_1$ line of FIG. 45A) of the stereoscopic display panel, the center (on the $y_3$ line of FIG. 45A), and the lower end (on the $y_2$ line of FIG. 45A) are detected (the position at $x_2$ when it is on the $y_1$ line of FIG. 45A, the position at $x_1$ when it is on the $y_2$ line of FIG. 45A), the slope of the 3D crosstalk image area of the oblique component is calculated from the detected positions in the X-axis direction.

As the second processing, the image filter value for the position in the X-axis direction is calculated by the calculation method the same as that of the first exemplary embodiment from the 3D crosstalk characteristic data in the center (on the $y_3$ line of FIG. 45A) of the stereoscopic display panel. While the image filter value for the viewing angle is calculated in the first exemplary embodiment, the image filter value for the position in the X-axis direction is calculated in the second processing instead of the viewing angle.

As the third processing, the image filter value for the area other than the center of the stereoscopic display panel (other than the positions on the $y_3$ line of FIG. 45A) is calculated through shifting the image filter value calculated by the second processing to the X-axis direction by referring to the slope of the 3D crosstalk image area calculated by the first processing. Through the above-described processing, it is possible to apply the proper image filter value to the 3D crosstalk image area by calculating the image filter values for all the positions on the stereoscopic display panel even when there is position shift generated between the display panel and the lenticular lens.

Further, as in the case of the first exemplary embodiment, the third exemplary embodiment can be applied to stereoscopic image display devices of various naked-eye stereoscopic types such as a multi-viewpoint type and an integral type. Naturally, it is possible to provide the image processing unit 153 of the third exemplary embodiment as an independent image processing device, and to achieve the function of the stereoscopic image display device 13 by combining it with the stereoscopic display panel 107 and the like.

Figure 46:
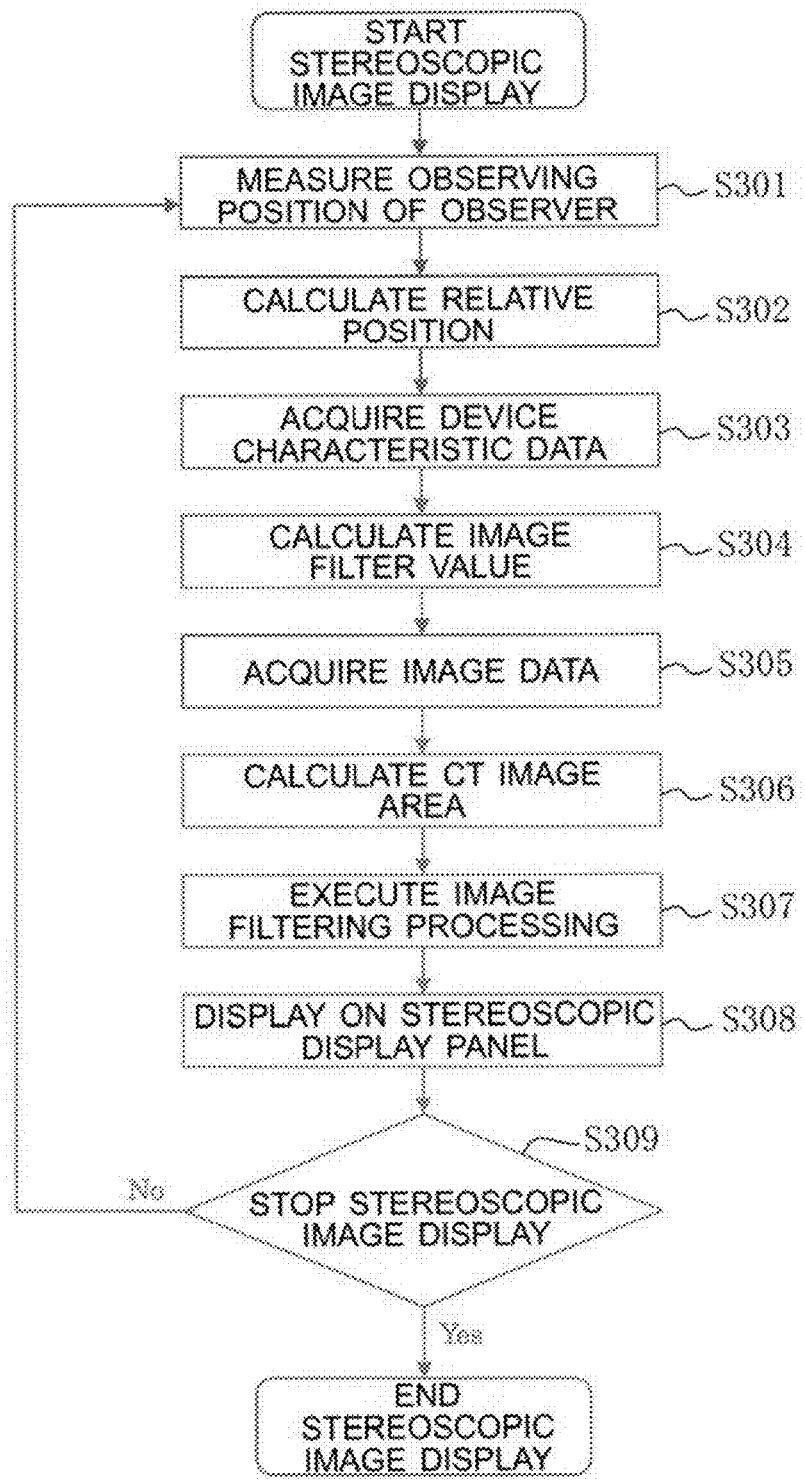
FIG. 46 is a flowchart of a stereoscopic image processing method.

A flowchart of the stereoscopic image processing method used in the stereoscopic image display device 13 according to the third exemplary embodiment will be described by referring to FIG. 46.

Step S301 to step S305 are the same as those of the first exemplary embodiment.

In step S306, the image area (3D crosstalk image area) in which the CT image is projected to the right eye and the left eye of the observer is calculated by using the 3D crosstalk image area calculating unit 110 from the relative position calculated in step S302 and the device characteristic data acquired in step S303.

In step S307, the image area on which the image filtering processing is performed is judged through referring to the processing judgment table of the image filtering processing shown in FIG. 41 by using the image filtering processing unit 106 from the image area calculated in step S306. Then, for the judged image area, the image filtering processing is performed on the image data acquired in step S305 by referring to the image filter value calculated in step S304. In the image filtering processing of step S307, convolution of the image filter value is executed on each pixel of the image data within the image area to generate the image data on which the image filtering processing is performed.

Step S308 and step S309 are the same as step S107 and step S108 of the first exemplary embodiment.

It is possible to provide the stereoscopic image display device and the stereoscopic image display method with which the influence of the CT-image by the 3D crosstalk is lightened while keeping display state where there is no image blurring caused by the image filtering processing in the other image area so that a sense of discomfort is not felt by the observer, through applying the image blurring processing described above only in the image area where the influence of the CT-image by the 3D crosstalk appears.

In other words, the stereoscopic image display device according to the third exemplary embodiment includes: the observer position measuring unit which measures the observing position of the observer; the relative position calculating unit which calculates the relative positions between the observing position of the observer and the position of the stereoscopic display panel; the device characteristic data saving unit which saves the device characteristic data for the viewing angles of the stereoscopic display panel; the 3D crosstalk image area calculating unit which calculates the image area where a CT-image by the 3D crosstalk appears from the device characteristic data; the image filter value calculating unit which calculates the image filter value suited for stereoscopic image display for the viewing angle based on the device characteristic data; the image data saving unit which saves or receives the image data; the image filtering processing unit which performs the image filtering processing on the image data according to the image filter value and the image area of the 3D crosstalk; and the stereoscopic display panel unit which projects the image data on which the image filtering processing is performed to the right eye and the left eye according to the relative position.

It is possible with the third exemplary embodiment to overcome the issues by providing the stereoscopic image display device and the stereoscopic image processing method with which the influence of the CT-image by the 3D crosstalk is lightened while keeping the image quality of the image data in the other image area so that a sense of discomfort is not felt by the observer, through applying the image filtering processing only in the image area where the influence of the CT-image by the 3D crosstalk appears.

Fourth Exemplary Embodiment

Figure 47:
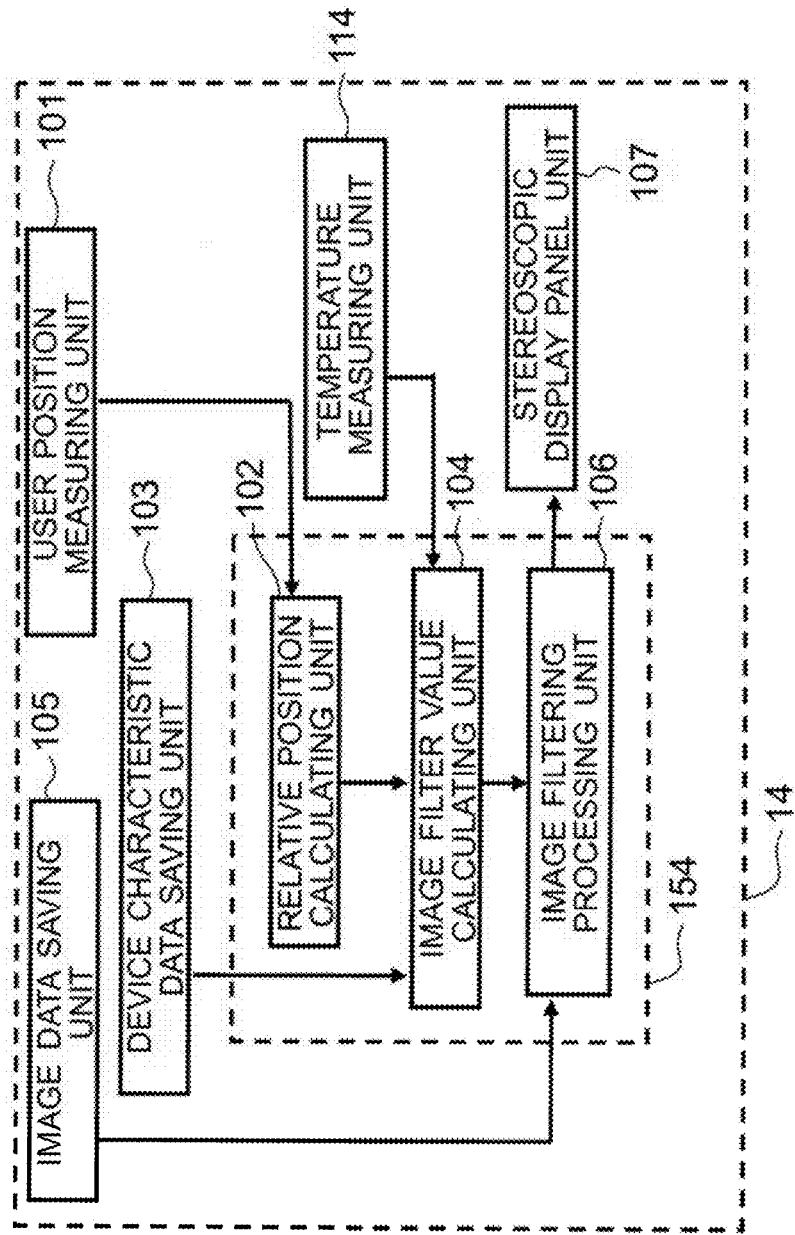
FIG. 47 is a block diagram of a stereoscopic image display device according to a fourth exemplary embodiment.

It is an exemplary object of a fourth exemplary embodiment to provide a stereoscopic image display device and a stereoscopic image processing method with which the influence of the CT-image by the 3D crosstalk is lightened so that a sense of discomfort is not felt by the observer even when the environmental temperature under which the stereoscopic image display device is used changes, through performing image filtering processing appropriate for the temperatures. FIG. 47 shows a block diagram of a stereoscopic image display device 14. The stereoscopic image display device 14 includes: an observer position measuring unit 101; a relative position calculating unit 102; a device characteristic data saving unit 103; an image filter value calculating unit 104; an image data saving unit 105; an image filtering processing unit 106; a stereoscopic display panel unit 107; and a temperature measuring unit 114. Further, a processing unit that is an integration of the relative position calculating unit 102, the image filter value calculating unit 104, and the image filtering processing unit 106 is referred to as an image processing unit 154.

Hereinafter, functions of each unit included in the stereoscopic image display device 14 will be described. The functions of the observer position measuring unit 101, the relative position calculating unit 102, the image data saving unit 105, the image filtering processing unit 106, and the stereoscopic display panel unit 107 are the same as those of the first exemplary embodiment. The temperature measuring unit 114 has a function which measures the temperature of the stereoscopic image display device 14. A lenticular lens can be made with an inorganic material such as glass. However, it is often made with an organic material such as engineering plastic, typically polymethyl methacrylate (PMMA), cyclopoly olefin (COP), and polycarbonate (PC), because of the production cost. Therefore, when the environmental temperature under which the stereoscopic image display device 14 is used changes, the positional relation between the material of the lenticular lens and the display panel fluctuates due to the difference between the lenticular lens made with a plastic material and the material of the display panel that normally uses a glass substrate, i.e., difference between the thermal expansion coefficients of a plastic material and a glass material.

Figure 48:
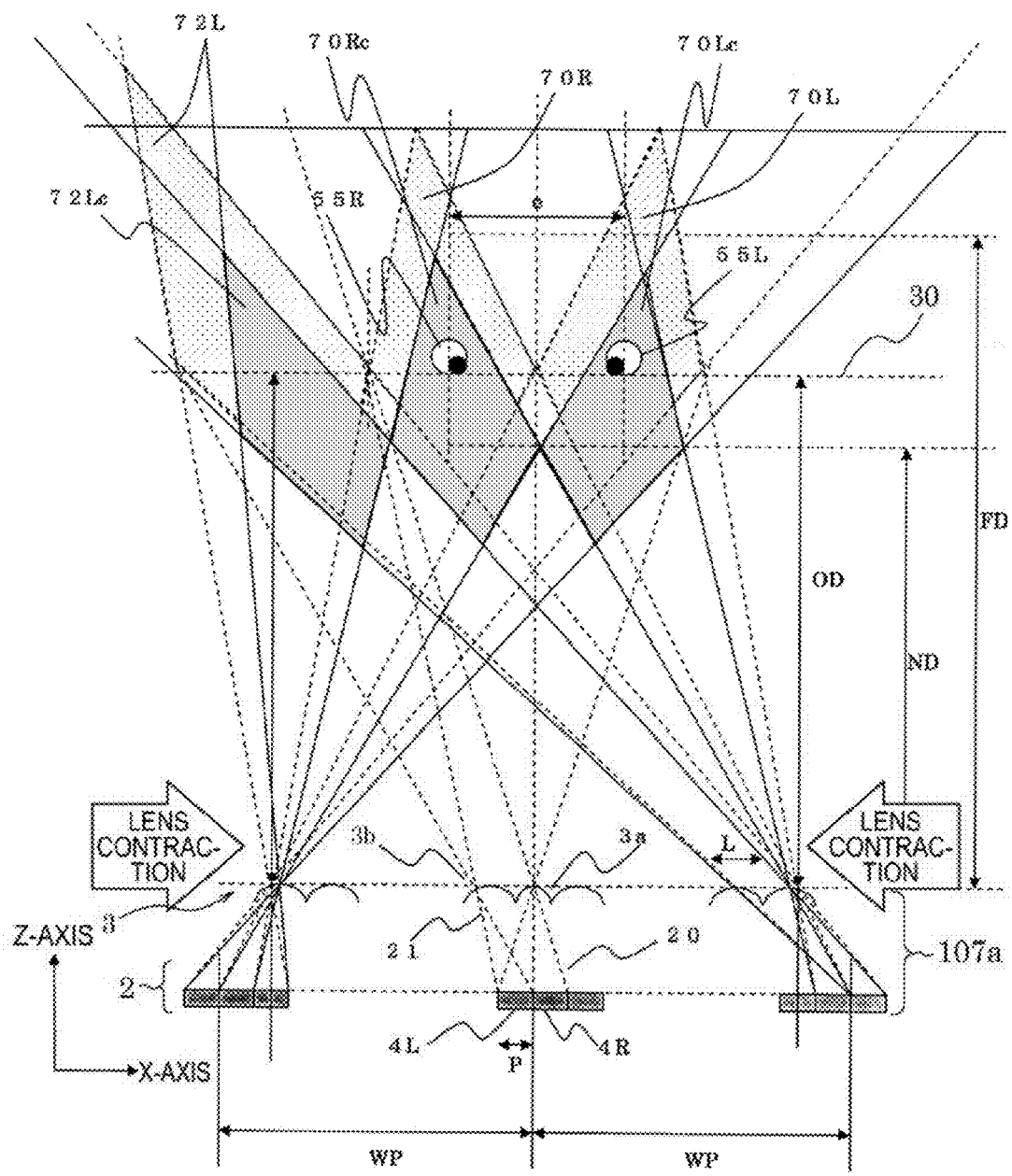
FIG. 48 is a chart showing changes in an optical model due to a decrease in the temperature.

FIG. 48 shows a chart in which the lenticular lens is shifted as the temperature drops, and the optical model of the stereoscopic display panel is changed. When the environmental temperature drops, the lenticular lens is contracted towards the center part of the display panel. Thus, the slope of light rays 20, 21 projected from a left-eye pixel 4L and a right-eye pixel 4R of FIG. 48 to the observer via the lenticular lens 3 (cylindrical lenses 3a, 3b) is decreased than the case of a normal temperature. When the positions of a right-eye area 70R and a left-eye area 70L of a case where the environmental temperature is a normal temperature are compared with the positions of the space of a right-eye area 70R, and a left-eye area 70L, of a case where the environmental temperature drops in the optical model chart of FIG. 48, it can be confirmed that the right-eye area and the left-eye area move closer to the stereoscopic display panel as the environmental temperature drops.

Figure 49:
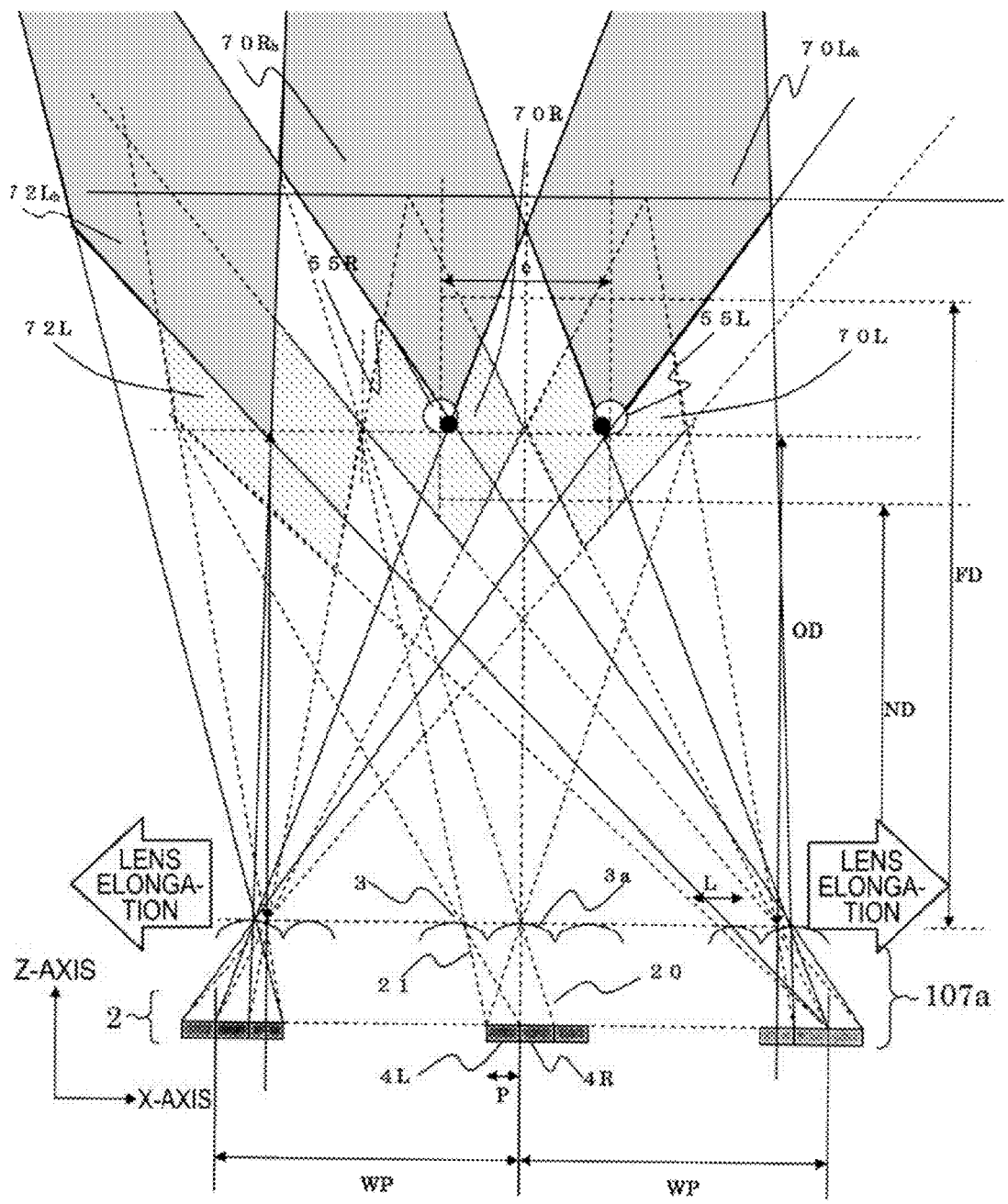
FIG. 49 is a chart showing changes in an optical model due to an increase in the temperature.

FIG. 49 shows a chart in which the lenticular lens is shifted as the temperature increases, and the optical model of the stereoscopic display panel is changed. When the environmental temperature increases, the lenticular lens 3 is expanded towards the both ends of the display panel. Thus, the slope of the light rays 20, 21 projected from a left-eye pixel 4L and a right-eye pixel 4R of FIG. 49 to the observer via the lenticular lens 3 (cylindrical lenses 3a, 3b) is increased than the case of a normal temperature. When the positions of the right-eye area 70R and the left-eye area 70L of a case where the environmental temperature is a normal temperature are compared with the positions of the space of a right-eye area $70R_h$ and a left-eye area $70L_h$ of a case where the environmental temperature increases in the optical model chart of FIG. 49, it can be confirmed that the right-eye area and the left-eye area move away from the stereoscopic display panel as the environmental temperature increases.

In the fourth exemplary embodiment, the image filtering processing is performed by considering the influence of the changes in the optical model of the display panel caused in accordance with the changes in the environmental temperature. The temperature measuring unit 114 grasps the state of the optical model of the stereoscopic display panel in accordance with the temperature changes by measuring the temperatures in the vicinity of the stereoscopic display panel. For measuring the temperatures, a widely-used resistance thermometer or the like can be used. Through providing the thermometer to the stereoscopic image display device 14, the environmental temperature of the stereoscopic display panel can be measured.

The device characteristic data saving unit 103 shown in FIG. 47 saves in advance the 3D crosstalk characteristic data corresponding to the environmental temperatures under which the stereoscopic image display device 14 is used. The characteristic data corresponding to the environmental temperature will be described hereinafter.

Figure 50:
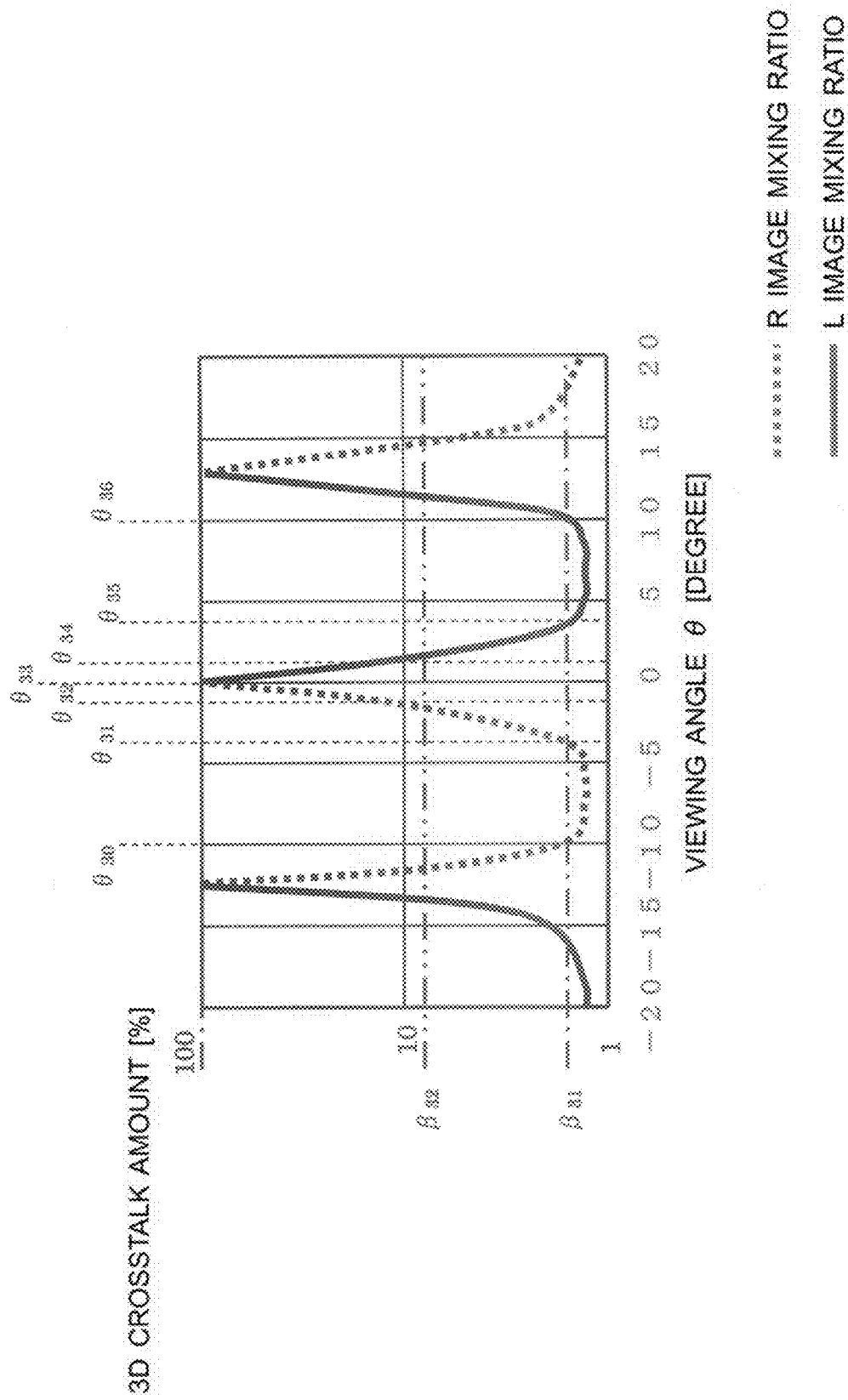
FIG. 50 is a chart showing 3D crosstalk characteristic data of the stereoscopic image display device at a low temperature.

FIG. 50 shows an example of the 3D crosstalk characteristic data of a case where the environmental temperature is low. With the stereoscopic image display device 14, the right-eye area, the left-eye area, and the 3D-crosstalk viewing space are determined depending on the 3D crosstalk characteristic data. As an example, assuming that the stereoscopic area is $\beta_{31}$% or less of the 3D crosstalk amount, the area of the viewing angle $\theta_{31}$ degree to the viewing angle $\theta_{35}$ degree is the 3D-crosstalk viewing space, and the areas of other viewing angles are the right-eye area and the left-eye area from FIG. 50.

Figure 51:
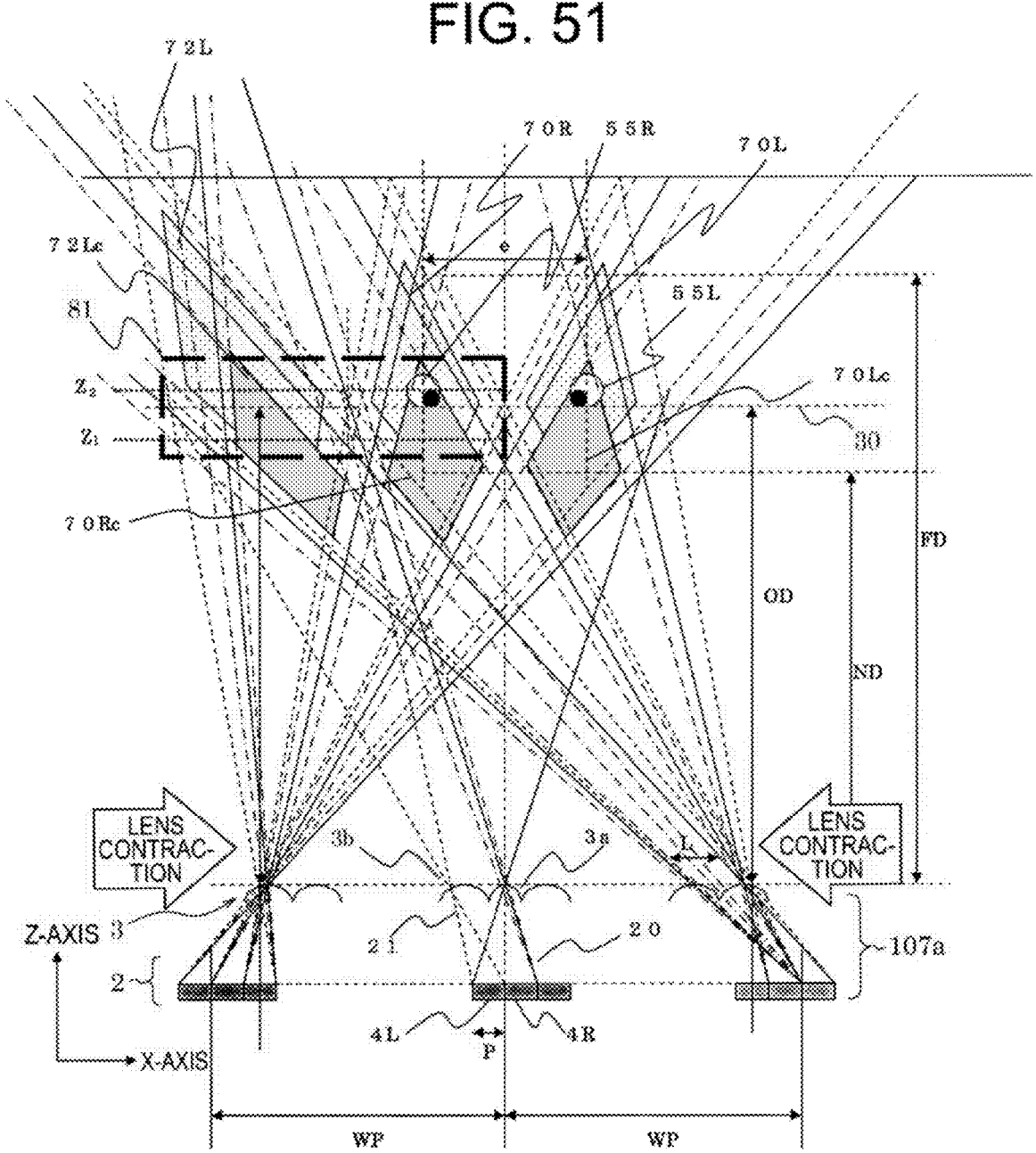
FIG. 51 is a chart showing changes in an optical model due to a decrease in the temperature.

FIG. 51 shows the optical model of the stereoscopic image display device 14 of such case. The section of the viewing angle $\theta_{31}$ degree to the viewing angle $\theta_{35}$ degree is the 3D-crosstalk viewing space in FIG. 51, so that the areas of the right-eye area $70R_c$ and the left-eye area $70L_c$ are narrowed further than the case of FIG. 48. For the right eye 55R, the right-eye area $70R_c$ is the stereoscopic viewing space, the left-eye areas $70L_c$, $72L_c$ are the pseudoscopic viewing spaces, and the other area is the 3D-crosstalk viewing space as in the case of FIG. 48.

Figure 52:
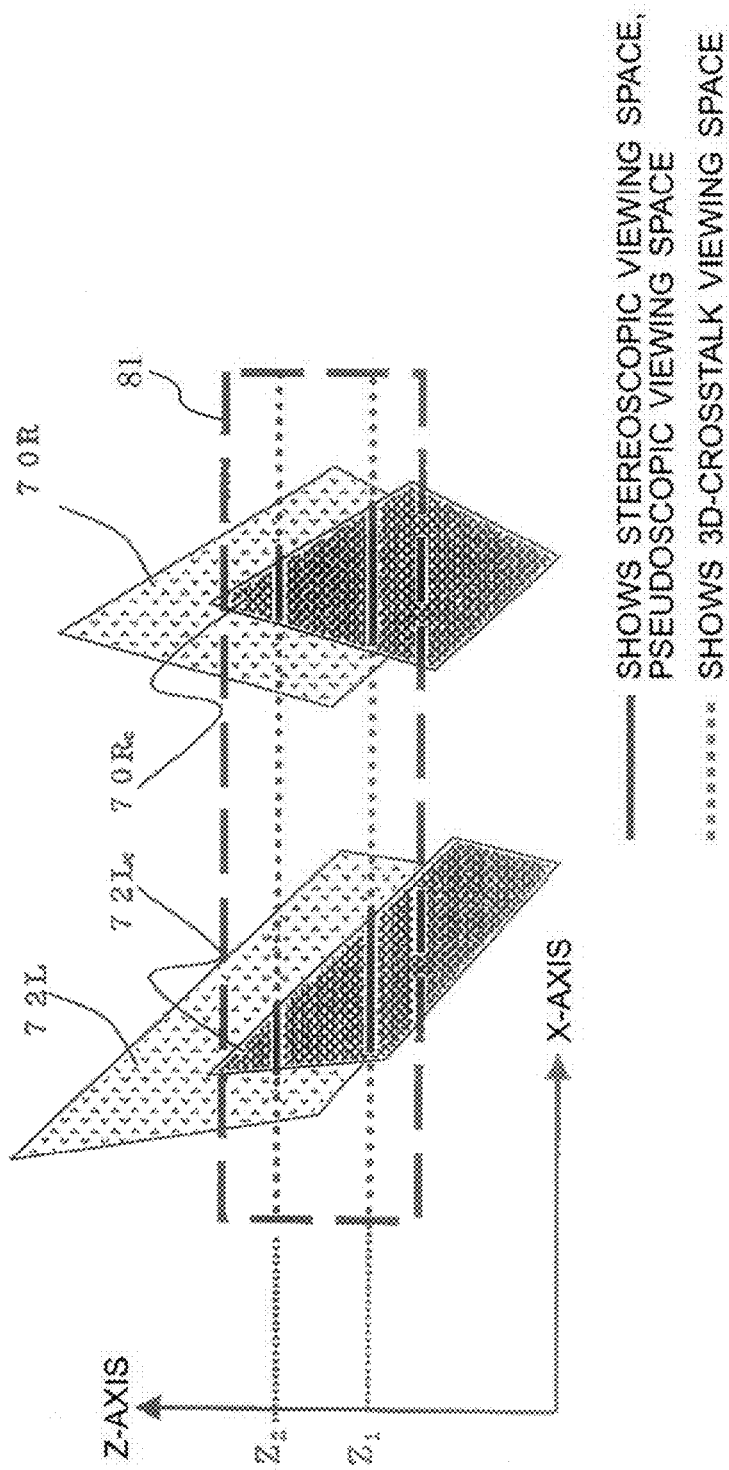
FIG. 52 is an enlarged view of the optical model at a low temperature.

FIG. 52 shows an enlarged view of an area 81 shown in FIG. 51. The area widths of the right-eye area 70R, the left-eye area 72L, and the 3D-crosstalk viewing space at $Z_1$ and $Z_2$ which are arbitrary positions on the Z-axis are different. Further, it can be seen that the area widths of the stereoscopic viewing space, the pseudoscopic viewing space, and the 3D-crosstalk viewing space change depending on the positions on the Z-axis.

Figure 53:
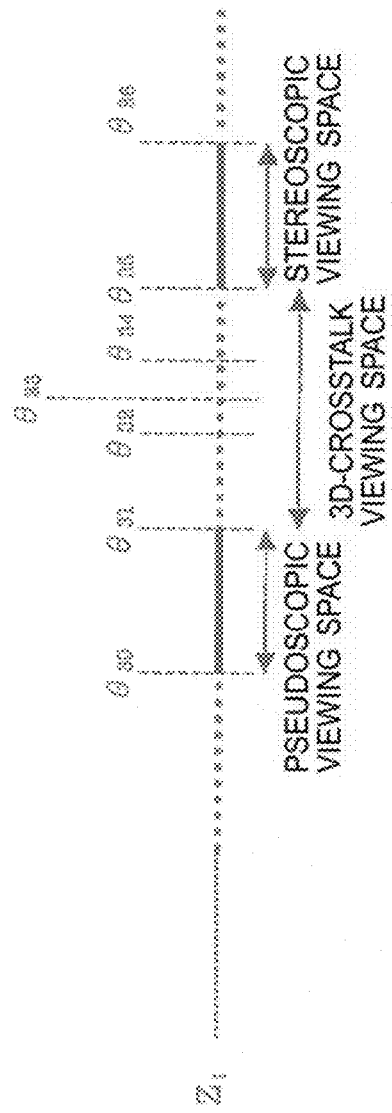
FIG. 53 is a relational chart regarding a stereoscopic viewing space, a pseudoscopic viewing space, a 3D-crosstalk viewing space, and viewing angles.

Further, FIG. 53 shows a relational chart regarding the stereoscopic viewing space, the pseudoscopic viewing space, and the 3D-crosstalk viewing space at the arbitrary value $Z_1$ on the Z-axis and the viewing angles shown in FIG. 50. When the right eye 55R is taken as the reference, the area of the viewing angle $\theta_{30}$ degree to the viewing angle $\theta_{31}$ degree is the pseudoscopic viewing space, the area of the viewing angle $\theta_{31}$ degree to the viewing angle $\theta_{35}$ degree is the 3D-crosstalk viewing space, and the area of the viewing angle $\theta_{35}$ degree to the viewing angle $\theta_{36}$ degree is the stereoscopic viewing space. Further, the 3D crosstalk amount becomes the maximum at the position of the viewing angle $\theta_{33}$ degree, and the area of the viewing angle $\theta_{32}$ degree to the viewing angle $\theta_{34}$ degree is the area having the 3D crosstalk amount of $\beta_{32}\%$ or more.

While the characteristic data corresponding to the environmental temperature has been described above, it is possible to employ arbitrary content for the data depending on the use of the stereoscopic image display device 14, e.g., the 3D crosstalk characteristic data regarding the environmental temperatures of every 5 degrees in a range of –20 degrees to 60 degrees. Further, it is also possible to provide a program which saves in advance necessary parameters for calculating the 3D crosstalk characteristic data and finds the 3D crosstalk characteristic data according to the environmental temperature. As examples of the parameter, it is possible to use the effective linear expansion coefficient of the lenticular lens provided to the display panel, the panel size, the panel resolution, and the like.

The image filter value calculating unit 104 shown in FIG. 47 acquires the 3D crosstalk characteristic data corresponding to the temperature measured by the temperature measuring unit 114 from the above-described device characteristic data saving unit 103, and calculates the image filter value suited for the stereoscopic image display with respect to the viewing angle based on the 3D crosstalk characteristic data. The image filter value calculation processing and the image filtering processing thereafter are performed in the same manner as in the case of the first exemplary embodiment. Thereby, the image filtering processing appropriate for the environmental temperature under which the stereoscopic image display device 14 is used can be performed.

Further, as in the case of the first exemplary embodiment, the fourth exemplary embodiment can be applied to stereoscopic image display devices of various naked-eye stereoscopic types such as a multi-viewpoint type and an integral type. Naturally, it is possible to provide the image processing unit 154 of the fourth exemplary embodiment as an independent image processing device, and to achieve the function of the stereoscopic image display device 14 by combining it with the stereoscopic display panel 107 and the like.

Figure 54:
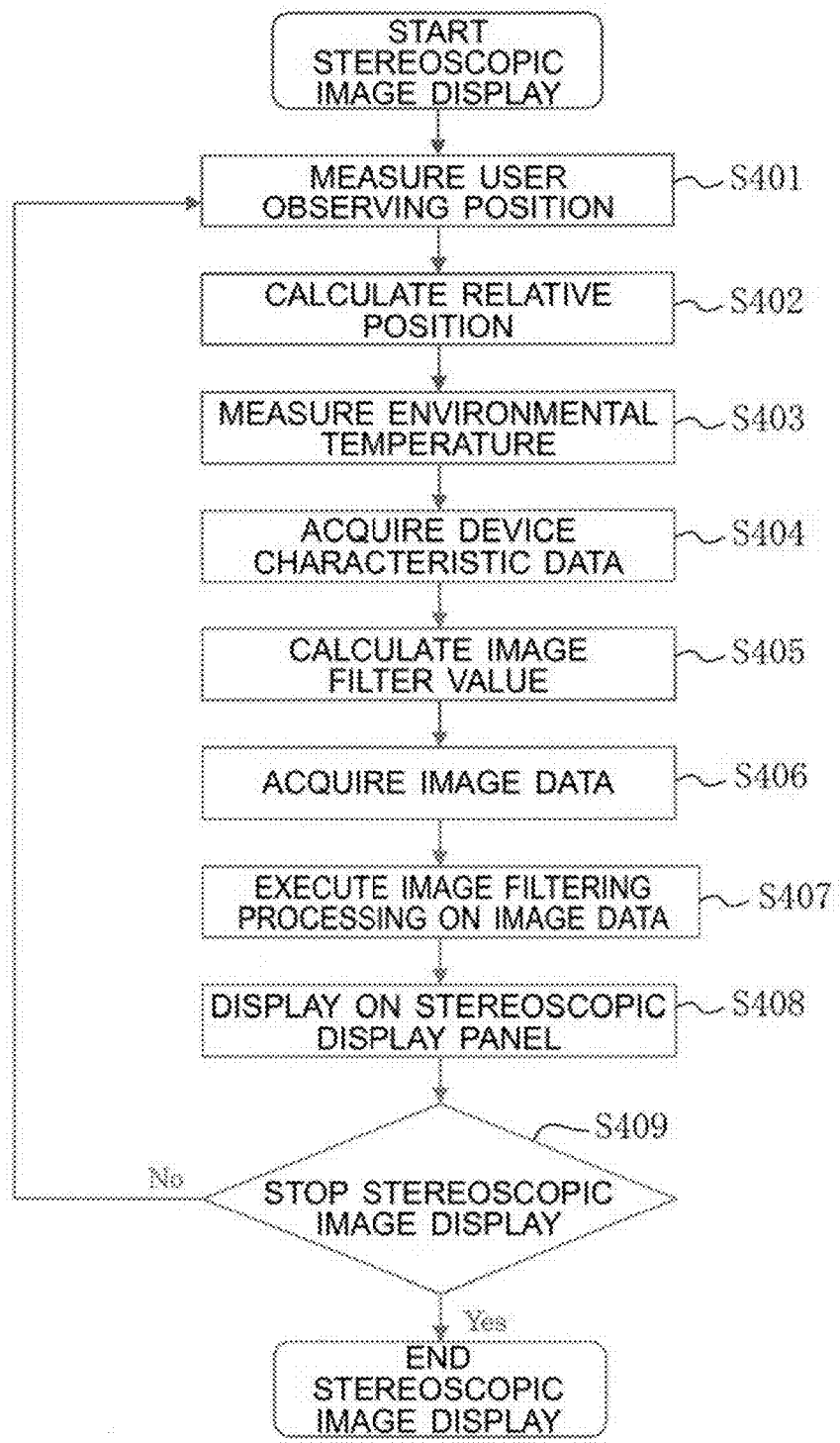
FIG. 54 is a flowchart of a stereoscopic image processing method.

A flowchart of the stereoscopic image processing method used in the stereoscopic image display device 14 according to the fourth exemplary embodiment will be described by referring to FIG. 54.

In step S401 to step S402, the same processing as that of the first exemplary embodiment is performed.

In step S403, the temperature in the vicinity of the stereoscopic display panel is measured by the temperature measuring unit 114.

In step S404, the device characteristic data corresponding to the temperature measured in step S403 is acquired from the device characteristic data saving unit 103.

In step S405 to step S409, the processing same as the processing of step S104 to step S108 of the first exemplary embodiment is performed.

As described above, it is possible to provide the stereoscopic image display device and the stereoscopic image processing method with which the issues of the CT-image and the reverse vision by the 3D crosstalk are overcome so that a sense of discomfort is not felt by the observer, through applying the image filtering processing appropriate for the temperatures even when the environmental temperature under which the stereoscopic image display device 14 is used changes.

In other words, the stereoscopic image display device according to the fourth exemplary embodiment includes: the observer position measuring unit which measures the observing position of the observer; the relative position calculating unit which calculates the relative positions between the observing position of the observer and the position of the stereoscopic display panel; the device characteristic data saving unit which saves the device characteristic data for the viewing angles of the stereoscopic display panel; the image filter value calculating unit which calculates the image filter value suited for stereoscopic image display for the viewing angle based on the device characteristic data; the image data saving unit which saves or receives the image data; the image filtering processing unit which performs the image filtering processing on the image data according to the image filter value; the stereoscopic display panel unit which projects the image data on which the image filtering processing is performed to the right eye and the left eye according to the relative position; and the temperature measuring unit which measures the use environmental temperature.

The fourth exemplary embodiment achieves the image filtering processing appropriate for the environmental temperature under which the stereoscopic image display device is used by calculating the image filter value by considering the use environmental temperature and the temperature characteristic data of the stereoscopic display panel in addition to the observing position of the observer and the device characteristic data. Thereby, it is possible to overcome the issues by providing the stereoscopic image display device and the stereoscopic image processing method with which a sense of discomfort is not felt by the observer, through applying the image filtering processing appropriate for the temperatures even when the environmental temperature under which the stereoscopic image display device is used changes.

Fifth Exemplary Embodiment

It is an exemplary object of a fifth exemplary embodiment to provide a stereoscopic image display device and a stereoscopic image processing method with which the influence of the CT-image by the 3D crosstalk is lightened so that a sense of discomfort is not felt by the observer, through performing the image filtering processing suited for the parallax value of the stereoscopic image content through calculating the image filter value by referring not only to the device characteristic data but also to the parallax value of the stereoscopic image content.

Figure 55:
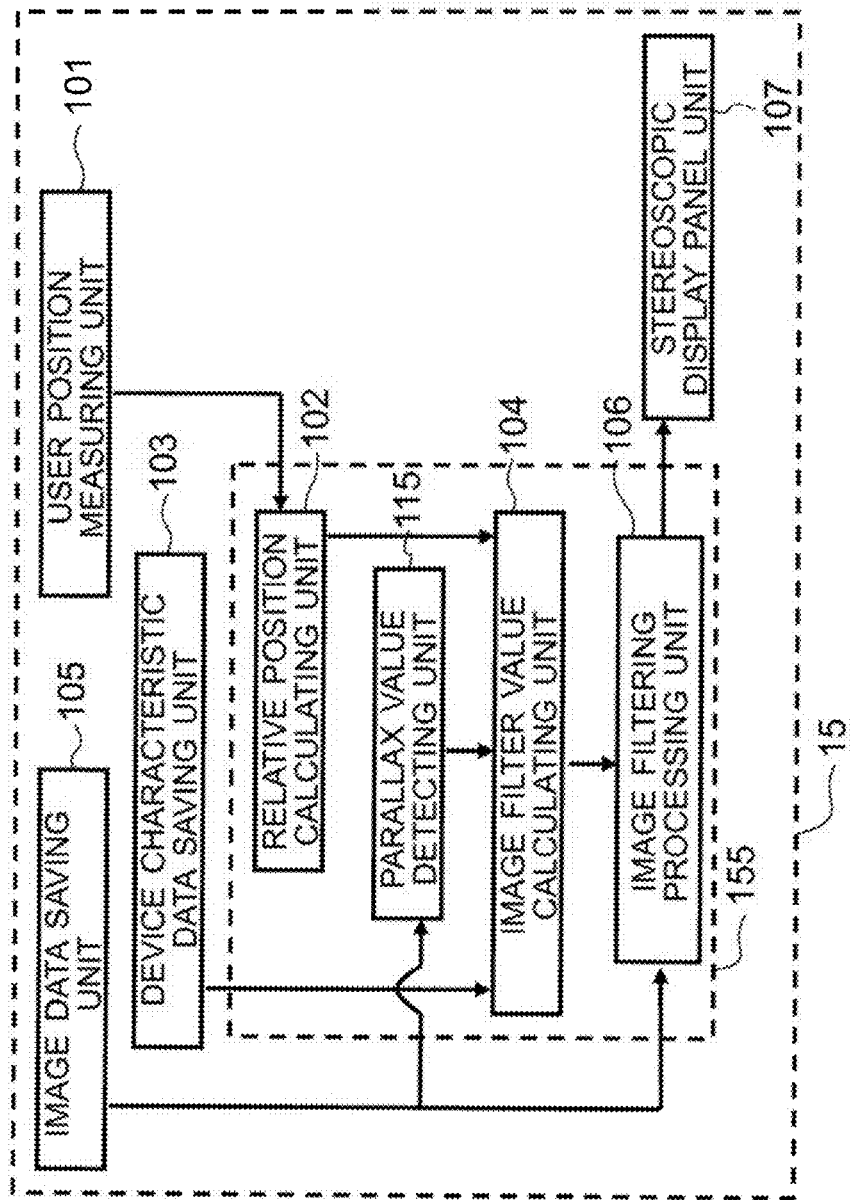
FIG. 55 is a block diagram of a stereoscopic image display device according to a fifth exemplary embodiment.

FIG. 55 shows a block diagram of a stereoscopic image display device 15. The stereoscopic image display device 15 includes: an observer position measuring unit 101; a relative position calculating unit 102; a device characteristic data saving unit 103; an image filter value calculating unit 104; an image data saving unit 105; an image filtering processing unit 106; a stereoscopic display panel unit 107; and a parallax value detecting unit 115. Further, a processing unit that is an integration of the relative position calculating unit 102, the image filter value calculating unit 104, the image filtering processing unit 106, and the parallax value detecting unit 115 is referred to as an image processing unit 155.

Hereinafter, functions of each unit included in the stereoscopic image display device 15 will be described. The functions of the observer position measuring unit 101, the relative position calculating unit 102, the device characteristic data saving unit 103, the image data saving unit 105, the image filtering processing unit 106, and the stereoscopic display panel unit 107 are the same as those of the first exemplary embodiment.

The parallax value detecting unit 115 detects the parallax value of the stereoscopic image contents saved in the image data saving unit 105. When the parallax image of the stereoscopic image content is saved in the image data saving unit, the parallax value of each pixel is detected from the parallax image.

Figure 56:
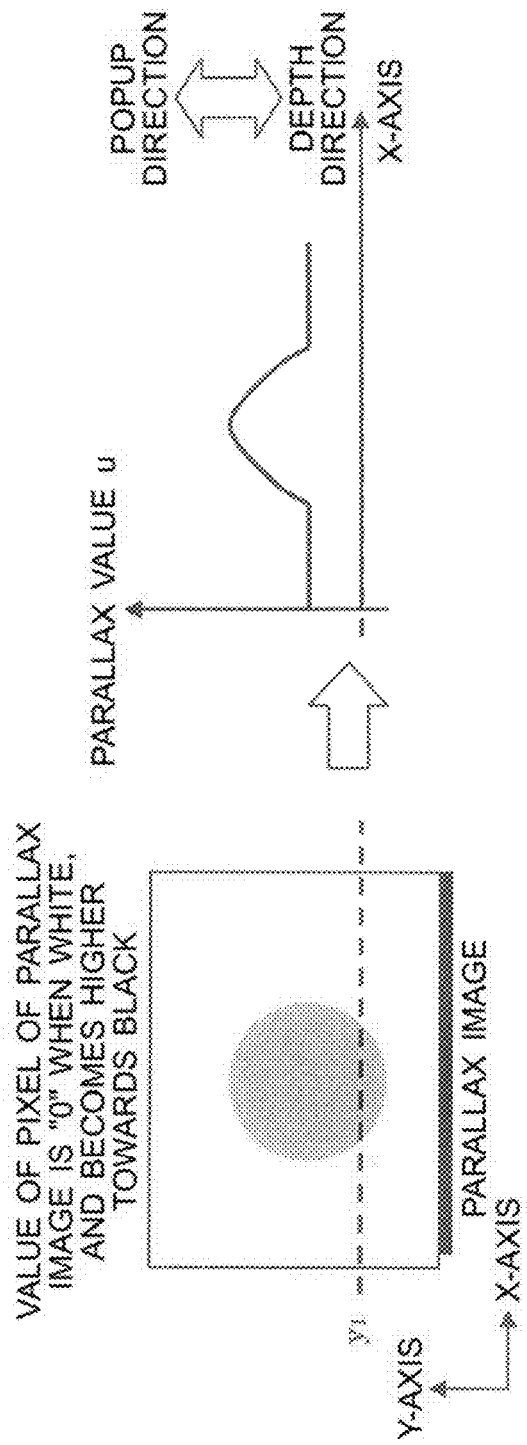
FIG. 56 is a relational chart between parallax images and parallax values.

FIG. 56 shows a relational chart between the parallax image and the parallax value. Shown on the right side of FIG. 56 is a chart showing the parallax value u for a pixel column at an arbitrary value $Y_1$ on the Y-axis taken out from the parallax image (left side of FIG. 56). Note here that the parallax value shows the position shift amount of the pixel value of the R image with respect to the pixel value of the L image by taking the L image as the reference.

Figure 57:
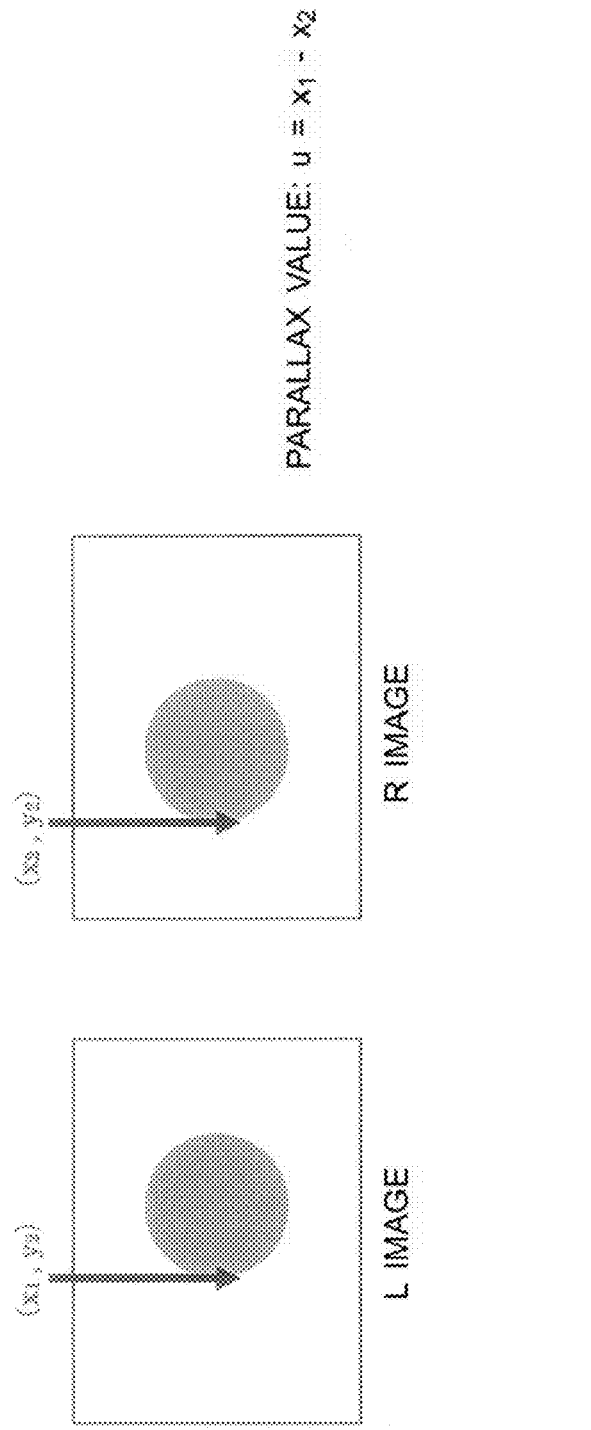
FIG. 57 is a relational chart between parallax values and LR images.

As a specific example, FIG. 57 shows a relational chart between the parallax value and the LR image. The parallax value of the position $(x_1, y_2)$ in the parallax image is a difference value between the position $(x_1, y_2)$ of the L image and the position $(x_2, y_2)$ of the corresponding pixel value of the R image (Formula (10)).

$$\text{Parallax value } u = x_1 - x_2 \qquad \text{Formula (10)}$$

Thereby, the parallax value in each pixel can be detected by referring to the pixel value in the parallax image. Further, in a case where the parallax image is not saved in the image data saving unit 105, the parallax value is calculated from the L image and the R image as the image data of the stereoscopic image content to generate the parallax image. For calculating the parallax value, a feature point within the L image is detected by using the luminance value information of the image, a corresponding point which corresponds to the feature point is searched from the R image, and the parallax amount is calculated from the position shift amount between the feature point position of the L image and the corresponding point position of the R image. Thereby, the parallax value of each pixel can be detected even when the parallax image is not saved in the image data saving unit 105.

The image filter value calculating unit 104 calculates the image filter value by referring to the parallax value of the stereoscopic image content detected by the parallax value detecting unit 115. The influence of the CT-image by the 3Dcrosstalk becomes greater when the parallax value is larger, and becomes smaller when the parallax value is smaller. Thus, it is possible to perform the image filtering processing suited for the parallax value of the stereoscopic image content through performing the image filtering processing by applying the image filter value which provides a high image blurring effect for the pixel within the image having a large parallax value and performing the image filtering processing by applying the image filter value which provides a low image blurring effect for the pixel within the image having a small parallax value.

As an example of the method for calculating the image filter value suited for the parallax value of the stereoscopic image content, the value of the window width value $Wp(x, y)$ of the mage filter is changed by each pixel within the stereoscopic image content through giving weight on the window width value Wp of the image filter with the parallax value. The calculation method of the window width value $Wp(x, y)$ of the image filter will be shown hereinafter.

First, as in the case of the first exemplary embodiment, the window width values $W(\theta)$ of the image filter for the range of all the viewing angles $\theta_0$ to $\theta_6$ (stereoscopic viewing space, pseudoscopic viewing space, 3D-crosstalk viewing space) are calculated. Then, the window width value Wp of the image filter at the viewing angle θp as the observing position of the observer calculated by the relative position calculating unit 102 is acquired. Then, the weight value a for the window width value Wp of the image filter is calculated from the parallax value of the stereoscopic image content.

Figure 58:
FIG. 58 shows tables of weight values calculated from parallax images.

FIG. 58 shows an example for calculating the weight value a from the parallax image. The weight value $\alpha(x, y)$ of each pixel within the image of the stereoscopic image content is calculated by dividing the parallax value $u(x, y)$ saved in each pixel of the parallax image of the stereoscopic image content by the parallax maximum value $u_{max}$ of the parallax image (Formula (11)). Note here that $u(x, y)$ shows the parallax value held at the pixel position $(x, y)$ of the parallax image.

$$\alpha(x,y) = u(x,y)/u_{max} \qquad \text{Formula (11)}$$

Then, the calculated weight value $\alpha(x, y)$ is multiplied to the window width value Wp of the image filter to calculate the window width value $Wp(x, y)$ of the image filter by each pixel within the image of the stereoscopic image content (Formula (12)).

$$Wp(x,y) = Wp \times \alpha(x,y) \qquad \text{Formula (12)}$$

In the manner described above, the window width value $Wp(x, y)$ of the image filter can be calculated. The window width value $Wp(x, y)$ of the image filter is desirable to be an integer, so that a decimal fraction may be rounded off to be approximated to an integer. An arbitrary filter shape (Gaussian filter or the like) is applied to the calculated image filter window width value $Wp(x, y)$ to calculate the image filter value.

The image filtering processing unit 106 performs the image filtering processing on the image data saved in the image data saving unit 105 according to the image filter value calculated by the image filter value calculating unit 104. The image filter value calculated by the image filter value calculating unit 104 is different for each of the pixels of the image data depending on the parallax value of the image data of the stereoscopic image contents. Thus, as in the case of the first exemplary embodiment, the image filtering processing is performed through executing convolution of the image filter value on each pixel of the image data.

Thereby, the image filtering processing suited for the parallax value of the stereoscopic image content can be performed through calculating the image filter value by referring not only to the device characteristic data but also to the parallax value of the stereoscopic image content. Further, as in the case of the first exemplary embodiment, the fifth exemplary embodiment can be applied to stereoscopic image display devices of various naked-eye stereoscopic types such as a multi-viewpoint type and an integral type. Naturally, it is possible to provide the image processing unit 155 of the fifth exemplary embodiment as an independent image processing device, and to achieve the function of the stereoscopic image display device 15 by combining it with the stereoscopic display panel 107 and the like.

Figure 59:
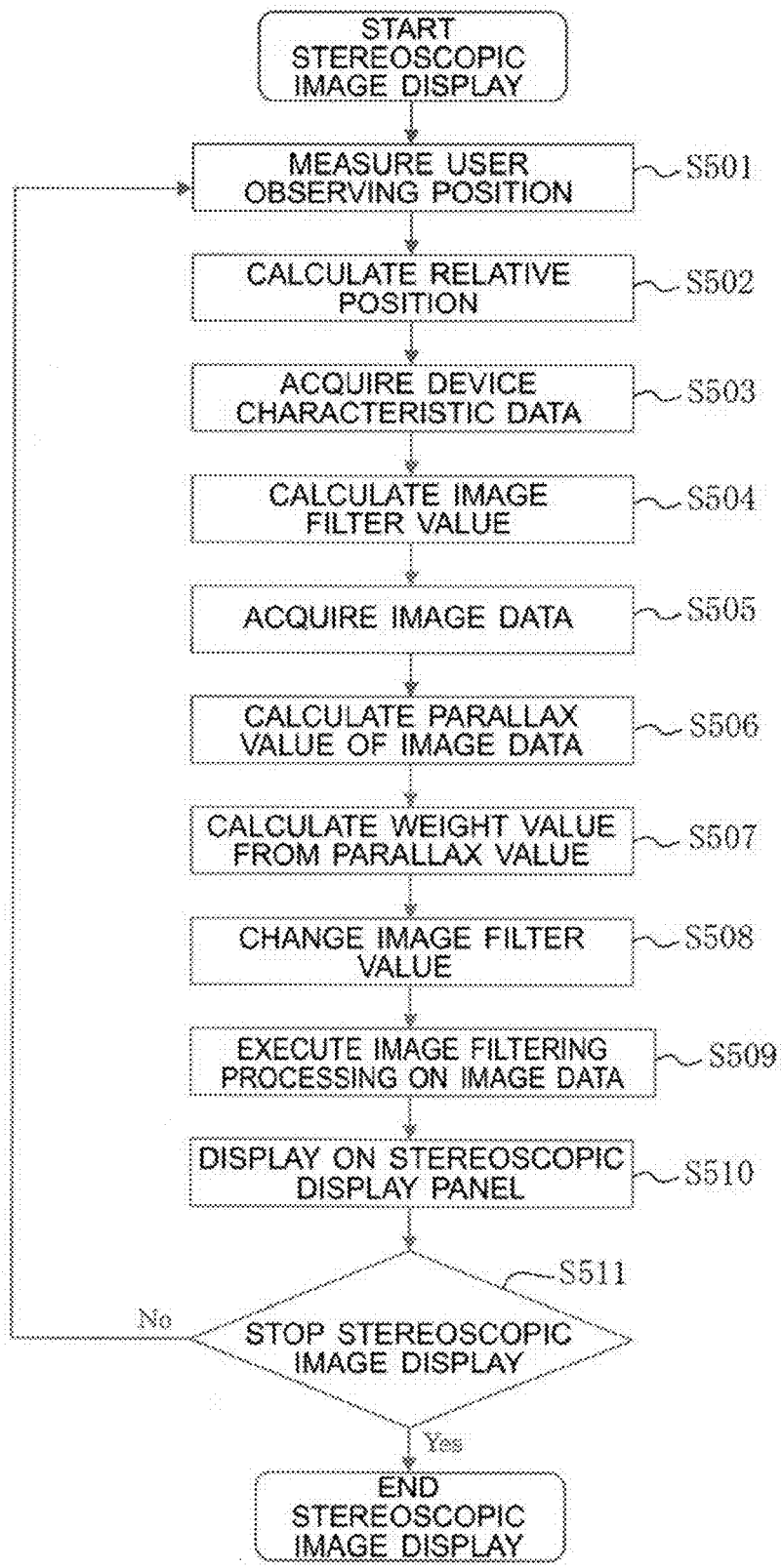
FIG. 59 is a flowchart of a stereoscopic image processing method.

A flowchart of the stereoscopic image processing method used in the stereoscopic image display device 15 according to the fifth exemplary embodiment will be described by referring to FIG. 59. In step S501 to step S505, the same processing as that of the first exemplary embodiment is performed.

In step S506, the parallax value of the image data saved in the image data saving unit 105 is calculated.

In step S507, the weight value $\alpha(x, y)$ of the image filter value for each pixel of the stereoscopic image content is calculated by referring to the parallax value of the image data calculated in step S506.

In step S508, the weight value $\alpha(x, y)$ is multiplied to the window width value Wp of the image filter calculated in step S504 to change it to the window width value Wp(x, y) of the image filter suited for the parallax value of the image data.

In step 509, the image filtering processing is performed by the image filtering processing unit 106 on the image data acquired in step S505 according to the image filter value Wp(x, y) changed in step S508. In the image filtering processing executed in step S509, convolution of the image filter value is executed on each pixel of the image data to convert it to the image data on which the image filtering processing is performed.

In step S510, the image data on which the image filtering processing is performed in step S509 is displayed in a stereoscopic manner on the stereoscopic display panel by using the stereoscopic display panel unit 107.

In step S511, whether to stop or to continuously execute the stereoscopic image display processing is set. When the power of the stereoscopic image display device 15 is turned off or interruption of the stereoscopic image display is designated by the observer, the stereoscopic image display processing is stopped. When there is no event for stopping the stereoscopic image display processing, the stereoscopic image display processing is continuously executed. When the stereoscopic image display processing is stopped in step S511, the stereoscopic image display processing is ended. When the stereoscopic image display processing is executed continuously in step S511, the procedure is returned to the processing of step S501 to repeatedly execute the processing from step S501 to step S511.

As described above, it is possible to provide the stereoscopic image display device and the stereoscopic image processing method with which the influence of the CT-image by the 3D crosstalk is lightened so that a sense of discomfort is not felt by the observer, through performing the image filtering processing suited for the parallax value of the stereoscopic image content through calculating the image filter value by referring not only to the device characteristic data but also to the parallax value of the stereoscopic image contents.

In other words, the stereoscopic image display device according to the fifth exemplary embodiment includes: the observer position measuring unit which measures the observing position of the observer; the relative position calculating unit which calculates the relative positions between the observing position of the observer and the position of the stereoscopic display panel; the device characteristic data saving unit which saves the device characteristic data for the viewing angles of the stereoscopic display panel; the image data saving unit which saves or receives the image data; the parallax value detecting unit which detects the parallax value of the image data; the image filter value calculating unit which calculates the image filter value suited for stereoscopic image display for the viewing angle based on the parallax value of the image data and the device characteristic data; the image filtering processing unit which performs the image filtering processing on the image data according to the image filter value; and the stereoscopic display panel unit which projects the image data on which the image filtering processing is performed to the right eye and the left eye according to the relative position.

It is possible with the fifth exemplary embodiment to overcome the issues by providing the stereoscopic image display device and the stereoscopic image processing method with which the influence of the CT-image by the 3D crosstalk is lightened so that a sense of discomfort is not felt by the observer, through performing the image filtering processing suited for the parallax value of the stereoscopic image content through calculating the image filter value by considering the parallax value of the image data of the stereoscopic image content addition to the observing position of the observer and the device characteristic data.

Sixth Exemplary Embodiment

It is an exemplary object of a sixth exemplary embodiment to provide a stereoscopic image display device and a stereoscopic image processing method with which the influence of the CT-image by the 3D crosstalk is lightened so that a sense of discomfort is not felt by the observer, through performing the image filtering processing suited for the directional characteristic of the image area where the CT-image by the 3D crosstalk appears for each of the image data by calculating the image filter value while considering the directional characteristic of the image area where the CT-image by the 3D crosstalk appears by each of the image data.

Figure 60:
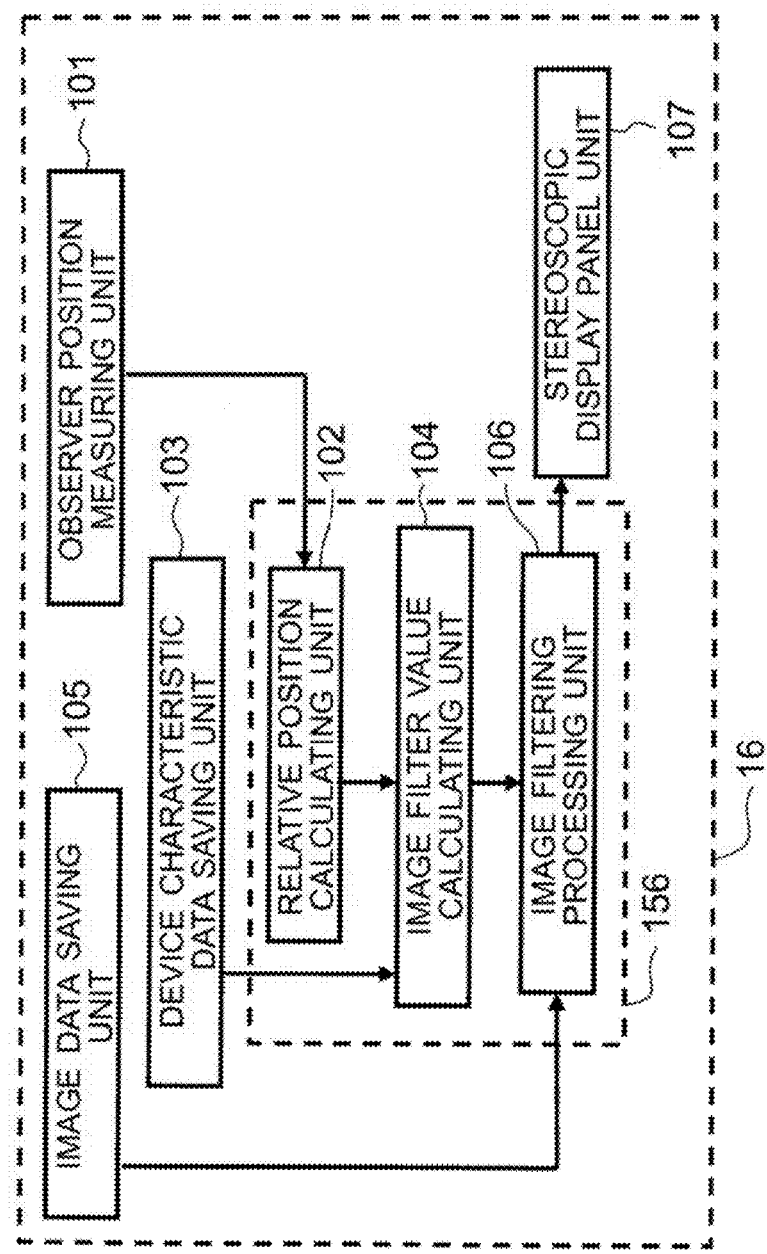
FIG. 60 is a block diagram of a stereoscopic image display device according to a sixth exemplary embodiment.

FIG. 60 shows a block diagram of a stereoscopic image display device 16. The stereoscopic image display device 16 includes: an observer position measuring unit 101; a relative position calculating unit 102; a device characteristic data saving unit 103; an image filter value calculating unit 104; an image data saving unit 105; an image filtering processing unit 106; and a stereoscopic display panel unit 107. Further, a processing unit that is an integration of the relative position calculating unit 102, the image filter value calculating unit 104, and the image filtering processing unit 106 is referred to as an image processing unit 156.

Hereinafter, functions of each unit included in the stereoscopic image display device 16 will be described. The functions of the observer position measuring unit 101, the relative position calculating unit 102, the device characteristic data saving unit 103, the image data saving unit 105, and the stereoscopic display panel unit 107 are the same as those of the first exemplary embodiment.

The image filter value calculating unit 104 has a function which calculates the image filter value suited for stereoscopic image display with respect to the viewing angle based on the device characteristic data by considering the directional characteristic of the image area where the CT-image by the 3D crosstalk appears for each of the image data. In the first exemplary embodiment, the image filter value is calculated by applying the Gaussian filter having the laterally symmetric filter shape to the image filter value. However, in the sixth exemplary embodiment, the image filter value is calculated by using an intrinsic filter having a laterally asymmetric shape by considering the directional characteristic of the image area where the CT-image by the 3D crosstalk appears for each of the image data.

Figure 61:
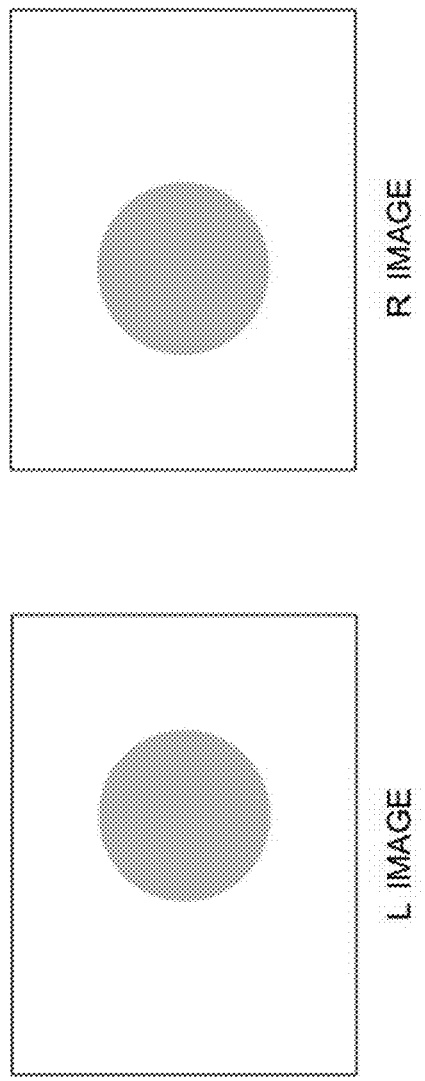
FIG. 61 shows illustrations of an L image and an R image of a case where a ball-like object is popup-displayed in the center part of a stereoscopic image.
Figure 62:
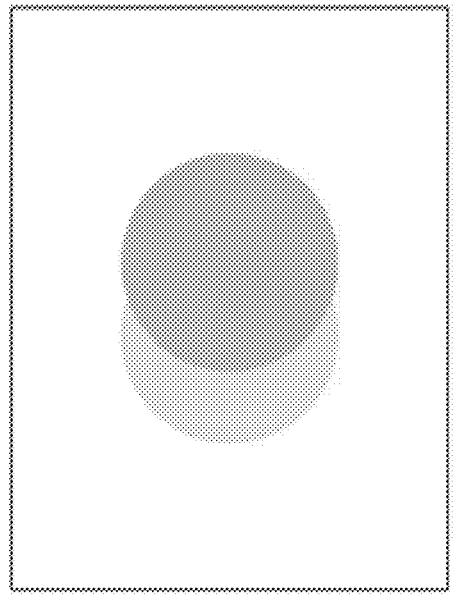
FIG. 62 is an illustration showing a CT-image by 3D crosstalk generated by mixture of the L image and the R image of FIG. 61.

The CT-image by the 3D crosstalk is generated by mixture of an L image and an R image. Thus, it is possible to specify the direction of the image area in which the CT-image appears. FIG. 61 shows the L image and the R image of a case where a ball-like object is popup-displayed in the center part as the stereoscopic image content. FIG. 62 shows an example of the CT-image in which the L image and the R image of FIG. 61 are mixed by the 3D crosstalk. The CT-image by the 3D crosstalk shown in FIG. 62 is an image in which about 50% image components of the R image (provided that the L image is 10%) is mixed by taking the L image as the reference. With the 3D crosstalk, the ball-like object of the L image is displayed on the right side and the ball-like object of the R image is displayed on the left side to generate a CT-image. Therefore, it is possible to specify whether the image area where the CT-image by the 3D crosstalk appears is the right side or the left side depending on whether it is the L image or the R image.

Figure 63:
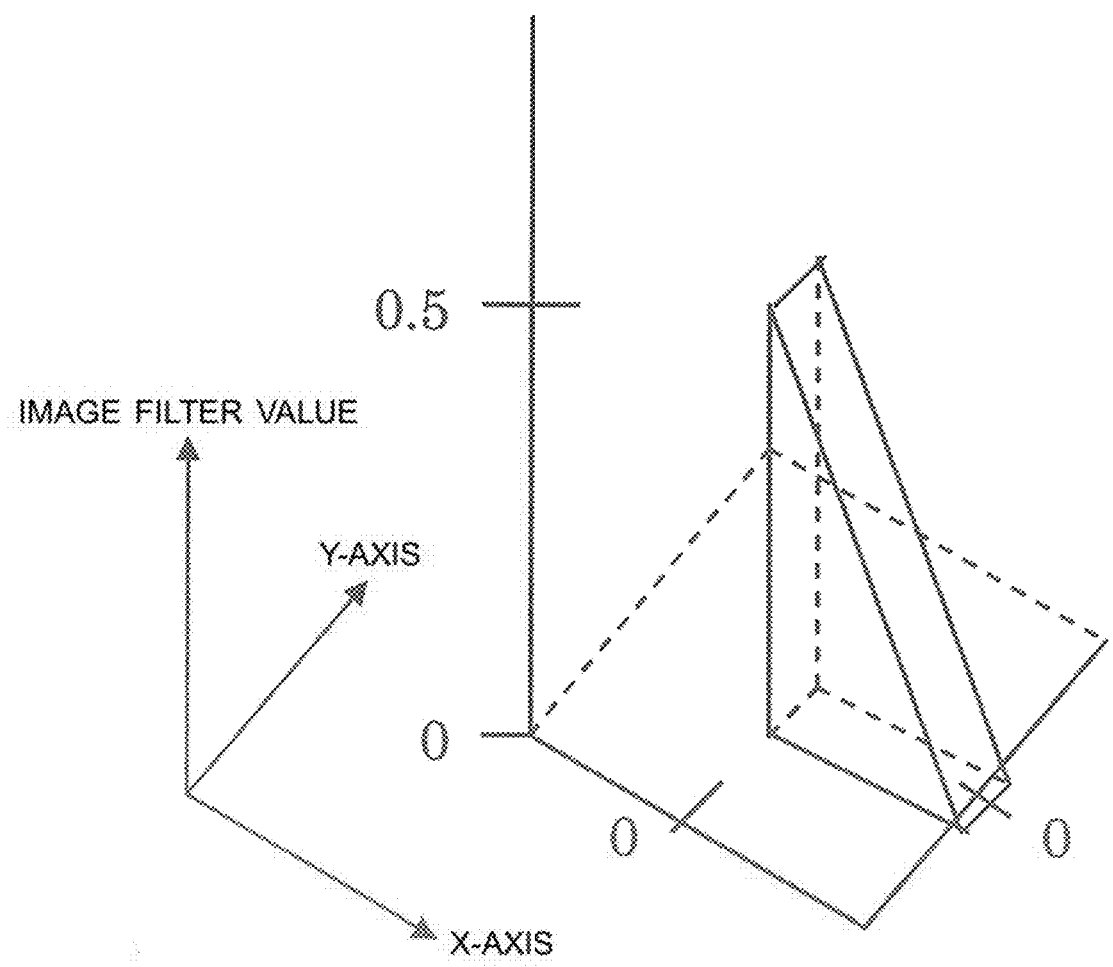
FIG. 63 is an illustration showing the shape of an image filter applied to the L image.
Figure 64:
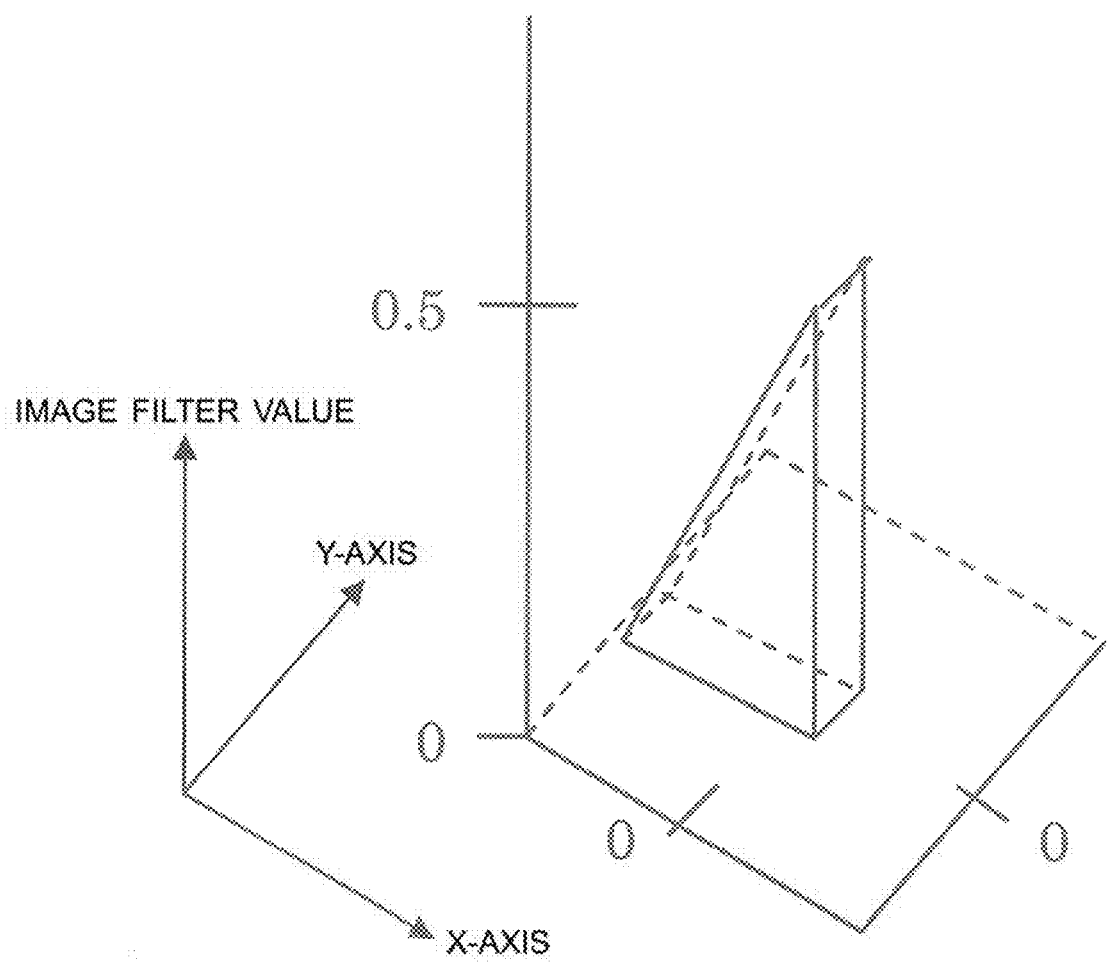
FIG. 64 is an illustration showing the shape of an image filter applied to the R image.

Thus, the image filter shape shown in FIG. 63 is used for the image filter value of the L image, and the image filter shape shown in FIG. 64 is used for the image filter value of the R image. In the image filter shape shown in FIG. 63, the image filter value is defined as "0" at a position where the value on the X-axis is negative, the image filter value is defined as the maximum value at a position where the value on the X-axis is "0", and the image filter value is decreased as the value on the X-axis is increased. Inversely, in the image filter shape shown in FIG. 64, the image filter value is defined as "0" at a position where the value on the X-axis is positive, the image filter value is defined as the maximum value at a position where the value on the X-axis is "0", and the image filter value is decreased as the value on the X-axis is decreased.

Figure 65:
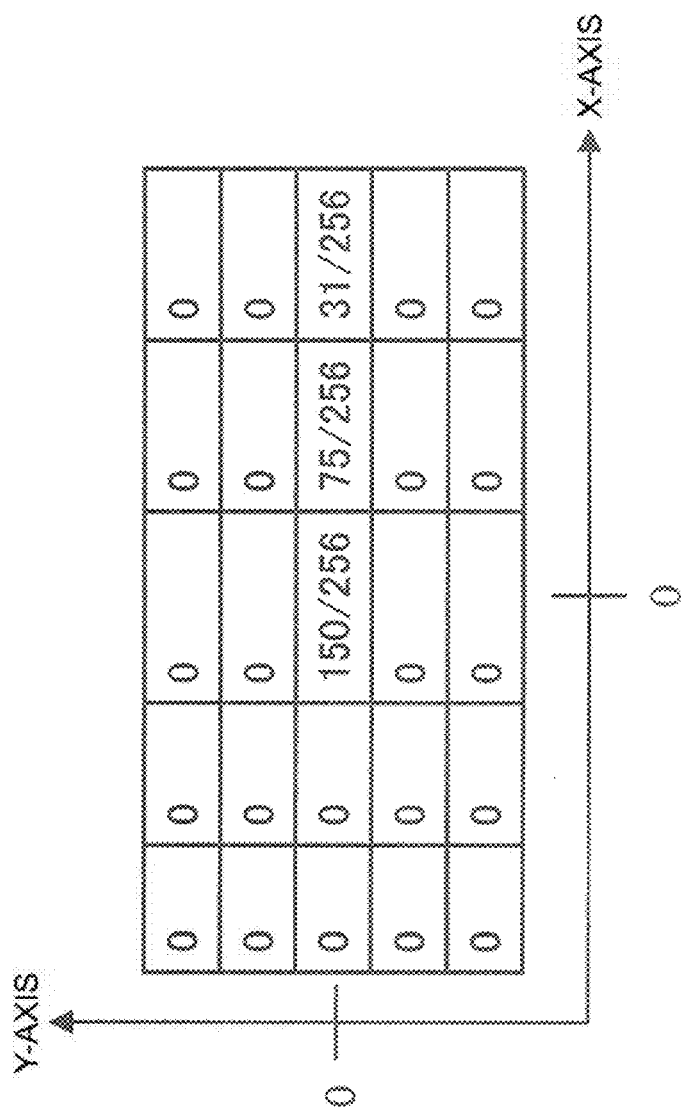
FIG. 65 is a chart showing image filter values applied to the L image.
Figure 66:
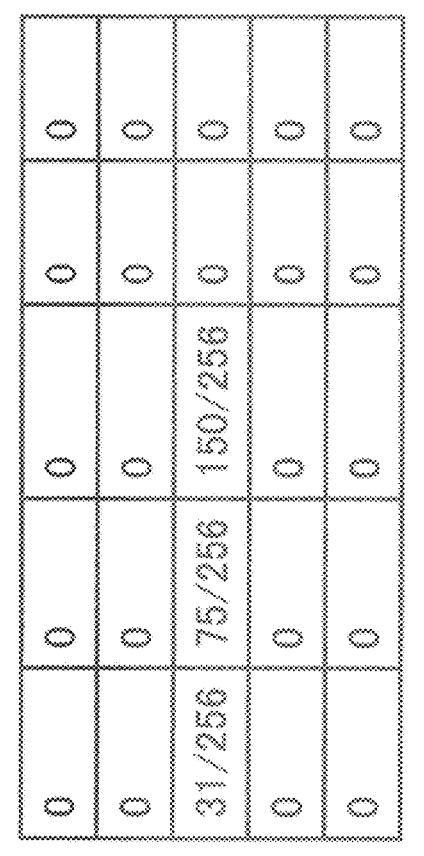

FIG. 65 and FIG. 66 show examples of the image filter values of a case where the image filter shapes are those shown in FIG. 63, FIG. 64, and the window width value of the image filter is 5 (5×5 pixels). When the image filtering processing is performed according to the image filter value applied to the L image shown in FIG. 65, image blurring processing is executed in such a manner that the image data is shifted to the left side. In the meantime, when the image filtering processing is performed according to the image filter value applied to the R image shown in FIG. 66, image blurring processing is executed in such a manner that the image data is shifted to the right side. When the image filtering processing is performed according to laterally asymmetric image filter values, the image blurring processing is executed to shift the image data in arbitrary directions. Therefore, it is possible to perform the image filtering processing suited for the directional characteristic of the image area where the CT-image by the 3D crosstalk appears by each of the image data.

In the image filter value shown in FIG. 65, the case where "0" is substituted to the image filter value at the positions where the value on the Y-axis is other than "0" is shown. However, an arbitrary value may also be substituted to the image filter value at positions where the value on the Y-axis is other than "0" as shown in FIG. 67.

The image filtering processing unit 106 has a function which performs the image filtering processing on the image data saved in the image data saving unit 105 according to the image filter value calculated by the image filter value calculating unit 104.

Figure 68:
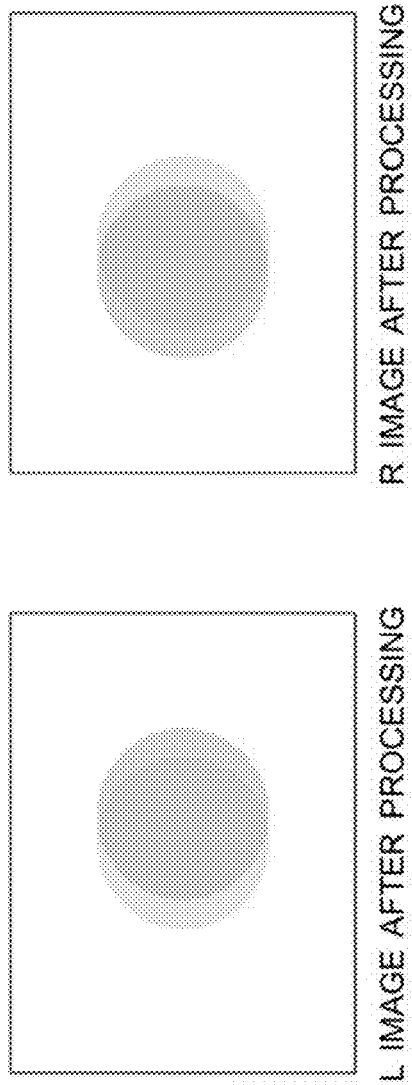
FIG. 68 shows illustrations of an L image and an R image to which laterally asymmetric image filtering processing is applied.
Figure 69:
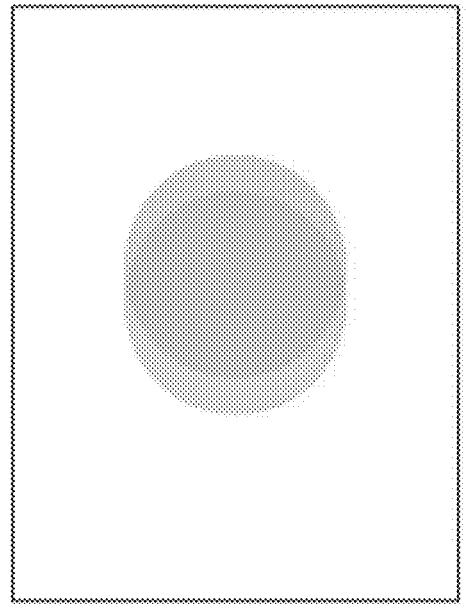
FIG. 69 is an illustration showing a CT-image by 3D crosstalk generated by mixture of the L image and the R image of FIG. 68.
Figure 71:
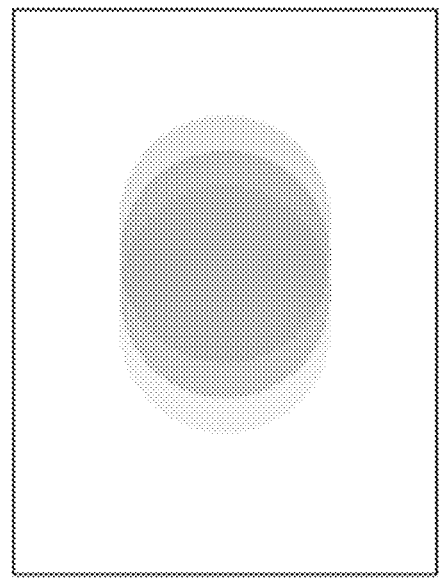
FIG. 71 is an illustration showing a CT-image by 3D crosstalk generated by mixture of the L image and the R image of FIG. 70.

FIG. 68 shows an example of the image data converted by performing the image filtering processing according to the laterally asymmetric image filter values calculated by the image filter value calculating unit 104. Further, FIG. 69 shows an example of a CT-image in which the L image and the R image of FIG. 68 are mixed by the 3D crosstalk. FIG. 70 shows an example of the image data converted by performing the image filtering processing according to the laterally symmetric image filter values. FIG. 71 shows an example of a CT-image in which the L image and the R image of FIG. 70 are mixed by the 3D crosstalk. By comparing FIG. 69 and FIG. 71, it is shown that the image blurring processing is performed only in the direction of the image area where the CT-image by the 3D crosstalk appears when the laterally asymmetric image filter values are applied, so that the influence of the CT-image by the 3D crosstalk can be reduced efficiently.

In the above, described is the case where the object within the stereoscopic image content is popup-displayed towards the front side from the 3D display. However, it is also possible to apply the laterally asymmetric image filter values in the case where the object is displayed in the depth direction that is in the far side than the 3D display. Regarding the object displayed in the depth direction, there is a possibility that the direction of the image area where the CT-image by the 3D crosstalk appears becomes opposite depending on the capturing condition of the stereoscopic image content (layout condition of the virtual cameras).

Figure 72:
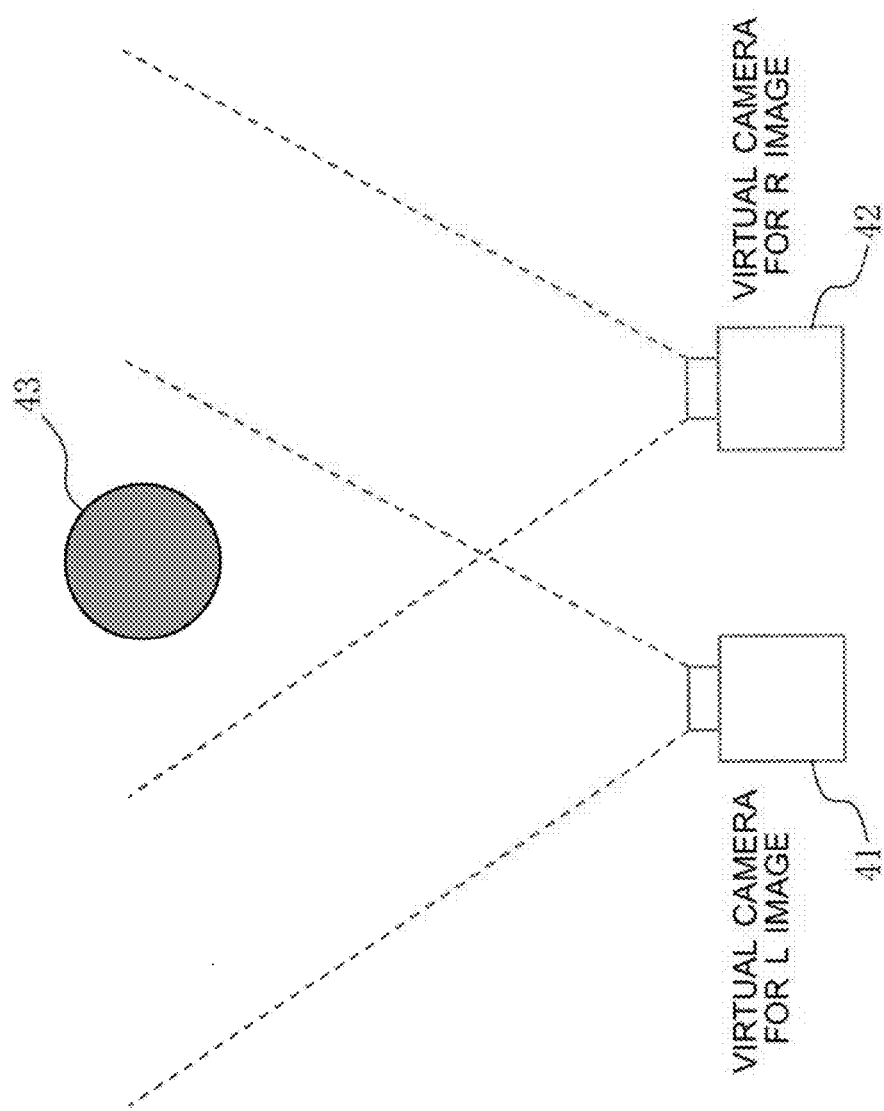
FIG. 72 is a layout chart of virtual cameras by shift sensors.
Figure 73:
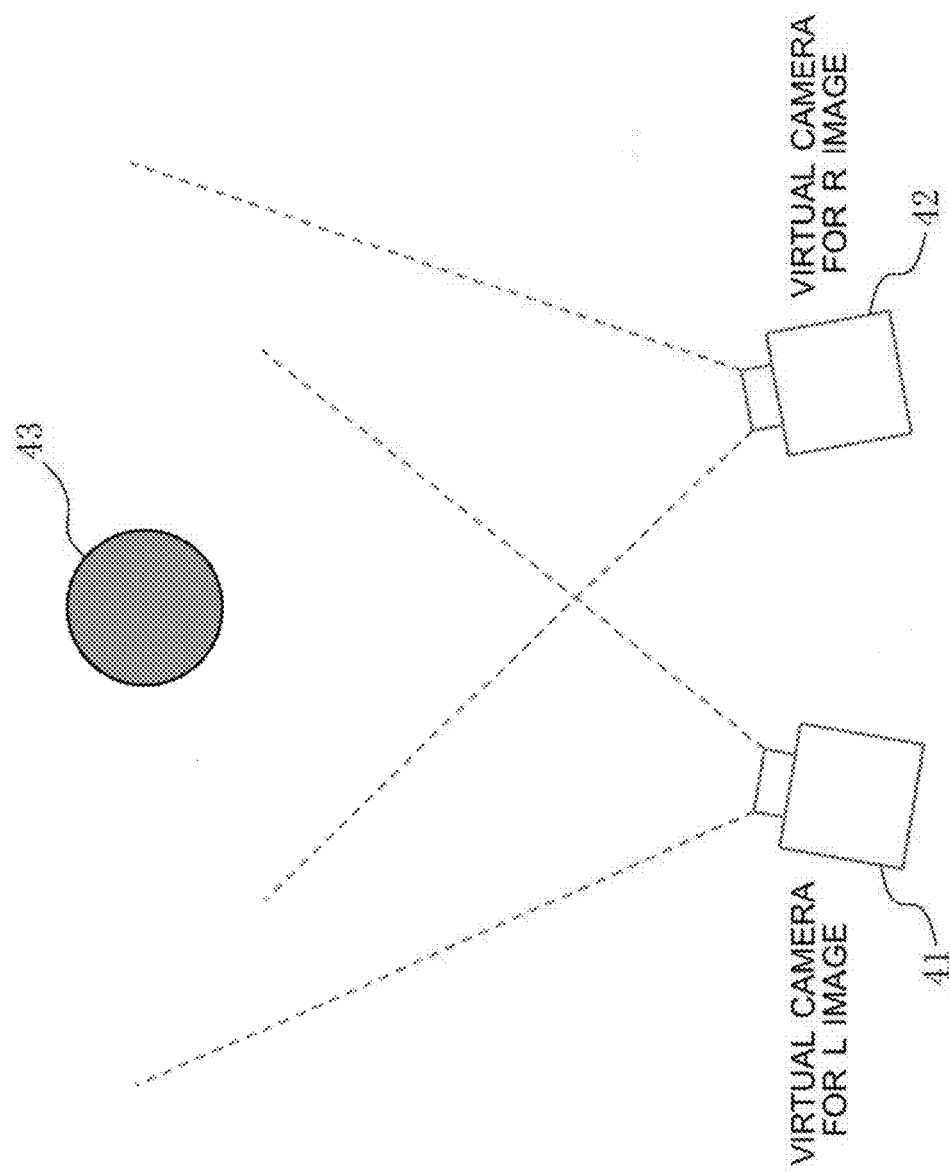

FIG. 72 shows a layout chart of virtual cameras by shift sensors, and FIG. 73 shows a layout chart of virtual cameras by toe-in.

When placing the virtual cameras by the shift sensors, a virtual camera 41 for the L image and a virtual camera 42 for the R image are placed in parallel. Thus, when an object 43 within the stereoscopic image contents is placed in an infinite far distant point, an object 43 within the L image and an object 43 within the R image are displayed at a same position. Therefore, even when the object 43 is displayed in the deeper direction that is the far side than the 3D display, the object 43 is displayed on the side closer to the right side in the L image and displayed on the side closer to the left side in the R image.

In the meantime, when placing the virtual cameras by toe-in, the optical axis center between the virtual camera 41 for the L image and the virtual camera 42 for the R image is aligned with the center position of the object 43 within the stereoscopic image content. Thus, when the object 43 within the stereoscopic image content is placed at the position same as the position on the 3D display plane, the object 43 within the L image and the object 43 within the R image are displayed at the same position. Therefore, when the object 43 is displayed in the popup direction, it is displayed on the side closer to the right side in the L image and displayed on the side closer to the left side in the R image. However, when the object 43 is displayed in the depth direction, it is inversely displayed on the side closer to the left side in the L mage and displayed on the side closer to the right side in the R image.

Thus, when the image filtering processing is performed on the stereoscopic image content captured under the virtual camera layout condition by toe-in, it is necessary to judge whether the object within the stereoscopic image content is displayed in the popup direction or in the depth direction and to change the image filter shape according to the judgment result.

Figure 74:
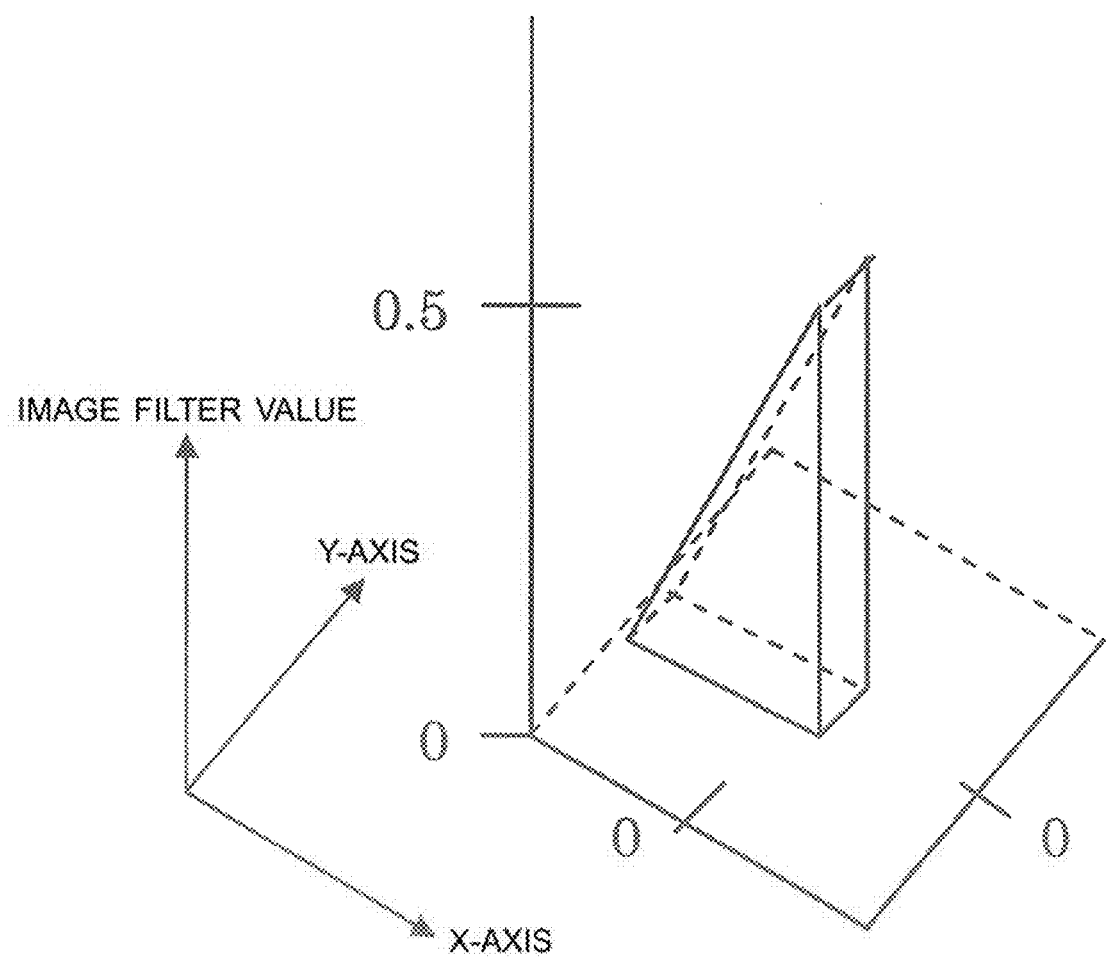
FIG. 74 is an illustration showing the shape of an image filter applied to the L image.
Figure 75:
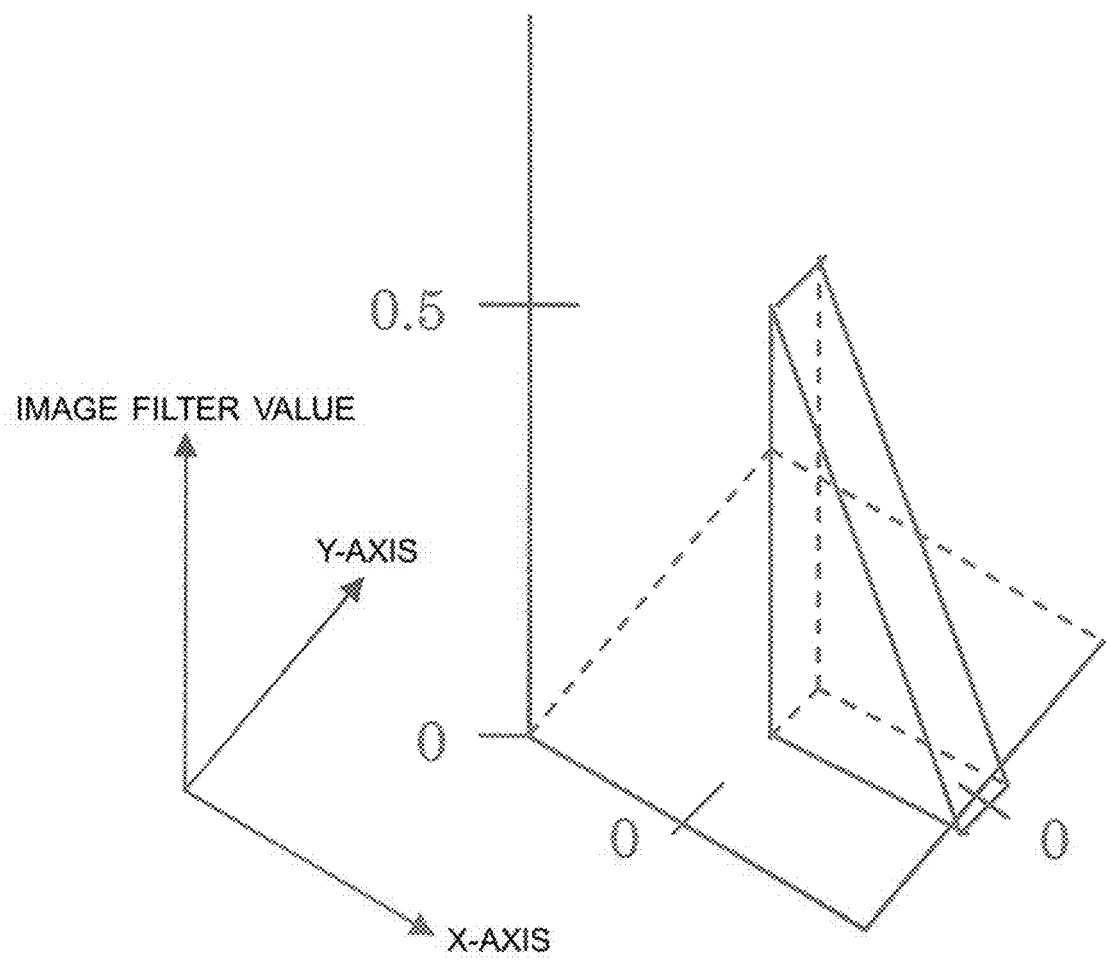
FIG. 75 is an illustration showing the shape of an image filter applied to the R image.

Specifically, in the case where the object within the stereoscopic image content is displayed in the popup direction, the image filter shapes shown in FIG. 63 and FIG. 64 are applied. In the case where the object is displayed in the depth direction, the image filter shapes shown in FIG. 74 and FIG. 75 are applied. Note that the image filter shapes of FIG. 74 and FIG. 75 are the shapes acquired by inverting the filter shapes of FIG. 63 and FIG. 64 in the X-axis direction.

Further, regarding the display state of the object within the stereoscopic image content, the parallax value of the stereoscopic image content is referred to to judge whether it is displayed in the popup direction or in the depth direction. When the parallax value information is not saved in the stereoscopic image content, the parallax value of the stereoscopic image content is detected by using the parallax value detecting unit 115 depicted in the fifth exemplary embodiment. As a result of the detection, the image filter value inverted in the X-axis direction is applied to the image area of the image data displayed in the depth direction to perform the image filtering processing.

Figure 76:
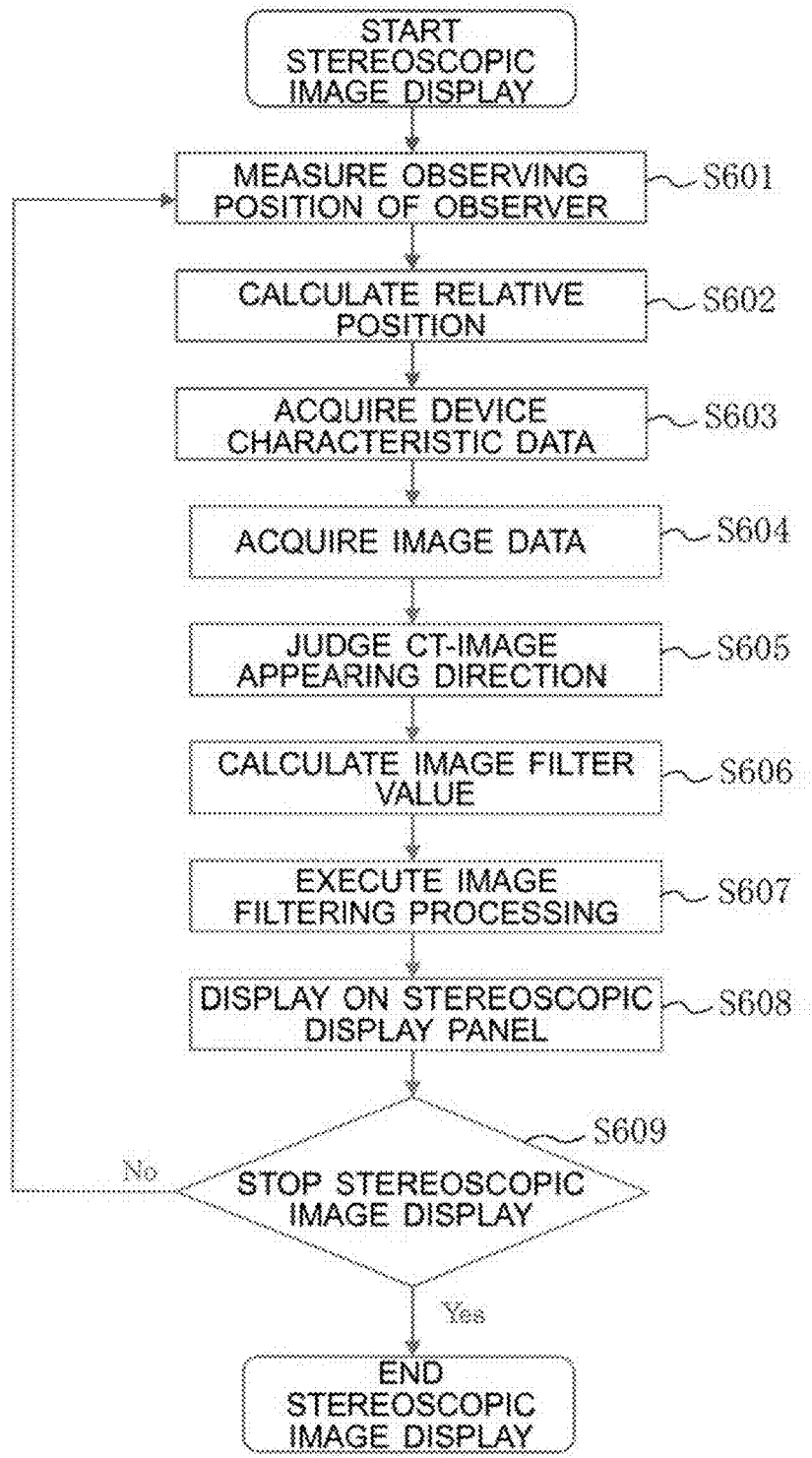
FIG. 76 is a flowchart of a stereoscopic image processing method.

A flowchart of the stereoscopic image processing method used in the stereoscopic image display device 16 according to the sixth exemplary embodiment will be described by referring to FIG. 76.

Step S601 to step S603 are same as the flowchart of the first exemplary embodiment.

Step S604 is same as step S105 of the flowchart of the first exemplary embodiment.

In step S605, the direction of the image area where the CT-image by the 3D crosstalk appears is judged by each of the image data acquired in step S604. When the stereoscopic image content is captured under the virtual camera layout condition using the shift sensors, it is judged that the right side of the object is the image area influenced by the CT-image by the 3D crosstalk since the object within the stereoscopic image contents is on the side closer to the right side in the L image, and judged that left side of the object is the image area influenced by the CT-image by the 3D crosstalk since the object within the stereoscopic image content is on the side closer to the left side in the R image. Under the virtual camera layout condition by toe-in, the object displayed in the popup direction exhibits the same judgment result as that of the virtual camera layout condition by the shift sensors. However, the judgment result shows the opposite direction for the object displayed in the depth direction.

In step S606, the laterally asymmetric image filter values are calculated from the device characteristic data by referring to the result of the image area influenced by the CT-image by the 3D crosstalk judged in step S605. When calculating the image filter value, first, as in the case of the first exemplary embodiment, the window width value Wp of the image filter is calculated. Then, when it is judged by referring to the result of the image area judged in step S605 that the right side of the object within the stereoscopic image content is the image area influenced by the CT-image by the 3D crosstalk, the image filter shape (FIG. 63) with which the image blurring processing is performed to shift to the left direction is applied. When it is judged that the left side of the object within the stereoscopic image content is the image area influenced by the CT-image by the 3D crosstalk, the image filter shape (FIG. 64) with which the image blurring processing is performed to shift to the right direction is applied. At last, the image filter value is calculated from the window width value Wp of the image filter and the image filer shape. In step S607 to step S609, the same processing as the processing of step S106 to step S108 of the first exemplary embodiment is performed.

As described above, it is possible to provide the stereoscopic image display device and the stereoscopic image processing method with which the influence of the CT-image by the 3D crosstalk is lightened so that a sense of discomfort is not felt by the observer, through performing the image filtering processing suited for the directional characteristic of the image area where the CT-image by the 3D crosstalk appears by each of the image data through calculating the image filter value by considering the directional characteristic of the image area where the CT-image by the 3D crosstalk appears by each of the image data.

Further, as in the case of the first exemplary embodiment, the sixth exemplary embodiment can be applied to stereoscopic image display devices of various naked-eye stereoscopic types such as a multi-viewpoint type and an integral type. Naturally, it is possible to provide the image processing unit 156 of the sixth exemplary embodiment as an independent image processing device, and to achieve the function of the stereoscopic image display device 16 by combining it with the stereoscopic display panel 107 and the like.

In other words, the stereoscopic image display device according to the sixth exemplary embodiment includes: the observer position measuring unit which measures the observing position of the observer; the relative position calculating unit which calculates the relative position between the observing position of the observer and the position of the stereoscopic display panel; the device characteristic data saving unit which saves the device characteristic data for the viewing angles of the stereoscopic display panel; the image data saving unit which saves or receives the image data; the image filter value calculating unit which sets the image filter shape by considering the directional characteristic of the image area where the CT-image by the 3D crosstalk appears by each of the image data and calculates the image filter value suited for stereoscopic image display with respect to the viewing angle based on the device characteristic data; the image filtering processing unit which performs the image filtering processing on the image data according to the image filter value; and the stereoscopic display panel unit which projects the image data on which the image filtering processing is performed to the right eye and the left eye according to the relative position.

It is possible with the sixth exemplary embodiment to overcome the issues by providing the stereoscopic image display device and the stereoscopic image processing method with which the influence of the CT-image by the 3D crosstalk is lightened so that a sense of discomfort is not felt by the observer, through performing the image filtering processing suited for the directional characteristic of the image area where the CT-image by the 3D crosstalk appears by each of the image data through calculating the image filter value by considering the directional characteristic of the image area where the CT-image by the 3D crosstalk appears by each of the image data in addition to the observing position of the observer and the device characteristic data.

Seventh Exemplary Embodiment

Figure 77:
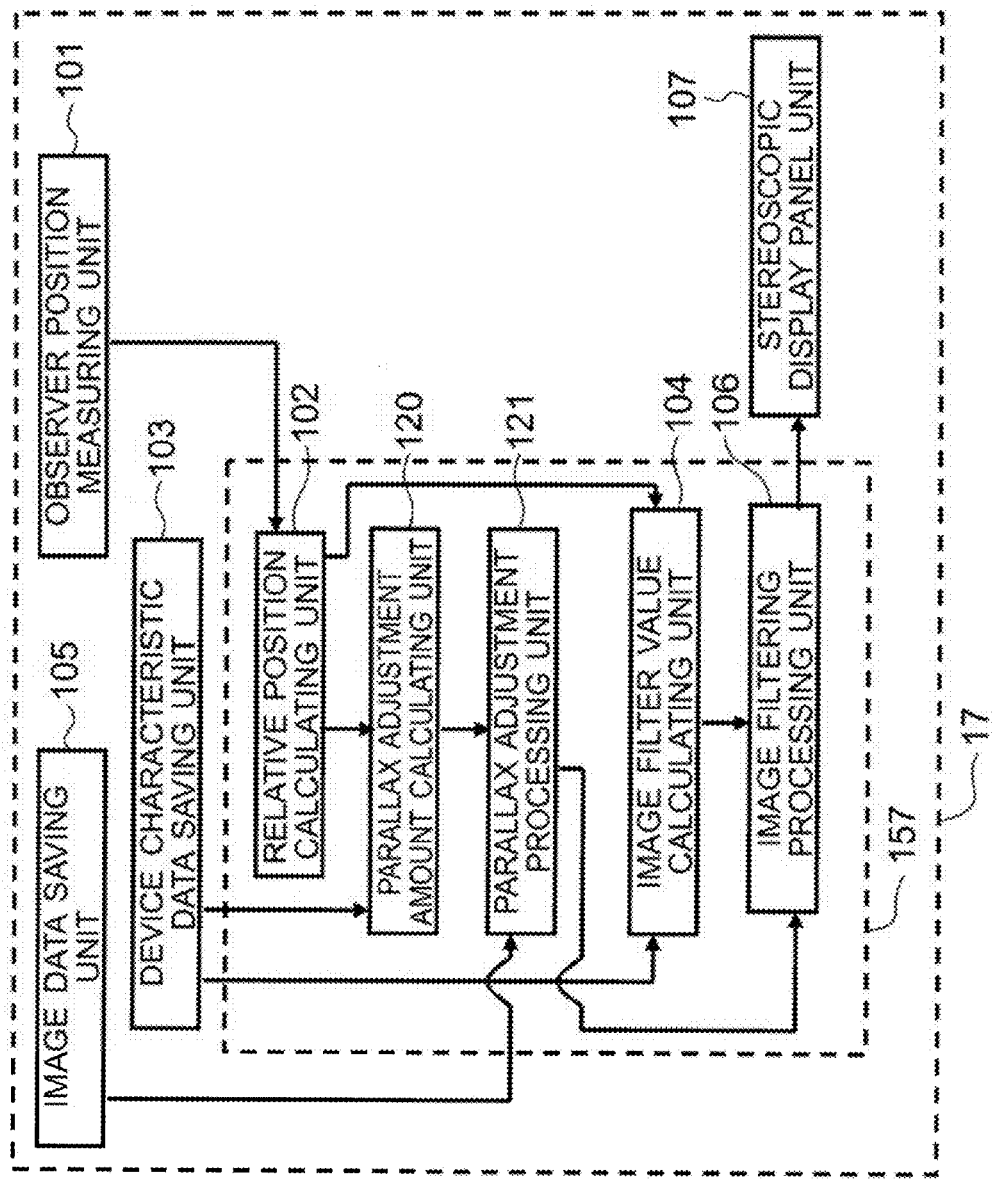
FIG. 77 is a block diagram of a stereoscopic image display device according to a seventh exemplary embodiment.

It is an exemplary object of a seventh exemplary embodiment to provide a stereoscopic image display device and a stereoscopic image processing method with which the influence of the CT-image by the 3D crosstalk is lightened so that a sense of discomfort is not felt by the observer, through performing parallax adjustment processing in addition to the image filtering processing. FIG. 77 shows a block diagram of a stereoscopic image display device 17. The stereoscopic image display device 17 includes: an observer position measuring unit 101; a relative position calculating unit 102; a device characteristic data saving unit 103; an image filter value calculating unit 104; an image data saving unit 105; an image filtering processing unit 106; a stereoscopic display panel unit 107; a parallax adjustment amount calculating unit 120; and a parallax adjustment processing unit 121. Further, a processing unit that is an integration of the relative position calculating unit 102, the image filter value calculating unit 104, the image filtering processing unit 106; the parallax adjustment amount calculating unit 120; and the parallax adjustment processing unit 121 is referred to as an image processing unit 157.

Hereinafter, functions of each unit included in the stereoscopic image display device 17 will be described. The functions of the observer position measuring unit 101, the relative position calculating unit 102, the device characteristic data saving unit 103, the image data saving unit 105, and the stereoscopic display panel unit 107 are the same as those of the first exemplary embodiment.

Figure 78:
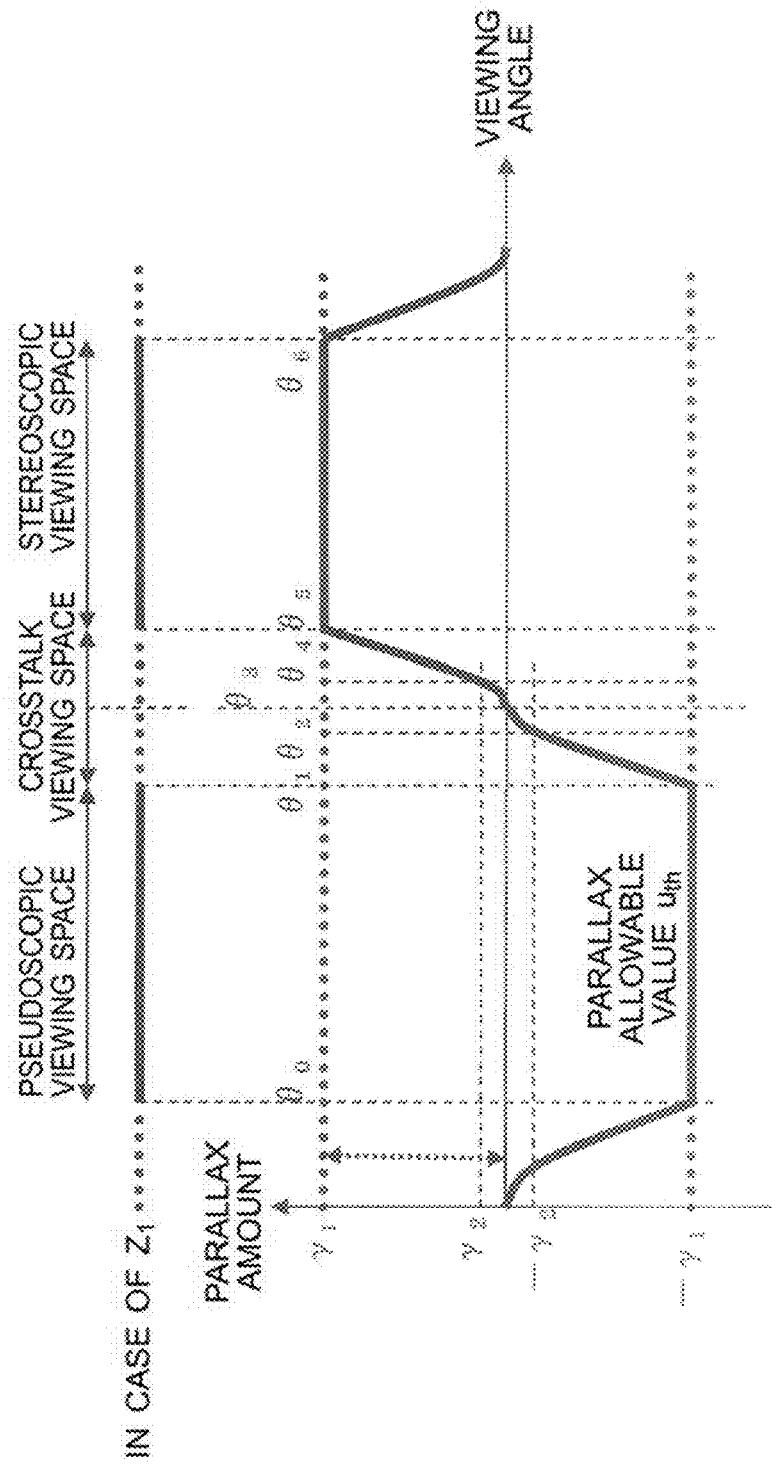
FIG. 78 is a chart showing parallax allowable values with respect to viewing angles.

The parallax adjustment amount calculating unit 120 has a function which calculates the parallax adjustment amount suited for stereoscopic image display with respect to the viewing angle based on the device characteristic data saved in the device characteristic data saving unit 103. For example, the parallax adjustment amount calculating unit 120 calculates the parallax limit value (parallax allowable value $u_{th}$) with which a stereoscopic image can be displayed. FIG. 78 shows the result acquired by calculating the parallax allowable value $u_{th}$ with respect to the viewing angles $\theta$ based on the device characteristic data (see FIG. 4) in a case where the observing position of the observer is at positions on $Z_1$. Note here that "$u_{th}$" is a function $u_{th}(\theta)$ of the viewing angle $\theta$. However, it is simply expressed as "$u_{th}$" for convenience' sake. FIG. 78 shows that the parallax allowable value $u_{th}$ takes different values for the pseudoscopic viewing space $\theta_0$ to $\theta_1$, the 3D-crosstalk viewing space $\theta_1$ to $\theta_5$, and the stereoscopic viewing space $\theta_5$ to $\theta_6$ in a case where the threshold value of the 3D crosstalk amount is defined as $\beta_1$ (see FIG. 4). FIG. 79 is a table which shows the relation regarding the 3D crosstalk amount, generation of CT-image, the influence for the stereoscopic image, the viewing angle ranges, the viewing space names (pseudoscopic viewing space, 3D-crosstalk viewing space, stereoscopic viewing space), and the absolute value $|u_{th}|$ of the parallax allowable value. Hereinafter, the parallax allowable value $u_{th}$ for each of the areas of the stereoscopic viewing space $\theta_5$ to $\theta_6$, the pseudoscopic viewing space $\theta_0$ to $\theta_1$, and the 3D-crosstalk viewing space $\theta_1$ to $\theta_5$ will be described by referring to FIG. 78 and FIG. 79.

For the parallax allowable value $u_{th}$ in the stereoscopic viewing space $\theta_5$ to $\theta_6$, set is the parallax maximum value $\gamma_1$ with which the observer can merge the L image and the R image (LR image) (can merge the LR images observed by the right eye and the left eye in the brain so as to recognize them as a single stereoscopic image) so that the safety level of not giving a sense of discomfort to the observer can be maintained in a case where the right-eye image (R image) to be projected to the right-eye area is projected to the right eye of the observer properly and the left-eye image (L image) to be projected to the left-eye area is projected to the left eye of the observer properly. Regarding the parallax maximum value $\gamma_1$, safety standard values are proposed by various organizations. As an example, the comfort parallax range maximum value depicted in the 3D safety guideline of the 3D consortium may be substituted to the parallax allowable value $u_{th}$ in the stereoscopic viewing space as the parallax maximum value $\gamma_1$.

Regarding the parallax allowable value $u_{th}$ in the pseudoscopic viewing space $\theta_0$ to $\theta_1$, a value $-\gamma_1$ that is an inversion of the parallax allowable value $u_{th}$ in the stereoscopic viewing space is substituted to the parallax allowable value $u_{th}$ in the pseudoscopic viewing space in order to invert the parallax value as a countermeasure for the reverse vision. In the 3D-crosstalk viewing space $\theta_1$ to $\theta_5$, the parallax allowable value $|u_{th}|$ is fractionated according to the 3D crosstalk amount. In the range where the 3D crosstalk amount is $\beta_1$ to $\beta_2$ (the viewing angle range of $\theta_1$ to $\theta_2$), a slight CT-image is generated. Thus, the stereoscopic image can be sighted even though the observer feels a sense of discomfort. In the meantime, in the range where the 3D crosstalk amount is $\beta_2$ or more (the viewing angle range of $\theta_2$ to $\theta_3$), the influence of the CT-image is increased. Thus, it becomes almost impossible for the observer to sight the stereoscopic image. Therefore, it is desirable to set the parallax allowable value in accordance with the extent of the influence of the CT-image.

Specifically, the 3D crosstalk amount is referred to from the device characteristic data of FIG. 4, and the parallax allowable value $u_{th}$ suited for that amount is set. The parallax allowable value $u_{th}$ shown in FIG. 78 and FIG. 79 is calculated under the condition where the absolute value of the parallax allowable value $|u_{th}|$ is defined to be equal to or less than $\gamma_1$ (the parallax allowable value $u_{th}$ in the stereoscopic viewing space) when the 3D crosstalk amount is $\beta_1$ or more, and the absolute value of the parallax allowable value $|u_{th}|$ is defined to be equal to or less than an arbitrarily set parallax value $\gamma_2$ when the 3D crosstalk amount is $\beta_2$ or more. The parallax value $\gamma_2$ as the condition of calculating the parallax allowable value $u_{th}$ can be set arbitrarily according to the preference of the observer or can be specified by the subjective evaluation for the observer. The experimental results of the subjective evaluation for the observers are shown in various documents, so that the parallax value $\gamma_2$ can also be specified from those documents.

Regarding the parallax allowable value $u_{th}$ in the 3D-crosstalk viewing space, the point where the parallax allowable value is $\gamma_1$ at the viewing angle $\theta_1$, the point where the parallax allowable value is $\gamma_2$ at the viewing angle $\theta_2$, the point where the parallax allowable value is 0 at the viewing angle $\theta_3$ as the center position of the 3D-crosstalk viewing space, the point where the parallax allowable value is $-\gamma_2$ at the viewing angle $\theta_4$, and the point where the parallax allowable value is $-\gamma_1$ at the viewing angle $\theta_5$ are connected with each other by interpolation via a line to calculate the parallax allowable value $u_{th}$ for each of the viewing angles. As the line for interpolating the group of points with each other, secondary interpolation (polynomial interpolation) or linear interpolation may be used.

While FIG. 78 and FIG. 79 show the case where the threshold values $\beta_1$, $\beta_2$ of the 3D crosstalk amount are set as the calculation condition of the parallax allowable value $u_{th}$, the threshold values of the 3D crosstalk amount are not limited only to the two kinds. It is also possible to set a greater number of threshold values.

Figure 80A:
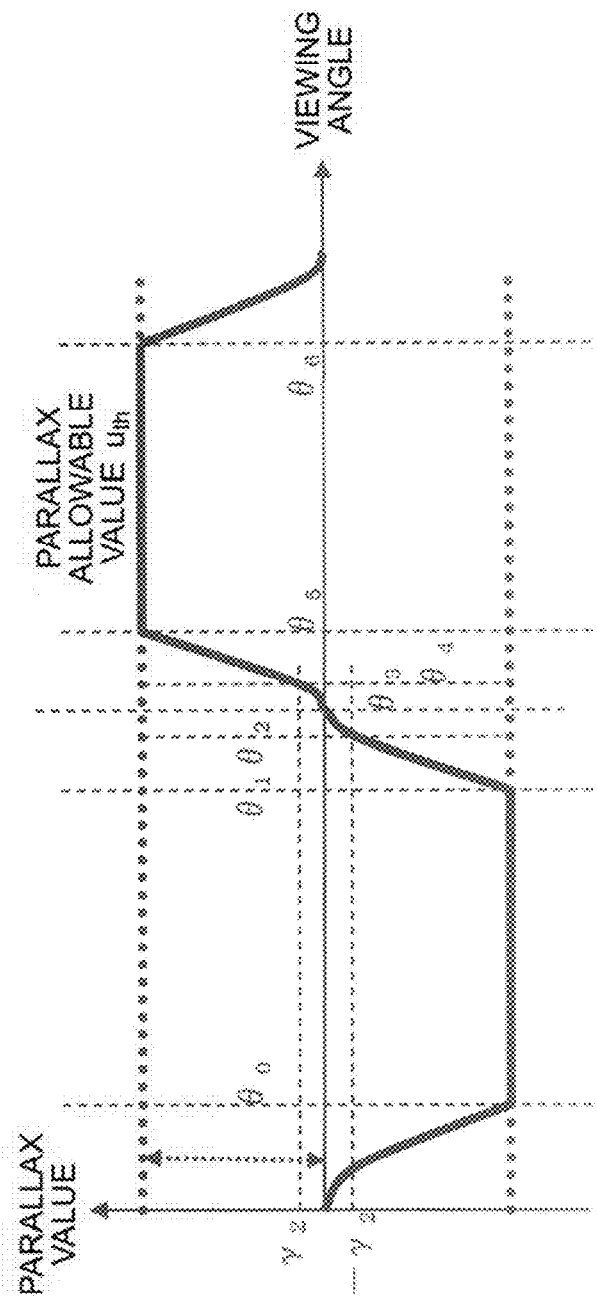
FIG. 80A is a chart showing parallax allowable values with respect to viewing angles.

The parallax adjustment processing unit 121 has a function which performs the parallax adjustment processing of the image data saved in the image data saving unit 105 according to the parallax adjustment value calculated by the parallax adjustment calculating unit 120. For example, the parallax adjustment processing unit 121 has a function which performs the parallax adjustment processing of the image data according to the parallax adjustment value $u_{th}$ calculated by the parallax adjustment calculating unit 120. FIG. 80 shows the result acquired by calculating the parallax maximum value $u_f$ of the stereoscopic image content with respect to the viewing angles by performing the parallax adjustment processing. In the parallax adjustment processing, in order to calculate the parallax maximum value $u_f$ of the stereoscopic image content after the parallax adjustment processing, calculated is the parallax maximum value $u_f$ (FIG. 80C) which satisfies both conditions (Formula (15)), i.e., the condition (FIG. 80A) of the parallax allowable value $u_{th}$ calculated by the parallax adjustment amount calculating unit 120 and the condition (FIG. 80B) of the parallax maximum value $u_c$ of the stereoscopic image content saved in the image data saving unit 105.

$$(u_f <= u_{th}) \text{AND} (u_f <= u_c) \quad \text{Formula (15)}$$

In a case where the parallax maximum value $u_f$ is larger than the parallax maximum value $u_c$ of the stereoscopic image contents, the parallax value of the stereoscopic image content is not changed and the LR image in that state is transmitted to the image filtering processing unit 106. In a case where the parallax maximum value $u_f$ on which the parallax adjustment processing is performed is smaller than the parallax maximum value $u_c$, the parallax adjustment value κ (ratio between $u_f$ and $u_c$) is calculated by Formula (16), the parallax value of the stereoscopic image contents is changed, and then the LR image is transmitted to the image filtering processing unit 106.

$$u_f = \kappa u_c \quad \text{Formula (16)}$$

In the above-described case, it is depicted that the parallax adjustment amount calculation processing is performed by the parallax adjustment processing unit 121. However, the parallax adjustment amount calculation processing may be performed by the parallax adjustment amount calculating unit 120. Note, however, that it is necessary for the parallax adjustment amount calculating unit 120 to acquire the parallax maximum value $u_c$ of the stereoscopic image content from the image data saving unit 105.

Figure 81:
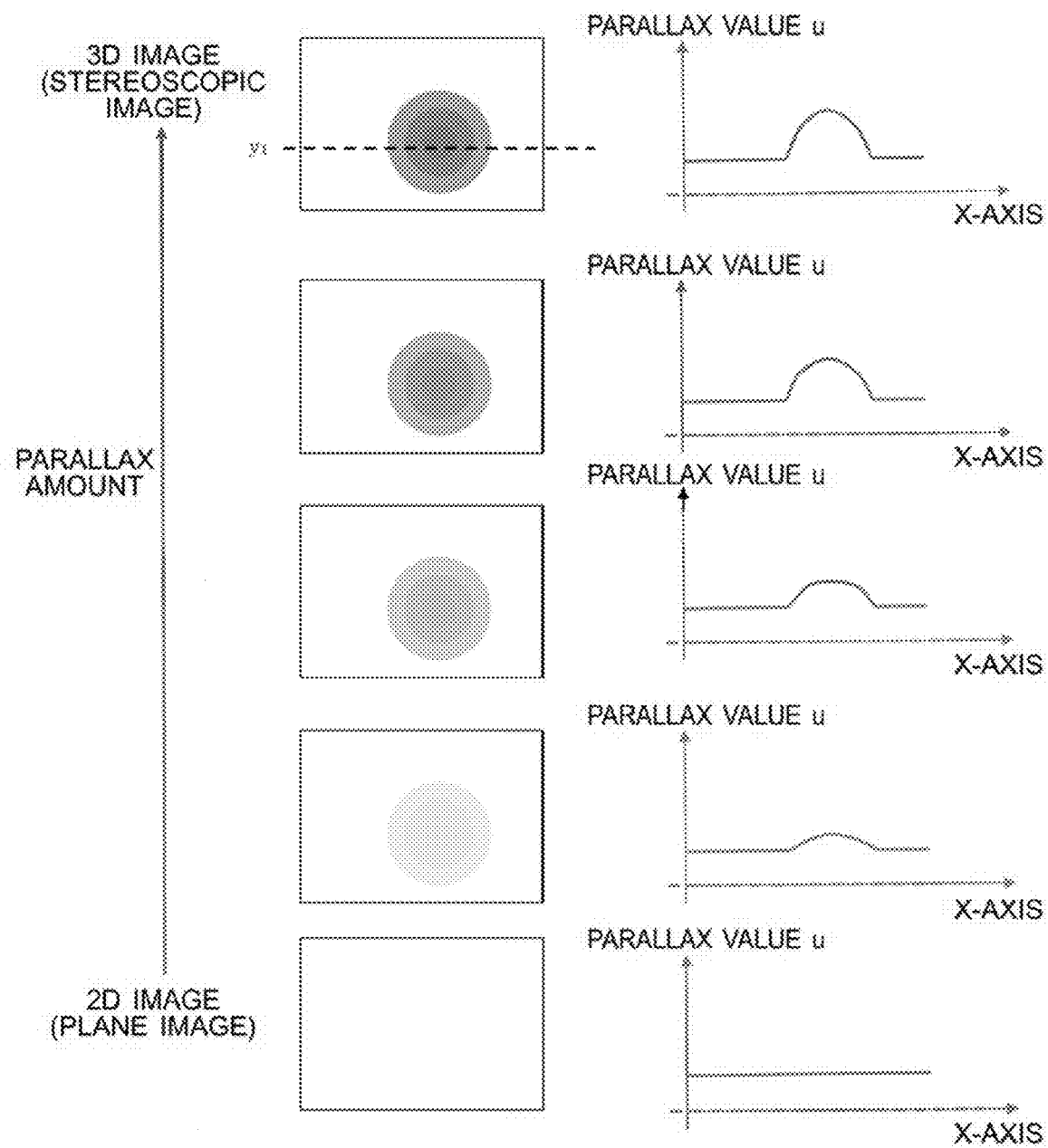
FIG. 81 is a chart of a group of parallax image data changed by a parallax adjusting amount.

An example of the processing for changing the parallax value of the stereoscopic image content by the calculated parallax adjustment amount κ will be described. In the parallax value changing processing, first, the parallax image is changed by multiplying the parallax adjustment amount κ to the parallax value of the parallax image of the stereoscopic image content. FIG. 81 shows a group of parallax images changed by the parallax adjustment amount κ. The parallax image in the uppermost section of FIG. 81 shows the parallax image having the parallax values originally held by the stereoscopic image content, while the parallax image in the lowermost section of FIG. 81 shows the parallax image in which all the parallax values are "0". The parallax images in the middle section of FIG. 81 are the parallax images acquired by changing the parallax values through multiplying the parallax adjustment amount κ to the parallax value of the parallax image on the uppermost section. The parallax adjustment amount κ of the parallax image on the second section from the top is set as 0.75, the parallax adjustment amount κ of the parallax image on the third section from the top is set as 0.50, the parallax adjustment amount κ of the parallax image on the fourth section from the top is set as 0.25, and the parallax adjustment amount κ of the parallax image on the lowermost section is set as 0. Provided that the parallax values originally held by the stereoscopic image content are $u_c(x, y)$, the parallax values $u_f(x, y)$ of the stereoscopic image content after the parallax value adjustment processing can be expressed as in Formula (17).

$$u_f(x, y) = \kappa u_c(x, y) \quad \text{Formula (17)}$$

Note here that $u_c(x, y)$ shows the parallax value at the pixel position (x, y) of the parallax image.

Figure 82:
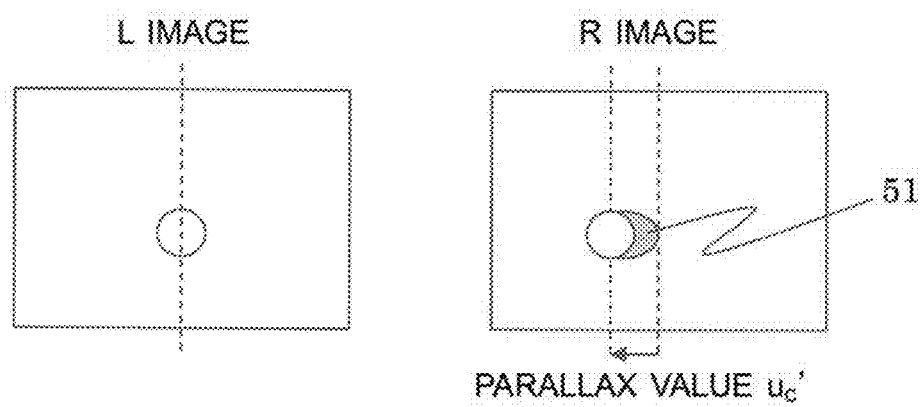
FIG. 82 is an illustration of an R' image generated by shift of pixels.

Then, an $LR_f$ image on which the parallax adjustment processing is performed is generated from the LR image of the stereoscopic image content by referring to the changed parallax image. In the $LR_f$ image generating processing, an $R_f$ image is generated by shifting each pixel of the L image to the X-axis direction in accordance with the parallax value of the parallax image by having the L image as the reference. FIG. 82 shows the $R_f$ image is generated by shifting the pixels. When shifting the pixels, a blank section 51 having no luminance value (RGB values) of the pixels appears in the $R_f$ image due to the difference in the parallax values at the positions of each of the pixels. In order to fill the blank section 51, the image interpolation processing is executed from the luminance values of the pixels in the vicinity of the blank section 51.

As an image interpolation processing method, it is possible to use linear interpolation or average-value interpolation. In a case where the range of the blank section is wide, various kinds of image restoration (Inpainting) may be employed in order to perform high-quality image interpolation processing. As the Inpainting method, there are a method which restores the image in the blank region by searching the luminance value pattern similar to the luminance value pattern in the vicinity of the blank section from the image information through executing pattern matching, a Shift-Map method, and the like. Further, in the image interpolation processing performed in the blank section, not only the luminance values of the L image but also the luminance values of the R image may be referred to. Through generating the $LR_f$ image on which the parallax adjustment processing is performed by referring to the parallax adjustment amount κ in the manner described above, the parallax values of the stereoscopic image content can be changed.

The image filter value calculating unit 104 has a function which calculates the image filter value suited for stereoscopic image display with respect to the viewing angle based on the device characteristic data. The calculation method of the image filter value is the same processing as that of the first exemplary embodiment in which the window width value Wp of the image filter is calculated so as to calculate the image filter value. The seventh exemplary embodiment employs not only the image filtering processing but also the parallax adjustment processing, so that the image filter value may be set as a smaller value than the value calculated in the first exemplary embodiment.

Specifically, the values of the window width values $W_1, W_2$ as the calculation condition of the window width value $W(\theta)$ of the image filter are changed to decrease the window width value $W(\theta)$ of the image filter so as to make the image filter value small. Note here that the window width value $W_1$ is the window width value of the image filter defined arbitrarily for the threshold value $\beta_1$ of the 3D crosstalk amount, and the window width value $W_2$ is the window width value of the image filter defined arbitrarily for the threshold value $\beta_2$ of the 3D crosstalk amount.

The image filtering processing unit 106 has a function which performs the image filtering processing on the image data on which the parallax adjustment processing is performed by the parallax adjustment processing unit 121 according to the image filter value calculated by the image filter value calculating unit 104. In the image filtering processing, convolution of the image filter value is executed on each of the pixels of the image data as in the case of the first exemplary embodiment.

Further, as in the case of the first exemplary embodiment, the seventh exemplary embodiment can be applied to stereoscopic image display devices of various naked-eye stereoscopic types such as a multi-viewpoint type and an integral type. Naturally, it is possible to provide the image processing unit 157 of the seventh exemplary embodiment as an independent image processing device, and to achieve the function of the stereoscopic image display device 17 by combining it with the stereoscopic display panel 107 and the like.

Figure 83:
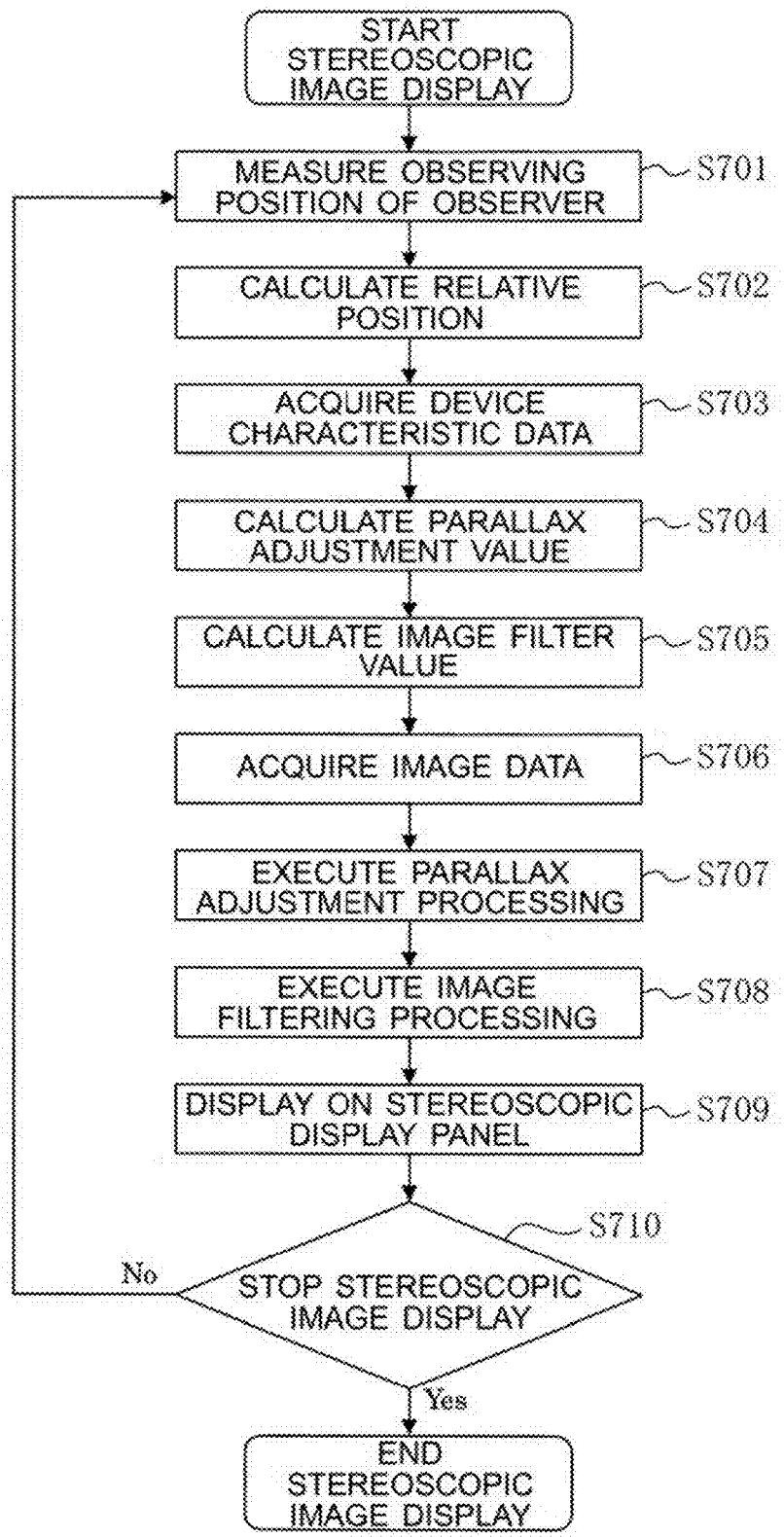
FIG. 83 is a flowchart of a stereoscopic image processing method.
Figure 84:
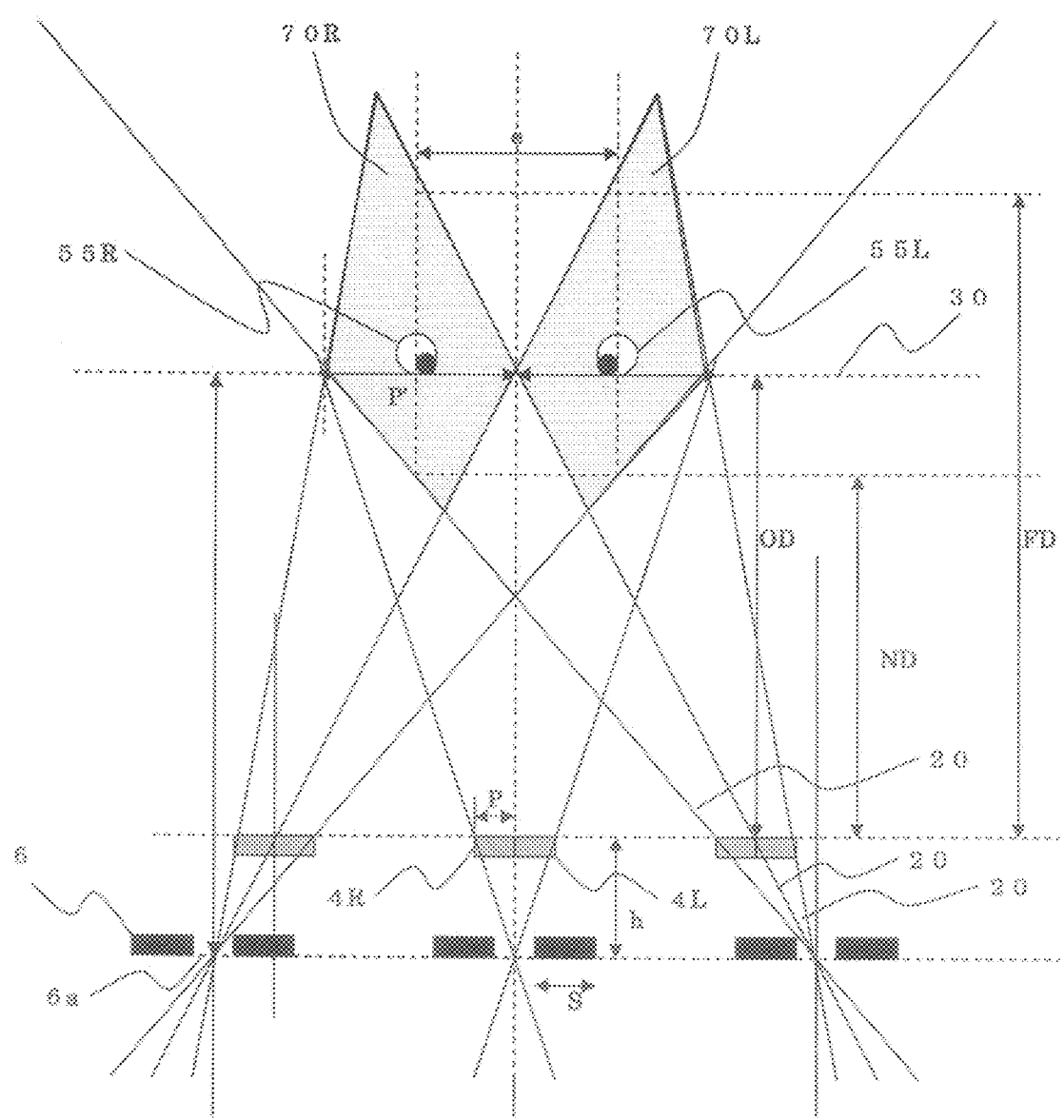
FIG. 84 is an optical model chart of a parallax barrier.
Figure 85:
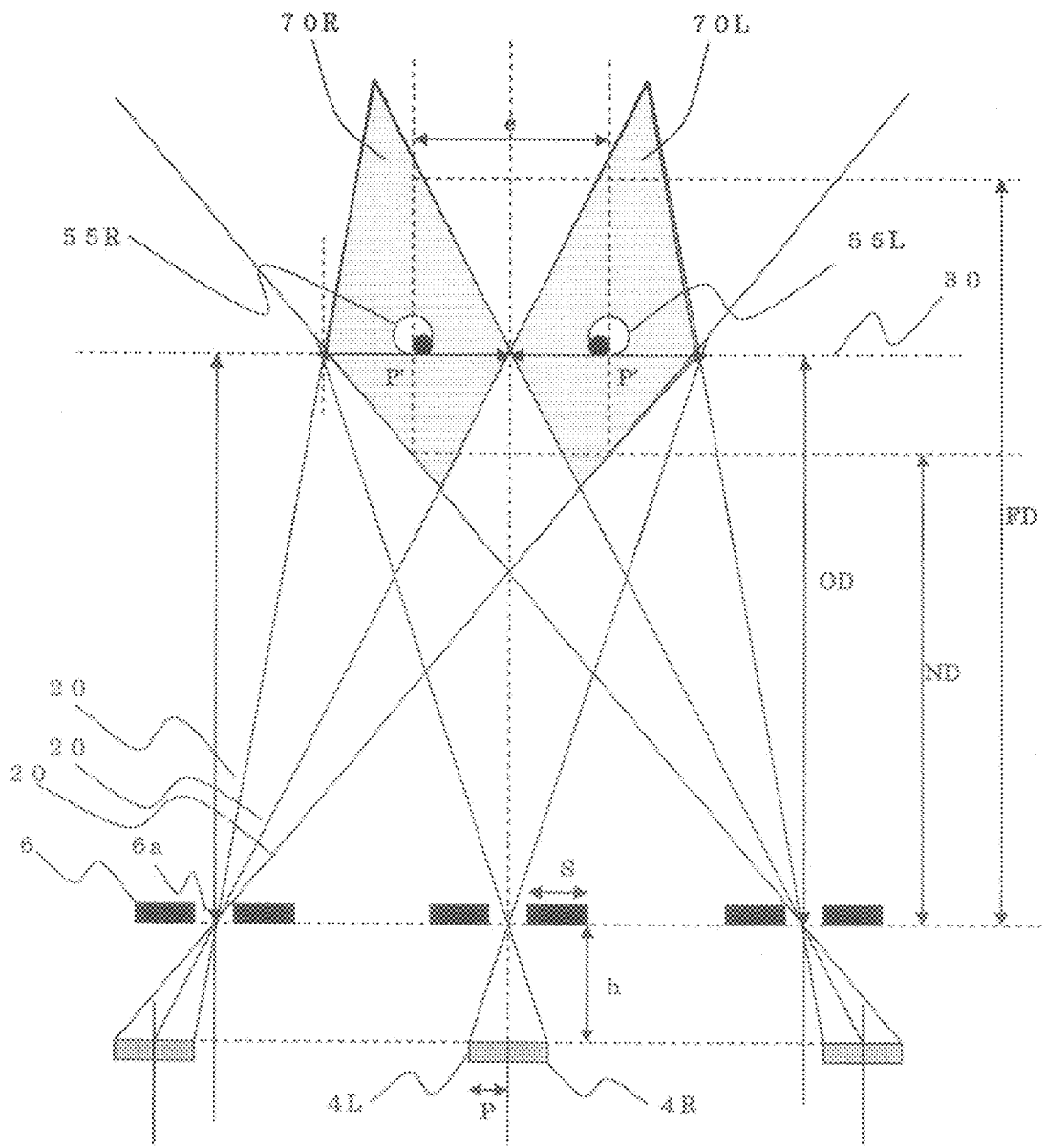
FIG. 85 is an optical model chart of a parallax barrier.

A flowchart of the stereoscopic image processing method used in the stereoscopic image display device 17 according to the seventh exemplary embodiment will be described by referring to FIG. 83.

In step S701 to step S703, the same processing as that of the first exemplary embodiment is performed.

In step S704, the parallax adjustment amount for the viewing angle θp as the relative position calculated in step S702 is calculated by using the parallax adjustment amount calculating unit 120 from the 3D crosstalk characteristic data acquired in step S703.

In step S705, the image filter value is calculated by acquiring the window width value Wp of the image filter for the viewing angle θp as the relative position calculated in step S702, from the 3D crosstalk characteristic data acquired in step S703, by using the image filter value calculating unit 104.

In step S706, the same processing as that of step S105 of the flowchart of the first exemplary embodiment is performed.

In step S707, the parallax adjustment processing is performed on the image data acquired in step S706 according to the parallax adjustment amount calculated in step S704.

In step S708, the image filtering processing is performed on the image data on which parallax adjustment processing is performed in step S707 according to the image filter value calculated in step S705.

In step S709 and step S710, the same processing as that of the processing of step S107 and step S108 according to the first exemplary embodiment is performed.

As described above, it is possible to provide the stereoscopic image display device and the stereoscopic image processing method with which the influence of the CT-image by the 3D crosstalk is lightened so that a sense of discomfort is not felt by the observer through performing the parallax adjustment processing in addition to the image filtering processing. Further, the image blurring amount by the image filtering processing is adjusted in accordance with the decrease of the parallax value by the parallax adjustment processing, so that it is possible to provide the stereoscopic image display device and the stereoscopic image processing method having a function which informs the observer that the parallax value of the stereoscopic image contents is decreased by the parallax adjustment processing.

In other words, the stereoscopic image display device according to the seventh exemplary embodiment includes: the observer position measuring unit which measures the observing position of the observer; the relative position calculating unit which calculates the relative position between the observing position of the observer and the position of the stereoscopic display panel; the device characteristic data saving unit which saves the device characteristic data for the viewing angles of the stereoscopic display panel; the parallax adjustment value calculating unit which calculates the parallax adjustment value suited for stereoscopic image display with respect to the viewing angle based on the device characteristic data; the image filter value calculating unit which calculates the image filter value from the parallax adjustment value; the image data saving unit which saves or receives the image data; the parallax adjustment processing unit which performs the parallax adjustment processing of the image data according to the parallax adjustment value; the image filtering processing unit which performs the image filtering processing on the image data according to the image filter value; and the stereoscopic display panel unit which projects the image data on which the image filtering processing is performed to the right eye and the left eye according to the relative position.

It is possible with the seventh exemplary embodiment to overcome the issues by providing the stereoscopic image display device and the stereoscopic image processing method with which the influence of the CT-image by the 3D crosstalk is lightened so that a sense of discomfort is not felt by the observer, through performing the parallax adjustment processing in addition to the image filtering processing.

Eighth Exemplary Embodiment

It is an exemplary object of an eighth exemplary embodiment to provide a stereoscopic image display device which not only lightens the CT-image by the 3D crosstalk but also presents the motion parallax according to the shift in the relative positions, through combining arbitrary viewpoint image generating processing executed according to the relative position between the observing position of the observer and the stereoscopic display panel with the image filtering processing.

Figure 88:
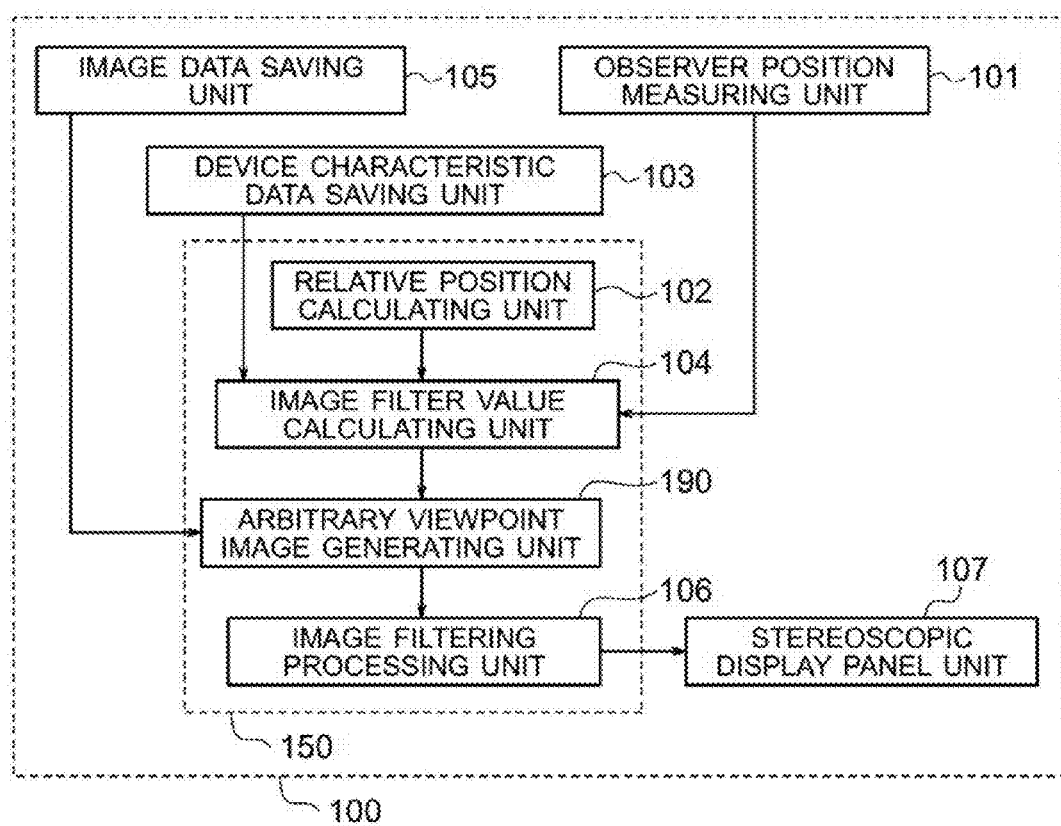
FIG. 88 is a block diagram showing a stereoscopic image display device according to an eighth exemplary embodiment.

FIG. 88 shows a block diagram of a stereoscopic image display device 100. The stereoscopic image display device 100 includes: an observer position measuring unit 101; a relative position calculating unit 102; a device characteristic data saving unit 103; an image filter value calculating unit 104; an image data saving unit 105; an image filtering processing unit 106; a stereoscopic display panel unit 107; and an arbitrary viewpoint image generating unit 190. Further, a processing unit that is an integration of the relative position calculating unit 102, the image filter value calculating unit 104, the image filtering processing unit 106; and the arbitrary viewpoint image generating unit 190 is referred to as an image processing unit 150.

Hereinafter, functions of each unit included in the stereoscopic image display device 100 will be described. The functions of the observer position measuring unit 101, the relative position calculating unit 102, the device characteristic data saving unit 103, the image filter value calculating unit 104, the image data saving unit 105, the image filtering processing unit 106, and the stereoscopic display panel unit 107 are the same as those of the first exemplary embodiment.

The arbitrary viewpoint image generating unit 190 has a function which calculates the viewpoint positions of the virtual cameras by referring to the relative position between the observing position of the observer and the stereoscopic display panel, and generates image data captured from the camera viewpoint positions for the stereoscopic image content acquired from the image data saving unit 105. The image filtering processing unit 106 performs the image filtering processing on the image data according to the image filter value calculated by the image filter value calculating unit 104, and takes the processed image data as the display target.

First, the relation regarding motion parallax and generation of the arbitrary viewpoint image will be described herein.

The motion parallax means that a stereoscopic object is visually recognized in a regularly changing manner in a specific direction when the observing position of the observer viewing the stereoscopic object is shifted. The change in the manner the stereoscopic object is observed according to the shift in the observing position is increased when the distance between the observer and the stereoscopic object is small, while the change in the manner the stereoscopic object is observed according to the shift in the observing position is decreased when the distance between the observer and the stereoscopic object is large. Thereby, the observer senses the distance between the observer and the stereoscopic object from the change in the manner the object is viewed, which is caused in accordance with the shift in the observing position of the observer.

Figure 89:
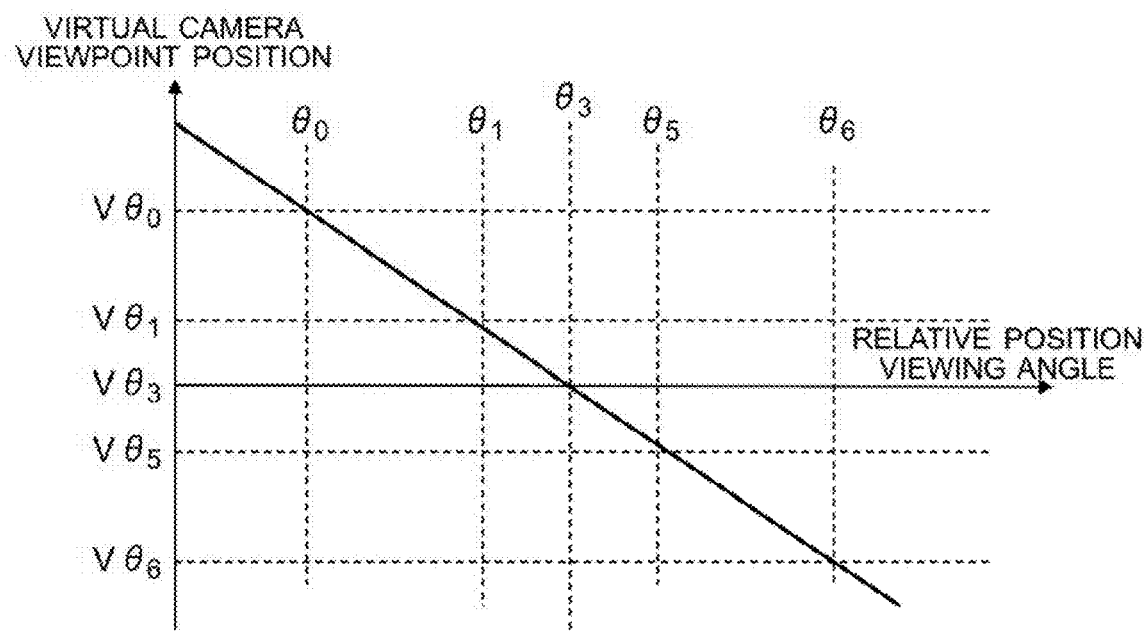
FIG. 89 is a chart showing virtual camera viewpoint positions with respect to the viewing angles.

With the stereoscopic image display device in general, image data of different parallaxes is projected to the left and right eyes of the observer to present binocular parallax. In systems such as multi-viewpoint system and integer system which spatially project images of plural viewpoints, the motion parallax can be recognized when the observer shifts the position in addition to the binocular parallax. In the meantime, in a case where there is no binocular parallax, i.e., in a case where image data of same parallax is projected to the left and right eyes of the observer, it is also possible to present the motion parallax by displaying the image data in accordance with the movement of the observer. FIG. 89 shows the relation between the viewpoint positions of the virtual cameras and the viewing angles in such case. The longitudinal axis of FIG. 89 shows the viewpoint positions of the virtual cameras set when acquiring the image data from the stereoscopic image content, and the lateral axis shows the viewing angles calculated from the relative positions between the observing positions of the observer and the stereoscopic display panel. $V\theta_0$ to $V\theta_6$ on the longitudinal axis and $\theta_0$ to $\theta_6$ on the lateral axis will be described later.

Figure 90:
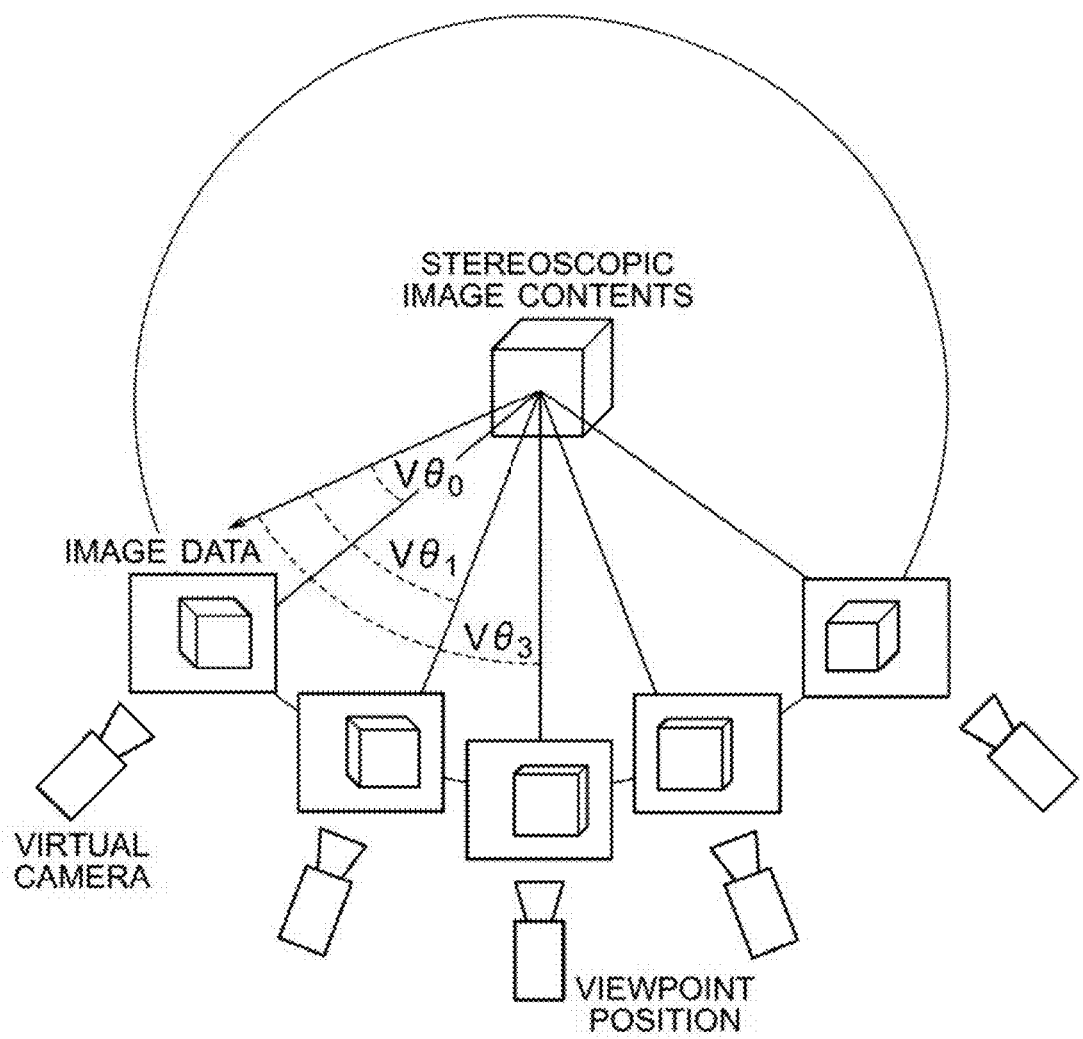
FIG. 90 is a conceptual diagram of a stereoscopic image content and the virtual camera viewpoint positions.

FIG. 90 shows a conceptual chart regarding the viewpoint positions of the virtual cameras. There is a stereoscopic image content in the center part of FIG. 90, and virtual cameras are placed in the surroundings thereof. The image data at arbitrary viewpoint positions is acquired by capturing the stereoscopic image content from the viewpoint positions ($V\theta_0, V\theta_1, V\theta_3, V\theta_5, V\theta_6$) where the virtual cameras are placed. The virtual camera viewpoint position information may be added to the image data as the attribute information of the image data.

While the case where the virtual cameras are placed in a circular form in the surroundings of the stereoscopic image content is shown in FIG. 90, the virtual cameras may be placed in a globular form or the distance between the stereoscopic image content and the virtual cameras may be changed arbitrarily. Through placing the virtual cameras in such manner, it is possible to acquire image data of the stereoscopic image content captured from arbitrary viewpoint positions on a three-dimensional space. The viewpoint positions of the virtual cameras of FIG. 90 are expressed as the angle $V\theta$ on a plane of the X-axis-Z-axis, the angle Vq on a plane of the Y-axis-Z-axis, and the distance VR from the viewpoint positions of the virtual cameras to the center position of the stereoscopic display panel.

Figure 91:
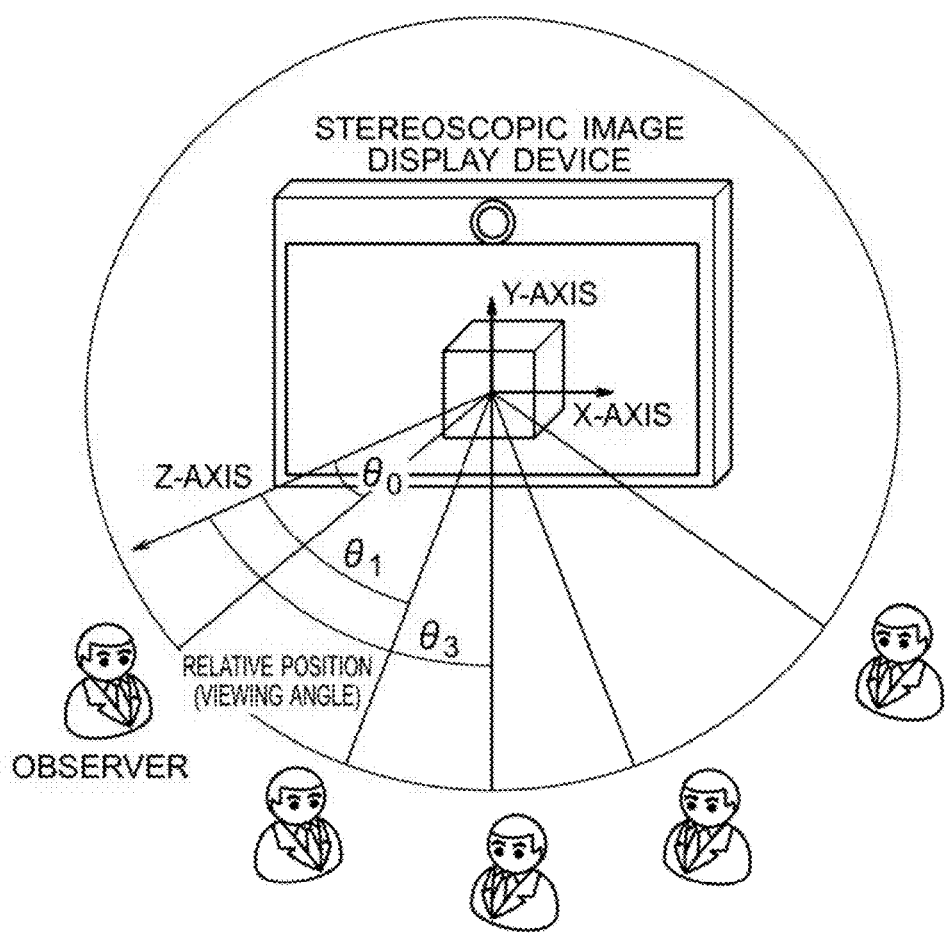
FIG. 91 is a conceptual diagram of the stereoscopic image display device and the viewing angles.

FIG. 91 shows a conceptual chart regarding relative positions between the observing positions of the observer and the stereoscopic image display panel of the stereoscopic image display device. The stereoscopic image content of FIG. 90 is displayed on the place of the stereoscopic display panel of FIG. 91. As in the case of the first exemplary embodiment, regarding the relative positions, the angles of the relative positions on the plane of the X-axis-Z-axis are expressed as the viewing angles $\theta$. Further, the angles on the plane of the Y-axis-Z-axis are expressed as viewing angles $\phi$, and the length from the viewpoint positions of the virtual cameras to the center position of the stereoscopic display panel is expressed as the distance R.

The coordinate axes of FIG. 90 and FIG. 91 are aligned from the positional relation between the stereoscopic image content displayed on the stereoscopic display panel plane and the position of the stereoscopic display panel to associate the viewpoint positions ($V\theta_0, V\theta_1, V\theta_3, V\theta_5, V\theta_6$) of the virtual cameras in FIG. 90 with the relative positions ($V\theta_0, V\theta_1, V\theta_3, V\theta_5, V\theta_6$) in FIG. 91. FIG. 89 shows the relationship therebetween. While FIG. 89 shows the case of the angle $V\theta$ on the plane of the X-axis-Z-axis with respect to the viewing angles $\theta$ of the relative position, the angle $V\phi$ on the plane of the Y-axis-Z-axis with respect to the viewing angles $\phi$ of the relative position, and the distance VR from the viewpoint positions of the virtual cameras to the center position of the stereoscopic display panel with respect to the distance R of the relative position can be also shown with the similar relationship.

Thereby, the observer recognizes the image data that regenerates the change in the manner the stereoscopic object is actually viewed when the relative position is shifted, so that the observer senses the motion parallax. The method for presenting the motion parallax at the viewing angles $\phi$ on the plane of Y-Z axis is also the same as the case of viewing angles $\theta$ on the plane of the X-Y axis. Further, through changing the distance VR from the viewpoint positions of the virtual cameras to the center position of the stereoscopic display panel (may change the display magnification of the stereoscopic image content displayed in the image data) in accordance with the change in the distance from the observing position of the observer to the stereoscopic display panel, it is possible to present the motion parallax in accordance with the change in the distance of the relative positions. While the method for presenting the motion parallax is shown form the relational chart of FIG. 89, the image data of the same parallax is shown on the left and right eyes of the observer with the presenting method of FIG. 89. Thus, the binocular parallax cannot be presented. The above is the explanation regarding the relation between the motion parallax and generation of the binocular parallax.

The eighth exemplary embodiment shows the structure which presents the binocular parallax and the motion parallax to the observer.

For presenting the binocular parallax in the stereoscopic image display device, the left-eye image and the right-eye image as the image data of different parallaxes are displayed for the left and right eyes of the observer as in the case of the first exemplary embodiment.

Figure 92:
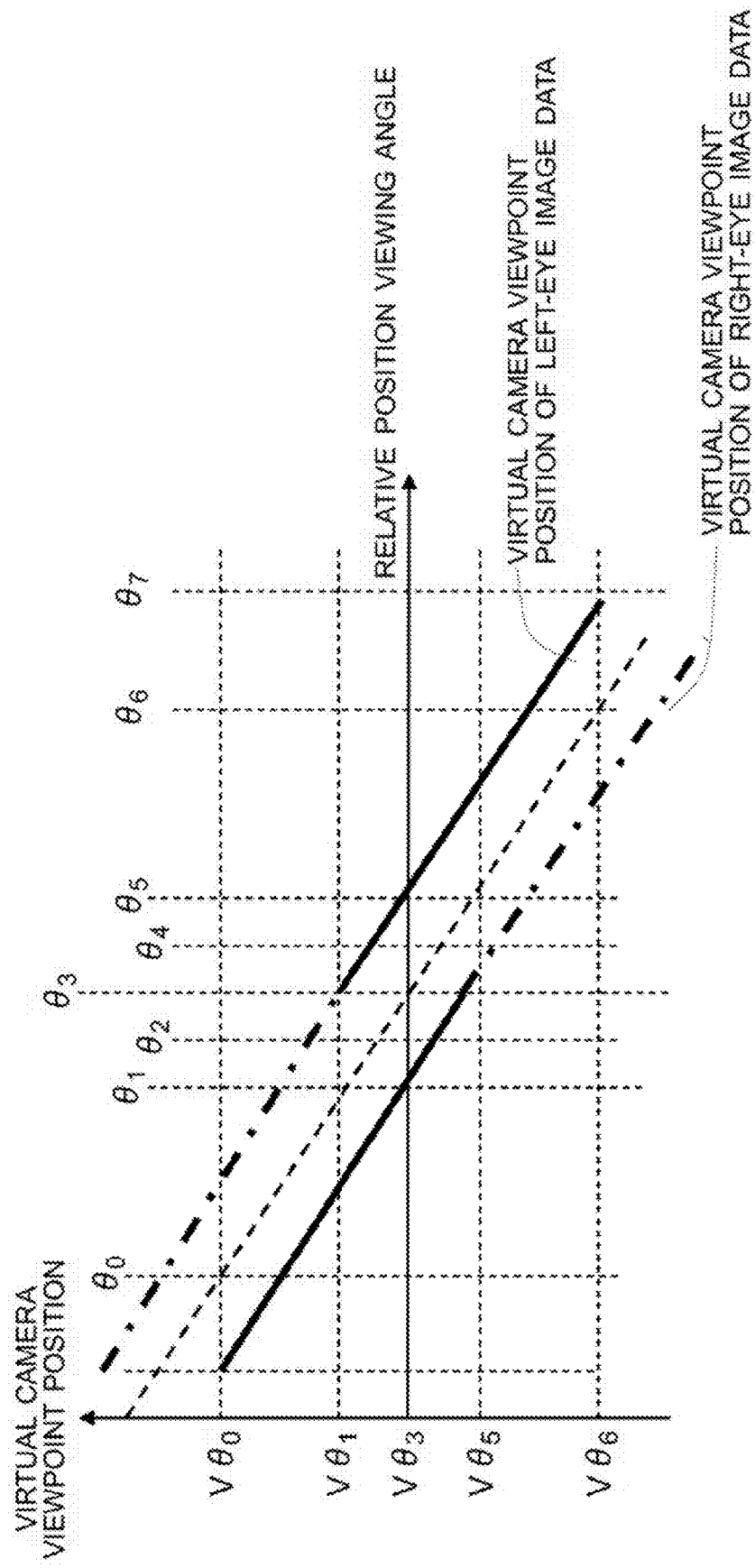
FIG. 92 is a chart showing virtual camera viewpoint positions with respect to the viewing angles.

Specifically, when the viewpoint positions of the virtual cameras capturing the right-eye image data and the viewpoint positions of the virtual cameras capturing the right-eye image data are separated by considering the space between the both eyes of the observer, the relation of the virtual camera viewpoint positions with respect to the viewing angles by considering the parallax of both eyes as shown in FIG. 92 can be acquired with respect to the relation of the virtual camera viewpoint positions for the viewing angles as shown in FIG. 89. The black line in FIG. 92 shows the virtual camera viewpoint position at the time of capturing the left-eye image data of the observer, the alternate long and short dash line shows the virtual camera viewpoint position at the time of capturing the right-eye image data of the observer. Note here that the difference between the viewpoint positions of the virtual cameras for the left eye and for the right eye is adjusted to be equivalent to the parallax value of the image data.

Figure 93:
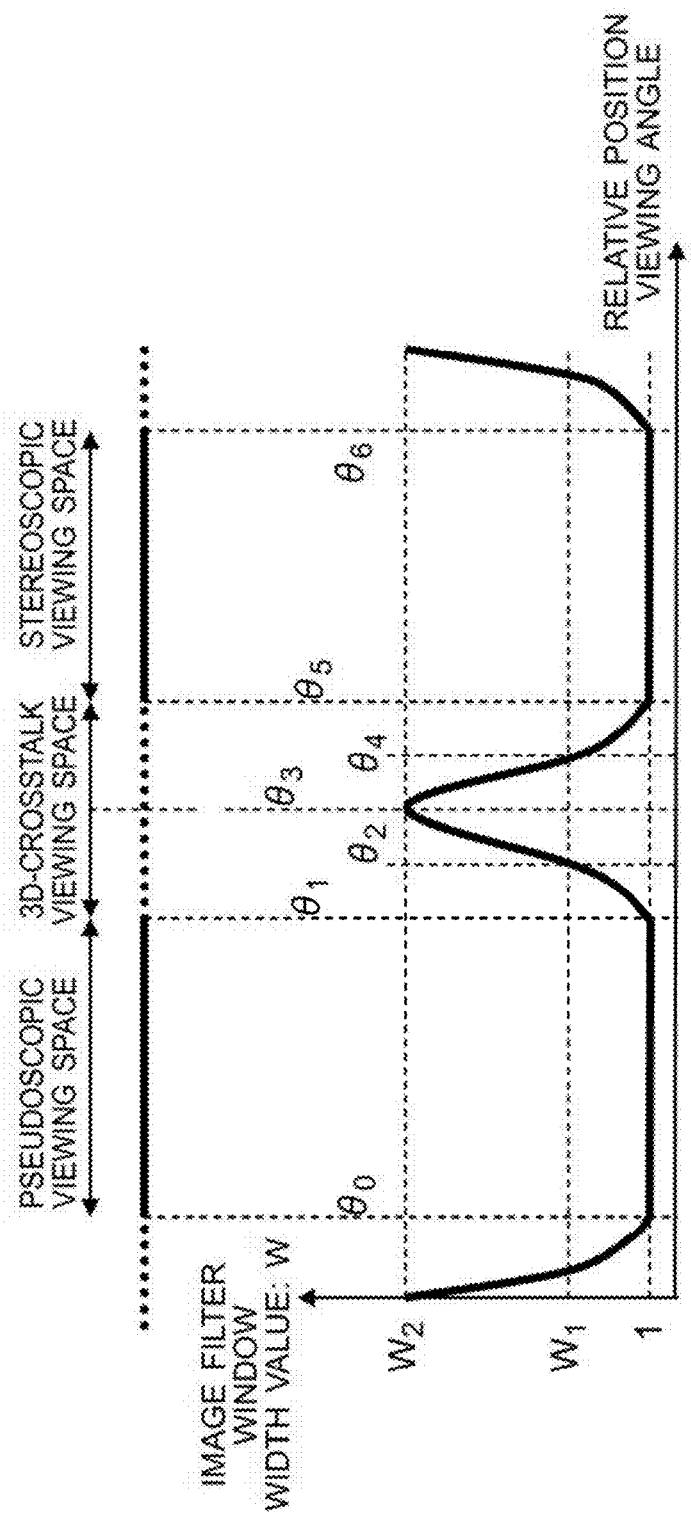
FIG. 93 is a chart showing window width values of an image filter with respect to the viewing angles.

Further, FIG. 93 shows the calculation result of the window width value of the image filter with respect to the viewing angles shown in FIG. 12 of the first exemplary embodiment. The image filtering processing unit 106 of the eighth exemplary embodiment performs the image filtering processing on the image data captured at the viewpoint positions of the virtual cameras shown in FIG. 92 according to the window width values of the image filter shown in FIG. 93. In FIG. 92 and FIG. 93, the image filtering processing is performed by setting the window width of the image filter as $W_2$ at the viewing angle $\theta_3$ where the 3D crosstalk amount becomes large and by setting the window width of the image filter as $W_1$ at the viewing angles $\theta_2$ and $\theta_4$ where the 3D crosstalk amount becomes slightly large. Thereby, it is possible to lighten the influence of the CT-image by the 3D crosstalk through adjusting the image blurring amount in accordance with the 3D crosstalk amount as in the case of the first exemplary embodiment.

As described in the first exemplary embodiment, the influence of the reverse vision may be overcome by switching the right-eye image and the left-eye image and displaying those images in the pseudoscopic viewing space of the stereoscopic display panel. Thus, in FIG. 92, the viewpoint positions of the virtual cameras for the left eye and for the right eye in the pseudoscopic viewing space are switched from those of the virtual cameras for the left eye and for the right eye in the stereoscopic viewing space.

Figure 94:
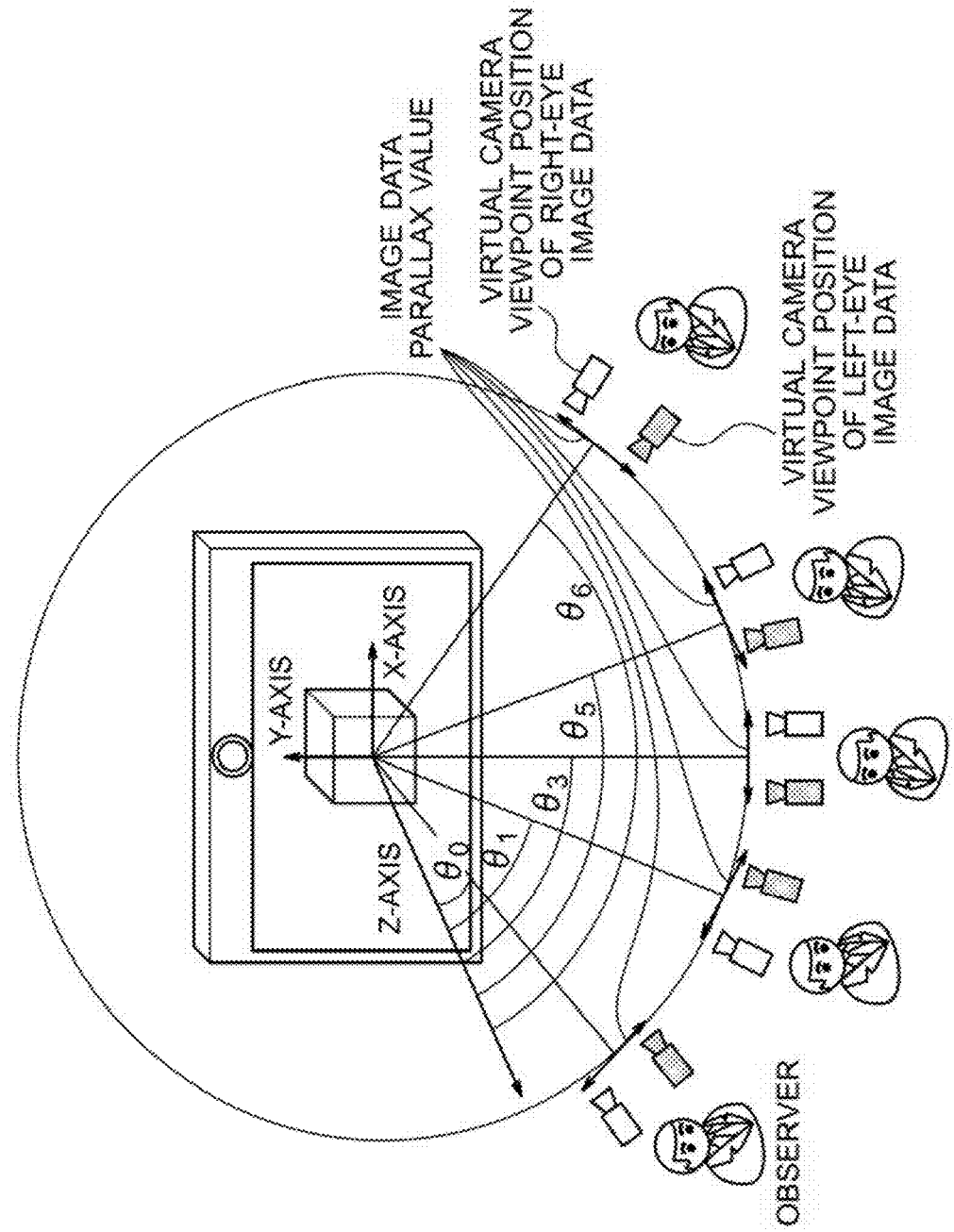
FIG. 94 is a chart showing virtual camera viewpoint positions with respect to the viewing angles.

FIG. 94 shows a conceptual chart regarding the relation between the virtual camera viewpoint positions and the viewing angles. The gray cameras in FIG. 94 show the virtual camera viewpoint positions at the time of capturing the image data for the left eye of the observer, and the white cameras show the virtual camera viewpoint positions at the time of capturing the image data for the right eye of the observer. Note here that the virtual camera viewpoint positions for the left eye and for the right eye at the viewing angles $\theta_0$ and $\theta_1$ as the pseudoscopic viewing space are the positions switched from those of the virtual cameras for the left eye and for the right eye at the viewing angles $\theta_5$ and $\theta_6$ as the stereoscopic viewing space.

Further, the difference between the viewpoint position of the virtual camera for the left eye and the viewpoint position of the virtual camera for the right eye is the parallax value of the image data.

Figure 95:
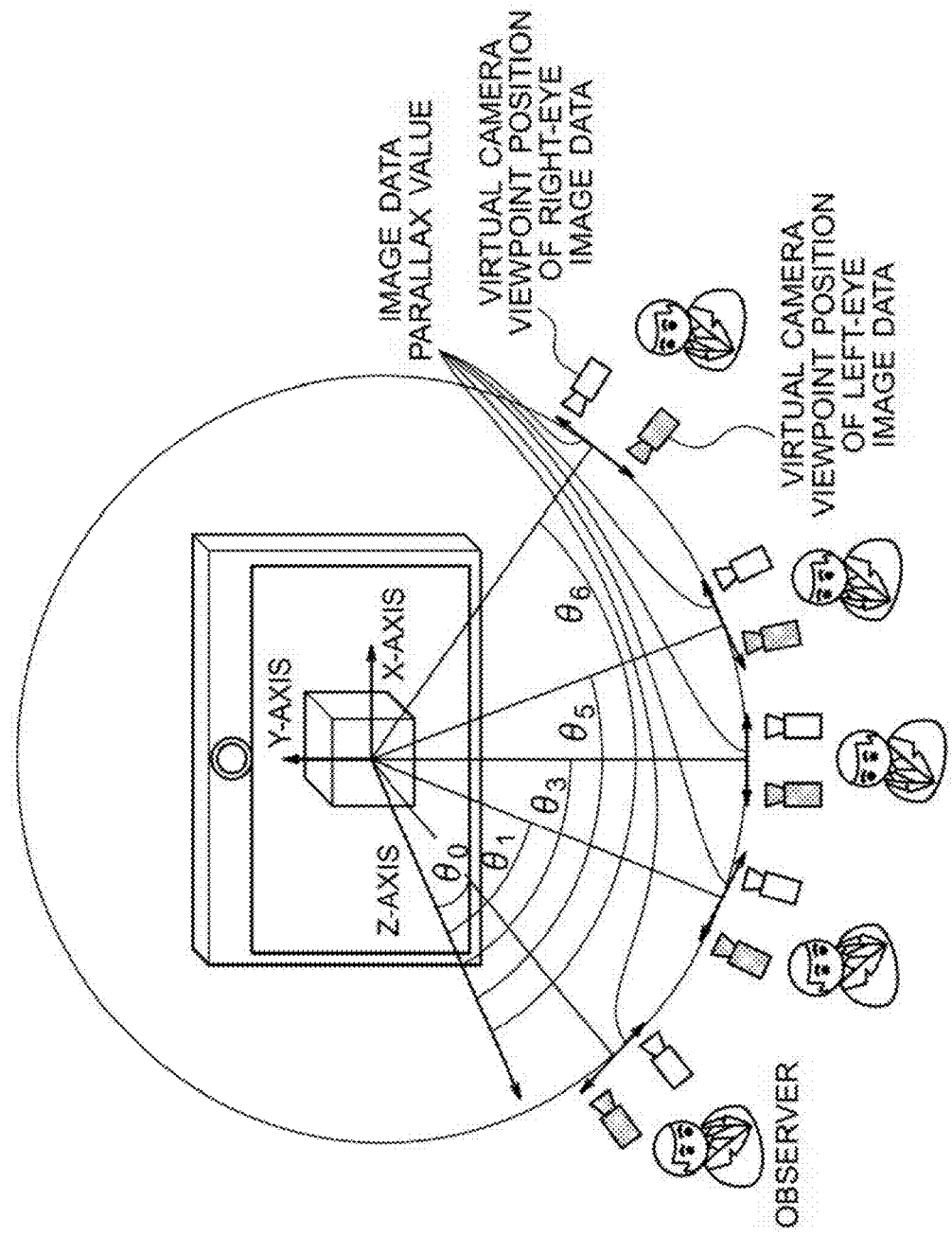
FIG. 95 is a chart showing virtual camera viewpoint positions with respect to the viewing angles.

In FIG. 94, the viewpoint positions of the virtual cameras for the left eye and for the right eye are switched in the viewing angle range to be the pseudoscopic viewing space of the stereoscopic display panel in the arbitrary viewpoint image generating unit 190 shown in FIG. 88. However, it is not the only way. For example, it is possible to generate the image without switching the viewpoint positions of the virtual cameras for the left eye and for the right eye as shown in FIG. 95. In that case, the image filtering processing unit 106 may switch the left-eye image and the right-eye image in the viewing angle range of the pseudoscopic viewing space of the stereoscopic display panel.

In FIG. 92 showing the relation of the virtual camera viewpoint positions with respect to the viewing angles considering the parallax of both eyes, shown is the case of using two virtual cameras at each viewpoint. However, the number of the virtual cameras is not limited to that. The embodiment can be applied also to the cases of three or more virtual cameras.

The number of the virtual cameras corresponds to the number of viewpoint areas of the stereoscopic display panel. In general, a naked-eye type stereoscopic image display device projects images of different parallaxes to the left and right eyes of the observer through dividing the spatial areas for projecting the stereoscopic image by the stereoscopic display panel and projecting images of different parallaxes to each of the divided spatial areas. The spatial area divided by the stereoscopic display panel is referred to as a viewpoint area. In the first exemplary embodiment, there are two viewpoint areas in total, i.e., the left-eye area and the right-eye area, as described in FIG. 5 as the examples of the two-viewpoint stereoscopic display panel. Further, a four-viewpoint stereoscopic display panel has four viewpoint areas in total, i.e., viewpoint areas for displaying the first, second, third, and fourth viewpoint images, as described in FIG. 24.

Figure 96:
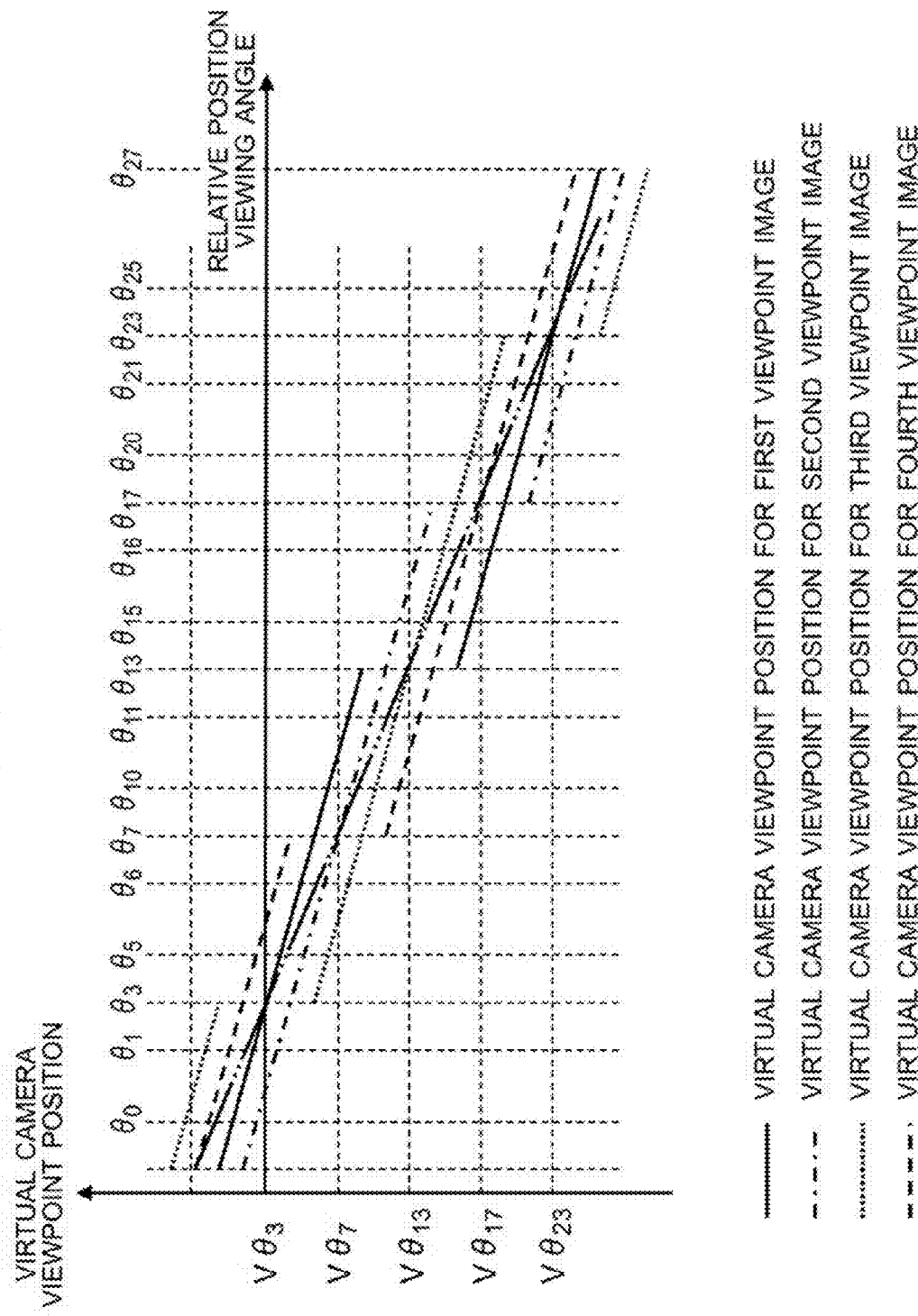
FIG. 96 is a chart showing viewpoint positions of a four-viewpoint virtual camera with respect to the viewing angles.

FIG. 96 shows the viewpoint positions of the virtual cameras with respect to the viewing angles when using four virtual cameras.

Further, reverse vision may be prevented by detecting the virtual camera which captures an image that is not projected to the observer from the virtual cameras of N-viewpoints by referring to the viewing angles showing the relative position between the observer and the stereoscopic display panel and uncontinuously shifting the viewpoint position of the detected virtual camera in the relative position. For example, at the viewing angle $\theta_{13}$ of FIG. 96, the image captured by the virtual camera for the first viewpoint is not projected to the observer. Thus, the viewpoint position of the virtual camera for the first viewpoint is changed at the viewing angle $\theta_{13}$ largely to shift the viewpoint position of the detected virtual camera uncontinuously. Through uncontinuously shifting the viewpoint position of the detected virtual camera as described above, it is possible to display the stereoscopic image without having reverse vision not only between the first viewpoint and the second viewpoint, between the second and the third, between the third and fourth but also between the fourth and first viewpoints.

The feature of this case considering the relation with the case of FIG. 88 is as follows.

The arbitrary viewpoint image generating unit 190 prevents projection of reverse vision images to the observer through detecting the virtual camera which captures an image that is not projected to the observer from the virtual cameras of N-viewpoints by referring to the relative positions calculated by the relative position calculating unit 102 and uncontinuously shifting the viewpoint position of the detected virtual camera in the relative position.

As described above, it is possible with the eighth exemplary embodiment to present the binocular parallax and the motion parallax through displaying the image data acquired by changing the virtual camera viewpoint positions according to the viewing angle of the relative position between the observing position of the observer and the stereoscopic display panel as in the case of the above-described first exemplary embodiment.

Figure 97:
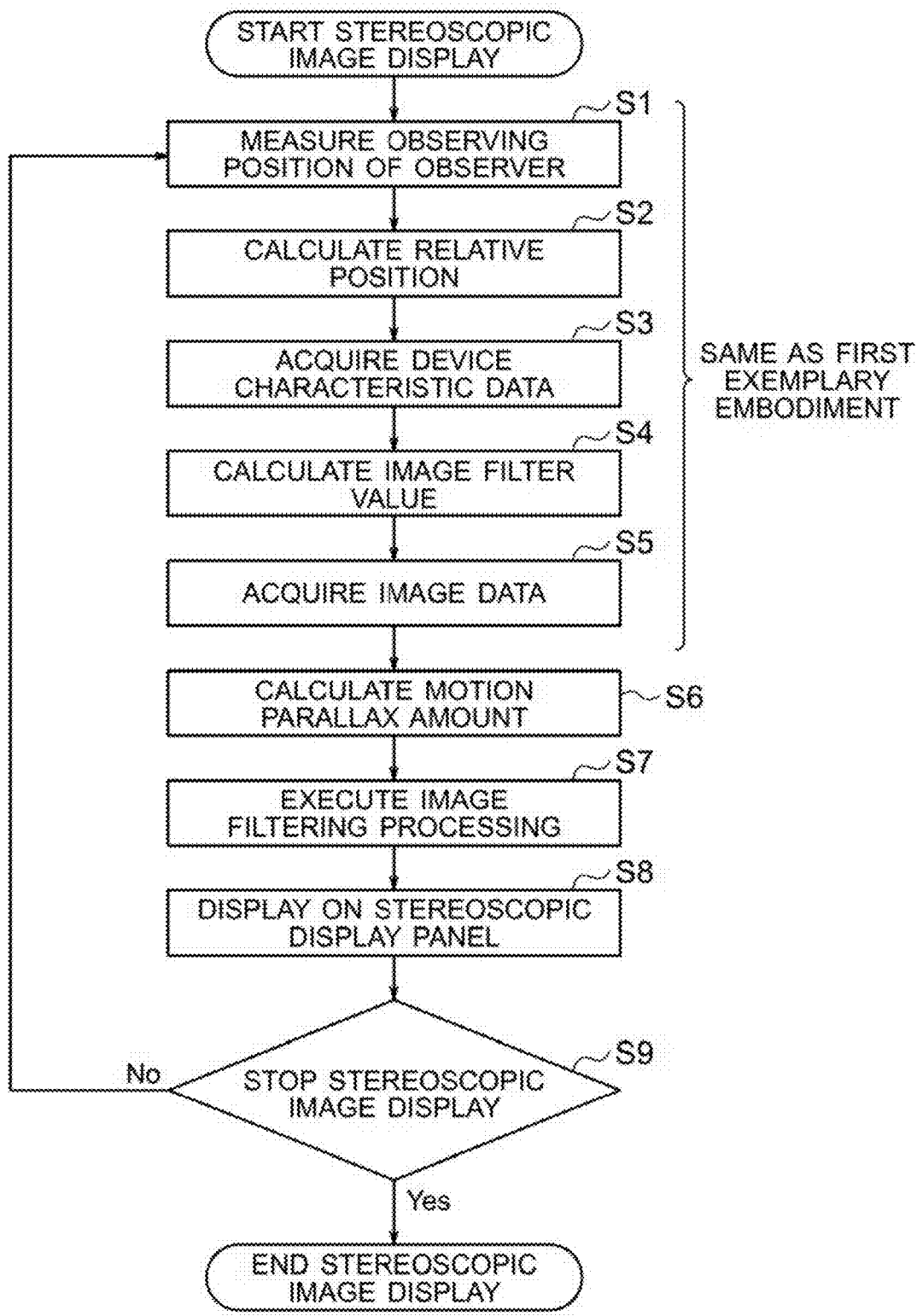
FIG. 97 is a flowchart of a stereoscopic image processing method.

A flowchart of the stereoscopic image processing method used in the stereoscopic image display device according to the eighth exemplary embodiment will be described by referring to FIG. 97. In step 1 to step 5 in the flowchart of FIG. 97, the same processing as that of the first exemplary embodiment is performed.

In step 6, the virtual camera viewpoint positions at the time of acquiring the image data from the stereoscopic image content is calculated as the motion parallax by using the arbitrary viewpoint image generating unit 190 by referring to the relative position calculated in step 2.

In step 7, the image filtering processing is performed on the image data captured at the virtual camera viewpoint position calculated in step 6 according to the image filter value calculated in step 4.

In step 8 to step 9, the same processing as that of step 107 to step 108 of the first exemplary embodiment is performed.

While FIG. 92 shows the case of the angle VA on the plane of the X-axis-Z-axis with respect to the viewing angles $\theta$ of the relative position, the same applies also to the case of the angle Vq on the plane of the Y-axis-Z-axis with respect to the viewing angles $\phi$ of the relative position. In a case of a stereoscopic image display device only with horizontal parallax, the use of horizontal/vertical parallax image Vq makes it easy to achieve horizontal/vertical parallax.

As described above, it is possible to provide the stereoscopic image display device with which not only the influence of the CT-image by the 3D crosstalk is lightened but also the motion parallax and the binocular parallax of the stereoscopic image content according to the shift of the relative position can be presented through displaying the image data of arbitrary viewpoint positions according to the relative position between the observing position of the observer and the stereoscopic display panel.

The case of placing the virtual cameras in the surroundings of the stereoscopic image content and using the image data acquired by capturing the stereoscopic image content from arbitrary viewpoint positions is shown in the exemplary embodiment described above. However, there may be cases where the image data of only two viewpoints in total, i.e., one viewpoint for the left-eye image and one viewpoint for the right-eye image, can be used depending on the environment for capturing the stereoscopic image content.

In such case, it is possible to generate the image data captured from the viewpoint positions within the range between the two viewpoints by using the image data of the total of two viewpoints with the use of the image data arbitrary viewpoint image generating unit 190. However, it is difficult to generate the image data captured from the viewpoint positions outside the range between the two viewpoints. Therefore, in a case where used is only the image data of the two viewpoints in total, it is necessary to present the motion parallax by using only the image data captured within the range between the two viewpoints.

Figure 98:
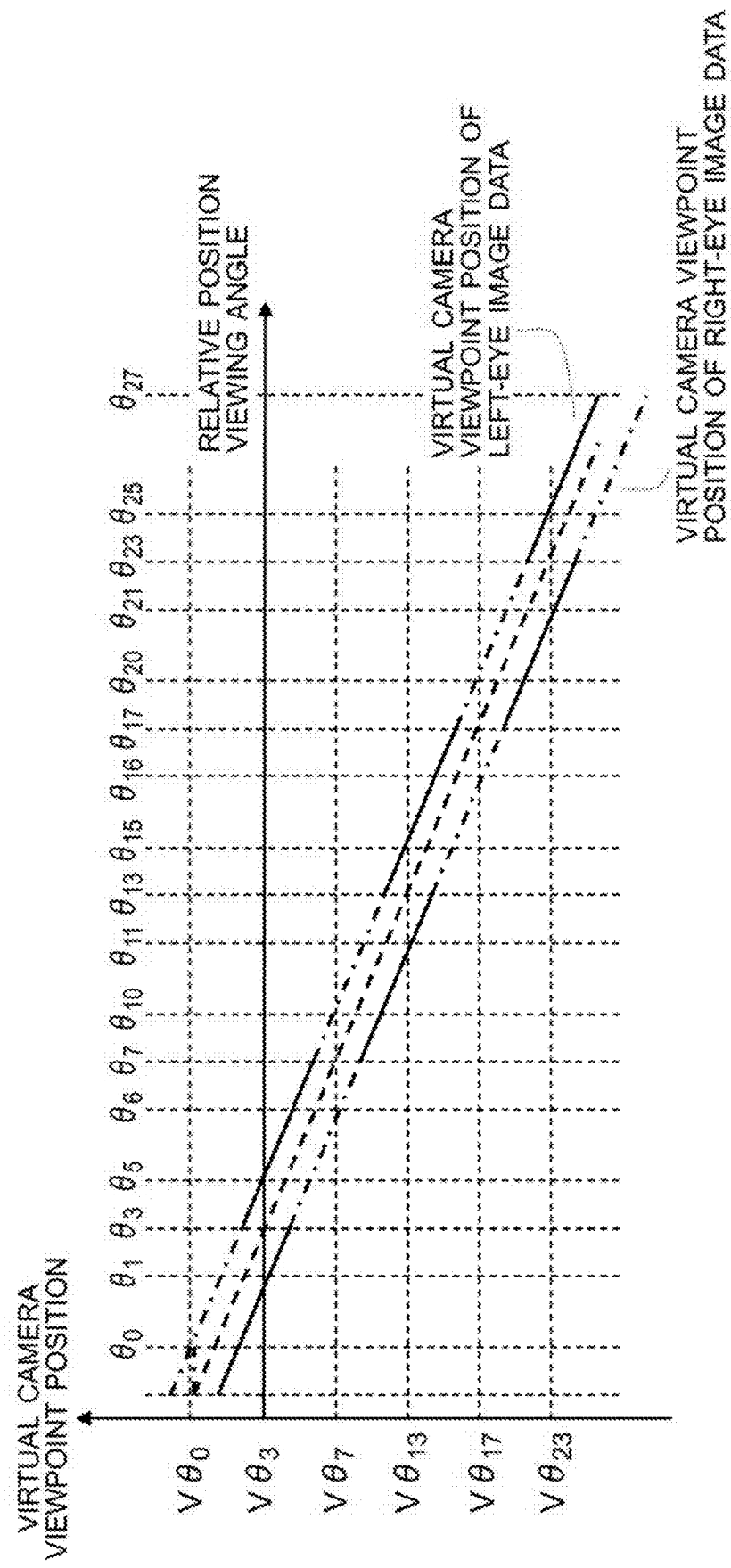
FIG. 98 is a chart showing virtual camera viewpoint positions with respect to the viewing angles.
Figure 99:
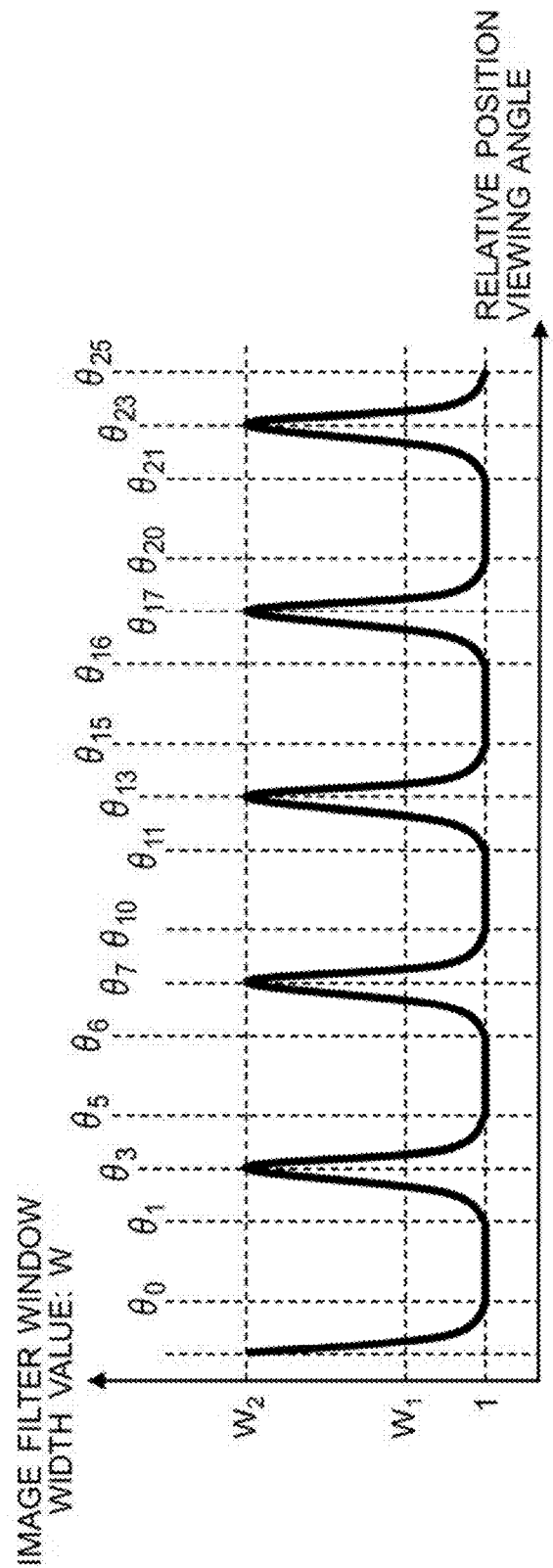
FIG. 99 is a chart showing window width values of an image filter with respect to the viewing angles.

FIG. 98 shows the relation between the viewpoint positions of the virtual cameras and the viewing angles of a case where the image data of all the arbitrary viewpoint positions can be used, and FIG. 99 shows the relation between the window width value of the image filter and the viewing angle. The relational charts in the range of viewing angles $\theta_0$ to $\theta_7$ in FIG. 98 and FIG. 99 are the same as the relational charts of FIG. 92 and FIG. 93. The image data of the virtual camera viewpoint positions at the angles of $V\theta_0$ to $V\theta_7$ is displayed in the range of viewing angles $\theta_0$ to $\theta_7$ in FIG. 98, the image data of the virtual camera viewpoint positions at the angles of $V\theta_7$ to $V\theta_{17}$ is displayed in the range of viewing angles $\theta_7$ to $\theta_{17}$, and the image data of the virtual camera viewpoint positions at the angles of $V\theta_{17}$ to $V\theta_{27}$ is displayed in the range of viewing angles $\theta_{17}$ to $\theta_{27}$.

Figure 100:
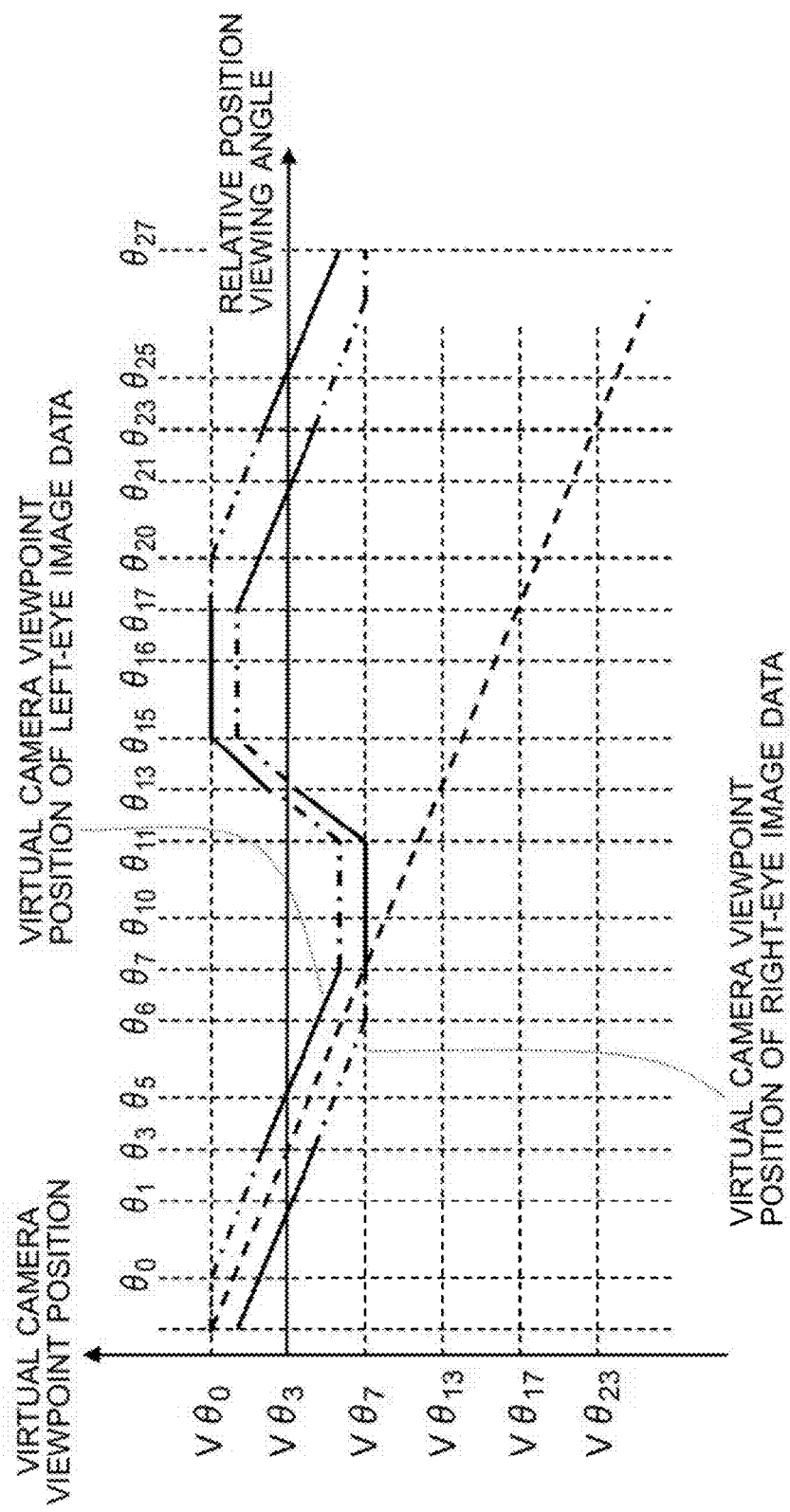
FIG. 100 is a chart showing virtual camera viewpoint positions with respect to the viewing angles.

Next, FIG. 100 shows the relation between the viewpoint positions of the virtual cameras and the viewing angles of a case where only the image data of two viewpoint positions in total can be used. Note here that the viewpoint positions of the virtual cameras for the image data of two viewpoints are defined as $V\theta_0$ and $V\theta_7$. The image data in the range of the virtual camera viewpoint positions $V\theta_0$ to $V\theta_7$ can be generated from the image data of the two viewpoints. Thus, the image data within the range between the viewpoints is used to present the motion parallax.

In the viewing angle range from $\theta_0$ to $\theta_7$ and the viewing angle range from $\theta_{17}$ to $\theta_{27}$ of FIG. 100, the image data in the range of the virtual camera viewpoint positions $V\theta_0$ to $V\theta_7$ is displayed. In the viewing angle range from $\theta_7$ to $\theta_{17}$, the viewpoint position of the virtual camera is shifted from $V\theta_7$ to $V\theta_0$. The shift of the viewpoint position may be performed only in the viewing angle range $\theta_{11}$ to $\theta_{16}$ in the center part of the viewing angle range $\theta_7$ to $\theta_{17}$. When the parallax value changes drastically, the viewing angle range to perform the shift of the viewpoint position may be expanded.

In the viewing angle range $\theta_{11}$ to $\theta_{16}$ to perform the shift of the viewpoint position, the motion parallax for the changes in the relative position becomes opposite. However, the motion parallax can be presented to the observer in the viewing angle range $\theta_0$ to $\theta_7$ and the viewing angle range $\theta_{17}$ to $\theta_{27}$. As described above, through repeatedly displaying the image data of arbitrary viewpoint images within the range of two viewpoints, it is possible to present the motion parallax to the observer in the range of many viewing angles even in the case where only the image data of two viewpoints in total can be used.

Figure 101:
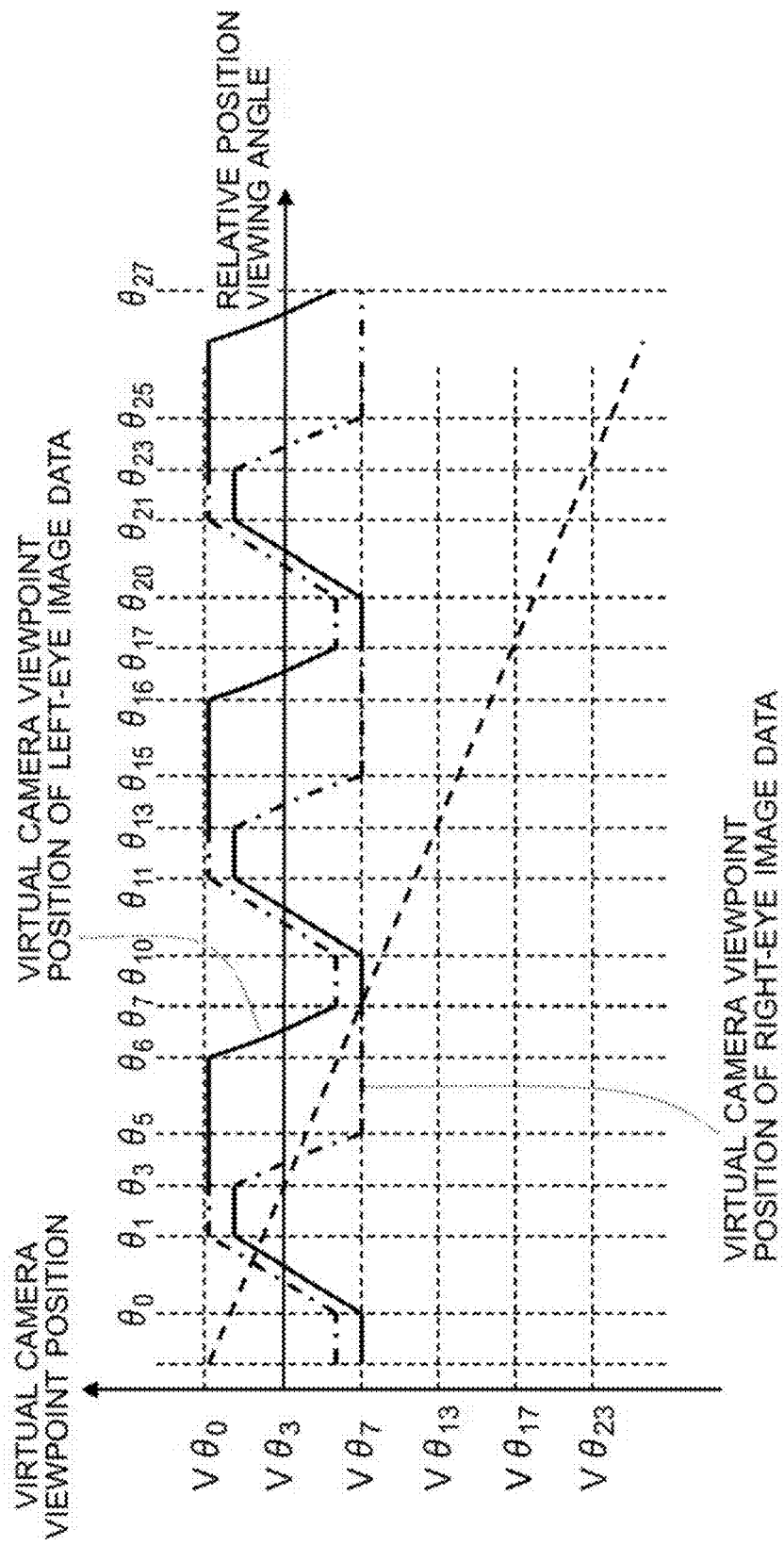
FIG. 101 is a chart showing virtual camera viewpoint positions with respect to the viewing angles.

Further, while FIG. 100 shows the case where the image data is repeatedly displayed in the viewing angle range $\theta_0$ to $\theta_7$ and the viewing angle range $\theta_{17}$ to $\theta_{27}$, the viewing angle range to be repeatedly displayed may be changed arbitrarily. FIG. 101 shows the relation between the viewpoint positions of the virtual cameras and the viewing angles when the viewing angle range to be repeatedly displayed is changed. In FIG. 101, the motion parallax is presented by repeatedly displaying the image data in the range of the virtual camera viewpoint positions $V\theta_0$ to $V\theta_7$ in the viewing angle range $\theta_3$ to $\theta_7$, the viewing angle range $\theta_{13}$ to $\theta_{17}$, and the viewing angle range $\theta_{23}$ to $\theta_{27}$ for the stereoscopic viewing space of the stereoscopic display panel.

The feature of this case considering the relation with the case of FIG. 88 can be summarized as follows. The arbitrary viewpoint image generating unit 190 detects the virtual camera viewpoint positions at the time of capturing each of the image data by referring to the left-eye image data and the right-eye image data saved in the image data saving unit 105, and generates the image data captured within the range between the viewpoint positions of the virtual cameras. Then, the motion parallax is presented to the observer through repeatedly displaying the generated image data by referring to the relative position calculated by the relative position calculating unit 102 even in a case where only the left-eye image and the right-eye image can be used.

As described above, it is possible to provide the stereoscopic image display device which not only lightens the CT-image by the 3D crosstalk in the range of many viewing angles but also presents the motion parallax and the binocular parallax of the stereoscopic image content according to the shift in the relative positions through repeatedly displaying the image data of the arbitrary viewpoint positions within the region between the two viewpoints even in the case where only the image data of two viewpoints in total can be used.

Other Exemplary Embodiments

While the case where the image filter value calculating unit 104 according to all the above-described exemplary embodiments calculates the image filter values by using the device characteristic data saved in the device characteristic data saving unit 103 is depicted above, the image filter value may be calculated without using the device characteristic data so that the image filter processing can be achieved even in a state where the device characteristic data cannot be acquired.

In this case, the precision of the image filter values is deteriorated compared to that of the image filtering processing of the case where the device characteristic data is used. However, through the use of the stereoscopic display panel having such stereoscopic display characteristic that the 3D crosstalk amount is small and the stereoscopic viewing space width is large, it is possible to perform the image filtering processing for lightening the influence of the CT-image by the 3D crosstalk in a practically useable level even when the observer shifts the position.

As an example of the case where the image filter values are calculated without using the device characteristic data, there is a case where the observer oneself sets the image filter values subjectively. As the first setting, the observer sets the stereoscopic viewing space, the 3D-crosstalk viewing space, and the pseudoscopic viewing space in accordance with the observing positions (the observing distance Z and the viewing angle θ) while observing the stereoscopic image projected from the stereoscopic display panel of the stereoscopic image display device. Note here that it is desirable to perform the setting at a plurality of observing positions in order to improve the precision of the image filter values. Further, for the setting, it is possible to use input devices such as a keyboard and a touch panel provided to the stereoscopic image display device.

As the second setting, at the center and far end positions of the 3D-crosstalk viewing space, the image filter values (the window width values of the image filter) with which the observer can sight the stereoscopic image content optimally are set. Further, as the third setting, the image filter values (the window width values of the image filter) with which the observer can sight the stereoscopic image content optimally may also be set in the vicinity of the middle position between the center position and the far end positions of the 3D-crosstalk viewing space (border position between the 3D-crosstalk viewing space and the stereoscopic viewing space). The image filter value calculating unit 104 calculates the image filter value for all the viewing angles through connecting the far end position of the 3D-crosstalk viewing space, the center position of the 3D-crosstalk viewing space for which the observer sets the image filter value, and the image filter value at the middle position between the center position and the far end position of the 3D-crosstalk viewing space by using the first, second, and third setting values. In FIG. 8, the center position 61, the far end positions 62, 63, and the middle positions 64, 65 described above are shown.

It is also possible to calculate the image filter values for all the viewing angles by connecting the image filter values of the stereoscopic viewing space, the 3D-crosstalk viewing space, and the pseudoscopic viewing space by using only the first and second settings described above. Further, the first, second, and third setting values may be saved in the device characteristic data saving unit 103 or may be stored in the image filter value calculating unit 104 by omitting the device characteristic data saving unit 103.

Another example for calculating the image filter values is as follows. Even in a case where the device characteristic data of the stereoscopic display panel 107 of the stereoscopic image display device which displays the stereoscopic image content is unknown, the device characteristic data of a plurality of stereoscopic display panels are saved in the device characteristic data saving unit 103 by associating them with the specification data such as the screen size of the stereoscopic display panel and the optimum viewing distance in advance, and the image filter values are calculated by acquiring the device characteristic data associated with the specification data similar to the specification data of the stereoscopic display panel used for display from the device characteristic data saving unit 103 when displaying the stereoscopic image content.

As described above, it is possible to provide the stereoscopic image display device and the stereoscopic image processing method with which the influence of the CT-image by the 3D crosstalk is lightened so that a sense of discomfort is not felt by the observer, through performing the image filtering processing by calculating the image filter values even when the device characteristic data of the stereoscopic display panel unit 107 of the stereoscopic image display device is unknown.

Here, the effects of each of the exemplary embodiments will be summarized. With the first to seventh exemplary embodiments, it is possible to provide the stereoscopic image display device and the stereoscopic image processing method with which the influence of the CT-image by the 3D crosstalk is lightened so that a sense of discomfort is not felt by the observer even when the observing position of the observer is shifted. In addition, with the first, second, third, fourth, and sixth exemplary embodiments, it is possible to provide the stereoscopic image display device and the stereoscopic image processing method with which the influence of the CT-image by the 3D crosstalk is lightened so that a sense of discomfort is not felt by the observer without using the parallax values of the stereoscopic image content. Furthermore, with the seventh exemplary embodiment, it is possible to provide the stereoscopic image display device and the stereoscopic image processing method which inform the observer that the parallax value of the stereoscopic image content is decreased by the parallax adjustment processing through performing image blurring on the stereoscopic image content by applying the image filter values in accordance with the decrease of the parallax value of the stereoscopic image content by the parallax adjustment processing.

While the present invention has been described above by referring to each of the exemplary embodiments, the present invention is not limited only to each of the exemplary embodiments described above. Various changes and modifications that occur to those skilled in the art can be added to the structures and details of the present invention. Further, proper combinations of a part or a whole part of the structures of each of the exemplary embodiments are also included in the present invention.

While a part of or a whole part of the exemplary embodiments can be summarized as follows, the present invention is not limited only to the followings.

(Supplementary Note 1)

A stereoscopic image display device which includes:
- a stereoscopic display panel which includes: a light separating module which distributes a light ray at least into two different viewpoint directions; assuming that the direction of distributing the light ray as a first direction, a stereoscopic viewing space where a stereoscopic image is displayed by projecting a right-eye image to the right-eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a 3D-crosstalk viewing space where the right-eye image and the left-eye image are projected to one of or both of the right eye and the left eye, which is between the stereoscopic viewing space and the pseudoscopic viewing space in the first direction;
- an observer position measuring unit which measures an observing position of the observer;
- a relative position calculating unit which calculates a relative position of the stereoscopic display panel with respect to the measured observing position;
- an image filter value calculating unit which calculates an image filter value for adjusting an image blurring amount according to the relative position; and
- an image filtering processing unit which performs image filtering processing on image data according to the image filter value.

(Supplementary Note 2)

The stereoscopic image display device as depicted in Supplementary Note 1, which further includes:
- a device characteristic data saving unit which saves device characteristic data containing a display characteristic of the stereoscopic display panel for the relative position; and
- an image data saving unit which saves or receives the image data, wherein
  the image filter value calculating unit calculates the image filter value suited for stereoscopic image display based on the relative position and the device characteristic data.

(Supplementary Note 3)

The stereoscopic image display device as depicted in Supplementary Note 2, wherein
  the relative position is an viewing angle between the observing position of the observer and a display plane of the stereoscopic display panel unit.

(Supplementary Note 4)

The stereoscopic image display device as depicted in Supplementary Note 2 or 3, wherein:
  the device characteristic data is 3D crosstalk characteristic data; and
  the image filter value is calculated based on the 3D crosstalk characteristic data.

(Supplementary Note 5)

The stereoscopic image display device as depicted in Supplementary Note 4, wherein
  when it is defined among the 3D crosstalk characteristic data that an area where the 3D crosstalk amount exceeds a prescribed value is an 3D-crosstalk viewing space and an area where the 3D crosstalk amount is equal to or less than the prescribed value is a no-3D-crosstalk area, the image filter value of the 3D-crosstalk viewing space is larger than the image filter value of the no-3D-crosstalk area.

(Supplementary Note 6)

The stereoscopic image display device as depicted in any one of Supplementary Notes 1 to 5, wherein
  the image filter value calculating unit calculates the image filter values different for each of the image data so as to suppress deterioration in image quality caused by the image filtering processing.

(Supplementary Note 7)

The stereoscopic image display device as depicted in any one of Supplementary Notes 2 to 6, which further includes a 3D crosstalk image area calculating unit which calculates a 3D crosstalk image area based on the relative position and the device characteristic data, wherein
  the image filtering processing unit performs the image filtering processing on the 3D crosstalk image area among the image data according to the image filter value.

(Supplementary Note 8)

The stereoscopic image display device as depicted in any one of Supplementary Notes 2 to 7, which further includes a temperature measuring unit which measures an environmental temperature, wherein
  the image filter value calculating unit calculates the image filter value suited for stereoscopic image display based on the relative position and the device characteristic data corresponding to the environmental temperature measured by the temperature measuring unit.

(Supplementary Note 9)

The stereoscopic image display device as depicted in any one of Supplementary Notes 2 to 8, wherein
  the image filter value calculating unit calculates the image filter value suited for stereoscopic image display based on the relative position, the device characteristic data, and a parallax value held by the image data.

(Supplementary Note 10)

The stereoscopic image display device as depicted in any one of Supplementary Notes 1 to 9, wherein
  the image filter value calculating unit calculates the image filter value by using a laterally asymmetric image filter shape suited for a directional characteristic of an image area where a CT-image by the 3D crosstalk appears.

(Supplementary Note 11)

The stereoscopic image display device as depicted in Supplementary Note 10, wherein
  the image filter value calculating unit calculates the image filter value by using a laterally asymmetric image filter shape whose left and right directions become opposite from each other between an image area displayed in a popup direction and an image area displayed in a depth direction by referring to the parallax value held by the image data.

(Supplementary Note 12)

The stereoscopic image display device as depicted in any one of Supplementary Notes 2 to 11, which further includes:
- a parallax adjustment value calculating unit which calculates a parallax adjustment value suited for stereoscopic image display based on the relative position and the device characteristic data; and
- a parallax adjustment processing unit which performs parallax adjustment processing on the image data according to the parallax adjustment value.

(Supplementary Note 13)

The stereoscopic image display device as depicted in any one of Supplementary Notes 1 to 12, wherein
  the image filter value calculating unit: classifies the area into a stereoscopic viewing space where a left-eye stereoscopic image is projected to the left eye and a right-eye stereoscopic image is projected to the right eye, a pseudoscopic viewing space where a right-eye stereoscopic image is projected to the left eye and a left-eye stereoscopic image is projected to the right eye, and a 3D-crosstalk viewing space where a right-eye and a left-eye stereoscopic images are projected to the left eye or a left-eye and a right-eye stereoscopic images are projected to the right eye according to the relative position; and
  gives an image filter value larger than that of the stereoscopic viewing space or the pseudoscopic viewing space for the image data in the 3D-crosstalk viewing space when the observer moves to the pseudoscopic viewing space from the stereoscopic viewing space.

(Supplementary Note 14)

A stereoscopic image display device which includes:
- a stereoscopic display panel which includes a light separating module which distributes a light ray at least into two different viewpoint directions and includes only a stereoscopic viewing space where a stereoscopic image is displayed by projecting images of different viewpoints to both eyes of an observer, respectively;
- an observer position measuring unit which measures an observing position of the observer;
- a relative position calculating unit which calculates a relative position of the stereoscopic display panel with respect to the observing position;
- an image filter value calculating unit which calculates an image filter value for adjusting an image blurring amount according to the relative position; and an image filtering processing unit which performs image filtering processing on image data according to the image filter value.

(Supplementary Note 15)

The stereoscopic image display device as depicted in Supplementary Note 14, wherein
the relative position is an viewing angle between the observing position of the observer and a display plane of the stereoscopic display panel unit.

(Supplementary Note 16)

The stereoscopic image display device as depicted in Supplementary Note 14 or 15, wherein
the image filter value calculating unit calculates the image filter values different for each of the image data so as to suppress deterioration in image quality caused by the image filtering processing.

(Supplementary Note 17)

The stereoscopic image display device as depicted in any one of Supplementary Notes 14 to 16, which further includes a temperature measuring unit which measures an environmental temperature, wherein
the image filter value calculating unit calculates the image filter value suited for stereoscopic image display by corresponding to the relative position and the environmental temperature measured by the temperature measuring unit.

(Supplementary Note 18)

The stereoscopic image display device as depicted in any one of Supplementary Notes 14 to 17, wherein
the image filter value calculating unit calculates the image filter value suited for stereoscopic image display based on the relative position and a parallax value held by the image data.

(Supplementary Note 19)

The stereoscopic image display device as depicted in any one of Supplementary Notes 14 to 18, wherein
the image filter value calculating unit calculates the image filter value by using a laterally asymmetric image filter shape whose left and right directions become opposite from each other between an image area displayed in a popup direction and an image area displayed in a depth direction by referring to the parallax value held by the image data.

(Supplementary Note 20)

The stereoscopic image display device as depicted in any one of Supplementary Notes 14 to 18, which further includes:
a parallax adjustment value calculating unit which calculates a parallax adjustment value suited for stereoscopic image display based on the relative position; and
a parallax adjustment processing unit which performs parallax adjustment processing on the image data according to the parallax adjustment value.

(Supplementary Note 21)

The stereoscopic image display device as depicted in any one of Supplementary Notes 1 to 20, which includes an arbitrary viewpoint image generating unit having a function which calculates viewpoint positions of two or more virtual cameras by referring to the relative position calculated by the relative position calculating unit, wherein
the image filtering processing unit performs the image filtering processing on the image data captured from the cameras according to the image filter value calculated by the image filter value calculating unit, and takes the processed image data as a display target.

(Supplementary Note 22)

The stereoscopic image display device as depicted in Supplementary Note 21 having N-viewpoints (N is 3 or more), wherein
the arbitrary viewpoint image generating unit detects the virtual camera which captures an image not projected to the observer among the virtual cameras of N-viewpoints by referring to the relative position calculated by the relative position calculating unit, and uncontinuously shifts the viewpoint position of the detected virtual camera in the relative position.

(Supplementary Note 23)

The stereoscopic image display device as depicted in Supplementary Note 21, wherein:
the arbitrary viewpoint image generating unit refers to the viewpoint positions from a plurality of pieces of image data saved in the image data saving unit to specify an arbitrary viewpoint position placed between the viewpoint positions; and
repeatedly displays the image data captured from the arbitrary viewpoint position placed between the viewpoint positions according to the relative position calculated by the relative position calculating unit.

(Supplementary Note 24)

The stereoscopic image display device as depicted in Supplementary Note 23, wherein:
the image data saved in the image data saving unit are the image data of two viewpoints in total, which are right-eye image data and left-eye image data;
the arbitrary viewpoint image generating unit refers to the two viewpoints in total from the right-eye image data and the left-eye image data to specify the arbitrary viewpoint position placed between the two viewpoint positions; and
the image data captured from the arbitrary viewpoint position placed between the two viewpoint positions is repeatedly displayed according to the relative position calculated by the relative position calculating unit.

(Supplementary Note 25)

The stereoscopic image display device as depicted in Supplementary Note 24, wherein:
the arbitrary viewpoint image generating unit repeatedly displays the image data captured from the arbitrary viewpoint position placed between the two viewpoint positions according to the relative position in the stereoscopic viewing space of the stereoscopic display panel unit.

(Supplementary Note 26)

An image processing device which outputs an image data to a stereoscopic display panel which includes: a light separating module which distributes a light ray at least into two different viewpoint directions; assuming that the direction of distributing the light ray as a first direction, a stereoscopic viewing space where a stereoscopic image is displayed by projecting a right-eye image to the right-eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a crosstalk area where the right-eye image and the left-eye image are projected to one of or both of the right eye and the left eye, which is between the stereoscopic viewing space and the pseudoscopic viewing space in the first direction, and the image processing device includes:

a relative position calculating unit which calculates a relative position of the stereoscopic display panel with respect to an observing position of the observer;
an image filter value calculating unit which calculates an image filter value for adjusting an image blurring amount according to the relative position; and
an image filtering processing unit which performs image filtering processing on image data according to the image filter value.

(Supplementary Note 27)

The image processing device as depicted in Supplementary Note 26, which further includes:
an observer position measuring unit which measures the observing position of the observer;
an image data receiving unit which receives the image data before the image filtering processing is performed; and
an image data transmitting unit which outputs the image data on which the image filtering processing is performed.

(Supplementary Note 28)

The image processing device as depicted in Supplementary Note 26 or 27, which further includes:
a device characteristic data saving unit which saves device characteristic data containing a display characteristic of the stereoscopic display panel for the relative position, wherein
the image filter value calculating unit calculates the image filter value based on the device characteristic data and the relative position.

(Supplementary Note 29)

A stereoscopic image processing method using a stereoscopic display panel which includes: a light separating module which distributes a light ray at least into two different viewpoint directions; assuming that the direction of distributing the light ray as a first direction, a stereoscopic viewing space where a stereoscopic image is displayed by projecting a right-eye image to the right-eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a crosstalk area where the right-eye image and the left-eye image are projected to one of or both of the right eye and the left eye, which is between the stereoscopic viewing space and the pseudoscopic viewing space in the first direction, and the method includes:
measuring an observing position of the observer;
calculating a relative position of the stereoscopic display panel with respect to the observing position;
calculating an image filter value for adjusting an image blurring amount according to the relative position;
performing image filtering processing on image data according to the image filter value; and
outputting the image data on which the image filtering processing is performed to the stereoscopic display panel.

(Supplementary Note 30)

The stereoscopic image processing method as depicted in Supplementary Note 29, which includes:
acquiring device characteristic data containing a display characteristic of the stereoscopic display panel with respect to the relative position;
calculating the image filter value based on the device characteristic data in addition to the relative position when calculating the image filter value;
acquiring the image data before performing the image filtering processing; and
performing the image filtering processing on the acquired image data when performing the image filtering processing on the image data.

(Supplementary Note 31)

The stereoscopic image processing method as depicted in Supplementary Note 30, which includes:
calculating a 3D crosstalk image area based on the relative position and the device characteristic data; and
performing the image filtering processing on the 3D crosstalk image area among the image data when performing the image filtering processing on the image data.

INDUSTRIAL APPLICABILITY

The present invention can be applied to a stereoscopic image processing system and a stereoscopic image display system having a function which displays stereoscopic image content on the stereoscopic image display device. Note that the present invention is not limited only to the above-described exemplary embodiments and that it is possible to apply changes and modifications as necessary within the scope of the present invention.

What is claimed is:

1. A stereoscopic image display device, comprising:
a stereoscopic display panel which includes: a light separating module which distributes a light ray at least into two different viewpoint directions; assuming that the direction of distributing the light ray as a first direction, a stereoscopic viewing space where a stereoscopic image is displayed by projecting a right-eye image to the right-eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a 3D-crosstalk viewing space where the right-eye image and the left-eye image are projected to one of or both of the right eye and the left eye, which is between the stereoscopic viewing space and the pseudoscopic viewing space in the first direction;
an observer position measuring unit which measures an observing position of the observer;
a relative position calculating unit which calculates a relative position of the stereoscopic display panel with respect to the measured observing position;
an image filter value calculating unit which calculates an image filter value for adjusting an amount of blur in an image according to the relative position; and
an image blurring processing unit which performs image blurring processing on image data to blur the image according to the image filter value.

2. The stereoscopic image display device as claimed in claim 1, wherein at least two or more stereoscopic viewing spaces are included between pseudoscopic viewing spaces existing in the first direction, and the 3D-crosstalk viewing space exists not only between the pseudoscopic viewing space and the stereoscopic viewing space but also between the stereoscopic viewing spaces.

3. The stereoscopic image display device as claimed in claim 1, further comprising:

a device characteristic data saving unit which saves device characteristic data containing a display characteristic of the stereoscopic display panel for the relative position; and an image data saving unit which saves or receives the image data, wherein the image filter value calculating unit calculates the image filter value suited for stereoscopic image display based on the relative position and the device characteristic data.

4. The stereoscopic image display device as claimed in claim 3, wherein the relative position is an viewing angle between the observing position of the observer and a display plane of the stereoscopic display panel unit.

5. The stereoscopic image display device as claimed in claim 3, wherein:

the device characteristic data is 3D crosstalk characteristic data; and the image filter value is calculated based on the 3D crosstalk characteristic data.

6. The stereoscopic image display device as claimed in claim 5, wherein when it is defined among the 3D crosstalk characteristic data that an area where the 3D crosstalk amount exceeds a prescribed value is a 3D-crosstalk viewing space and an area where the 3D crosstalk amount is equal to or less than the prescribed value is a no-3D-crosstalk area, the image filter value of the 3D-crosstalk viewing space is larger than the image filter value of the no-3D-crosstalk area.

7. The stereoscopic image display device as claimed in claim 3, further comprising a 3D crosstalk image area calculating unit which calculates a 3D crosstalk image area based on the relative position and the device characteristic data, wherein the image blurring processing unit performs the image blurring processing to blur the 3D crosstalk image area among the image data according to the image filter value.

8. The stereoscopic image display device as claimed in claim 3, further comprising a temperature measuring unit which measures an environmental temperature, wherein the image filter value calculating unit calculates the image filter value suited for stereoscopic image display based on the relative position and the device characteristic data corresponding to the environmental temperature measured by the temperature measuring unit.

9. The stereoscopic image display device as claimed in claim 3, wherein the image filter value calculating unit calculates the image filter value suited for stereoscopic image display based on the relative position, the device characteristic data, and a parallax value of the image data.

10. The stereoscopic image display device as claimed in claim 3, further comprising:

a parallax adjustment value calculating unit which calculates a parallax adjustment value suited for stereoscopic image display based on the relative position and the device characteristic data; and a parallax adjustment processing unit which performs parallax adjustment processing on the image data according to the parallax adjustment value.

11. The stereoscopic image display device as claimed in claim 1, wherein the image filter value calculating unit calculates the image filter values different for each of the image data so as to suppress deterioration in image quality caused by the image blurring processing.

12. The stereoscopic image display device as claimed in claim 1, wherein the image filter value calculating unit calculates the image filter value by using a laterally asymmetric image filter shape suited for a directional characteristic of an image area where a 3D-crosstalk image by the 3D crosstalk appears.

13. The stereoscopic image display device as claimed in claim 12, wherein the image filter value calculating unit calculates the image filter value by using a laterally asymmetric image filter shape whose left and right directions become opposite from each other between an image area displayed in a popup direction and an image area displayed in a depth direction by referring to the parallax value of the image data.

14. The stereoscopic image display device as claimed in claim 1, wherein the image filter value calculating unit:

classifies the area into a stereoscopic viewing space where a left-eye stereoscopic image is projected to the left eye and a right-eye stereoscopic image is projected to the right eye, a pseudoscopic viewing space where a right-eye stereoscopic image is projected to the left eye and a left-eye stereoscopic image is projected to the right eye, and a 3D-crosstalk viewing space where a right-eye and a left-eye stereoscopic images are projected to the left eye or a left-eye and a right-eye stereoscopic images are projected to the right eye, according to the relative position; and gives an image filter value larger than that of the stereoscopic viewing space or the pseudoscopic viewing space for the image data in the 3D-crosstalk viewing space when the observer moves to the pseudoscopic viewing space from the stereoscopic viewing space.

15. The stereoscopic image display device as claimed in claim 1, comprising an arbitrary viewpoint image generating unit having a function which calculates viewpoint positions of two or more virtual cameras by referring to the relative position calculated by the relative position calculating unit, wherein the image blurring processing unit performs the image blurring processing on the image data captured from the cameras according to the image filter value calculated by the image filter value calculating unit, and takes the processed image data as a display target.

16. The stereoscopic image display device as claimed in claim 15 having N-viewpoints (N is 3 or more), wherein the arbitrary viewpoint image generating unit detects the virtual camera which captures an image not projected to the observer among the virtual cameras of N-viewpoints by referring to the relative position calculated by the relative position calculating unit, and uncontinuously shifts the viewpoint position of the detected virtual camera in the relative position.

17. The stereoscopic image display device as claimed in claim 15, wherein:

the arbitrary viewpoint image generating unit refers to the viewpoint positions from a plurality of pieces of image data saved in the image data saving unit to specify an arbitrary viewpoint position placed between the viewpoint positions; and repeatedly displays the image data captured from the arbitrary viewpoint position placed between the viewpoint positions according to the relative position calculated by the relative position calculating unit.

18. The stereoscopic image display device as claimed in claim 17, wherein:

the image data saved in the image data saving unit are the image data of two viewpoints in total, which are right-eye image data and left-eye image data;

the arbitrary viewpoint image generating unit refers to the two viewpoints in total from the right-eye image data and the left-eye image data to specify the arbitrary viewpoint position placed between the two viewpoint positions; and the image data captured from the arbitrary viewpoint position placed between the two viewpoint positions is repeatedly displayed according to the relative position calculated by the relative position calculating unit.

19. The stereoscopic image display device as claimed in claim 18, wherein the arbitrary viewpoint image generating unit repeatedly displays the image data captured from the arbitrary viewpoint position placed between the two viewpoint positions according to the relative position in the stereoscopic viewing space of the stereoscopic display panel unit.

20. A stereoscopic image display device, comprising:
a stereoscopic display panel which includes a light separating module which distributes a light ray at least into two different viewpoint directions and includes only a stereoscopic viewing space where a stereoscopic image is displayed by projecting images of different viewpoints to both eyes of an observer, respectively;
an observer position measuring unit which measures an observing position of the observer;
a relative position calculating unit which calculates a relative position of the stereoscopic display panel with respect to the observing position;
an image filter value calculating unit which calculates an image filter value for adjusting an amount of blur in an image according to the relative position; and
an image blurring processing unit which performs image blurring processing on image data to blur the image according to the image filter value.

21. The stereoscopic image display device as claimed in claim 20, wherein the relative position is an viewing angle between the observing position of the observer and a display plane of the stereoscopic display panel unit.

22. The stereoscopic image display device as claimed in claim 20, wherein the image filter value calculating unit calculates the image filter values different for each of the image data so as to suppress deterioration in image quality caused by the image blurring processing.

23. The stereoscopic image display device as claimed in claim 20, further comprising a temperature measuring unit which measures an environmental temperature,
wherein the image filter value calculating unit calculates the image filter value suited for stereoscopic image display by corresponding to the relative position and the environmental temperature measured by the temperature measuring unit.

24. The stereoscopic image display device as claimed in claim 20, wherein the image filter value calculating unit calculates the image filter value suited for stereoscopic image display based on the relative position and a parallax value of the image data.

25. The stereoscopic image display device as claimed in claim 20, wherein the image filter value calculating unit calculates the image filter value by using a laterally asymmetric image filter shape whose left and right directions become opposite from each other between an image area displayed in a popup direction and an image area displayed in a depth direction by referring to the parallax value held by the image data.

26. The stereoscopic image display device as claimed in claim 20, further comprising:
a parallax adjustment value calculating unit which calculates a parallax adjustment value suited for stereoscopic image display based on the relative position; and a parallax adjustment processing unit which performs parallax adjustment processing on the image data according to the parallax adjustment value.

27. An image processing device which outputs an image data to a stereoscopic display panel which includes: a light separating module which distributes a light ray at least into two different viewpoint directions; assuming that the direction of distributing the light ray as a first direction, a stereoscopic viewing space where a stereoscopic image is displayed by projecting a right-eye image to the right-eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a crosstalk area where the right-eye image and the left-eye image are projected to one of or both of the right eye and the left eye, which is between the stereoscopic viewing space and the pseudoscopic viewing space in the first direction, the image processing device comprising:
a relative position calculating unit which calculates a relative position of the stereoscopic display panel with respect to an observing position of the observer;
an image filter value calculating unit which calculates an image filter value for adjusting an amount of blur in an image according to the relative position; and
an image blurring processing unit which performs image blurring processing on image data to blur the image according to the image filter value.

28. The image processing device as claimed in claim 27, further comprising:
an observer position measuring unit which measures the observing position of the observer;
an image data receiving unit which receives the image data before the image blurring processing is performed; and
an image data transmitting unit which outputs the image data on which the image blurring processing is performed.

29. The image processing device as claimed in claim 27, further comprising:
a device characteristic data saving unit which saves device characteristic data containing a display characteristic of the stereoscopic display panel for the relative position,
wherein the image filter value calculating unit calculates the image filter value based on the device characteristic data and the relative position.

30. A stereoscopic image processing method using a stereoscopic display panel which includes: a light separating module which distributes a light ray at least into two different viewpoint directions; assuming that the direction of distributing the light ray as a first direction, a stereoscopic viewing space where a stereoscopic image is displayed by projecting a right-eye image to the right-eye of an observer and a left-eye image to the left eye of the observer, respectively; a pseudoscopic viewing space where the left-eye image is projected to the right eye and the right-eye image is projected to the left eye, respectively, which is at a position shifted from the stereoscopic viewing space in the first direction; and a crosstalk area where the right-eye image and the left-eye image are projected to one of or both of the right eye and the left eye, which is between the stereoscopic viewing space and the pseudoscopic viewing space in the first direction, the method comprising:
measuring an observing position of the observer;
calculating a relative position of the stereoscopic display panel with respect to the observing position;

calculating an image filter value for adjusting an amount of blurring in an image according to the relative position;

performing image blurring processing on image data to blur the image according to the image filter value; and outputting the image data on which the image blurring processing is performed to the stereoscopic display panel.

31. The stereoscopic image processing method as claimed in claim 30, comprising:

acquiring device characteristic data containing a display characteristic of the stereoscopic display panel with respect to the relative position;

calculating the image filter value based on the device characteristic data in addition to the relative position when calculating the image filter value;

acquiring the image data before performing the image blurring processing; and performing the image blurring processing on the acquired image data when performing the image blurring processing on the image data.

32. The stereoscopic image processing method as claimed in claim 31, comprising:

calculating a 3D crosstalk image area based on the relative position and the device characteristic data; and performing the image blurring processing on the 3D crosstalk image area among the image data when performing the image blurring processing on the image data.

* * * * *